United States Patent
Jiang et al.

(10) Patent No.: US 12,473,284 B2
(45) Date of Patent: Nov. 18, 2025

(54) SMALL MOLECULE INHIBITORS OF ULK1

(71) Applicant: Memorial Sloan Kettering Cancer Center, New York, NY (US)

(72) Inventors: Xuejun Jiang, New York, NY (US);
Derek Tan, New York, NY (US);
Deguang Liang, New York, NY (US);
Pui-Mun Wong, New York, NY (US);
Takao Suzuki, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 731 days.

(21) Appl. No.: 17/790,091

(22) PCT Filed: Dec. 29, 2020

(86) PCT No.: PCT/US2020/067323
§ 371 (c)(1),
(2) Date: Jun. 29, 2022

(87) PCT Pub. No.: WO2021/138331
PCT Pub. Date: Jul. 8, 2021

(65) Prior Publication Data
US 2023/0117572 A1    Apr. 20, 2023

Related U.S. Application Data

(60) Provisional application No. 62/955,342, filed on Dec. 30, 2019.

(51) Int. Cl.
*C07D 471/04* (2006.01)
*A61K 45/06* (2006.01)

(52) U.S. Cl.
CPC ............ *C07D 471/04* (2013.01); *A61K 45/06* (2013.01)

(58) Field of Classification Search
CPC .................................................... C07D 471/04
USPC ........................................................ 514/300
See application file for complete search history.

(56) References Cited

U.S. PATENT DOCUMENTS

| | | | |
|---|---|---|---|
| 5,478,838 A * | 12/1995 | Arita | C07D 471/04 546/113 |
| 6,218,410 B1 * | 4/2001 | Uehata | A61P 27/02 514/242 |
| 6,649,625 B2 * | 11/2003 | Azuma | A61K 31/4545 514/303 |
| 6,720,341 B2 * | 4/2004 | Moriyama | A61K 31/44 514/242 |
| 6,794,398 B1 | 9/2004 | Nakamuta et al. | |
| 2016/0186141 A1 | 6/2016 | Cao et al. | |

FOREIGN PATENT DOCUMENTS

WO     WO-9528387 A1 * 10/1995 ................ A61P 9/12

OTHER PUBLICATIONS

International Search Report and Written Opinion issued in International Application No. PCT/US2020/067323 dated Jul. 22, 2021.
Shah et al. "A review on ROCK-II inhibitors: From molecular modelling to synthesis", Bioorganic & Medicinal Chemistry Letters, 2016, pp. 2383-2391, vol. 26, 2016 Elsevier Ltd.

* cited by examiner

*Primary Examiner* — Niloofar Rahmani
(74) *Attorney, Agent, or Firm* — Foley & Lardner LLP

(57) ABSTRACT

The present technology is directed to compounds, compositions, and methods related to inhibition of ULK1 and treatment of cancers therefrom.

18 Claims, 2 Drawing Sheets
Specification includes a Sequence Listing.

SMALL MOLECULE INHIBITORS OF ULK1

CROSS-REFERENCE TO RELATED APPLICATIONS

This application is a U.S. National Phase Application under 35 U.S.C. 371 of International Application No. PCT/US2020/067323, filed Dec. 29, 2020, which claims the benefit of and priority to U.S. Provisional Application No. 62/955,342, filed Dec. 30, 2019, the contents of which are incorporated by reference in their entireties for any and all purposes.

SEQUENCE LISTING

The instant application contains a Sequence Listing which has been submitted electronically in ASCII format and is hereby incorporated by reference in its entirety. Said ASCII copy, created on Mar. 22, 2021, is named 115872-2011_SL.txt and is 622 bytes in size.

FIELD

The present technology is directed to compounds, compositions, and methods related to inhibition of ULK1 via small molecules and treatment of cancers therefrom.

SUMMARY

In an aspect, a compound according to Formula I is

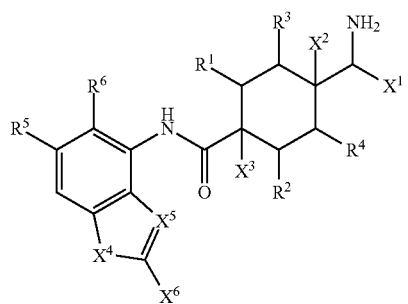

or a pharmaceutically acceptable salt and/or solvate thereof, wherein
  $R^1$ and $R^2$ are each independently H, or $R^1$ and $R^2$ together are a bond;
  $R^3$ and $R^4$ are each independently H, or $R^3$ and $R^4$ together are a bond;
  $R^5$ and $R^6$ are each independently H, alkyl, O-alkyl, $CO_2H$, $CO_2$-alkyl, halogen, or cyano;
  $X^1$ is H, Me, $CO_2$-alkyl, or heteroaryl;
  $X^2$ is H or Me;
  $X^3$ is H or Me;
  $X^4$ is NH or O;
  $X^5$ is CH or N; and
  $X^6$ is H, aryl, or heteroaryl.

In an aspect of the present technology, a composition is provided that includes any one of the herein-described embodiments of compounds of Formula I and a pharmaceutically acceptable carrier.

In a related aspect, a pharmaceutical composition is provided, the pharmaceutical composition including an effective amount of the compound of any one of the aspects and embodiments of compounds of Formula I for treating cancer in a subject (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer); and a pharmaceutically acceptable carrier.

In a further related aspect, a method is provided that includes administering an effective amount of a compound of any one of the embodiments of compounds of Formula I or administering a pharmaceutical composition including an effective amount of a compound of any one of the embodiments of compounds of Formula I to a subject suffering from cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer).

DETAILED DESCRIPTION

Figure 1:
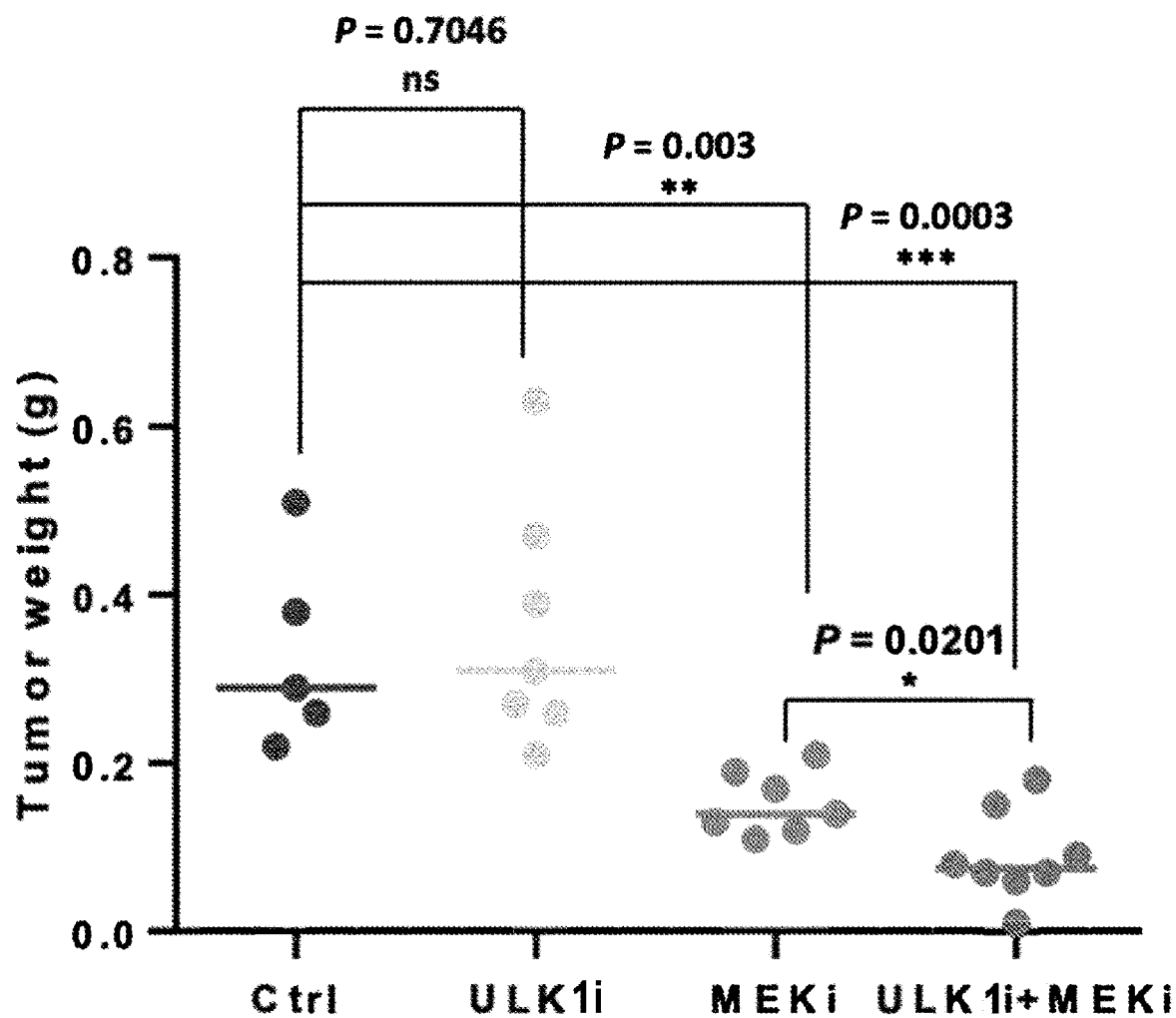
FIG. 1 illustrates the final tumor weights for four groups on mice in a MiaCaPa-2 cell line xenograft mouse model, where "Control" group mice were treated 6 days a week, i.p., for 17 days with dosing vehicle; "ULK1i" group mice were treated 6 days a week, i.p., for 17 days with a compound of the present technology, 10 mg/kg; "MEKi" group mice were treated 6 days a week, i.p., for 17 days with MEK1 inhibitor trametinib, 0.5 mg/kg; "ULK1i+MEKi" group mice were treated 6 days a week, i.p., for 17 days with a combination of the compound of the present technology (10 mg/kg) and trametinib (0.5 mg/kg), according to the working examples.

In various aspects, the present technology provides compounds and methods for inhibition of ULK1. The compounds provided herein can be formulated into pharmaceutical compositions and medicaments that are useful in the disclosed methods. Also provided is the use of the compounds in preparing pharmaceutical formulations and medicaments.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The phrase "and/or" as used in the present disclosure will be understood to mean any one of the recited members individually or a combination of any two or more thereof—for example, "A, B, and/or C" would mean "A, B, C, A and B, A and C, or B and C."

Generally, reference to a certain element such as hydrogen or H is meant to include all isotopes of that element. For example, if an R group is defined to include hydrogen or H, it also includes deuterium and tritium. Compounds comprising radioisotopes such as tritium, $C^{14}$, $P^{32}$ and $S^{35}$ are thus within the scope of the present technology. Procedures for inserting such labels into the compounds of the present technology will be readily apparent to those skilled in the art based on the disclosure herein.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyl, heterocyclylalkyl, heterocyclyloxy, and heterocyclylalkoxy groups; carbonyls (oxo); carboxylates; esters; urethanes; oximes; hydroxylamines; alkoxyamines; aralkoxyamines; thiols; sulfides; sulfoxides; sulfones; sulfonyls; pentafluorosulfanyl (i.e., $SF_5$), sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; and nitriles (i.e., CN).

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Alkyl groups may be substituted or unsubstituted. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above, and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Cycloalkyl groups may be substituted or unsubstituted. Exemplary monocyclic cycloalkyl groups include, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Cycloalkylalkyl groups are alkyl groups as defined above in which a hydrogen or carbon bond of an alkyl group is replaced with a bond to a cycloalkyl group as defined above. Cycloalkylalkyl groups may be substituted or unsubstituted. In some embodiments, cycloalkylalkyl groups have from 4 to 16 carbon atoms, 4 to 12 carbon atoms, and typically 4 to 10 carbon atoms. Substituted cycloalkylalkyl groups may be substituted at the alkyl, the cycloalkyl or both the alkyl and cycloalkyl portions of the group. Representative substituted cycloalkylalkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Alkenyl groups may be substituted or unsubstituted. Alkenyl groups have from 2 to 12 carbon atoms, and typically from 2 to 10 carbons or, in some embodiments, from 2 to 8, 2 to 6, or 2 to 4 carbon atoms. In some embodiments, the alkenyl group has one, two, or three carbon-carbon double bonds. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, among others. Representative substituted alkenyl groups may be mono-substituted or substituted more than once, such as, but not limited to, mono-, di- or tri-substituted with substituents such as those listed above.

Cycloalkenyl groups include cycloalkyl groups as defined above, having at least one double bond between two carbon atoms. Cycloalkenyl groups may be substituted or unsubstituted. In some embodiments the cycloalkenyl group may have one, two or three double bonds but does not include aromatic compounds. Cycloalkenyl groups have from 4 to 14 carbon atoms, or, in some embodiments, 5 to 14 carbon atoms, 5 to 10 carbon atoms, or even 5, 6, 7, or 8 carbon atoms. Examples of cycloalkenyl groups include cyclohexenyl, cyclopentenyl, cyclohexadienyl, cyclobutadienyl, and cyclopentadienyl.

Cycloalkenylalkyl groups are alkyl groups as defined above in which a hydrogen or carbon bond of the alkyl group is replaced with a bond to a cycloalkenyl group as defined above. Cycloalkenylalkyl groups may be substituted or unsubstituted. Substituted cycloalkenylalkyl groups may be substituted at the alkyl, the cycloalkenyl or both the alkyl and cycloalkenyl portions of the group. Representative substituted cycloalkenylalkyl groups may be substituted one or more times with substituents such as those listed above.

Alkynyl groups include straight and branched chain alkyl groups as defined above, except that at least one triple bond exists between two carbon atoms. Alkynyl groups may be substituted or unsubstituted. Alkynyl groups have from 2 to 12 carbon atoms, and typically from 2 to 10 carbons or, in some embodiments, from 2 to 8, 2 to 6, or 2 to 4 carbon atoms. In some embodiments, the alkynyl group has one, two, or three carbon-carbon triple bonds. Examples include, but are not limited to —C≡CH, —C≡CCH$_3$, —CH$_2$C≡CCH$_3$, —C≡CCH$_2$CH(CH$_2$CH$_3$)$_2$, among others. Representative substituted alkynyl groups may be mono-substituted or substituted more than once, such as, but not limited to, mono-, di- or tri-substituted with substituents such as those listed above.

Aryl groups are cyclic aromatic hydrocarbons that do not contain heteroatoms. Aryl groups herein include monocyclic, bicyclic and tricyclic ring systems. Aryl groups may be substituted or unsubstituted. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. The phrase "aryl groups" includes groups containing fused rings, such as fused aromatic-aliphatic ring systems (e.g., indanyl, tetrahydronaphthyl, and the like). Representative substituted aryl groups may be mono-substituted (e.g., tolyl) or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. Aralkyl groups may be substituted or unsubstituted. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanyl-ethyl. Representative substituted aralkyl groups may be substituted one or more times with substituents such as those listed above.

Heterocyclyl groups include aromatic (also referred to as heteroaryl) and non-aromatic ring compounds containing 3 or more ring members, of which one or more is a heteroatom such as, but not limited to, N, O, and S. Heterocyclyl groups may be substituted or unsubstituted. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. The phrase includes heterocyclyl groups that have other groups, such as alkyl, oxo or halo groups, bonded to one of the ring members, referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be monosubstituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups may be substituted or unsubstituted. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Representative substituted heteroaryl groups may be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Heterocyclylalkyl groups may be substituted or unsubstituted. Substituted heterocyclylalkyl groups may be substituted at the alkyl, the heterocyclyl or both the alkyl and heterocyclyl portions of the group. Representative heterocyclyl alkyl groups include, but are not limited to, morpholin-4-yl-ethyl, furan-2-yl-methyl, imidazol-4-yl-methyl, pyridin-3-yl-methyl, tetrahydrofuran-2-yl-ethyl, and indol-2-yl-propyl. Representative substituted heterocyclylalkyl groups may be substituted one or more times with substituents such as those listed above.

Heteroarakyl groups are alkyl groups as defined above in which a hydrogen or carbon bond of an alkyl group is replaced with a bond to a heteroaryl group as defined above. Heteroaralkyl groups may be substituted or unsubstituted. Substituted heteroarakyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth. Substituted groups having a single point of attachment to the compound of the present technology are not referred to using the "ene" designation. Thus, e.g., chloroethyl is not referred to herein as chloroethylene.

Alkoxy groups are hydroxyl groups (—OH) in which the bond to the hydrogen atom is replaced by a bond to a carbon atom of a substituted or unsubstituted alkyl group as defined above. Alkoxy groups may be substituted or unsubstituted. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Representative substituted alkoxy groups may be substituted one or more times with substituents such as those listed above.

The terms "alkanoyl" and "alkanoyloxy" as used herein can refer, respectively, to —C(O)-alkyl groups and —O—C(O)-alkyl groups, each containing 2-5 carbon atoms. Similarly, "aryloyl" and "aryloyloxy" refer to —C(O)-aryl groups and —O—C(O)-aryl groups.

The terms "aryloxy" and "arylalkoxy" refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups may be substituted one or more times with substituents such as those listed above.

The term "carboxylate" as used herein refers to a —COOH group.

The term "ester" as used herein refers to —COOR$^{70}$ and —C(O)O-G groups. R$^{70}$ is a substituted or unsubstituted alkyl, cycloalkyl, alkenyl, alkynyl, aryl, aralkyl, heterocyclylalkyl or heterocyclyl group as defined herein. G is a carboxylate protecting group. Carboxylate protecting groups are well known to one of ordinary skill in the art. An extensive list of protecting groups for the carboxylate group functionality may be found in Protective Groups in Organic Synthesis, Greene, T. W.; Wuts, P. G. M., John Wiley & Sons, New York, NY, (3rd Edition, 1999) which can be added or removed using the procedures set forth therein and which is hereby incorporated by reference in its entirety and for any and all purposes as if fully set forth herein.

The term "amide" (or "amido") includes C- and N-amide groups, i.e., —C(O)NR$^{71}$R$^{72}$, and —NR$^{71}$C(O)R$^{72}$ groups, respectively. R$^{71}$ and R$^{72}$ are independently hydrogen, or a substituted or unsubstituted alkyl, alkenyl, alkynyl, cycloalkyl, aryl, aralkyl, heterocyclylalkyl or heterocyclyl group as defined herein. Amido groups therefore include but are not limited to carbamoyl groups (—C(O)NH$_2$) and formamide groups (—NHC(O)H). In some embodiments, the amide is —NR$^{71}$C(O)—(C$_{1-5}$ alkyl) and the group is termed "carbonylamino," and in others the amide is —NHC(O)-alkyl and the group is termed "alkanoylamino."

The term "nitrile" or "cyano" as used herein refers to the —CN group.

Urethane groups include N- and O-urethane groups, i.e., —NR$^{73}$C(O)OR$^{74}$ and —OC(O)NR$^{73}$R$^{74}$ groups, respectively. R$^{73}$ and R$^{74}$ are independently a substituted or unsubstituted alkyl, alkenyl, alkynyl, cycloalkyl, aryl, aralkyl, heterocyclylalkyl, or heterocyclyl group as defined herein. R$^{73}$ may also be H.

The term "amine" (or "amino") as used herein refers to —NR$^{75}$R$^{76}$ groups, wherein R$^{75}$ and R$^{76}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "sulfonamido" includes S- and N-sulfonamide groups, i.e., —SO$_2$NR$^{78}$R$^{79}$ and —NR$^{78}$SO$_2$R$^{79}$ groups, respectively. R$^{78}$ and R$^{79}$ are independently hydrogen, or a substituted or unsubstituted alkyl, alkenyl, alkynyl, cycloalkyl, aryl, aralkyl, heterocyclylalkyl, or heterocyclyl group as defined herein. Sulfonamido groups therefore include but are not limited to sulfamoyl groups (—SO$_2$NH$_2$). In some embodiments herein, the sulfonamido is —NHSO$_2$-alkyl and is referred to as the "alkylsulfonylamino" group.

The term "thiol" refers to —SH groups, while "sulfides" include —SR$^{80}$ groups, "sulfoxides" include —S(O)R$^{81}$ groups, "sulfones" include —SO$_2$R$^{82}$ groups, and "sulfonyls" include —SO$_2$OR$^{83}$. R$^{80}$, R$^{81}$, R$^{82}$, and R$^{83}$ are each independently a substituted or unsubstituted alkyl, cycloalkyl, alkenyl, alkynyl, aryl aralkyl, heterocyclyl or heterocyclylalkyl group as defined herein. In some embodiments the sulfide is an alkylthio group, —S-alkyl.

The term "urea" refers to —NR$^{84}$—C(O)—NR$^{85}$R$^{86}$ groups. R$^{84}$, R$^{85}$, and R$^{86}$ groups are independently hydrogen, or a substituted or unsubstituted alkyl, alkenyl, alkynyl, cycloalkyl, aryl, aralkyl, heterocyclyl, or heterocyclylalkyl group as defined herein.

The term "amidine" refers to —C(NR$^{87}$)NR$^{88}$R$^{89}$ and —NR$^{87}$C(NR$^{88}$)R$^{89}$, wherein R$^{87}$, R$^{88}$, and R$^{89}$ are each independently hydrogen, or a substituted or unsubstituted alkyl, cycloalkyl, alkenyl, alkynyl, aryl aralkyl, heterocyclyl or heterocyclylalkyl group as defined herein.

The term "guanidine" refers to —NR$^{90}$C(NR$^{91}$)NR$^{92}$R$^{93}$, wherein R$^{90}$, R$^{91}$, R$^{92}$ and R$^{93}$ are each independently hydrogen, or a substituted or unsubstituted alkyl, cycloalkyl, alkenyl, alkynyl, aryl aralkyl, heterocyclyl or heterocyclylalkyl group as defined herein.

The term "enamine" refers to —C(R$^{94}$)=C(R$^{95}$)NR$^{96}$R$^{97}$ and —NR$^{94}$C(R$^{95}$)=C(R$^{96}$)R$^{97}$, wherein R$^{94}$, R$^{95}$, R$^{96}$ and R$^{97}$ are each independently hydrogen, a substituted or unsubstituted alkyl, cycloalkyl, alkenyl, alkynyl, aryl aralkyl, heterocyclyl or heterocyclylalkyl group as defined herein.

The term "halogen" or "halo" as used herein refers to bromine, chlorine, fluorine, or iodine. In some embodiments, the halogen is fluorine. In other embodiments, the halogen is chlorine or bromine.

The term "hydroxyl" as used herein can refer to —OH or its ionized form, —O⁻. A "hydroxyalkyl" group is a hydroxyl-substituted alkyl group, such as HO—CH₂—.

The term "imide" refers to —C(O)NR$^{98}$C(O)R$^{99}$, wherein R$^{98}$ and R$^{99}$ are each independently hydrogen, or a substituted or unsubstituted alkyl, cycloalkyl, alkenyl, alkynyl, aryl aralkyl, heterocyclyl or heterocyclylalkyl group as defined herein.

The term "imine" refers to —CR$^{100}$(NR$^{101}$) and —N(CR$^{100}$R$^{101}$) groups, wherein R$^{100}$ and R$^{101}$ are each independently hydrogen or a substituted or unsubstituted alkyl, cycloalkyl, alkenyl, alkynyl, aryl aralkyl, heterocyclyl or heterocyclylalkyl group as defined herein, with the proviso that R$^{100}$ and R$^{101}$ are not both simultaneously hydrogen.

The term "nitro" as used herein refers to an —NO₂ group.

The term "trifluoromethyl" as used herein refers to —CF₃.

The term "trifluoromethoxy" as used herein refers to —OCF₃.

The term "azido" refers to —N₃.

The term "trialkyl ammonium" refers to a —N(alkyl)₃ group. A trialkylammonium group is positively charged and thus typically has an associated anion, such as halogen anion.

The term "isocyano" refers to —NC.

The term "isothiocyano" refers to —NCS.

The term "pentafluorosulfanyl" refers to —SF₅.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Pharmaceutically acceptable salts of compounds described herein are within the scope of the present technology and include acid or base addition salts which retain the desired pharmacological activity and is not biologically undesirable (e.g., the salt is not unduly toxic, allergenic, or irritating, and is bioavailable). When the compound of the present technology has a basic group, such as, for example, an amino group, pharmaceutically acceptable salts can be formed with inorganic acids (such as hydrochloric acid, hydroboric acid, nitric acid, sulfuric acid, and phosphoric acid), organic acids (e.g., alginate, formic acid, acetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p-toluenesulfonic acid) or acidic amino acids (such as aspartic acid and glutamic acid). When the compound of the present technology has an acidic group, such as for example, a carboxylic acid group, it can form salts with metals, such as alkali and earth alkali metals (e.g., Na⁺, Li⁺, K⁺, Ca²⁺, Mg²⁺, Zn²⁺), ammonia or organic amines (e.g., dicyclohexylamine, trimethylamine, triethylamine, pyridine, picoline, ethanolamine, diethanolamine, triethanolamine) or basic amino acids (e.g., arginine, lysine and ornithine). Such salts can be prepared in situ during isolation and purification of the compounds or by separately reacting the purified compound in its free base or free acid form with a suitable acid or base, respectively, and isolating the salt thus formed.

Those of skill in the art will appreciate that compounds of the present technology may exhibit the phenomena of tautomerism, conformational isomerism, geometric isomerism and/or stereoisomerism. As the formula drawings within the specification and claims can represent only one of the possible tautomeric, conformational isomeric, stereochemical or geometric isomeric forms, it should be understood that the present technology encompasses any tautomeric, conformational isomeric, stereochemical and/or geometric isomeric forms of the compounds having one or more of the utilities described herein, as well as mixtures of these various different forms.

"Tautomers" refers to isomeric forms of a compound that are in equilibrium with each other. The presence and concentrations of the isomeric forms will depend on the environment the compound is found in and may be different depending upon, for example, whether the compound is a solid or is in an organic or aqueous solution. For example, in aqueous solution, quinazolinones may exhibit the following isomeric forms, which are referred to as tautomers of each other:

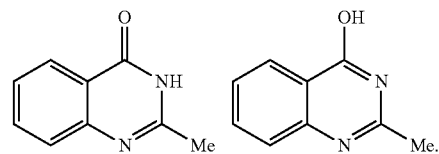

As another example, guanidines may exhibit the following isomeric forms in protic organic solution, also referred to as tautomers of each other:

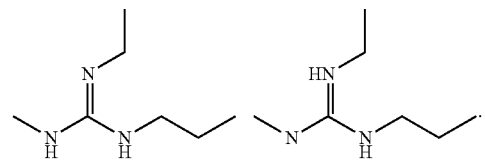

Because of the limits of representing compounds by structural formulas, it is to be understood that all chemical formulas of the compounds described herein represent all tautomeric forms of compounds and are within the scope of the present technology.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these stereoisomers are all within the scope of the present technology.

The compounds of the present technology may exist as solvates, especially hydrates. Hydrates may form during manufacture of the compounds or compositions comprising the compounds, or hydrates may form over time due to the hygroscopic nature of the compounds. Compounds of the present technology may exist as organic solvates as well, including DMF, ether, and alcohol solvates among others. The identification and preparation of any particular solvate is within the skill of the ordinary artisan of synthetic organic or medicinal chemistry.

The Present Technology

Autophagy related 1 (ATG1) is one of the upstream components of the autophagy pathway. In mammals, ATG1 has two homologous, uncoordinated 51-like kinase 1 (ULK1) and ULK2, which initiate autophagy in response to, e.g., amino acid starvation. ULK1 and ULK2 also phosphorylate key glycolytic enzymes to promote additional carbon flux into the pentose phosphate pathway during times of nutritional stress in order to maintain redox homeostasis. Elevated ULK1 expression has been observed in human cancers, including nasopharyngeal carcinoma, oesophageal squamous cell carcinoma, colorectal cancer, and hepatocellular carcinoma and is an independent predictor of poor survival for patients with these cancers. Small molecule inhibitors of ULK1 kinase have also been found to inhibit autophagy and enhances apoptosis in human glioblastoma and lung cancer cells, and induce cell apoptosis and enhance the sensitivity of cisplatin against non-small cell lung cancer cells. Further, knockdown of ULK1 and inhibition of ULK1 by small molecule ULK1 inhibitors has been shown to incude cell apoptosis in renal clear cell carcinonma tissues, inhibiting tumour growth without producing any symptoms of toxicity. See, e.g., J. Liu et al. *EBioMedicine* 2018, 34, 85-93. See also, e.g., Yamaguchi, H. et al. *J. Biochem.* 2006, 140, 305-311 regarding binding to other protein kinases. Accordingly, there is need for small molecule inhibitors of ULK1 for the treatment of a variety of cancers.

The present technology provides small molecule inhibitors of ULK1 useful in the treatment of cancers (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer). Further, the compounds of the present technology have been found to inhibit protein kinase CDK7 with low nM potency, and therefore are also available as therapeutic CDK7 inhibitors. Thus, in an aspect, a compound according to Formula I is provided

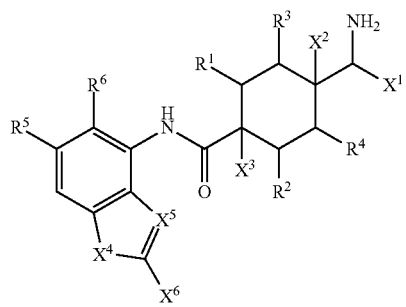

(I)

or a pharmaceutically acceptable salt and/or solvate thereof, wherein $R^1$ and $R^2$ are each independently H, or $R^1$ and $R^2$ together are a bond;

$R^3$ and $R^4$ are each independently H, or $R^3$ and $R^4$ together are a bond;

$R^5$ and $R^6$ are each independently H, alkyl, O-alkyl, $CO_2H$, $CO_2$-alkyl, halogen, or cyano;

$X^1$ is H, Me, $CO_2$-alkyl, or heteroaryl;

$X^2$ is H or Me;

$X^3$ is H or Me;

$X^4$ is NH or O;

$X^5$ is CH or N; and $X^6$ is H, aryl, or heteroaryl.

In any embodiment herein of a compound of Formula I, it may be that $X^6$ is substituted phenyl, unsubstituted phenyl, or heteroaryl. In any embodiment herein of a compound of Formula I, it may be that $X^6$ is

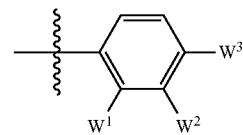

where $W^1$, $W^2$, and $W^3$ are each independently H, Cl, Br, F, Me, cyclopropyl, $CF_3$, OMe, or CN. In any embodiment herein of a compound of Formula I, it may be that $R^1$ and $R^2$ are each independently H. In any embodiment herein of a compound of Formula I, it may be that $R^3$ and $R^4$ are each independently H. In any embodiment herein of a compound of Formula I, it may be that $R^1$, $R^2$, $R^3$, and $R^4$ are each independently H.

In any embodiment herein of a compound of Formula I, it may be that the compound is of Formula IA

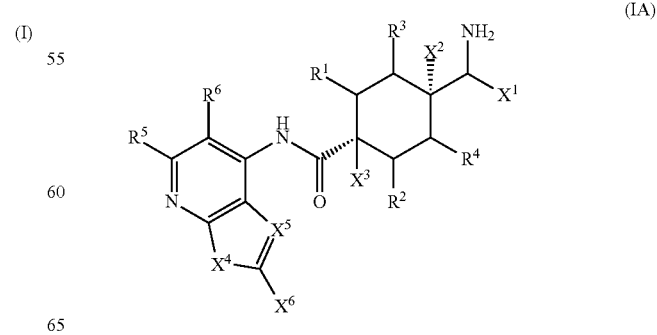

(IA)

or a pharmaceutically acceptable salt and/or solvate thereof.

In any embodiment herein of a compound of Formula I, it may be that the compound is of Formula IB

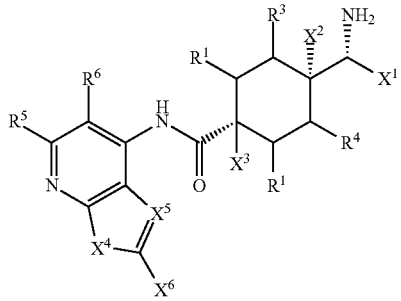
(IB)

or a pharmaceutically acceptable salt and/or solvate thereof, wherein $X^1$ is Me, $CO_2$-alkyl, or heteroaryl.

In any embodiment herein of a compound of Formula I, it may be that the compound is of Formula IC

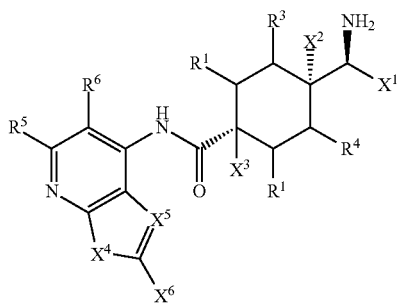
(IC)

or a pharmaceutically acceptable salt and/or solvate thereof, wherein $X^1$ is Me, $CO_2$-alkyl, or heteroaryl.

In any embodiment herein of a compound of Formula I, it may be that the compound is

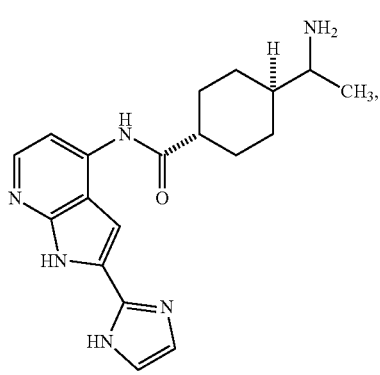
MSK-A157

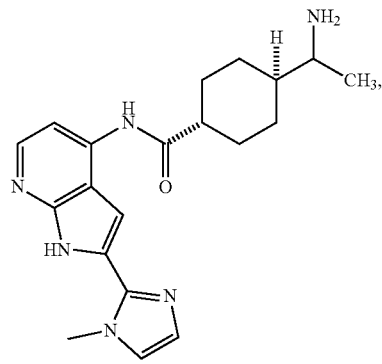
MSK-A171

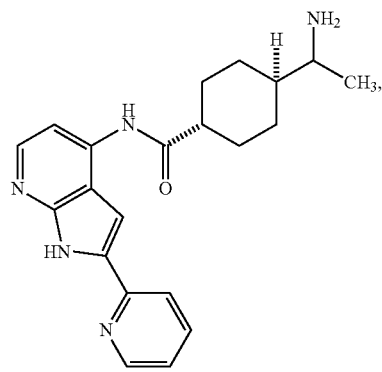
MSK-A172

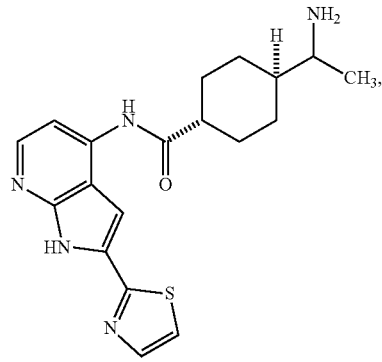
MSK-A178

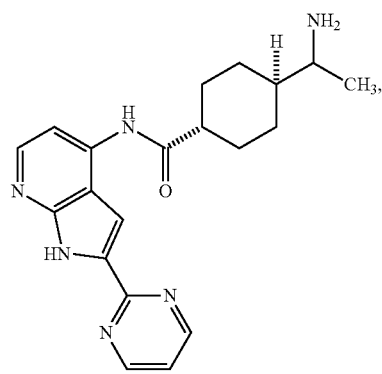
MSK-A180

MSK-A199
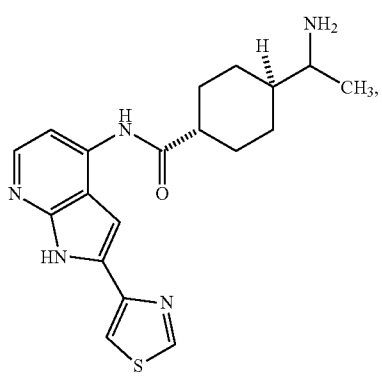
MSK-A170-(R)
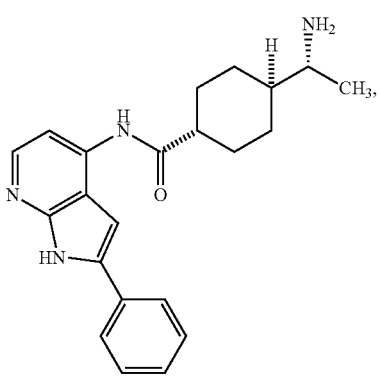
MSK-A202
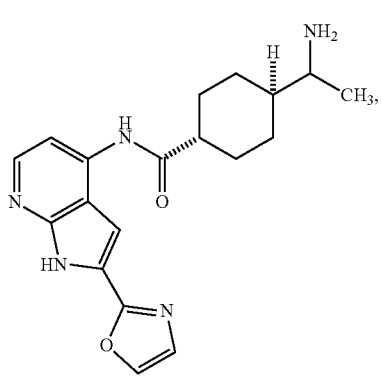
MSK-A170-(S)
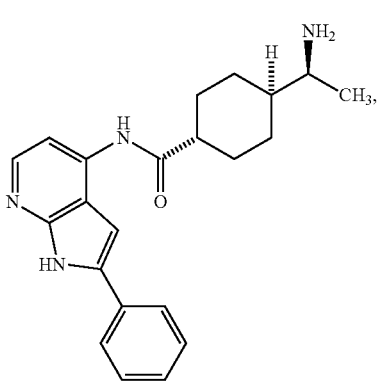
MSK-A173
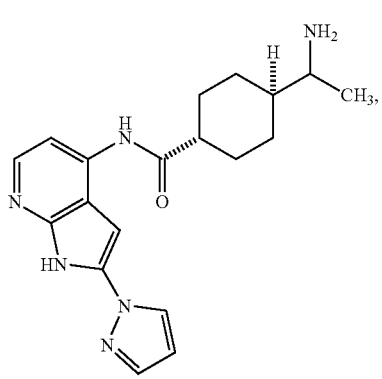
MSK-A182
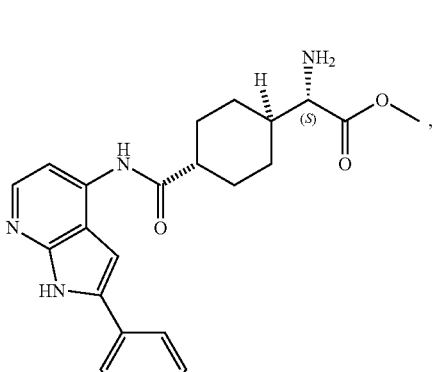
MSK-A181
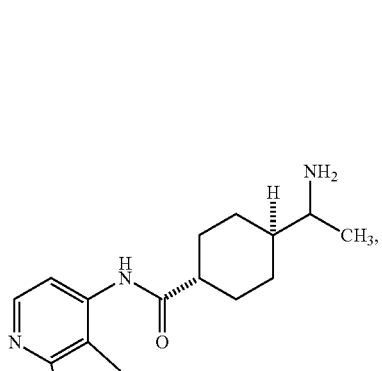
MSK-A183
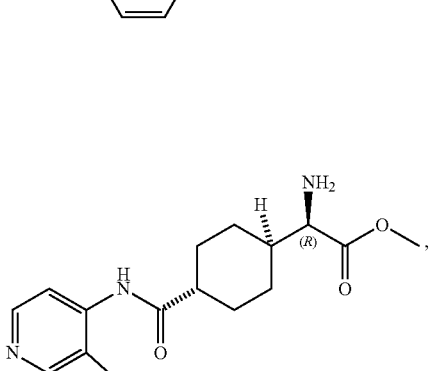

MSK-A176-(R)
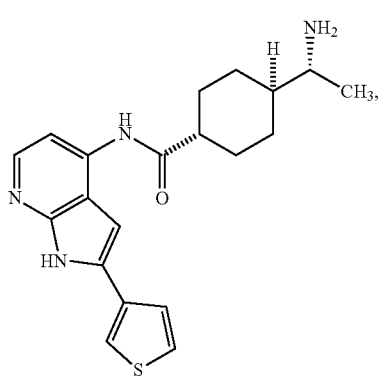
MSK-A184-(R)
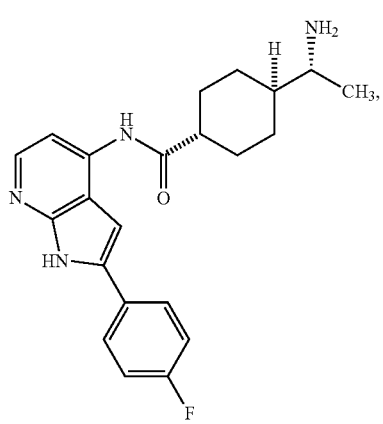
MSK-A176-(S)
MSK-A184-(S)
MSK-A178-(R)
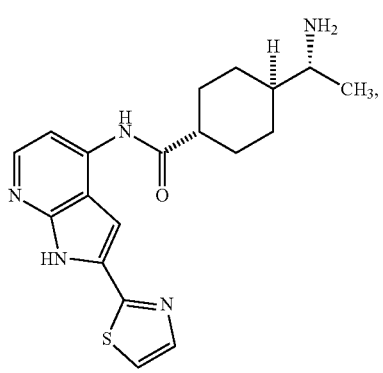
MSK-A177
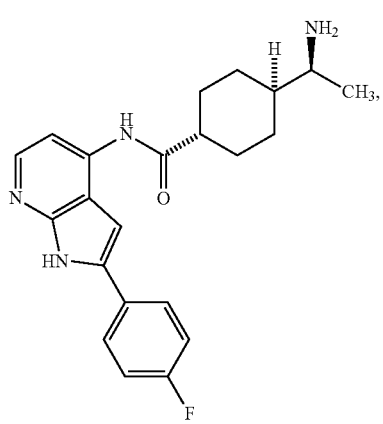
MSK-A178-(S)
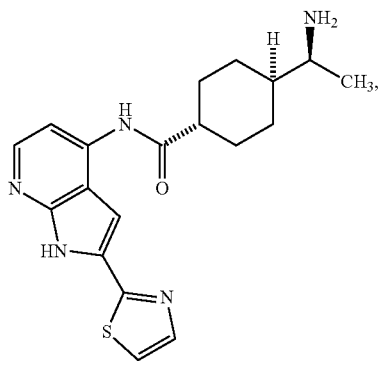
MSK-A198
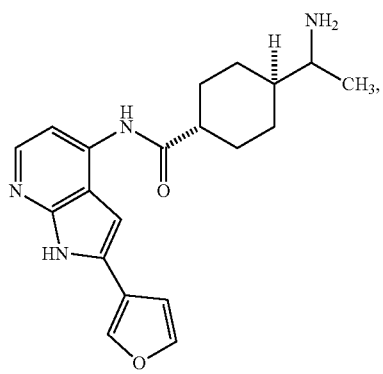
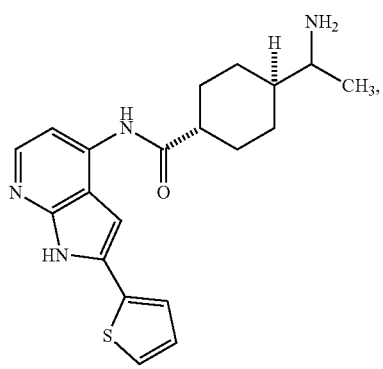

MSK-A185
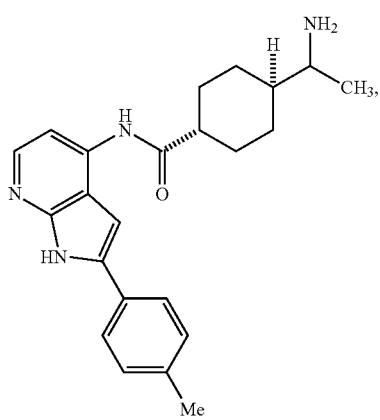
MSK-A188
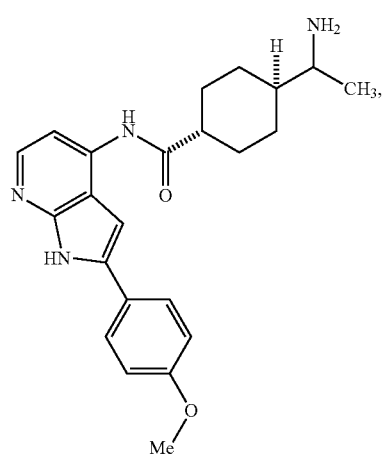
MSK-A186
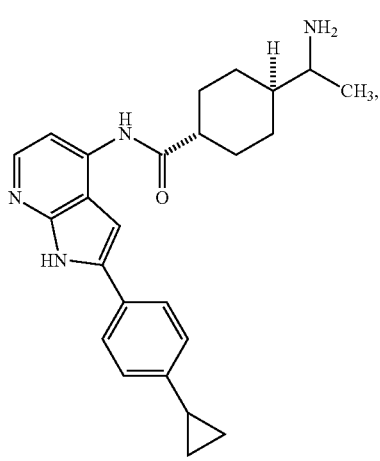
MSK-A189
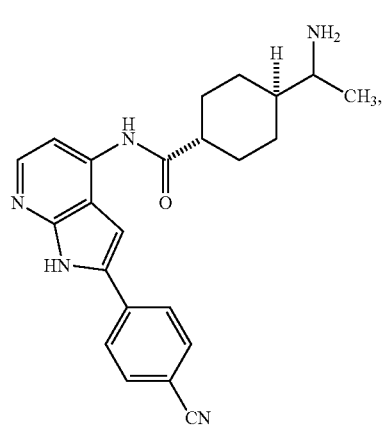
MSK-A187
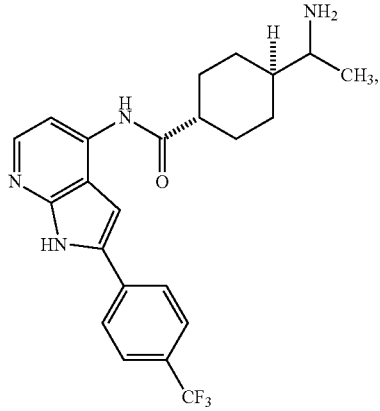
MSK-A190
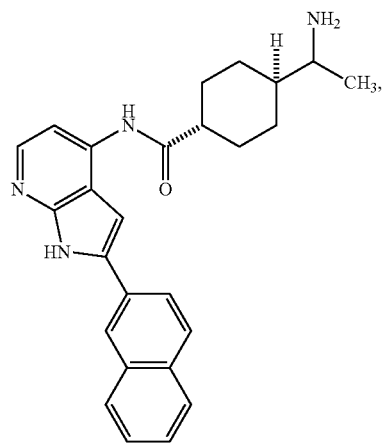

MSK-A191-(R)
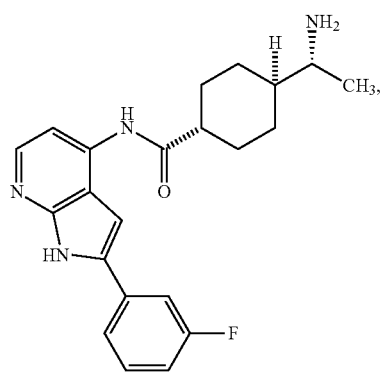
MSK-A194
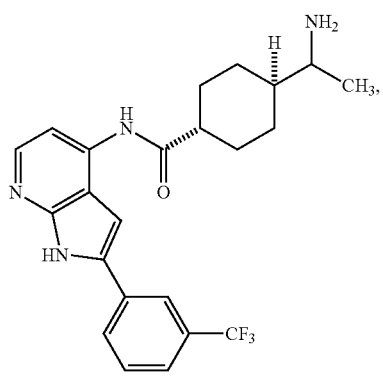
MSK-A191-(S)
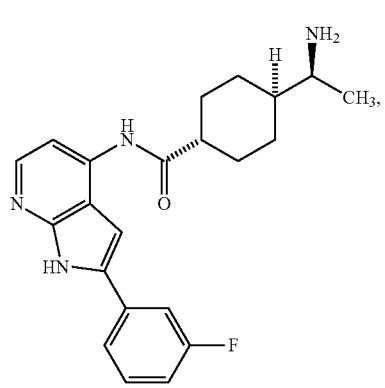
MSK-A195
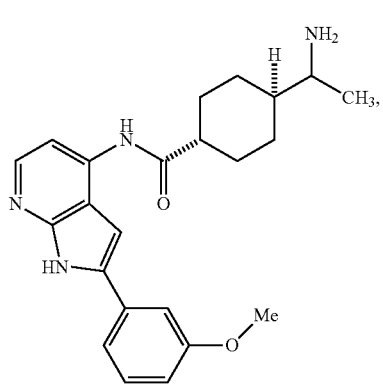
MSK-A192
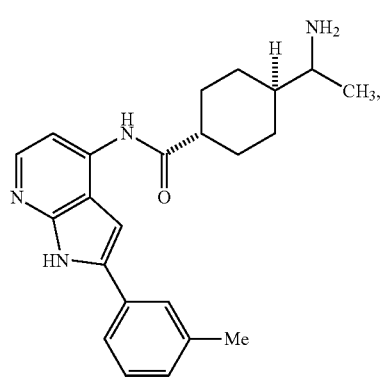
MSK-A196
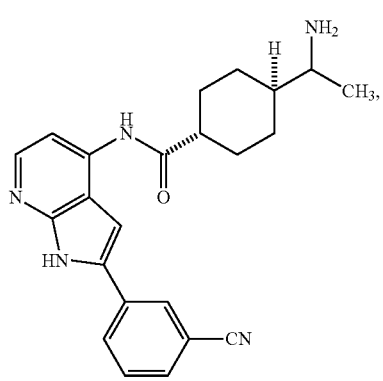
MSK-A193
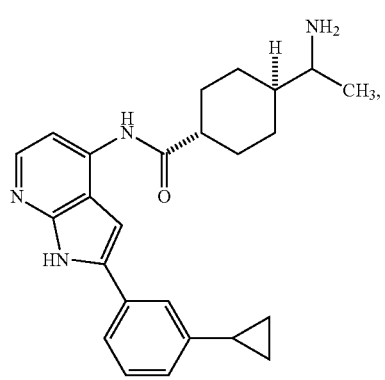
MSK-A197
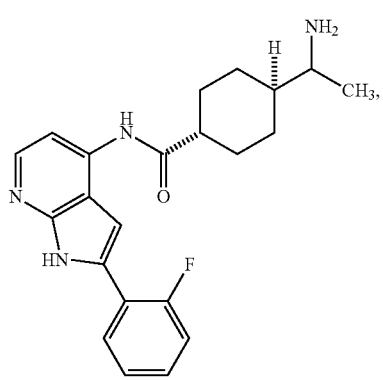

MSK-A200
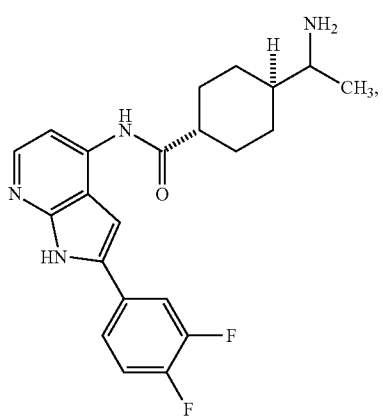
MSK-A201
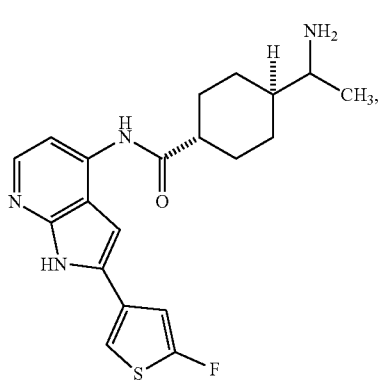
MSK-A202
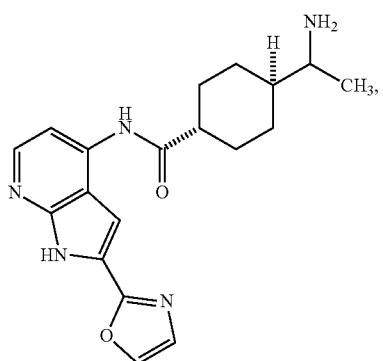
MSK-A203
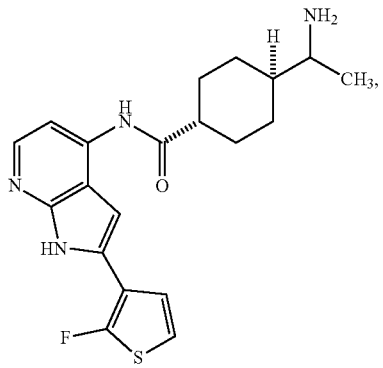
MSK-A204
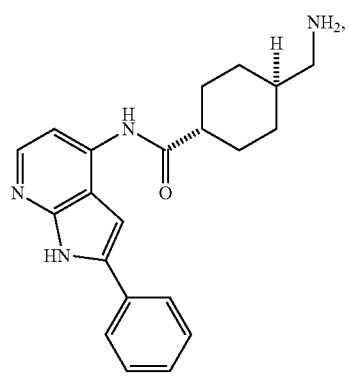
MSK-A205
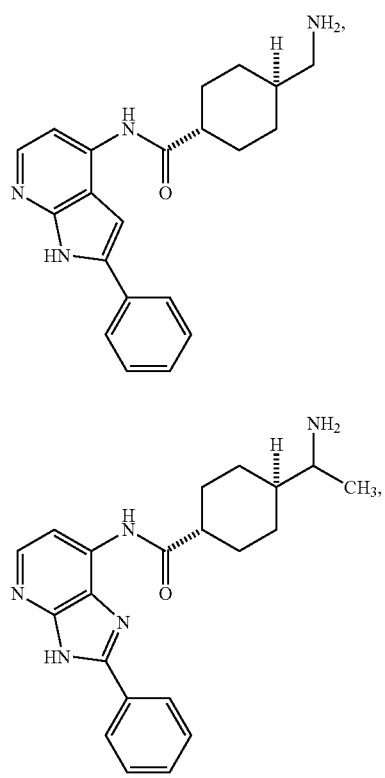
MSK-A207
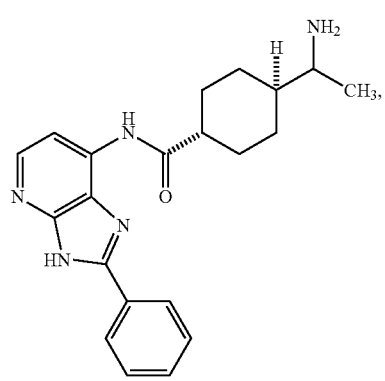
MSK-A208
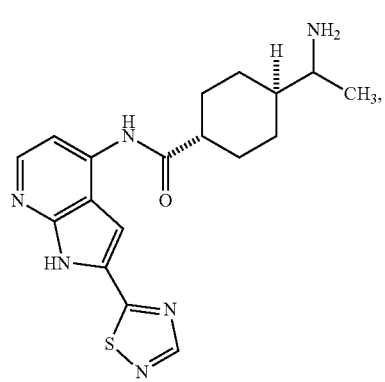

-continued

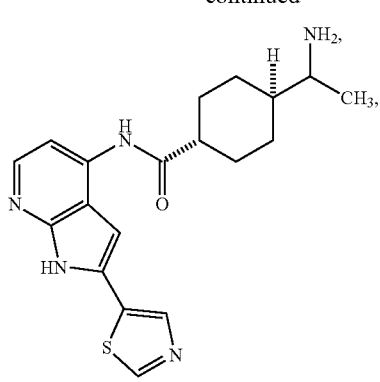
MSK-A209

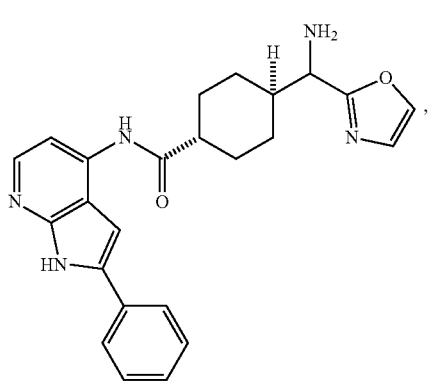
MSK-A210

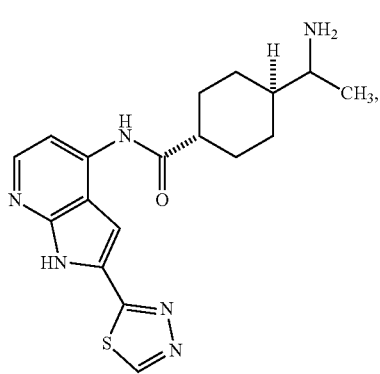
MSK-A211 or a pharmaceutically acceptable salt and/or solvate thereof.

In an aspect of the present technology, a composition is provided that includes any one of the herein-described embodiments of compounds of Formula I and a pharmaceutically acceptable carrier. In a related aspect, a pharmaceutical composition is provided, the pharmaceutical composition including an effective amount of the compound of any one of the aspects and embodiments of compounds of Formula I for treating cancer in a subject (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer); and a pharmaceutically acceptable carrier. In a further related aspect, a method is provided that includes administering an effective amount of a compound of any one of the embodiments of compounds of Formula I or administering a pharmaceutical composition including an effective amount of a compound of any one of the embodiments of compounds of Formula I to a subject suffering from cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer).

"Effective amount" refers to the amount of a compound or composition required to produce a desired effect. One example of an effective amount includes amounts or dosages that yield acceptable toxicity and bioavailability levels for therapeutic (pharmaceutical) use including, but not limited to, the treatment of cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer). As used herein, a "subject" or "patient" is a mammal, such as a cat, dog, rodent or primate. Typically the subject is a human, and, preferably, a human suffering from or suspected of suffering from cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer). The term "subject" and "patient" can be used interchangeably.

Thus, the instant present technology provides pharmaceutical compositions and medicaments comprising any of the compounds disclosed herein (e.g., compounds of Formula I) and a pharmaceutically acceptable carrier or one or more excipients or fillers (collectively referred to as "pharmaceutically acceptable carrier" unless otherwise specified). The compositions may be used in the methods and treatments described herein. Such compositions and medicaments include a theapeutically effective amount of any compound as described herein, including but not limited to a compound of Formula I. The pharmaceutical composition may be packaged in unit dosage form. The unit dosage form is effective in treating addiction by reducing desire for an addictive substance(s), and/or effective in treating a metabolic disorder by reducing symptoms associated with the metabolic disorder when administered to a subject in need thereof.

The pharmaceutical compositions and medicaments may be prepared by mixing one or more compounds of the present technology, pharmaceutically acceptable salts thereof, stereoisomers thereof, tautomers thereof, or solvates thereof, with pharmaceutically acceptable carriers, excipients, binders, diluents or the like. The compounds and compositions described herein may be used to prepare formulations and medicaments that prevent or treat cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer). Such compositions can be in the form of, for example, granules, powders, tablets, capsules, syrup, suppositories, injections, emulsions, elixirs, suspensions or solutions. The instant compositions can be formulated for various routes of administration, for example, by oral, parenteral, topical, rectal, nasal, vaginal administration, or via implanted reservoir. Parenteral or systemic administration includes, but is not limited to, subcutaneous, intravenous, intraperitoneal, and intramuscular, injections. The following dosage forms are given by way of example and should not be construed as limiting the instant present technology.

For oral, buccal, and sublingual administration, powders, suspensions, granules, tablets, pills, capsules, gelcaps, and caplets are acceptable as solid dosage forms. These can be prepared, for example, by mixing one or more compounds of the instant present technology, or pharmaceutically acceptable salts or tautomers thereof, with at least one additive such as a starch or other additive. Suitable additives are sucrose, lactose, cellulose sugar, mannitol, maltitol, dextran, starch, agar, alginates, chitins, chitosans, pectins, tragacanth gum, gum arabic, gelatins, collagens, casein, albumin, synthetic or semi-synthetic polymers or glycerides. Optionally, oral dosage forms can contain other ingredients to aid in administration, such as an inactive diluent, or lubricants such as magnesium stearate, or preservatives such as paraben or sorbic acid, or anti-oxidants such as ascorbic acid, tocopherol or cysteine, a disintegrating agent, binders, thickeners, buffers, sweeteners, flavoring agents or perfuming agents. Tablets and pills may be further treated with suitable coating materials known in the art.

Liquid dosage forms for oral administration may be in the form of pharmaceutically acceptable emulsions, syrups, elixirs, suspensions, and solutions, which may contain an inactive diluent, such as water. Pharmaceutical formulations and medicaments may be prepared as liquid suspensions or solutions using a sterile liquid, such as, but not limited to, an oil, water, an alcohol, and combinations of these. Pharmaceutically suitable surfactants, suspending agents, emulsifying agents, may be added for oral or parenteral administration.

As noted above, suspensions may include oils. Such oils include, but are not limited to, peanut oil, sesame oil, cottonseed oil, corn oil and olive oil. Suspension preparation may also contain esters of fatty acids such as ethyl oleate, isopropyl myristate, fatty acid glycerides and acetylated fatty acid glycerides. Suspension formulations may include alcohols, such as, but not limited to, ethanol, isopropyl alcohol, hexadecyl alcohol, glycerol and propylene glycol. Ethers, such as but not limited to, poly(ethyleneglycol), petroleum hydrocarbons such as mineral oil and petrolatum; and water may also be used in suspension formulations.

Injectable dosage forms generally include aqueous suspensions or oil suspensions which may be prepared using a suitable dispersant or wetting agent and a suspending agent. Injectable forms may be in solution phase or in the form of a suspension, which is prepared with a solvent or diluent. Acceptable solvents or vehicles include sterilized water, Ringer's solution, or an isotonic aqueous saline solution. Alternatively, sterile oils may be employed as solvents or suspending agents. Typically, the oil or fatty acid is nonvolatile, including natural or synthetic oils, fatty acids, mono-, di- or tri-glycerides.

For injection, the pharmaceutical formulation and/or medicament may be a powder suitable for reconstitution with an appropriate solution as described above. Examples of these include, but are not limited to, freeze dried, rotary dried or spray dried powders, amorphous powders, granules, precipitates, or particulates. For injection, the formulations may optionally contain stabilizers, pH modifiers, surfactants, bioavailability modifiers and combinations of these.

Compounds of the present technology may be administered to the lungs by inhalation through the nose or mouth. Suitable pharmaceutical formulations for inhalation include solutions, sprays, dry powders, or aerosols containing any appropriate solvents and optionally other compounds such as, but not limited to, stabilizers, antimicrobial agents, antioxidants, pH modifiers, surfactants, bioavailability modifiers and combinations of these. The carriers and stabilizers vary with the requirements of the particular compound, but typically include nonionic surfactants (Tweens, Pluronics, or polyethylene glycol), innocuous proteins like serum albumin, sorbitan esters, oleic acid, lecithin, amino acids such as glycine, buffers, salts, sugars or sugar alcohols. Aqueous and nonaqueous (e.g., in a fluorocarbon propellant) aerosols are typically used for delivery of compounds of the present technology by inhalation.

Dosage forms for the topical (including buccal and sublingual) or transdermal administration of compounds of the present technology include powders, sprays, ointments, pastes, creams, lotions, gels, solutions, and patches. The active component may be mixed under sterile conditions with a pharmaceutically-acceptable carrier or excipient, and with any preservatives, or buffers, which may be required. Powders and sprays can be prepared, for example, with excipients such as lactose, talc, silicic acid, aluminum hydroxide, calcium silicates and polyamide powder, or mixtures of these substances. The ointments, pastes, creams and gels may also contain excipients such as animal and vegetable fats, oils, waxes, paraffins, starch, tragacanth, cellulose derivatives, polyethylene glycols, silicones, bentonites, silicic acid, talc and zinc oxide, or mixtures thereof. Absorption enhancers can also be used to increase the flux of the compounds of the present technology across the skin. The rate of such flux can be controlled by either providing a rate controlling membrane (e.g., as part of a transdermal patch) or dispersing the compound in a polymer matrix or gel.

Besides those representative dosage forms described above, pharmaceutically acceptable excipients and carriers are generally known to those skilled in the art and are thus included in the instant present technology. Such excipients and carriers are described, for example, in "Remingtons Pharmaceutical Sciences" Mack Pub. Co., New Jersey (1991), which is incorporated herein by reference.

The formulations of the present technology may be designed to be short-acting, fast-releasing, long-acting, and sustained-releasing as described below. Thus, the pharmaceutical formulations may also be formulated for controlled release or for slow release.

The instant compositions may also comprise, for example, micelles or liposomes, or some other encapsulated form, or may be administered in an extended release form to provide a prolonged storage and/or delivery effect. Therefore, the pharmaceutical formulations and medicaments may be compressed into pellets or cylinders and implanted intramuscularly or subcutaneously as depot injections or as implants such as stents. Such implants may employ known inert materials such as silicones and biodegradable polymers.

Specific dosages may be adjusted depending on conditions of disease, the age, body weight, general health conditions, sex, and diet of the subject, dose intervals, administration routes, excretion rate, and combinations of drugs. Any of the above dosage forms containing effective amounts are well within the bounds of routine experimentation and therefore, well within the scope of the instant present technology.

Those skilled in the art are readily able to determine an effective amount by simply administering a compound of the present technology to a patient in increasing amounts until, for example, a decrease in tumor size is observed. The compounds of the present technology can be administered to a patient at dosage levels in the range of about 0.1 to about 1,000 mg per day. For a normal human adult having a body weight of about 70 kg, a dosage in the range of about 0.01 to about 100 mg per kg of body weight per day is sufficient. The specific dosage used, however, can vary or may be adjusted as considered appropriate by those of ordinary skill in the art. For example, the dosage can depend on a number of factors including the requirements of the patient, the stage of the particular cancer, and the pharmacological activity of the compound being used. The determination of optimum dosages for a particular patient is well known to those skilled in the art.

Various assays and model systems can be readily employed to determine the therapeutic effectiveness of the treatment according to the present technology. Effectiveness of the compositions and methods of the present technology may also be demonstrated by a decrease in, e.g., the rate of growth of a tumor.

For each of the indicated conditions described herein, test subjects will exhibit a 10%, 20%, 30%, 50% or greater reduction, up to a 75-90%, or 95% or greater, reduction, in one or more symptom(s) caused by, or associated with, the disorder in the subject, compared to placebo-treated or other suitable control subjects.

The compounds of the present technology can also be administered to a patient along with other conventional therapeutic agents that may be useful in the treatment of cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer), such as a MEK inhibitor. Exemplary MEK inhibitors include, but are not limited to, trametinib, cobimetinib, binimetinib, selumetinib, or a combination of any two or more thereof. The administration may include oral administration, parenteral administration, or nasal administration. In any of these embodiments, the administration may include subcutaneous injections, intravenous injections, intraperitoneal injections, or intramuscular injections. In any of these embodiments, the administration may include oral administration. The methods of the present technology can also comprise administering, either sequentially or in combination with one or more compounds of the present technology, a conventional therapeutic agent (such as trametinib, cobimetinib, binimetinib, selumetinib, or a combination of any two or more thereof) in an amount that can potentially or synergistically be effective for the treatment of cancer (such as one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer).

In one aspect, a compound of the present technology is administered to a patient in an amount or dosage suitable for therapeutic use. Generally, a unit dosage comprising a compound of the present technology will vary depending on patient considerations. Such considerations include, for example, age, protocol, condition, sex, extent of disease, contraindications, concomitant therapies and the like. An exemplary unit dosage based on these considerations can also be adjusted or modified by a physician skilled in the art. For example, a unit dosage for a patient comprising a compound of the present technology can vary from $1 \times 10^{-4}$ g/kg to 1 g/kg, preferably, $1 \times 10^{-3}$ g/kg to 1.0 g/kg. Dosage of a compound of the present technology can also vary from 0.01 mg/kg to 100 mg/kg or, preferably, from 0.1 mg/kg to 10 mg/kg.

A compound of the present technology can also be modified, for example, by the covalent attachment of an organic moiety or conjugate to improve pharmacokinetic properties, toxicity or bioavailability (e.g., increased in vivo half-life). The conjugate can be a linear or branched hydrophilic polymeric group, fatty acid group or fatty acid ester group. A polymeric group can comprise a molecular weight that can be adjusted by one of ordinary skill in the art to improve, for example, pharmacokinetic properties, toxicity or bioavailability. Exemplary conjugates can include a polyalkane glycol (e.g., polyethylene glycol (PEG), polypropylene glycol (PPG)), carbohydrate polymer, amino acid polymer or polyvinyl pyrolidone and a fatty acid or fatty acid ester group, each of which can independently comprise from about eight to about seventy carbon atoms. Conjugates for use with a compound of the present technology can also serve as linkers to, for example, any suitable substituents or groups, radiolabels (marker or tags), halogens, proteins, enzymes, polypeptides, other therapeutic agents (for example, a pharmaceutical or drug), nucleosides, dyes, oligonucleotides, lipids, phospholipids and/or liposomes. In one aspect, conjugates can include polyethylene amine (PEI), polyglycine, hybrids of PEI and polyglycine, polyethylene glycol (PEG) or methoxypolyethylene glycol (mPEG). A conjugate can also link a compound of the present technology to, for example, a label (fluorescent or luminescent) or marker (radionuclide, radioisotope and/or isotope) to comprise a probe of the present technology. Conjugates for use with a compound of the present technology can, in one aspect, improve in vivo half-life. Other exemplary conjugates for use with a compound of the present technology as well as applications thereof and related techniques include those generally described by U.S. Pat. No. 5,672,662, which is hereby incorporated by reference herein.

In another aspect, the present technology provides methods of identifying a target of interest including contacting the target of interest with a detectable or imaging effective quantity of a labeled compound of the present technology. A detectable or imaging effective quantity is a quantity of a labeled compound of the present technology necessary to be detected by the detection method chosen. For example, a detectable quantity can be an administered amount sufficient to enable detection of binding of the labeled compound to a target of interest including, but not limited to, a cancer tissue and/or cancer cell. Suitable labels are known by those skilled in the art and can include, for example, radioisotopes, radionuclides, isotopes, fluorescent groups, biotin (in conjunction with streptavidin complexation), and chemoluminescent groups. Upon binding of the labeled compound to the target of interest, the target may be isolated, purified and further characterized such as by determining the amino acid sequence.

The terms "associated" and/or "binding" can mean a chemical or physical interaction, for example, between a compound of the present technology and a target of interest. Examples of associations or interactions include covalent bonds, ionic bonds, hydrophilic-hydrophilic interactions, hydrophobic-hydrophobic interactions and complexes. Associated can also refer generally to "binding" or "affinity" as each can be used to describe various chemical or physical interactions. Measuring binding or affinity is also routine to those skilled in the art. For example, compounds of the present technology can bind to or interact with a target of interest or precursors, portions, fragments and peptides thereof and/or their deposits.

The examples herein are provided to illustrate advantages of the present technology and to further assist a person of ordinary skill in the art with preparing or using the compounds of the present technology. The examples herein are also presented in order to more fully illustrate the preferred aspects of the present technology. The examples should in no way be construed as limiting the scope of the present

EXAMPLES

Representative Synthetic and Analytical Details

Example 1. Synthetic Scheme of Analog MSK-A091

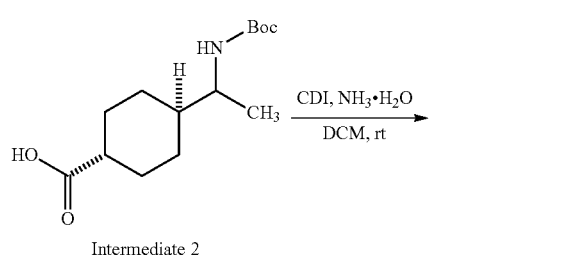

Intermediate 2

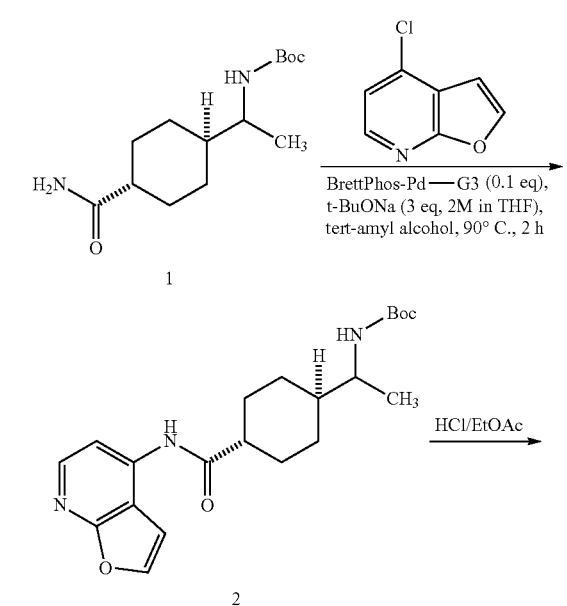

2. Experimental Procedures for a Large Scale Run:

The following procedures were used:

2.1 Procedure for Preparation of Compound 1.

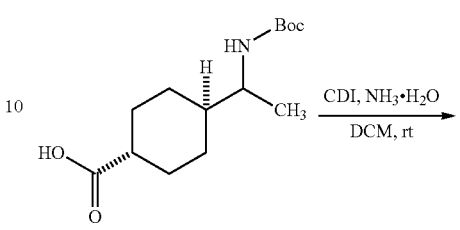

Intermediate 2

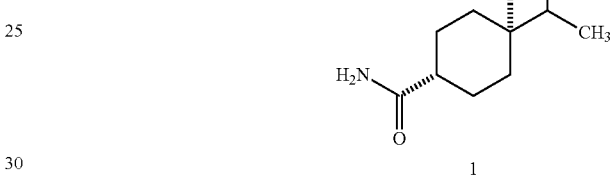

1

The solution of (1r,4r)-4-(1-((tert-butoxycarbonyl)amino)ethyl)cyclohexanecarboxylic acid (1.00 g, 3.69 mmol, 1.1 eq) and CDI (530 mg, 3.27 mmol, 1.0 eq) in DCM (10 mL) was stirred at 30° C. for 1 h. Then $NH_3 \cdot H_2O$ (10 mL, 30% purity) was added to the mixture dropwise. The mixture was stirred at 30° C. for additional 1 h. A large quantity of white precipitate was formed. The precipitate was collected by filtration and dried under reduced pressure. Then the solid was dissolved in DCM (80 mL) and washed with 1 M HCl (3×40 mL), dried over $Na_2SO_4$, filtered and concentrated under reduced pressure to give tert-butyl (1-((1r,4r)-4-carbamoylcyclohexyl)ethyl)carbamate (220 mg, crude) as a white solid. Synthesis of Compound 1 was confirmed by $^1H$ NMR, which showed the following data:

$^1H$ NMR (400 MHz, DMSO-$d_6$) δ=7.19 (br s, 1H), 6.67-6.65 (m, 2H), 3.33-3.29 (m, 1H), 2.06-1.97 (m, 1H), 1.86-1.75 (m, 4H), 1.44 (s, 9H), 1.36-1.20 (m, 3H), 1.03-0.91 (m, 5H).

2.2. Procedure for Preparation of Compound 2.

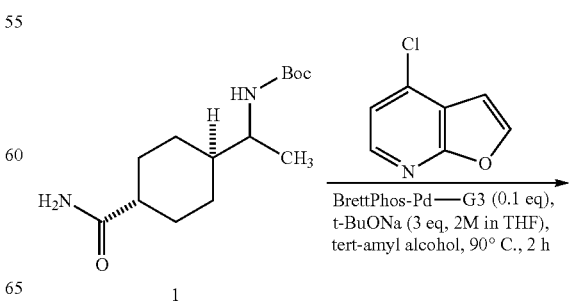

1

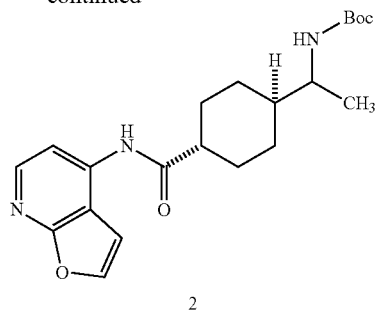

2

To a solution of tert-butyl (1-((1r,4r)-4-carbamoylcyclohexyl)ethyl)carbamate (200 mg, 740 μmol, 1.1 eq) and 4-chlorofuro[2,3-b]pyridine (100 mg, 651 μmol, 1.0 eq) in tert-amyl alcohol (4 mL) was added t-BuONa (2 M in THF, 1 mL, 3.0 eq) and BrettPhos-Pd-G3 (60 mg, 66.2 μmol, 0.1 eq) under N₂ atmosphere. The mixture was stirred at 90° C. for 2 h in a tube under N₂ atmosphere. After cooled to room temperature, the mixture was diluted with MeOH (10 mL) and filtered. The filtrate was concentrated under reduced pressure. The residue was purified by prep-HPLC (column: Phenomenex Gemini 150*25 mm*10 μm; mobile phase: [water (0.04% NH₃H₂O+10 mM NH₄HCO₃)-ACN]) and lyophilized to give tert-butyl (1-((1r,4r)-4-(furo[2,3-b]pyridin-4-ylcarbamoyl)cyclohexyl)ethyl)carbamate (80 mg, 206 μmol, 32% yield) as a white solid. Synthesis of Compound 2 was confirmed by ¹H NMR and LC-MS, which showed the following data:

¹H NMR (400 MHz, DMSO-$d_6$) δ=10.18 (s, 1H), 8.15 (d, J=5.4 Hz, 1H), 7.97-7.95 (m, 2H), 7.28 (d, J=2.4 Hz, 1H), 6.65 (d, J=8.8 Hz, 1H), 3.27-3.23 (m, 1H), 2.45-2.41 (m, 1H), 1.90 (br d, J=13.2 Hz, 2H), 1.79 (br t, J=11.8 Hz, 2H), 1.44-1.36 (m, 12H), 1.29-1.22 (m, 1H), 1.04-0.94 (m, 5H).

LC-MS (ESI) m/z 388.4 [M+H]⁺.

2.3 Procedure for Preparation of MSK-A091.

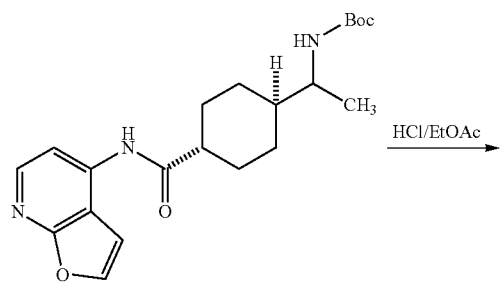

To a solution of tert-butyl (1-((1r,4r)-4-(furo[2,3-b]pyridin-4-ylcarbamoyl)cyclohexyl)ethyl)carbamate (80 mg, 206 μmol, 1.0 eq) in EtOAc (4 mL) was added HCl/EtOAc (4 M, 5 mL) at 0° C. The reaction mixture was stirred at 30° C. for 1.5 h. A large quantity of white precipitate was formed. The white precipitate was collected by filtration and washed with EtOAc (2×10 mL). The filter cake was dissolved in water (15 mL) and lyophilized to give (1r,4r)-4-(1-aminoethyl)-N-(furo[2,3-b]pyridin-4-yl)cyclohexanecarboxamide (39.6 mg, 110 μmol, 53% yield, 2HCl) as a white solid which was registered as MSK-A091. Synthesis of MSK-A091 was confirmed by ¹H NMR and LC-MS, which showed the following data:

¹H NMR (400 MHz, DMSO-$d_6$) δ=10.42 (s, 1H), 8.16 (d, J=5.6 Hz, 1H), 7.99-7.93 (m, 5H), 7.41 (d, J=2.6 Hz, 1H), 3.07-3.02 (m, 1H), 2.65-2.58 (m, 1H), 1.97 (br d, J=11.8 Hz, 2H), 1.88-1.81 (m, 2H), 1.54-1.38 (m, 3H), 1.18-1.06 (m, 5H).

LC-MS (ESI) m/z 288.3 [M+H]⁺.

These results indicated that MSK-A091 may be synthesized using the process disclosed herein.

Example 2. Synthesis of MSK-A157 and MSK-A171

1. Structures of MSK-A157 and MSK-A171.

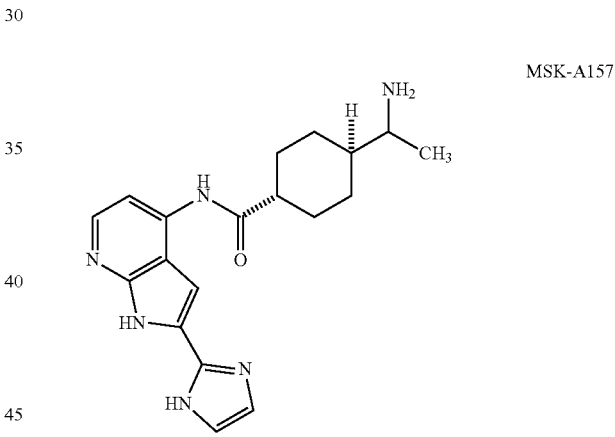

MSK-A157

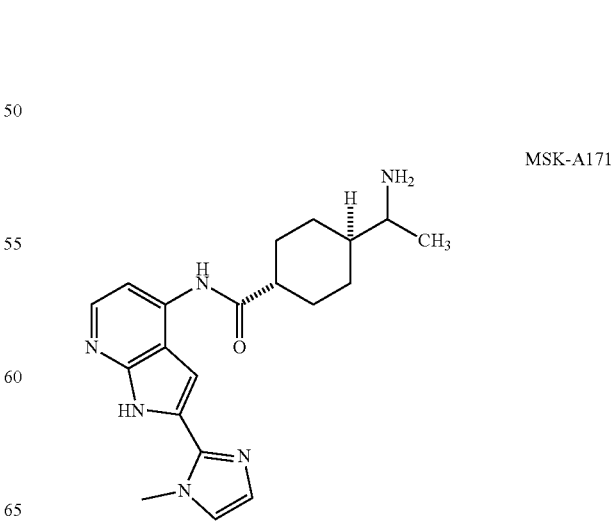

MSK-A171

2. Synthetic Scheme of MSK-A157 and MSK-A171.
The synthesis scheme of MSK-A157 and MSK-A171 is shown below:
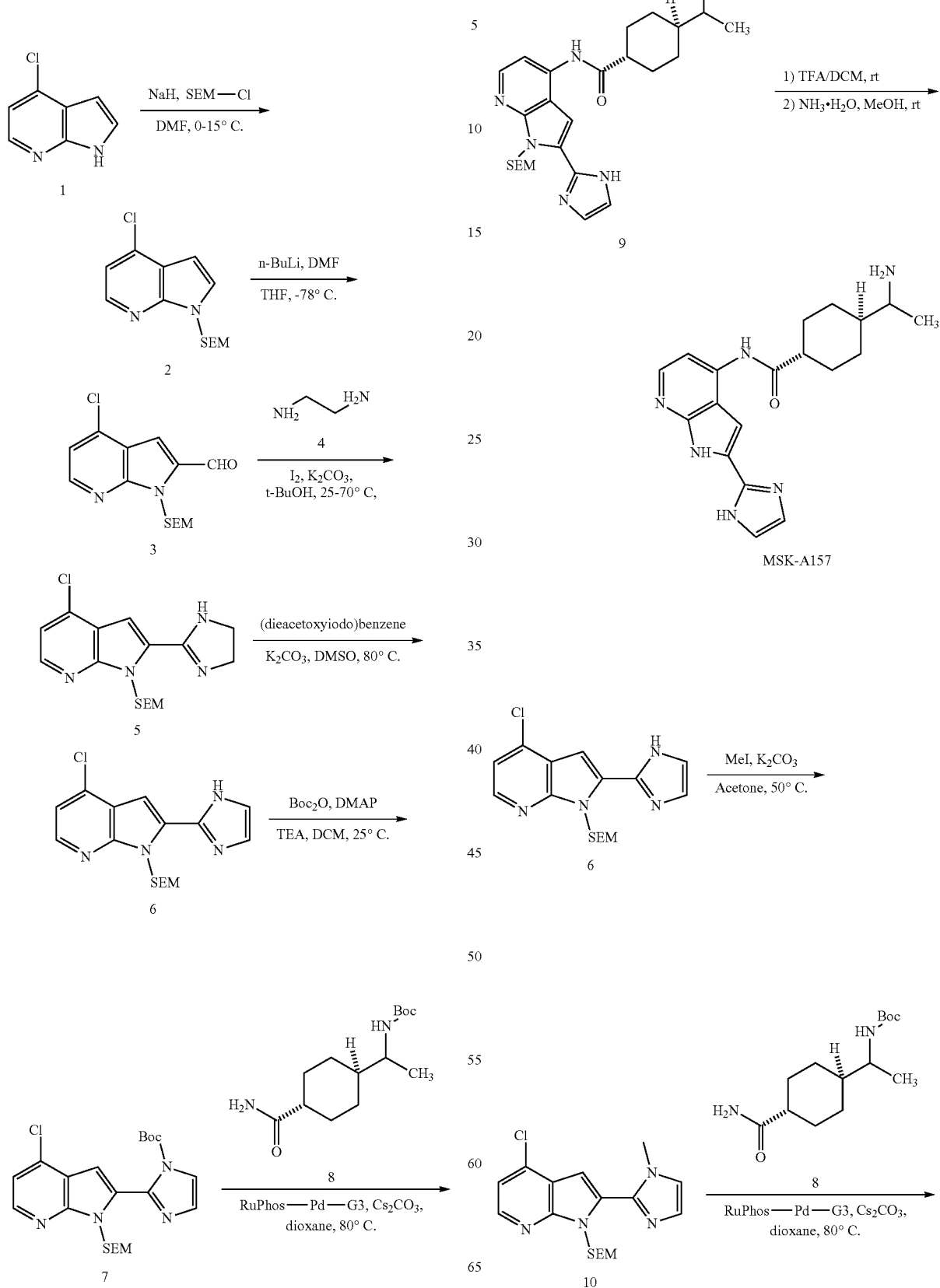

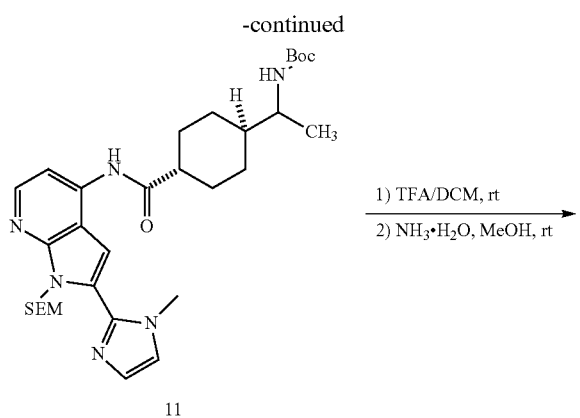

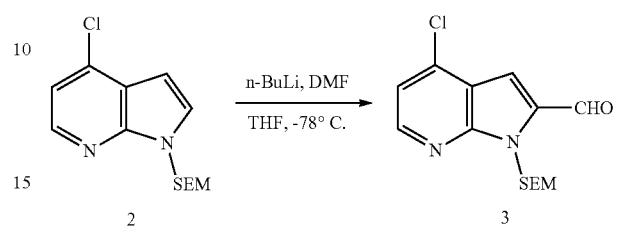

$^1$H NMR (400 MHz, DMSO-d$_6$) δ=8.25 (d, J=5.2 Hz, 1H), 7.77 (d, J=3.6 Hz, 1H), 7.28 (d, J=5.2 Hz, 1H), 6.60 (d, J=3.6 Hz, 1H), 5.64 (s, 2H), 3.51 (t, J=8.0 Hz, 2H), 0.93-0.69 (m, 2H), −0.12 (s, 9H).

LC-MS (ESI) m/z 283.3/285.3 [M+H]$^+$ 3.2. Procedure for Preparation of Compound 3.

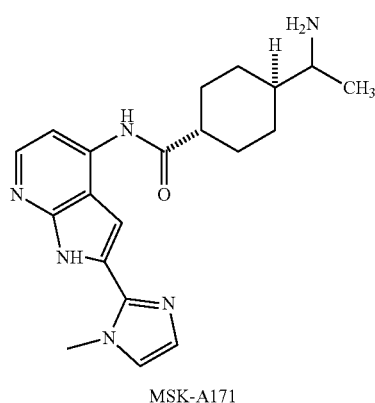

MSK-A171

3. Experimental Procedures for a Large Scale Run:

The following procedures were used:

3.1. Procedure for Preparation of Compound 2.

To a solution of 4-chloro-1-((2-(trimethylsilyl)ethoxy)methyl)-1H-pyrrolo[2,3-b]pyridine (600 mg, 2.10 mmol, 1.00 eq) in THF (10 mL) was added n-BuLi (2.5 M in n-hexane, 1.19 eq) at −78° C. After 1 h, DMF (770 mg, 10.5 mmol, 5.01 eq) was added at −78° C. The reaction mixture was stirred at −78° C. for 2 h. The reaction mixture was quenched with 1 M HCl solution (20 mL) at −78° C. The solution was warmed to room temperature and extracted with ethyl acetate (50 mL). The extract was washed with H$_2$O (30 mL), brine (30 mL), dried over anhydrous Na$_2$SO$_4$, filtered and concentrated under vacuum to afford 4-chloro-1-((2-(trimethylsilyl)ethoxy)methyl)-1H-pyrrolo[2,3-b]pyridine-2-carbaldehyde (840 mg, crude) as an yellow oil which was used into the next step without further purification. Synthesis of Compound 3 was confirmed by $^1$H NMR and LC-MS, which showed the following data:

$^1$H NMR (400 MHz, CHLOROFORM-d) δ=10.01 (s, 1H), 8.45 (d, J=5.2 Hz, 1H), 7.38 (s, 1H), 7.24 (d, J=5.2 Hz, 1H), 6.63 (d, J=3.6 Hz, 1H), 6.09 (s, 2H), 3.64-3.57 (m, 2H), 1.02-0.73 (m, 2H), −0.02-−0.13 (m, 9H).

LC-MS (ESI) m/z 349.5 [M+39]$^+$ 3.3. Procedure for Preparation of Compound 4.

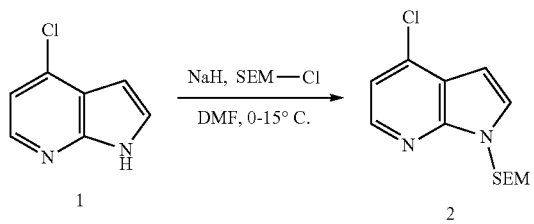 [SMILES: Clc1ccnc2[nH]ccc12 ; C[Si](C)(C)CCOCCl ; C[Si](C)(C)CCOCn1ccc2c(Cl)ccnc21]

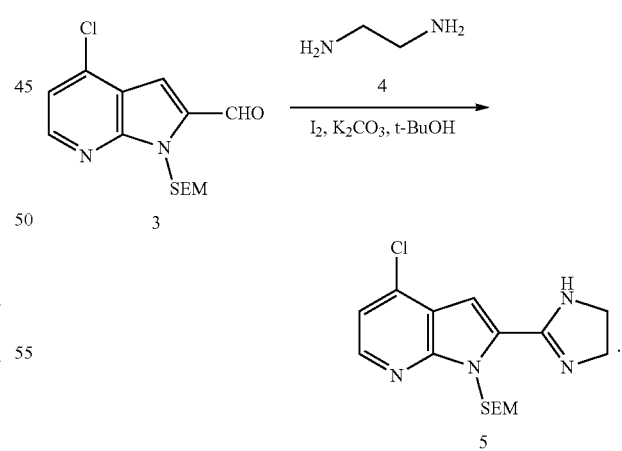

To a solution of 4-chloro-1H-pyrrolo[2,3-b]pyridine (3.00 g, 19.7 mmol, 1.00 eq) in DMF (30 mL) was added NaH (1.20 g, 30.0 mmol, 60% purity, 1.53 eq) at 0° C. After stirring at 0° C. for 1 h, SEM-Cl (3.96 g, 23.7 mmol, 1.21 eq) was added. Then the resulting was stirred at 15° C. for 1 h. The reaction mixture was quenched with H$_2$O (60 mL) and extracted with ethyl acetate (3×100 mL). The extracts were washed with H$_2$O (2×100 mL), brine (100 mL), dried over anhydrous Na$_2$SO$_4$, filtered and concentrated under vacuum. The residue was purified by column chromatography (TLC: Petroleum ether/Ethyl acetate=10/1, R$_f$=0.43; silica gel, Petroleum ether/Ethyl acetate=I/O to 100:1) to afford 4-chloro-1-((2-(trimethylsilyl)ethoxy) methyl)-1H-pyrrolo[2,3-b]pyridine (4.10 g, 14.4 mmol, 73% yield) as a yellow oil. Synthesis of Compound 2 was confirmed by $^1$H NMR and LC-MS, which showed the following data:

Ethane-1,2-diamine (162 mg, 2.69 mmol, 1.00 eq) was added to a solution of 4-chloro-1-((2-(trimethylsilyl)-ethoxy)methyl)-1H-pyrrolo[2,3-b]pyridine-2-carbaldehyde (840 mg, 2.70 mmol, 1.00 eq) in t-BuOH (20 mL). The reaction mixture was stirred at 25° C. for 30 min under N$_2$ atmosphere. I$_2$ (686 mg, 2.70 mmol, 1.00 eq) and K$_2$CO$_3$ (1.10 g, 7.96 mmol, 2.95 eq) were added, and the reaction mixture was heated at 70° C. for 3 h. After cooling to room temperature, the mixture was diluted with a saturated aqueous solution of sodium sulfite (20 mL) and extracted with ethyl acetate (40 mL). The organic layer was washed with brine (20 mL), dried over anhydrous Na$_2$SO$_4$, filtered and concentrated under vacuum. The residue was purified by reversed phase column (0.1% HCl in water/ACN). The desired fraction was collected and concentrated under vacuum to remove ACN. The aqueous phase was diluted with sat. NaHCO$_3$ solution (30 mL), and the mixture was extracted with ethyl acetate (50 mL). The organic layer was washed with brine (20 mL), dried over anhydrous Na$_2$SO$_4$, filtered and concentrated under vacuum to give 4-chloro-2-(4,5-dihydro-1H-imidazol-2-yl)-1-((2-(trimethylsilyl)ethoxy)meth-yl)-1H-pyrrolo[2,3-b]pyridine (380 mg, 1.07 mmol, 39% yield) as a yellow solid. Synthesis of Compound 4 was confirmed by $^1$H NMR and LC-MS, which showed the following data:

$^1$H NMR (400 MHz, CHLOROFORM-d) δ=8.28 (d, J=5.2 Hz, 1H), 7.16 (d, J=5.2 Hz, 1H), 7.13 (s, 1H), 6.06 (s, 2H), 3.84 (s, 4H), 3.68-3.60 (m, 2H), 0.98-0.88 (m, 2H), −0.03--0.09 (m, 9H).

LC-MS (ESI) m/z 351.0/353.0 [M+H]$^+$.

3.4. Procedure for Preparation of Compound 6.

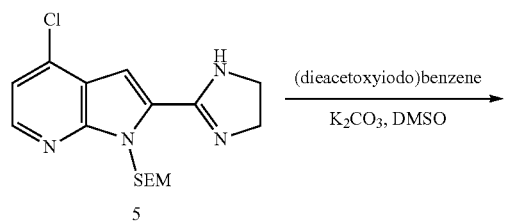

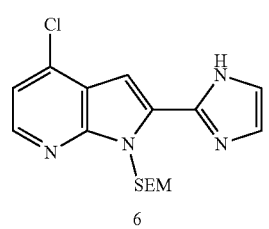

A mixture of 4-chloro-2-(4,5-dihydro-1H-imidazol-2-yl)-1-((2-(trimethylsilyl)ethoxy)methyl)-1H-pyrrolo-[2,3-b]pyridine (160 mg, 456 μmol, 1.00 eq), K$_2$CO$_3$ (189 mg, 1.37 mmol, 3.00 eq) and (diacetoxyiodo)-benzene (294 ng, 913 μmol, 2.00 eq) in DMSO (10 mL) was stirred at 80° C. for 16 h. After cooling to room temperature, it was diluted with H$_2$O (20 mL) and extracted with ethyl acetate (2×30 mL). The extracts were washed with H$_2$O (20 mL), brine (20 mL), dried over anhydrous Na$_2$SO$_4$, filtered and concentrated under vacuum. The residue was purified by prep-HPLC (column: Waters Xbridge 150*25 5u; water (10 mM NH$_4$HCO$_3$)-ACN) and lyophilized to afford 4-chloro-2-(1H-imidazol-2-yl)-1-((2-(trimethylsilyl)ethoxy)me-thyl)-1H-pyrrolo[2,3-b]pyridine (75.0 mg, 213 μmol, 46% yield) as a yellow oil. Synthesis of Compound 6 was confirmed by $^1$H NMR and LC-MS, which showed the following data:

$^1$H NMR (400 MHz, CHLOROFORM-d) δ=11.23 (s, 1H), 8.22 (d, J=5.2 Hz, 1H), 7.33-7.31 (m, 1H), 7.24 (s, 1H), 7.22-7.20 (m, 1H), 7.17 (d, J=5.2 Hz, 1H), 5.90 (s, 2H), 3.86-3.74 (m, 2H), 1.09-0.98 (m, 2H), 0.00--0.04 (m, 9H).

LC-MS (ESI) m/z 349.3/351.3 [M+H]$^+$.

3.5. Procedure for Preparation of Compound 7.

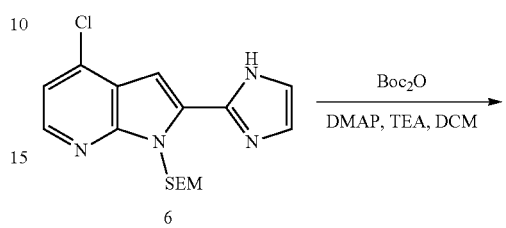

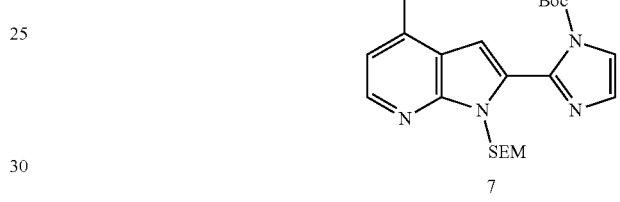

A mixture of 4-chloro-2-(1H-imidazol-2-yl)-1-((2-(trimethylsilyl)ethoxy)methyl)-1H-pyrrolo[2,3-h]pyridine (75.0 mg, 213 μmol, 1.00 eq), TEA (47.0 mg, 464 μmol, 2.18 eq), Boc$_2$O (70.0 mg, 321 μmol, 1.51 eq) and DMAP (3.00 mg, 24.6 μmol, 0.10 eq) in DCM (10 mL) was stirred at 25° C. for 12 h. The reaction mixture was concentrated under vacuum. The residue was purified by column chromatography (TLC: Petroleum ether/Ethyl acetate=3/1, R$_f$=0.68; silica gel, Petroleum ether/Ethyl acetate=1/0 to 10/1) to afford tert-butyl 2-(4-chloro-1-((2-(trimethylsilyl)ethoxy)methyl)-1H-pyrrolo[2,3-b]pyridin-2-yl)-1H-imidazole-1-carboxylate (80.0 mg, 176 μmol, 82% yield) as a white solid. Synthesis of Compound 7 was confirmed by LC-MS, which showed the following data:

LC-MS (ESI) m/z 449.3 [M+H]$^+$.

3.6. Procedure for Preparation of Compound 9.

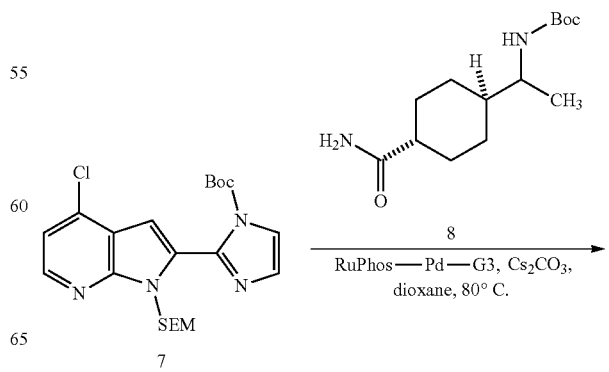

-continued

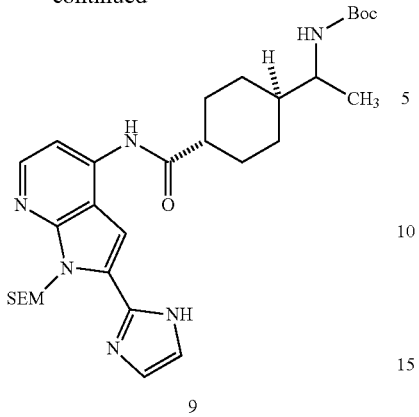

9

-continued

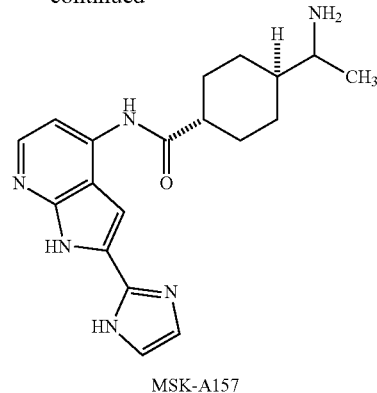

MSK-A157

To a solution of tert-butyl 2-(4-chloro-1-((2-(trimethylsilyl)ethoxy)methyl)-1H-pyrrolo[2,3-b]pyridin-2-yl)-1H-imidazole-1-carboxylate (60.0 mg, 134 µmol, 1.00 eq) and tert-butyl (1-((1r,4r)-4-carbamoylcyclo-hexyl)ethyl)carbamate (36.0 mg, 133 µmol, 1.00 eq) in dioxane (10 mL) were added $Cs_2CO_3$ (132 mg, 405 µmol, 3.03 eq) and RuPhos-Pd-G3 (12.0 mg, 14.4 µmol, 0.10 eq) in a glove box. The reaction mixture was heated to 80° C. for 16 h under $N_2$ atmosphere in a tube. After the reaction mixture was cooled to room temperature, thiourea resin was added to the mixture. After the solution was stirred for 4 h at room temperature, it was filtered and washed with ethyl acetate (30 mL). The filtrate was concentrated under vacuum. The residue was purified by prep-HPLC (column: Xtimate C18 150*25 mm*5 µm; water (0.05% ammonia hydroxide v/v)-ACN) to afford tert-butyl (1-((1r,4r)-4-((2-(1H-imidazol-2-yl)-1-((2-(trimethylsilyl)ethoxy)methyl)-1H-pyrrolo[2,3-b]pyridin-4-yl)carbamoyl)cyclohexyl)ethyl)carbamate (30.0 mg, 51.0 µmol, 38% yield) as a white solid. Synthesis of Compound 9 was confirmed by $^1$H NMR and LC-MS, which showed the following data:

$^1$H NMR (400 MHz, DMSO-$d_6$) δ=12.59 (br s, 1H), 10.07 (s, 1H), 8.16 (d, J=5.6 Hz, 1H), 7.77 (d, J=5.6 Hz, 1H), 7.32-7.28 (m, 1H), 7.22 (s, 1H), 7.13-7.10 (m, 1H), 6.67 (d, J=8.8 Hz, 1H), 6.20 (s, 2H), 3.40-3.34 (m, 2H), 3.32-3.28 (m, 1H), 2.58-2.53 (m, 1H), 1.99-1.87 (m, 2H), 1.86-1.74 (m, 2H), 1.50-1.33 (m, 11H), 1.32-1.20 (m, 1H), 1.09-0.92 (m, 5H), 0.74-0.65 (m, 2H), −0.17--0.26 (m, 9H).

LC-MS (ESI) m/z 583.6 [M+H]$^+$.

3.7. Procedure for Preparation of MSK-A157.

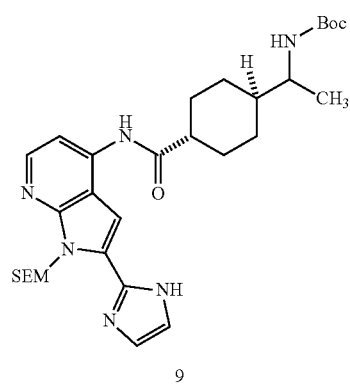

9

1) TFA/DCM, rt
2) NH$_3$•H$_2$O, MeOH, rt

A mixture of tert-butyl (1-((1r,4r)-4-((2-(1H-imidazol-2-yl)-1-((2-(trimethylsilyl)ethoxy)methyl)-1H-pyrro-lo[2,3-b]pyridin-4-yl)carbamoyl)cyclohexyl)ethyl)carbamate (30.0 mg, 51.5 µmol, 1.00 eq) in DCM (4 mL) and TFA (2 mL) was stirred at 10° C. After 12 h, the reaction mixture was concentrated under vacuum. The residue was dissolved in MeOH (4 mL) followed by addition of NH$_3$.H$_2$O (2 mL, 28% purity). The resulting was stirred at 10° C. for 0.5 h. The reaction mixture was concentrated under vacuum. The residue was purified by prep-HPLC (column: Phenomenex Synergi C18 150*30 mm*4 µm; water (0.05% HCl)-ACN) and lyophilized to afford (1r,4r)-N-(2-(1H-imidazol-2-yl)-1H-pyrrolo[2,3-b]pyridin-4-yl)-4-(1-aminoethyl)cyclohexanecarboxamide (18.0 mg, 42.0 µmol, 81% yield, 2HCl salt) as a white solid. Synthesis of MSK-A157 was confirmed by $^1$H NMR and LC-MS, which showed the following data:

$^1$H NMR (400 MHz, DMSO-$d_6$) δ=10.73 (br s, 1H), 8.31 (d, J=6.0 Hz, 1H), 8.02 (br s, 3H), 7.86-7.76 (m, 4H), 3.13-3.00 (m, 1H), 2.69-2.65 (m, 1H), 2.05-1.95 (m, 2H), 1.91-1.79 (m, 2H), 1.60-1.51 (m, 1H), 1.51-1.38 (m, 2H), 1.23-1.05 (m, 5H).

LC-MS (ESI) m/z 353.0 [M+H]$^+$.

3.8. Procedure for Preparation of Compound 10.

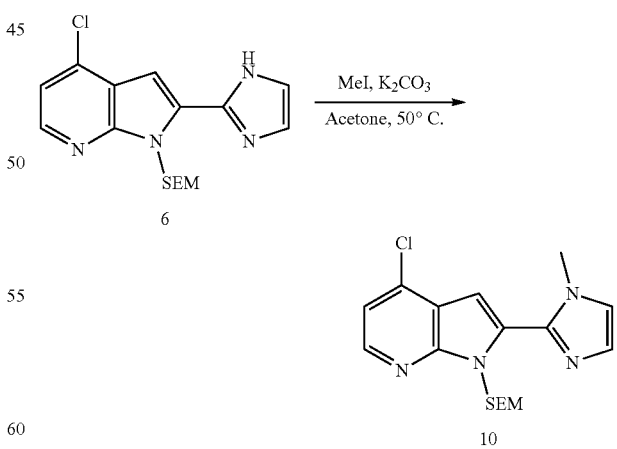

To a solution of 4-chloro-2(1H-imidazol-2-yl)-1-((2-(trimethylsilyl)ethoxy)me-thyl)-1H-pyrrolo[2,3-b] pyridine (150 mg, 423 µmol, 1.00 eq) and K$_2$CO$_3$ (180 mg, 1.30 mmol, 3.03 eq) in acetone (5 mL) was added MeI (90.0 mg, 634 µmol, 1.47 eq). The reaction mixture was heated at 50°

C. for 16 h. After was cooling to room temperature, the reaction mixture was diluted with H$_2$O (15 mL) and extracted with ethyl acetate (2×30 mL). The extracts were washed with brine (20 mL), dried over anhydrous Na$_2$SO$_4$, filtered and concentrated under reduced pressure. The residue was purified by Prep-HPLC (column: Waters Xbridge 150*25 mm*5 μm; water (0.05% ammonia hydroxide v/v)-ACN) to give 4-chloro-2-(1-methyl-1H-imidazol-2-yl)-1-((2-(trimethylsilyl)ethoxy)methyl)-1H-pyrrolo[2,3-b]pyridine (35.0 mg, 72.3 μmol, 16% yield) as a yellow solid. Synthesis of Compound 10 was confirmed by $^1$H NMR and LC-MS, which showed the following data:

$^1$H NMR (400 MHz, DMSO-d$_6$) δ=8.55 (d, J=5.2 Hz, 1H), 7.65 (d, J=1.2 Hz, 1H), 7.61-7.58 (m, 1H), 7.37 (d, J=1.2 Hz, 1H), 7.22 (s, 1H), 6.30 (s, 2H), 4.05 (s, 3H), 3.50-3.44 (m, 2H), 0.90-0.82 (m, 2H), 0.05--0.02 (m, 9H).

LC-MS (ESI) m/z 363.3 [M+H]$^+$.

3.9. Procedure for Preparation of Compound 11

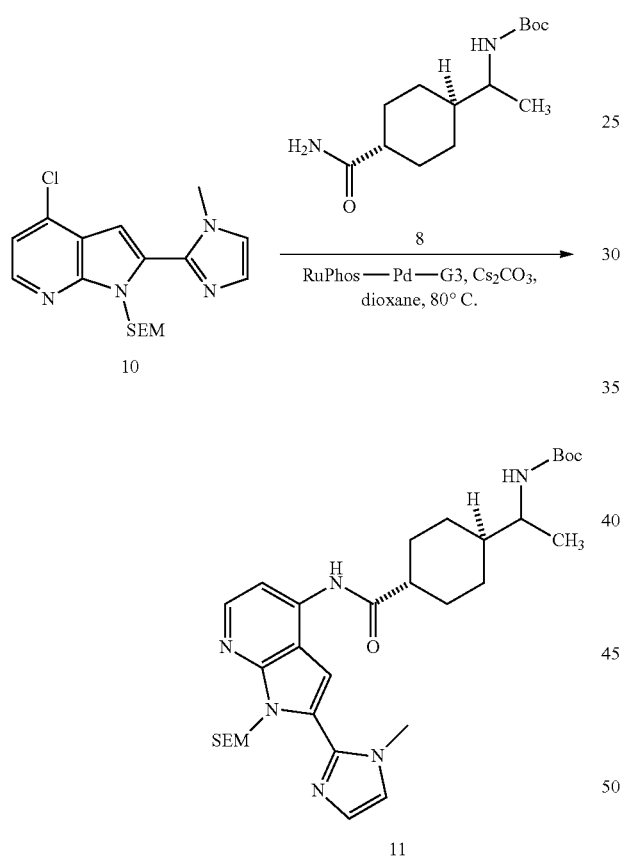

To a solution of 4-chloro-2-(1-methyl-1H-imidazol-2-yl)-1-((2-(trimethylsilyl)ethoxy)methyl)-1H-pyrrolo-[2,3-b]pyridine (35.0 mg, 72.3 μmol, 1.00 eq) and tert-butyl (1-((1r,4r)-4-carbamoylcyclohexyl)ethyl)-carbamate (20.0 mg, 74.0 μmol, 1.02 eq) in dioxane (2 mL) were added Cs$_2$CO$_3$ (71.0 mg, 218 μmol, 3.01 eq) and RuPhos-Pd-G3 (6.00 mg, 7.17 μmol, 0.10 eq). Then the reaction mixture was heated to 80° C. and stirred for 16 h under N$_2$ atmosphere. After cooling to room temperature, the reaction mixture was filtered. The filtrate was concentrated under vacuum. The residue was purified by prep-HPLC (column: Phenomenex luna C18 250*50 mm*10 μm; water (0.075% TFA)-ACN) to afford tert-butyl (1-((1r,4r)-4-((2-(1-methyl-1H-imidazol-2-yl)-1-((2-(trimethylsilyl)ethoxy)methyl)-1H-pyrrolo[2,3-b]pyridin-4-yl)carbamoyl)cyclohexyl)ethyl)carbamate (20.0 mg, 27.3 μmol, 37% yield, TFA salt) as a yellow solid. Synthesis of Compound 11 was confirmed by LC-MS, which showed the following data:

LC-MS (ESI) m/z 597.6 [M+H]$^+$.

3.10. Procedure for Preparation of MSK-A171.

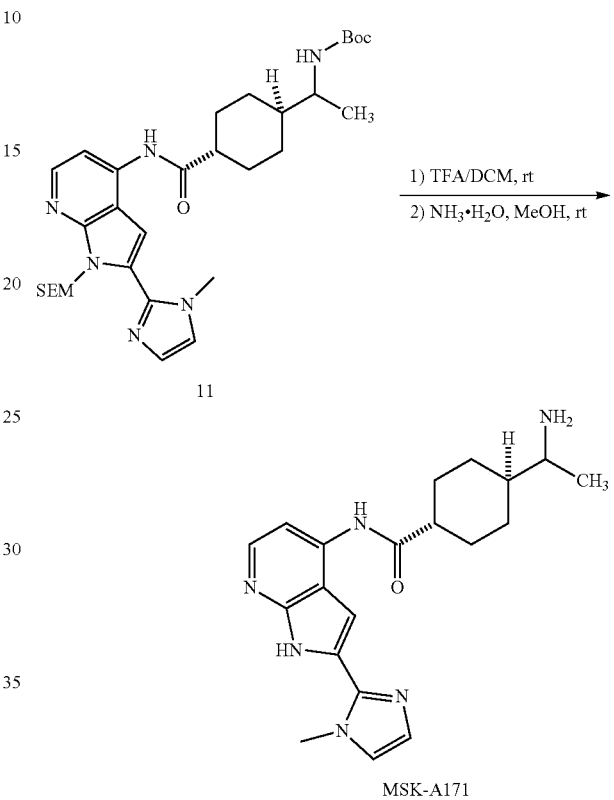

A mixture of tert-butyl (1-((1r,4r)-4-((2-(1-methyl-1H-imidazol-2-yl)-1-((2-(trimethylsilyl)ethoxy)methyl)-1H-pyrrolo[2,3-b]pyridin-4-yl)carbamoyl)cyclohexyl)ethyl)carbamate (20.0 mg, 28.1 μmol, 1.00 eq, TFA salt) in DCM (4 mL) and TFA (2 mL) was stirred at 15° C. After 16 h, the reaction mixture was concentrated under vacuum. The residue was dissolved into MeOH (4 mL) and NH$_3$.H$_2$O (2 mL). The resulting was stirred at 15° C. for 1 h. The reaction mixture was concentrated under vacuum. The residue was purified by prep-HPLC (column: Phenomenex Synergi C18 150*25*10 μm; water (0.05% HCl)-ACN) and lyophilized to afford (1r,4r)-4-(1-aminoethyl)-N-(2-(1-methyl-1H-imidazol-2-yl)-1H-pyrrolo[2,3-b] pyridin-4-yl)cyclohexanecarboxamide (3.58 mg, 8.07 μmol, 28% yield, 2HCl salt) as a white solid. Synthesis of MSK-A171 was confirmed by LC-MS, which showed the following data:

$^1$H NMR (400 MHz, DMSO+D$_2$O-d$_6$) δ=8.37-8.31 (m, 1H), 8.06 (d, J=6.0 Hz, 1H), 7.92-7.86 (m, 1H), 7.82 (d, J=1.6 Hz, 1H), 7.80-7.76 (m, 1H), 4.03 (s, 3H), 3.10-2.95 (m, 1H), 2.79-2.68 (m, 1H), 2.4-1.92 (m, 2H), 1.85-1.73 (m, 2H), 1.57-1.35 (m, 3H), 1.22-1.02 (m, 5H).

LC-MS (ESI) m/z 367.1 [M+H]$^+$.

These results indicate that MSK-A157 and MSK-A171 may be synthesized using the process disclosed herein.

Example 3. Synthesis of MSK-A172, MSK-A178, MSK-A180, MSK-A199 and MSK-202
1. Structure of MSK-A172, MSK-A178, MSK-A180, MSK-A199 and MSK-202.
MSK-A172
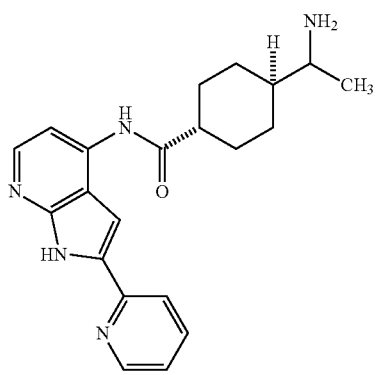
MSK-A178
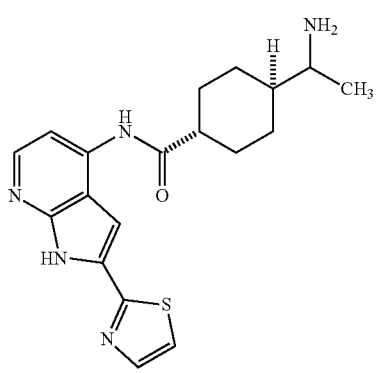
MSK-A180
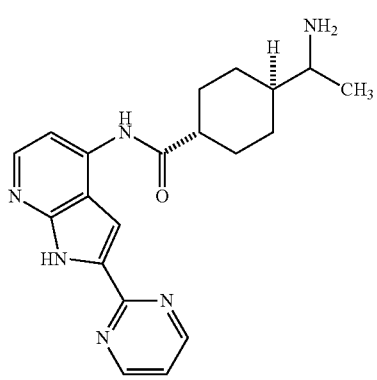
MSK-A199
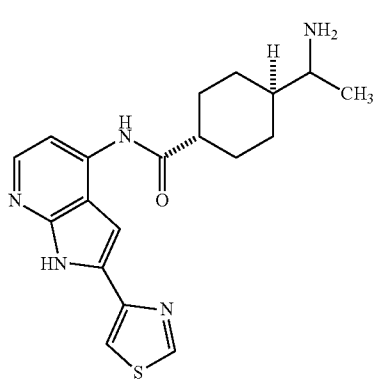
MSK-A202
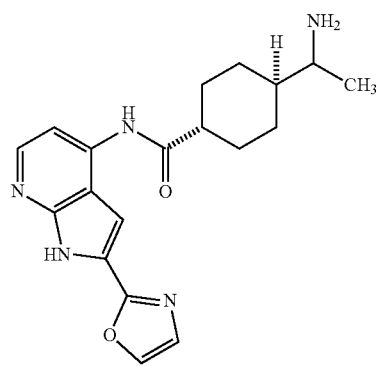
2. Synthetic Scheme of MSK A172
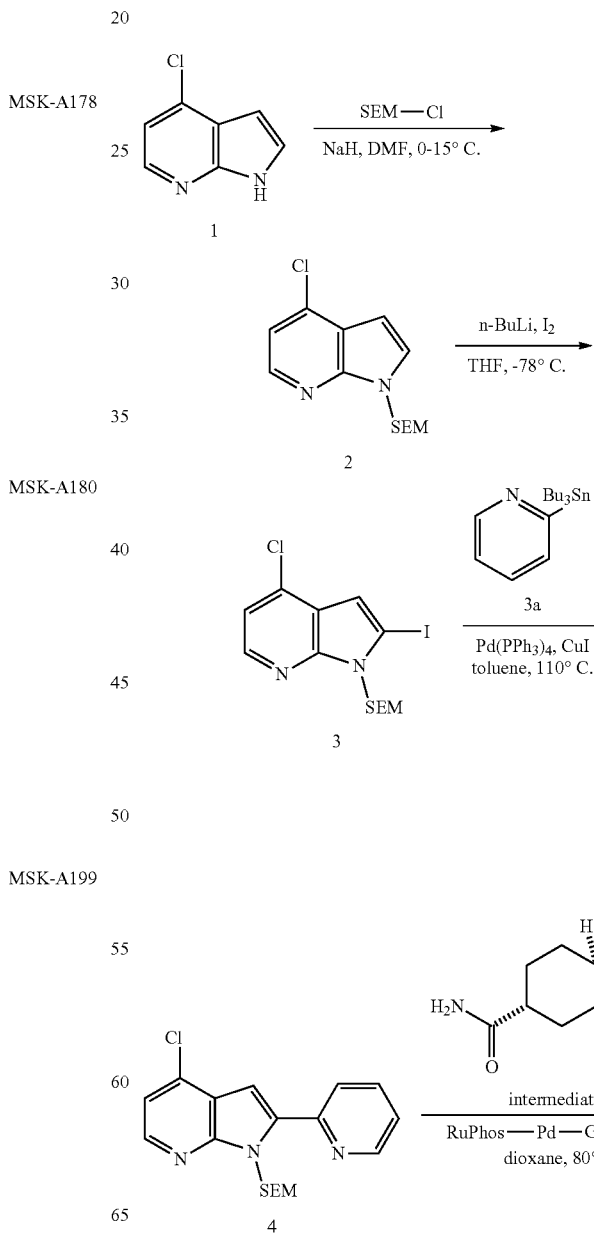

-continued

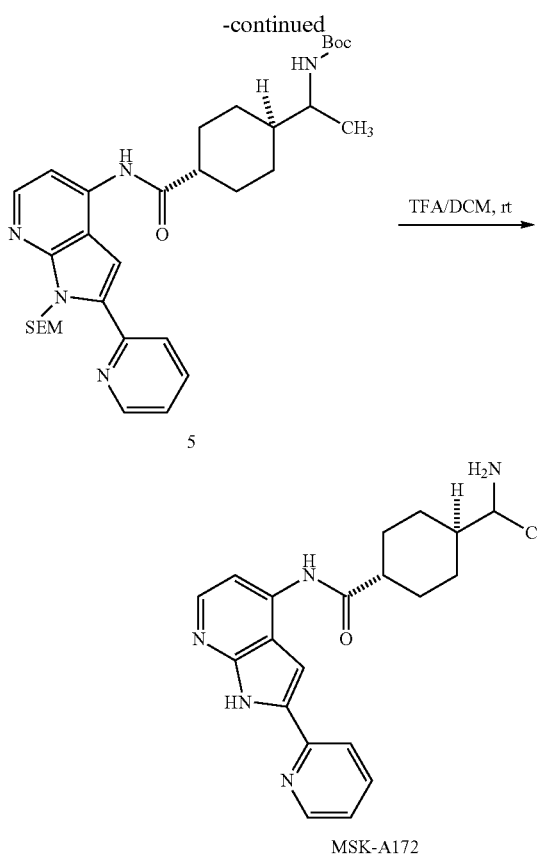

MSK-A172

3. Experimental Procedures for the Largest Scale Run.
3.1. Procedure for Preparation of Compound 2.

To a solution of 4-chloro-1H-pyrrolo[2,3-b]pyridine (3.00 g, 19.7 mmol, 1.00 eq) in DMF (30 mL) was added NaH (1.20 g, 30.0 mmol, 60% purity, 1.53 eq) at 0° C. After stirring at 0° C. for 1 h, SEM-Cl (3.96 g, 23.7 mmol, 1.21 eq) was added. Then the resulting was stirred at 15° C. for 1 h. The reaction mixture was quenched with H₂O (60 mL) and extracted with ethyl acetate (100 mL). The extracts were washed with H₂O (2×100 mL), brine (100 mL), dried over anhydrous Na₂SO₄, filtered and concentrated under vacuum.

The residue was purified by column chromatography (SiO₂, petroleum ether/ethyl acetate=1/0 to 100:1) to afford 4-chloro-1-((2-(trimethylsilyl)ethoxy)methyl)-1H-pyrrolo[2,3-b]pyridine (4.10 g, 14.4 mmol, 72% yield) as a yellow oil. Synthesis of Compound 2 was confirmed by ¹H NMR and LC-MS, which showed the following data:

¹H NMR (400 MHz, DMSO-d₆) δ=8.25 (d, J=5.2 Hz, 1H), 7.77 (d, J=3.6 Hz, 1H), 7.28 (d, J=5.2 Hz, 1H), 6.60 (d, J=3.6 Hz, 1H), 5.64 (s, 2H), 3.51 (t, J=8.0 Hz, 2H), 0.93-0.69 (m, 2H), −0.12 (s, 9H).

LC-MS (ESI) m/z 283.2/285.2 [M+H]⁺.
3.2. Procedure for Preparation of Compound 3.

To a solution of 4-chloro-1-((2-(trimethylsilyl)ethoxy)methyl)-1H-pyrrolo[2,3-b]pyridine (1.00 g, 3.54 mmol, 1.00 eq) in THF (10 mL) was added n-BuLi (2.5 M in hexanes, 1.9 mL, 1.34 eq) at −78° C. under N₂ atmosphere. After 1 h, a solution of 12 (1.08 g, 4.24 mmol, 1.20 eq) in THF (10 mL) was added at −78° C. The reaction mixture was warmed to 15° C. and stirred for 1 h. The reaction mixture was cooled to 0° C., it was quenched with H₂O (20 mL). The solution was extracted with ethyl acetate (2×30 mL). Combined extracts were washed with brine (20 mL), dried over Na₂SO₄, filtered and concentrated under vacuum. The residue was purified by column chromatography (SiO₂, petroleum ether/ethyl acetate=I/O to 100/1) to afford 4-chloro-2-iodo-1-((2-(trimethylsilyl)ethoxy)methyl)-1H-pyrrolo[2,3-b]pyridine (1.00 g, 2.23 mmol, 62% yield) as a yellow oil. Synthesis of Compound 3 was confirmed by ¹H NMR and LC-MS, which showed the following data:

¹H NMR (400 MHz, DMSO-d₆) δ=10.04 (s, 1H), 8.70 (d, J=4.4 Hz, 1H), 8.21 (d, J=5.6 Hz, 1H), 8.00-7.88 (m, 3H), 7.48 (s, 1H), 7.44-7.37 (m, 1H), 6.68 (d, J=9.2 Hz, 1H), 6.16 (s, 2H), 3.57-3.55 (m, 1H), 3.39-3.30 (m, 2H), 2.64-2.62 (m, 1H), 2.00-1.87 (m, 2H), 1.87-1.75 (m, 2H), 1.55-1.32 (m, 11H), 1.29-1.21 (m, 1H), 1.08-0.93 (m, 5H), 0.74-0.63 (m, 2H), −0.12--0.33 (m, 9H).

LC-MS (ESI) m/z 408.9/410.9 [M+H]⁺.
3.3. Procedure for Preparation of Compound 4.

To a solution of 4-chloro-2-iodo-1-((2-(trimethylsilyl)ethoxy)methyl)-1H-pyrrolo[2,3-b]pyridine (100 mg, 245 μmol, 1.00 eq) and 2-(tributylstannyl)pyridine (99.0 mg, 269 μmol, 1.10 eq) in toluene (8 mL) were added CuI (9.00 mg, 47.3 μmol, 0.20 eq) and Pd(PPh₃)₄ (28.0 mg, 24.2 μmol, 0.10 eq) under N₂ atmosphere. Then the reaction mixture was heated at 110° C. for 16 h. After the reaction mixture was cooled to room temperature, it was quenched with sat. KF solution (15 mL) and extracted with ethyl acetate (30 mL). The extract was washed with brine (15 mL), dried over anhydrous Na₂SO₄, filtered and concentrated under vacuum. The residue was purified by prep-TLC (SiO₂, TLC: petroleum ether/ethyl acetate=5/1, $R_f$=0.34) to afford 4-chloro-2-(pyridin-2-yl)-1-((2-(trimethylsilyl)ethoxy)methyl)-1H-pyrrolo[2,3-b]pyridine (60.0 mg, 165 μmol, 67% yield) as a yellow solid. Synthesis of Compound 4 was confirmed by ¹H NMR and LC-MS, which showed the following data:

¹H NMR (400 MHz, DMSO-d₆) δ=8.72 (d, J=4.4 Hz, 1H), 8.32 (d, J=5.2 Hz, 1H), 8.05 (d, J=8.0 Hz, 1H), 7.95 (dt, J=1.6, 7.6 Hz, 1H), 7.44 (dd, J=5.2, 7.2 Hz, 1H), 7.36 (d, J=5.2 Hz, 1H), 7.17 (s, 1H), 6.25 (s, 2H), 3.31-3.29 (m, 2H), 0.65 (t, J=8.0 Hz, 2H), −0.26 (s, 9H).

LC-MS (ESI) m/z 360.3 [M+H]⁺ˢˢ.

3.4. Procedure for Preparation of Compound 5.

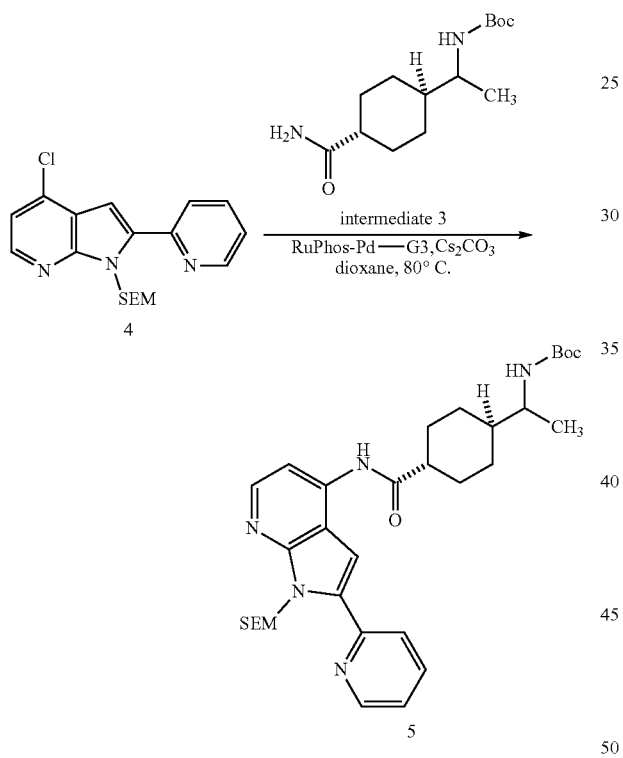

To a solution of 4-chloro-2-(pyridin-2-yl)-1-((2-(trimethylsilyl)ethoxy)methyl)-1H-pyrrolo[2,3-b]pyridine (60.0 mg, 167 μmol, 1.00 eq) and tert-butyl (1-((1r,4r)-4-carbamoylcyclohexyl)ethyl)carbamate (45.0 mg, 166 μmol, 1.00 eq) in dioxane (10 mL) were added Cs₂CO₃ (163 mg, 500 μmol, 3.00 eq) and RuPhos-Pd-G3 (14.0 mg, 16.7 μmol, 0.10 eq). Then the reaction mixture was heated at 80° C. for 16 h under N₂ atmosphere in a tube. After the reaction mixture was cooled to room temperature, it was filtered. The filtrate was diluted with H₂O (15 mL) and extracted with ethyl acetate (30 mL). The extract was washed with brine (15 mL), dried over anhydrous Na₂SO₄, filtered and concentrated under vacuum. The residue was purified by prep-HPLC (column: Phenomenex luna C18 250*50 mm*10 μm; water (0.075% TFA)-ACN) and concentrated under reduced pressure to afford tert-butyl (1-((1r,4r)-4-((2-(pyridin-2-yl)-1-((2-(trimethylsilyl)ethoxy)methyl)-1H-pyrrolo[2,3-b]pyridin-4-yl)carbamoyl)cyclohexyl)ethyl)carbamate (60.0 mg, 83.9 μmol, 50% yield, TFA salt) as a white solid. Synthesis of Compound 5 was confirmed by ¹H NMR and LC-MS, which showed the following data:

¹H NMR (400 MHz, DMSO-d₆) δ=10.04 (s, 1H), 8.70 (d, J=4.4 Hz, 1H), 8.21 (d, J=5.6 Hz, 1H), 8.00-7.88 (m, 3H), 7.48 (s, 1H), 7.44-7.37 (m, 1H), 6.68 (d, J=9.2 Hz, 1H), 6.16 (s, 2H), 3.57-3.55 (m, 1H), 3.39-3.30 (m, 2H), 2.64-2.62 (m, 1H), 2.00-1.87 (m, 2H), 1.87-1.75 (m, 2H), 1.55-1.32 (m, 11H), 1.29-1.21 (m, 1H), 1.08-0.93 (m, 5H), 0.74-0.63 (m, 2H), −0.12--0.33 (m, 9H).

LC-MS (ESI) m/z 594.7 [M+H]⁺.

3.5. Procedure for Preparation of MSK-A172.

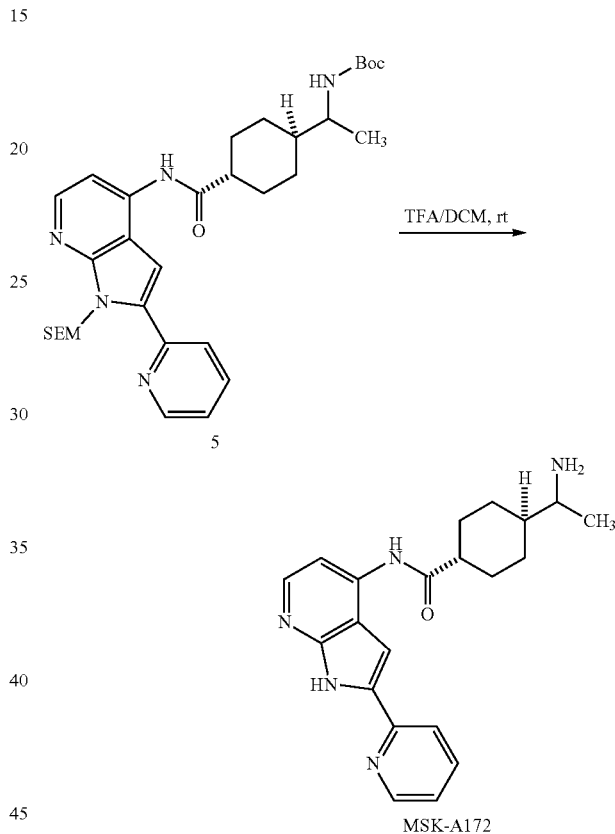

A mixture of tert-butyl (1-((1r,4r)-4-((2-(pyridin-2-yl)-1-((2-(trimethylsilyl)ethoxy)methyl)-1H-pyrrolo-[2,3-b]pyridin-4-yl)carbamoyl)cyclohexyl)ethyl)carbamate (60.0 mg, 84.8 μmol, 1.00 eq, TFA salt) in DCM (4 mL) and TFA (2 mL) was stirred at 15° C. for 16 h. The reaction mixture was concentrated under vacuum. The residue was purified by prep-HPLC (column: Phenomenex Synergi C18 150*25*10 μm; water (0.05% HCl)-ACN) and lyophilized to afford (1r,4r)-4-(1-aminoethyl)-N-(2-(pyridin-2-yl)-1H-pyrrolo[2,3-b]pyridin-4-yl)cyclohexanecarboxamide (18.5 mg, 42.1 μmol, 49% yield, 2HCl salt) as a yellow solid. Synthesis of MSK-A172 was confirmed by ¹H NMR and LC-MS, which showed the following data:

¹H NMR (400 MHz, DMSO-d₆) δ=13.41 (br s, 1H), 11.03 (s, 1H), 8.72 (d, J=4.4 Hz, 1H), 8.34-8.29 (m, 1H), 8.28-8.23 (m, 1H), 8.11-7.92 (m, 6H), 7.49-7.43 (m, 1H), 3.12-3.00 (m, 1H), 2.89-2.77 (m, 1H), 2.08-1.98 (m, 2H), 1.91-1.79 (m, 2H), 1.59-1.49 (m, 1H), 1.48-1.37 (m, 2H), 1.22-1.05 (m, 5H).

LC-MS (ESI) m/z 364.0 [M+H]⁺.

The above general procedure was followed for the syntheses of other target molecular, as summarized in the following table:

| Compound ID | Total weight (mg) | Yield (%) | Purity (%) |
|---|---|---|---|
| MSK-A178 | 44.21 | 70 | 99 |
| MSK-A180 | 40.78 | 93 | 99 |
| MSK-A199 | 110 | 89 | 99 |
| MSK-A202 | 37.18 | 75 | 99 |

MSK-A178.

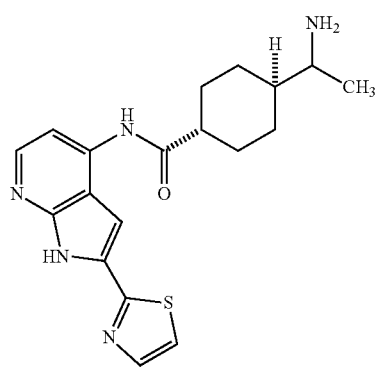

MSK-A178

$^1$H NMR (400 MHz, DMSO-d$_6$) δ=13.22 (br s, 1H), 10.56 (br s, 1H), 8.23-8.17 (m, 1H), 8.16-8.11 (m, 1H), 7.98 (br s, 3H), 7.76 (d, J=2.8 Hz, 1H), 7.66 (dd, J=0.8, 5.2 Hz, 1H), 7.41 (s, 1H), 7.20 (dd, J=3.6, 5.2 Hz, 1H), 3.13-3.00 (m, 1H), 2.79-2.66 (m, 1H), 2.05-1.93 (m, 2H), 1.90-1.78 (m, 2H), 1.60-1.35 (m, 3H), 1.26-1.05 (m, 5H).

LC-MS (ESI) m/z 370.2 [M+H]$^+$

MSK-A180.

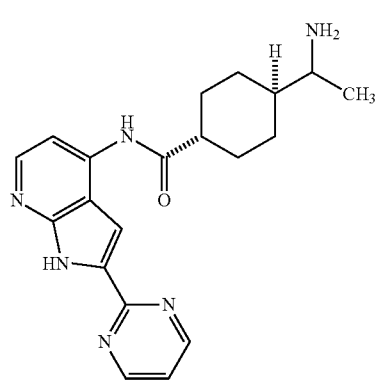

MSK-A180

$^1$H NMR (400 MHz, DMSO-d$_6$) δ=13.29 (br s, 1H), 10.89 (s, 1H), 8.97 (d, J=4.8 Hz, 2H), 8.35 (d, J=6.4 Hz, 1H), 8.23 (d, J=6.4 Hz, 1H), 8.17 (s, 1H), 8.02 (br s, 3H), 7.52 (t, J=4.8 Hz, 1H), 3.13-3.00 (m, 1H), 2.84-2.72 (m, 1H), 2.08-1.97 (m, 2H), 1.93-1.80 (m, 2H), 1.61-1.50 (m, 1H), 1.50-1.37 (m, 2H), 1.25-1.05 (m, 5H).

LC-MS (ESI) m/z 365.0 [M+H]$^+$.

MSK-A199.

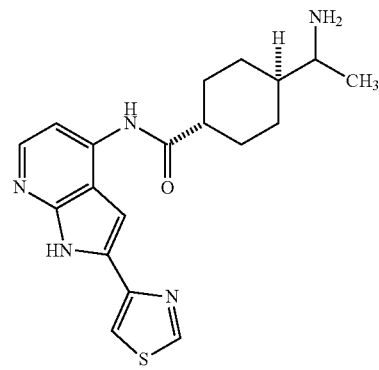

MSK-A199

$^1$H NMR (400 MHz, DMSO-d$_6$) δ=13.69 (s, 1H), 10.88 (s, 1H), 9.30 (d, J=2.0 Hz, 1H), 8.48 (d, J=1.6 Hz, 1H), 8.32-8.22 (m, 2H), 8.06 (s, 3H), 7.80 (m, 1H), 3.13-2.98 (m, 1H), 2.84-2.72 (m, 1H), 2.02 (d, J=12.0 Hz, 2H), 1.88-1.84 (m, 2H), 1.55-1.54 (m, 1H), 1.48-1.39 (m, 2H), 1.20-1.11 (m, 5H).

LC-MS (ESI) m/z 370.1 [M+H]$^+$.

MSK-A202.

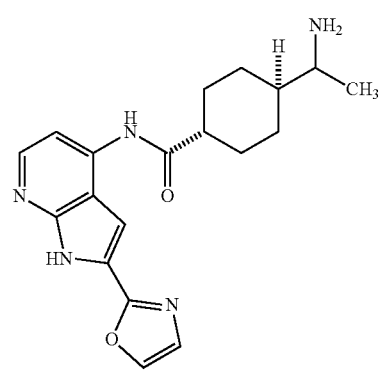

MSK-A202

$^1$H NMR (400 MHz, DMSO-d$_6$) δ=13.61 (br s, 1H), 10.94 (s, 1H), 8.36 (d, J=0.4 Hz, 1H), 8.33 (d, J=6.4 Hz, 1H), 8.21 (d, J=6.4 Hz, 1H), 8.06 (s, 3H), 7.98 (s, 1H), 7.52 (d, J=0.4 Hz, 1H), 3.11-3.01 (m, 1H), 2.87-2.77 (m, 1H), 2.07-1.95 (m, 2H), 1.90-1.79 (m, 2H), 1.60-1.49 (m, 1H), 1.49-1.36 (m, 2H), 1.22-1.05 (m, 5H).

LC-MS (ESI) m/z 354.0 [M+H]$^+$.

These results indicate that MSK-A172, MSK-A178, MSK-A180, MSK-A199 and MSK-202 may be synthesized using the process disclosed herein.

Example 4. Synthesis of MSK-A173

1. Structure of MSK-A173.

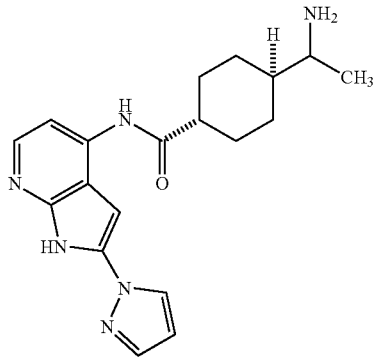

MSK-A173

2. Synthetic Scheme of MSK-A173.

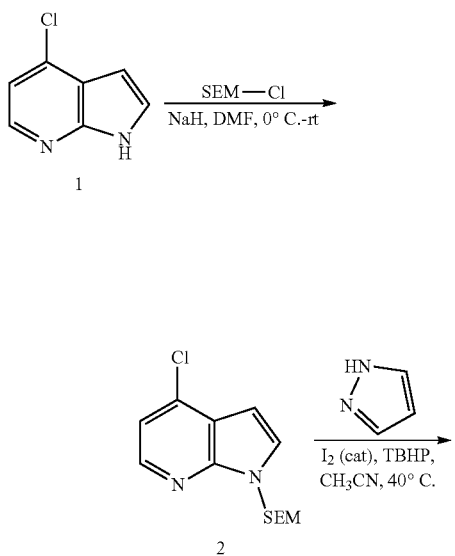

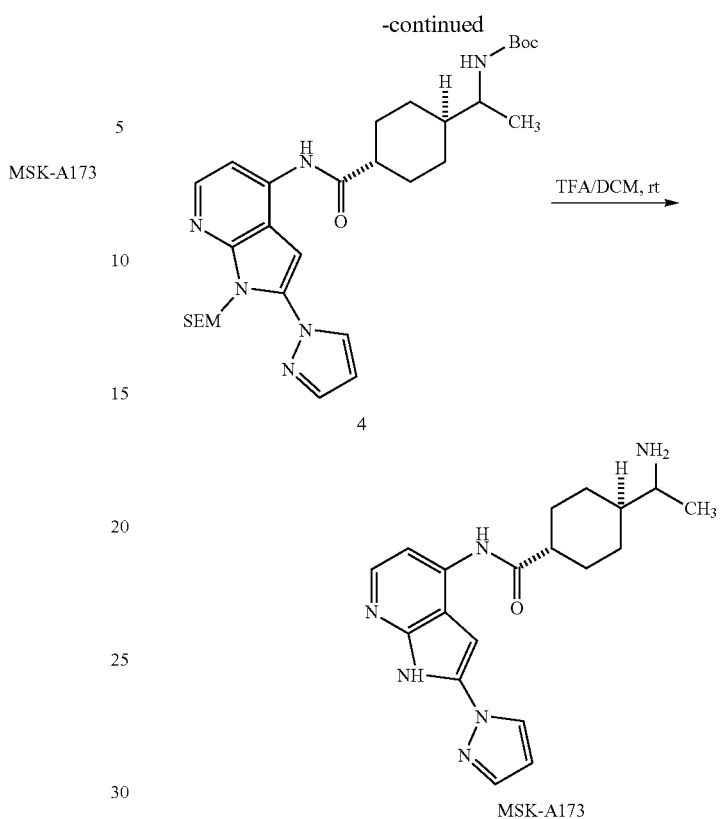

3. Experimental Procedures for a Large Scale Run:
Procedure for Preparation of Compound 2.

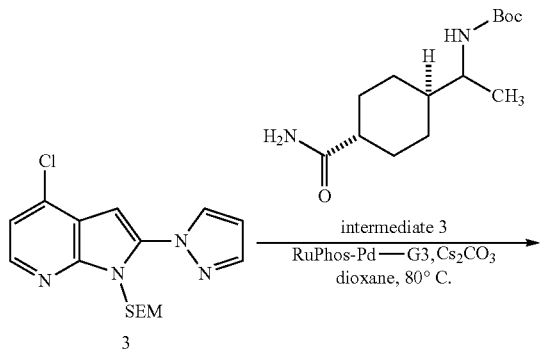

To a solution of 4-chloro-1H-pyrrolo[2,3-b]pyridine (3.00 g, 19.7 mmol, 1.00 eq) in DMF (30 mL) was added NaH (1.20 g, 30.0 mmol, 60% purity, 1.53 eq) at 0° C. After stirring at 0° C. for 1 h, SEM-Cl (3.96 g, 23.7 mmol, 1.21 eq) was added and the resulting was stirred at 15° C. for 1 h. The reaction mixture was quenched with $H_2O$ (60 mL) and extracted with ethyl acetate (3×100 mL). The extracts were washed with $H_2O$ (2×100 mL), brine (100 mL), dried over anhydrous $Na_2SO_4$, filtered and concentrated under vacuum.

The residue was purified by column chromatography ($SiO_2$, Petroleum ether/Ethyl acetate=I/O to 100:1) to afford 4-chloro-1-((2-(trimethylsilyl)ethoxy)methyl)-1H-pyrrolo[2,3-b]pyridine (4.10 g, 14.4 mmol, 72% yield) as a yellow oil. Synthesis of Compound 2 was confirmed by $^1H$ NMR and LC-MS, which showed the following data:

$^1H$ NMR (400 MHz, DMSO-$d_6$) δ=8.25 (d, J=5.2 Hz, 1H), 7.77 (d, J=3.6 Hz, 1H), 7.28 (d, J=5.2 Hz, 1H), 6.60 (d, J=3.6 Hz, 1H), 5.64 (s, 2H), 3.51 (t, J=8.0 Hz, 2H), 0.93-0.69 (m, 2H), −0.12 (s, 9H).

LC-MS (ESI) m/z 283.2/285.2 [M+H]$^+$.

3.2. Procedure for Preparation of Compound 3.

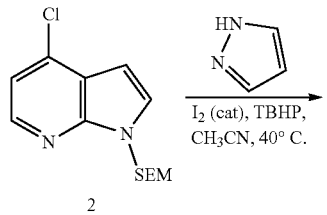

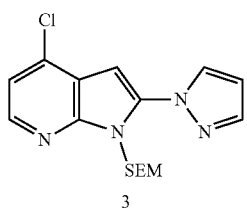

To a solution of 4-chloro-1-((2-(trimethylsilyl)ethoxy)methyl)-1H-pyrrolo[2,3-b]pyridine (200 mg, 707 μmol, 1.00 eq) in ACN (20 mL) were added 1H-pyrazole (100 mg, 1.47 mmol, 2.08 eq), TBHP (80.0 mg, 888 μmol, 1.26 eq) and I2 (80.0 mg, 315 μmol, 0.05 eq). The mixture was stirred at 40° C. for 16 h. After being cooled to room temperature, the mixture was diluted with ethyl acetate (100 mL) and H2O (50 mL). The solution was separated and the organic layer was concentrated under reduced pressure. The residue was purified by column chromatography on silica gel (Petroleum ether/Ethyl acetate=1/0 to 20/1) to afford 4-chloro-2-(1H-pyrazol-1-yl)-1-((2-(trimethylsilyl)ethoxy)methyl)-1H-pyrrolo[2,3-b]pyridine (220 mg, 631 μmol, 89% yield) as a yellow oil. Synthesis of Compound 3 was confirmed by $^1$H NMR and LC-MS, which showed the following data:

$^1$H NMR (400 MHz, CHLOROFORM-d) δ=8.37 (d, J=5.2 Hz, 1H), 8.11 (d, J=2.4 Hz, 1H), 7.94 (d, J=1.6 Hz, 1H), 7.29 (d, J=5.2 Hz, 1H), 6.77 (s, 1H), 6.64-6.62 (m, 1H), 5.93 (s, 2H), 3.65-3.55 (m, 2H), 0.97-0.91 (m, 2H), 0.02--0.01 (m, 9H).

LC-MS (ESI) m/z 349.0/351.0 [M+H]$^+$.

3.3. Procedure for Preparation of Compound 4.

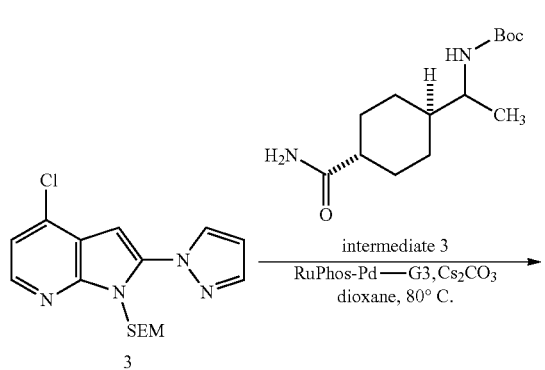

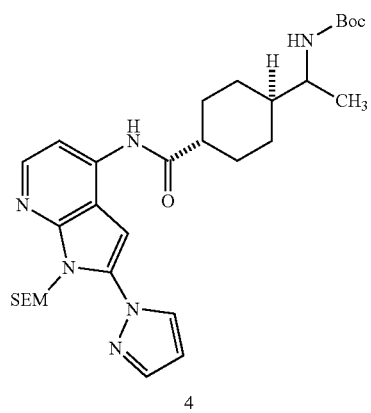

To a solution of 4-chloro-2-(1H-pyrazol-1-yl)-1-((2-(trimethylsilyl)ethoxy)methyl)-1H-pyrrolo[2,3-b]pyri-dine (200 mg, 573 μmol, 1.00 eq) in dioxane (50 mL) were added tert-butyl (1-((1r,4r)-4-carbamoylcyclo-hexyl)ethyl)carbamate (200 mg, 740 μmol, 1.29 eq), Cs2CO3 (600 mg, 1.84 mmol, 3.21 eq) and RuPhos-Pd-G3 (50.0 mg, 59.8 μmol, 0.10 eq). The mixture was stirred at 80° C. for 16 h under N2 atmosphere. After being cooled to room temperature, the mixture was diluted with ethyl acetate (200 mL) and H2O (100 mL). The solution was separated and the organic layer was concentrated under reduced pressure. The residue was purified by column chromatography on silica gel (Petroleum ether/Ethyl acetate=10/1 to 1/1) to afford tert-butyl(1-((1r, 4r)-4-((2-(1H-pyrazol-1-yl)-1-((2-(trimethylsilyl)ethoxy)methyl)-1H-pyrrolo[2,3-b]pyridin-4-yl)carbamoyl)cyclo-hexyl)ethyl)carbamate (240 mg, 362 μmol, 63% yield) as a yellow solid. Synthesis of Compound 4 was confirmed by $^1$H NMR and LC-MS, which showed the following data:

$^1$H NMR (400 MHz, DMSO-d6) δ=9.99 (s, 1H), 8.27 (d, J=2.4 Hz, 1H), 8.21 (d, J=5.6 Hz, 1H), 7.94 (d, J=5.6 Hz, 1H), 7.89 (d, J=1.6 Hz, 1H), 7.05 (s, 1H), 6.67 (d, J=8.8 Hz, 1H), 6.63-6.59 (m, 1H), 5.76 (s, 2H), 3.64 (s, 1H), 3.32-3.26 (m, 2H), 2.55 (s, 1H), 1.96-1.87 (m, 2H), 1.85-1.73 (m, 2H), 1.47-1.32 (m, 11H), 1.31-1.20 (m, 1H), 1.06-0.92 (m, 5H), 0.73-0.67 (m, 2H), −0.09--0.21 (m, 9H).

LC-MS (ESI) m/z 583.5 [M+H]$^+$.

3.4. Procedure for Preparation of MSK-A173.

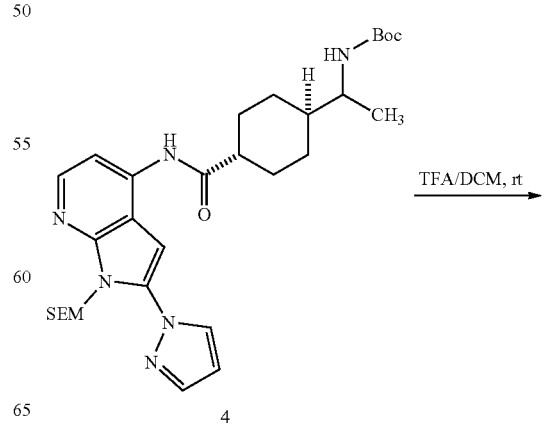

-continued

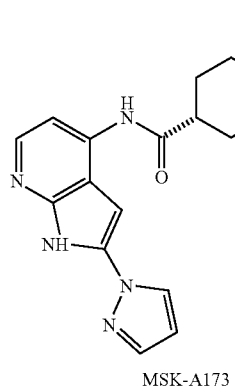

MSK-A173

To a solution of tert-butyl (1-((1r,4r)-4-((2-(1H-pyrazol-1-yl)-1-((2-(trimethylsilyl)ethoxy)methyl)-1H-pyrrolo[2,3-b]pyridin-4-yl)carbamoyl)cyclohexyl)ethyl)carbamate (200 mg, 302 µmol, 1.00 eq) in DCM (10 mL) was added TFA (5.0 mL). The mixture was stirred at 15° C. for 16 h. The reaction mixture was concentrated under vacuum. The residue was purified by prep-HPLC (column: Phenomenex luna C18 150*40 mm*15 µm; water (0.05% HCl)-ACN) and lyophilized to afford (1r,4r)-N-(2-(1H-pyrazol-1-yl)-1H-pyrrolo[2,3-b]pyridin-4-yl)-4-(1-aminoethyl)cyclohexanecarboxamide (40.1 mg, 93.5 µmol, 31% yield, 2HCl salt) as a yellow oil. Synthesis of MSK-A173 was confirmed by $^1$H NMR and LC-MS, which showed the following data:

$^1$H NMR (400 MHz, DMSO-$d_6$) δ=10.85 (br s, 1H), 8.59 (d, J=2.4 Hz, 1H), 8.23 (s, 2H), 8.08 (br s, 3H), 7.91 (d, J=1.6 Hz, 1H), 7.43 (s, 1H), 6.70-6.63 (m, 1H), 3.12-2.99 (m, 1H), 2.86-2.70 (m, 1H), 2.04-1.95 (m, 2H), 1.88-1.80 (m, 2H), 1.76 (s, 1H), 1.58-1.49 (m, 1H), 1.47-1.36 (m, 2H), 1.18 (d, J=6.8 Hz, 3H), 1.15-1.06 (m, 2H).

LC-MS (ESI) m/z 353.0 [M+H]$^+$.

These results indicate that MSK-A173 may be synthesized using the process disclosed herein.

Example 5. Synthesis of MSK-A181

1. Structure of MSK-A181.

2. Synthetic Scheme of MSK-A181.

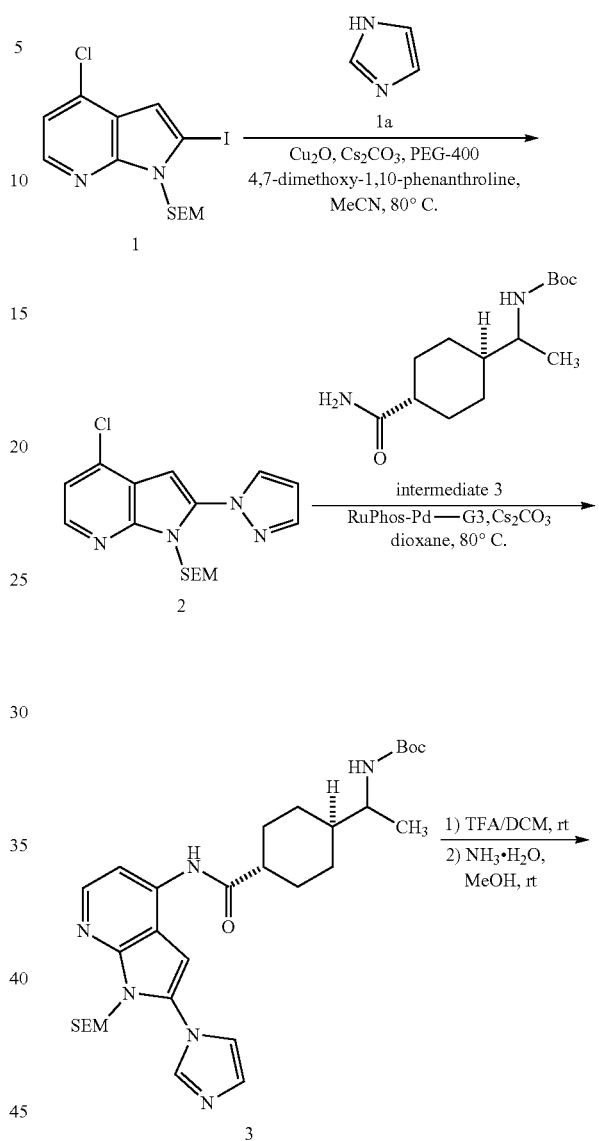

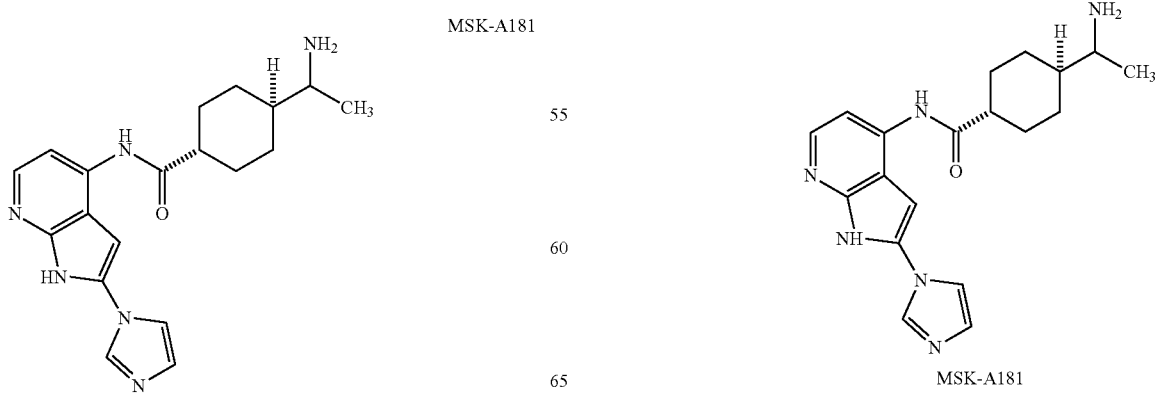

MSK-A181

3. Experimental Procedures for a Large Scale Run:

3.1. Procedure for Preparation of Compound 2.

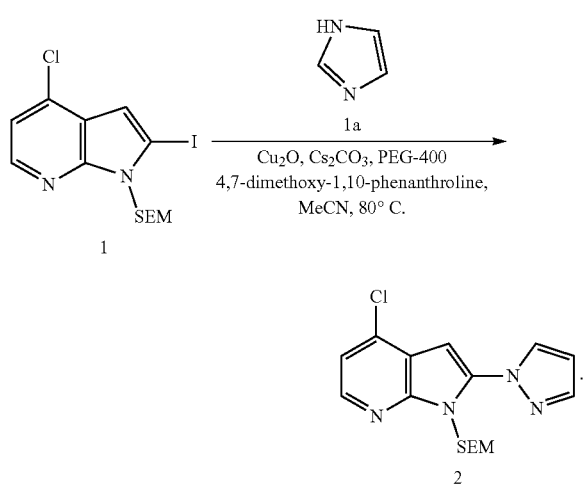

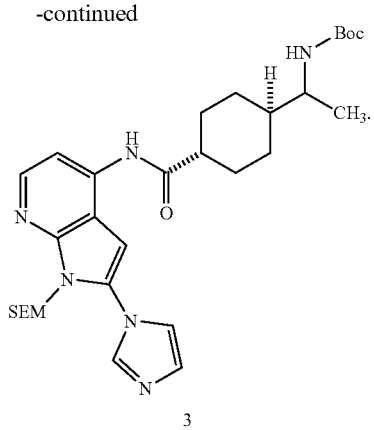

To a solution of 4-chloro-2-iodo-1-((2-(trimethylsilyl) ethoxy)methyl)-1H-pyrrolo[2,3-b]pyridine (500 mg, 1.22 mmol, 1.00 eq) and imidazole (166 mg, 2.44 mmol, 2.00 eq) in ACN (10 mL) were added 4,7-dimethoxy-1,10-phenanthroline (58.0 mg, 244 μmol, 0.20 eq), $Cs_2CO_3$ (598 mg, 1.83 mmol, 1.50 eq), $Cu_2O$ (17.0 mg, 122 μmol, 0.10 eq) and PEG-400 (200 mg). The mixture was stirred at 80° C. for 24 h under nitrogen atmosphere in a tube. After cooling to room temperature, the mixture was diluted with ethyl acetate (30 mL) and filtered. The filtrate was washed with water (20 mL), brine (20 mL), dried over $Na_2SO_4$, filtered and concentrated under reduced pressure. The residue was purified by column chromatography ($SiO_2$, Petroleum ether/Ethyl acetate=2/1) to give 4-chloro-2-(1H-imidazol-1-yl)-1-((2-(trimethylsilyl)ethoxy)methyl)-1H-pyrrolo[2,3-b]pyridine (170 mg, 487 μmol, 40% yield) as an off-white solid. Synthesis of Compound 2 was confirmed by $^1$H NMR, which showed the following data:

$^1$H NMR (400 MHz, DMSO-$d_6$) δ=8.50-8.45 (m, 1H), 8.25 (t, J=1.2 Hz, 1H), 7.82 (t, J=1.2 Hz, 1H), 7.54 (d, J=5.2 Hz, 1H), 7.35-7.31 (m, 1H), 7.00-6.95 (m, 1H), 5.72-5.64 (m, 2H), 3.61 (dd, J=7.6, 8.8 Hz, 2H), 0.92 (dd, J=7.6, 8.8 Hz, 2H), 0.01--0.01 (m, 9H).

3.2. Procedure for Preparation of Compound 3.

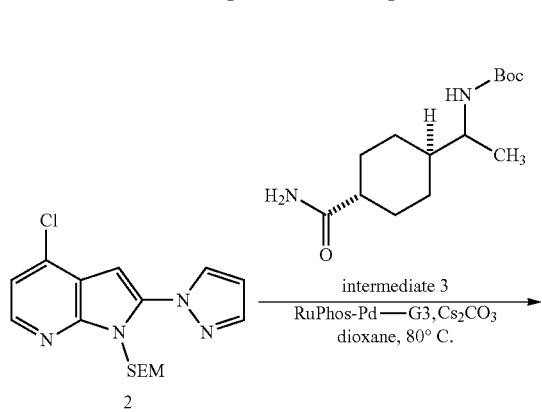

To a solution of tert-butyl (1-((1r,4r)-4-carbamoylcyclohexyl)ethyl)carbamate (128 mg, 473 μmol, 1.10 eq) and 4-chloro-2-(1H-imidazol-1-yl)-1-((2-(trimethylsilyl)ethoxy)methyl)-1H-pyrrolo[2,3-b]pyridine (150 mg, 430 μmol, 1.00 eq) in dioxane (4 mL) were added $Cs_2CO_3$ (420 mg, 1.29 mmol, 3.00 eq) and RuPhos-Pd-G3 (36.0 mg, 43.0 μmol, 0.10 eq). The mixture was stirred at 80° C. for 16 h under nitrogen atmosphere in a tube. After being cooled to room temperature, the mixture was diluted with ethyl acetate (30 mL) and filtered. The filtrate was washed with water (20 mL), brine (20 mL), dried over $Na_2SO_4$, filtered and concentrated under reduced pressure. The residue was purified by Prep-HPLC (column: Phenomenex Synergi C18 150*25*10 μm; mobile phase: [water (0.1% TFA)-ACN]) and concentrated under reduced pressure to give tert-butyl (1-((1r,4r)-4-((2-(1H-imidazol-1-yl)-1-((2-(trimethylsilyl)ethoxy)methyl)-1H-pyrrolo[2,3-b]pyridin-4-yl)carbamoyl)cyclohexyl)ethyl)carbamate (150 mg, 254 μmol, 59% yield) as a yellow solid. Synthesis of Compound 3 was confirmed by $^1$H NMR and LC-MS, which showed the following data:

$^1$H NMR (400 MHz, DMSO-$d_6$) δ=10.85 (s, 1H), 8.74 (s, 1H), 8.27 (d, J=5.6 Hz, 1H), 7.94 (d, J=5.2 Hz, 1H), 7.86 (s, 1H), 7.55 (s, 1H), 7.17 (s, 1H), 6.65 (d, J=9.2 Hz, 1H), 5.55 (s, 2H), 3.47-3.43 (m, 2H), 3.28-3.32 (m, 1H), 1.92-1.89 (m, 2H), 1.83-1.78 (m, 2H), 1.38 (s, 9H), 1.21-1.26 (m, 1H), 1.06-0.99 (m, 5H), 0.83-0.78 (m, 2H), −0.11--0.13 (m, 9H).

LC-MS (ESI) m/z 583.4 [M+H]$^+$.

3.3. Procedure for Preparation of MSK-A181.

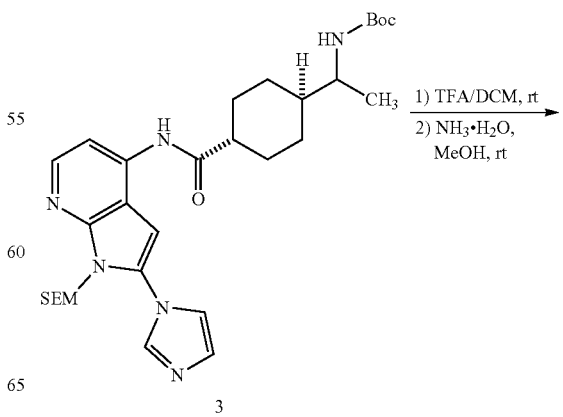

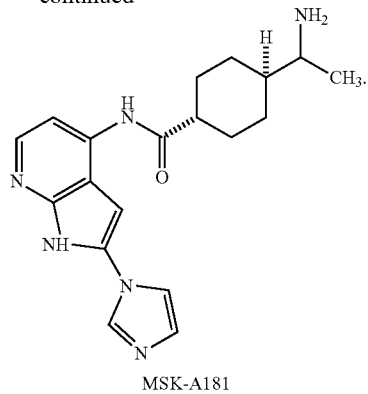

MSK-A181

A mixture of tert-butyl (1-((1r,4r)-4-((2-(1H-imidazol-1-yl)-1-((2-(trimethylsilyl)ethoxy)methyl)-1H-pyrrolo [2,3-b]pyridin-4-yl)carbamoyl)cyclohexyl)ethyl)carbamate (150 mg, 257 μmol, 1.00 eq) in TFA (3 mL) and DCM (6 mL) was stirred at 15° C. for 12 h. The reaction mixture was concentrated under vacuum to remove solvents. The residue was purified by Prep-HPLC (column: Phenomenex Synergi C18 150*25*10 μm; mobile phase:[water (0.05% HCl)-ACN]) and lyophilized to give (1r,4r)-N-(2-(1H-imidazol-1-yl)-1H-pyrrolo[2,3-b]pyridin-4-yl)-4-(1-aminoethyl)cyclohexanecarboxamide (63.1 mg, 177 μmol, 69% yield) as a white solid. Synthesis of MSK-A181 was confirmed by $^1$H NMR and LC-MS, which showed the following data:

$^1$H NMR (400 MHz, DMSO-$d_6$) δ=11.05 (s, 1H), 9.78 (s, 1H), 8.29 (d, J=6.0 Hz, 1H), 8.26 (d, J=1.6 Hz, 1H), 8.13 (br s, 3H), 8.10 (d, J=6.4 Hz, 1H), 7.95 (s, 1H), 7.67 (s, 1H), 3.01-3.04 (m, 1H), 2.82-2.84 (m, 1H), 2.00-1.97 (m, 2H), 1.83 (br s, 2H), 1.55-1.52 (m, 1H), 1.43-1.40 (m, 2H), 1.18-1.07 (m, 5H).

LC-MS (ESI) m/z 353.0 [M+H]$^+$.

These results indicate that MSK-A181 may be synthesized using the process disclosed herein.

Example 6. Synthesis of MSK-A170-PEAK1 and MSK-A170-PEAK2

1. Structure of MSK-A170-PEAK1 and MSK-A170-PEAK2.

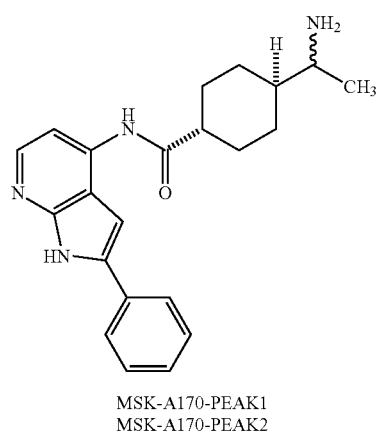

MSK-A170-PEAK1
MSK-A170-PEAK2

2. Synthetic Scheme of MSK-A170-PEAK1 and MSK-A170-PEAK2.

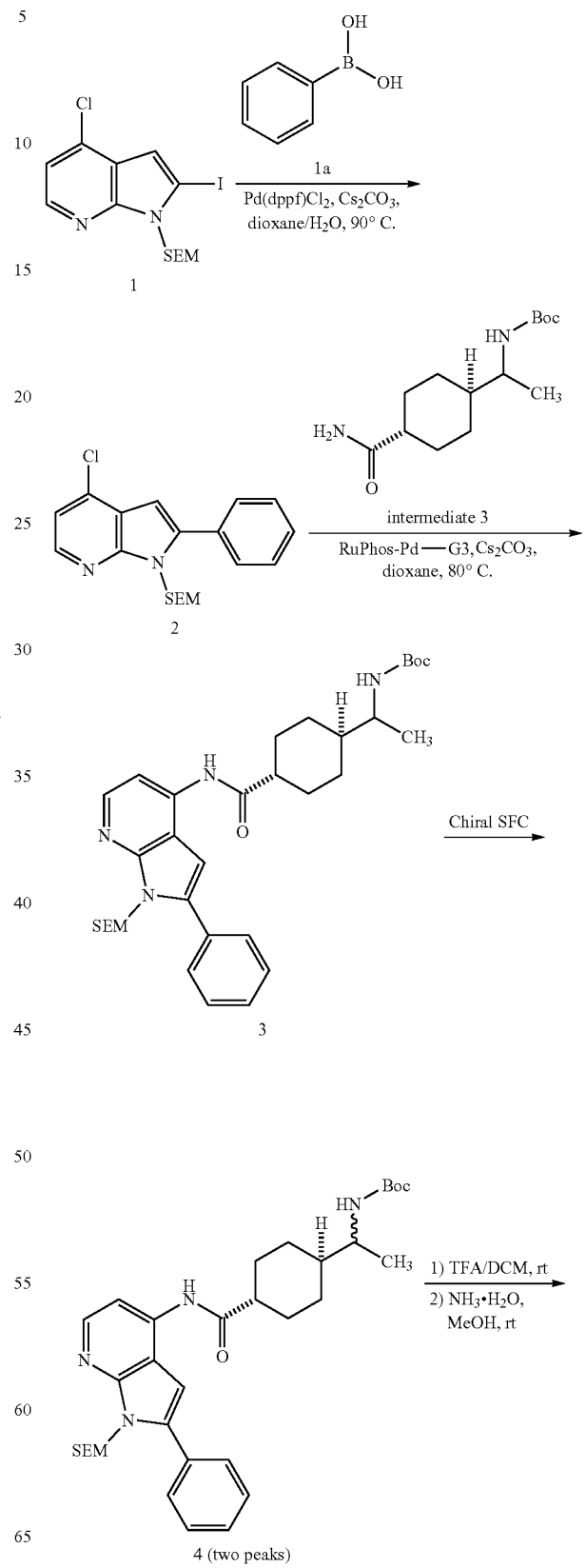

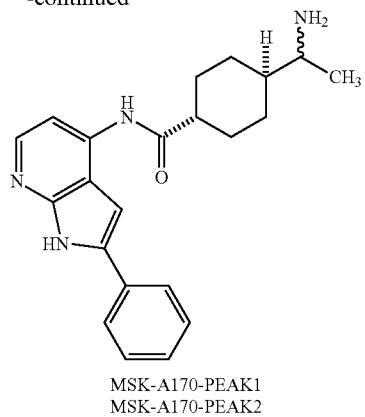

MSK-A170-PEAK1
MSK-A170-PEAK2

3. Experimental Procedures for a Large Scale Run.
3.1. Procedure for Preparation of Compound 2.

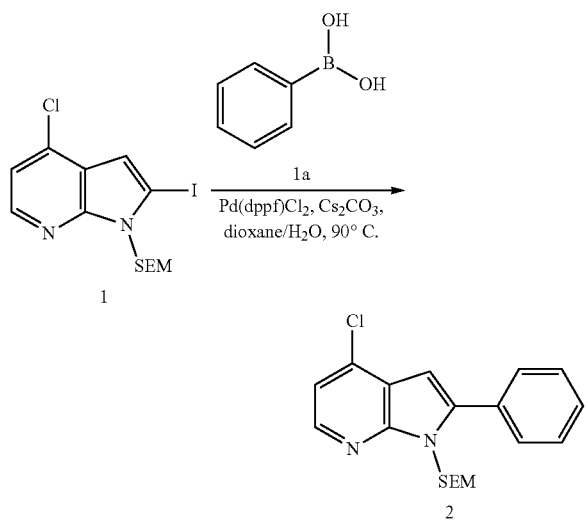

3.2. Procedure for Preparation of Compound 3.

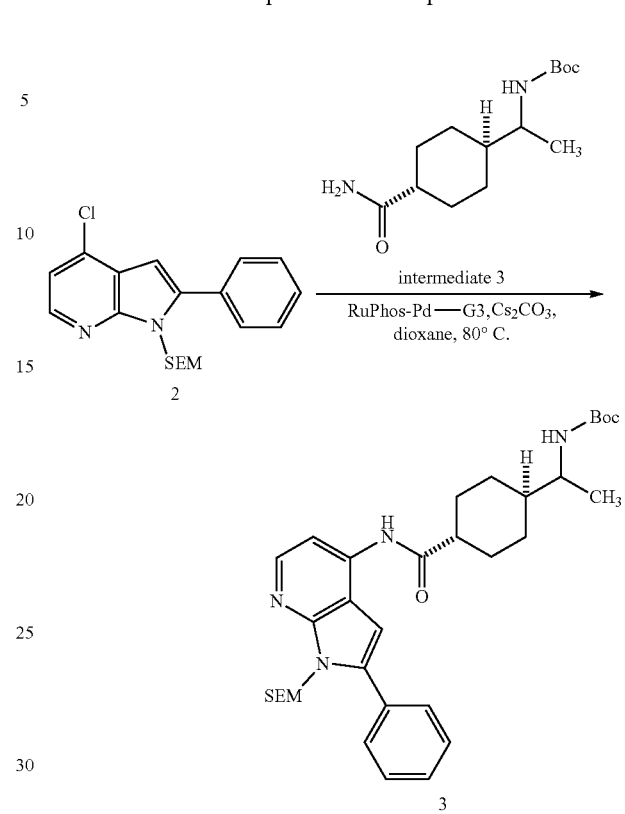

To a solution of 4-chloro-2-iodo-1-((2-(trimethylsilyl)ethoxy)methyl)-1H-pyrrolo[2,3-b]pyridine (1.00 g, 2.45 mmol, 1.00 eq) and phenylboronic acid (358 mg, 2.94 mmol, 1.20 eq) in dioxane (20 mL) and water (5 mL) were added $Cs_2CO_3$ (2.39 g, 7.34 mmol, 3.00 eq) and Pd(dppf)$Cl_2$ (180 mg, 246 μmol, 0.10 eq) under $N_2$. The reaction mixture was stirred at 80° C. for 7 h under nitrogen atmosphere. After the reaction mixture was cooled to room temperature, it was diluted with $H_2O$ (15 mL). The solution was extracted with ethyl acetate (2×25 mL). Combined extracts were washed with brine (20 mL), dried over $Na_2SO_4$, filtered and concentrated under vacuum. The residue was purified by column chromatography (TLC: Petroleum ether/Ethyl acetate=10/1, $R_f$=0.63; $SiO_2$, Petroleum ether/Ethyl acetate=1/0 to 100/1) to afford 4-chloro-2-phenyl-1-((2-(trime-thylsilyl)ethoxy)methyl)-1H-pyrrolo[2,3-b]pyridine (755 mg, 1.85 mmol, 76% yield) as a yellow oil. Synthesis of Compound 2 was confirmed by $^1$H NMR and LC-MS, which showed the following data:

$^1$H NMR (400 MHz, DMSO-$d_6$) δ=8.29 (d, J=5.2 Hz, 1H), 7.82 (dd, J=1.6, 8.0 Hz, 2H), 7.58-7.47 (m, 3H), 7.35 (d, J=5.2 Hz, 1H), 6.79 (s, 1H), 5.65 (s, 2H), 3.63-3.56 (m, 2H), 0.86-0.79 (m, 2H), −0.09-−0.14 (m, 9H).

LC-MS (ESI) m/z 359.3/361.3 [M+H]$^+$.

To a solution of 4-chloro-2-phenyl-1-((2-(trime-thylsilyl)ethoxy)methyl)-1H-pyrrolo[2,3-b]pyridine (755 mg, 1.85 mmol, 1.00 eq) and tert-butyl (1-((1r,4r)-4-carbamoylcyclohexyl)ethyl)carbamate (502 mg, 1.86 mmol, 1.00 eq) in dioxane (20 mL) were added $Cs_2CO_3$ (1.81 g, 5.55 mmol, 3.00 eq) and RuPhos-Pd-G3 (155 mg, 185 μmol, 0.10 eq) under nitrogen atmosphere. The reaction mixture was stirred at 80° C. for 16 h. After the reaction mixture was cooled to room temperature, it was diluted with $H_2O$ (15 mL) and ethyl acetate (25 mL). The solution was filtered and the layers were separated. The aqueous phase was extracted with ethyl acetate (25 mL). Combined extracts were washed with brine (20 mL), dried over $Na_2SO_4$, filtered and concentrated under vacuum. The residue was purified by Prep-HPLC (column: Phenomenex Synergi Max-RP 250*50 mm*10 μm; water (0.1% TFA)-ACN) to afford tert-butyl (1-((1r,4r)-4-((2-phenyl-1-((2-(tri-methylsilyl)ethoxy)methyl)-1H-pyrrolo[2,3-b]pyridin-4-yl)carbamoyl)cyclohexyl)ethyl)carbamate (840 mg, 1.40 mmol, 76% yield) as a yellow solid. Synthesis of Compound 3 was confirmed by $^1$H NMR and LC-MS, which showed the following data:

$^1$H NMR (400 MHz, DMSO-$d_6$) δ=9.99 (s, 1H), 8.18 (d, J=5.6 Hz, 1H), 7.94 (d, J=5.6 Hz, 1H), 7.80-7.74 (m, 2H), 7.57-7.50 (m, 2H), 7.50-7.44 (m, 1H), 7.11 (s, 1H), 6.68 (br d, J=8.8 Hz, 1H), 5.62 (s, 2H), 3.59-3.55 (m, 2H), 3.36-3.25 (m, 1H), 2.60-2.54 (m, 1H), 1.96-1.86 (m, 2H), 1.85-1.74 (m, 2H), 1.48-1.32 (m, 11H), 1.31-1.20 (m, 1H), 1.07-0.93 (m, 5H), 0.87-0.78 (m, 2H), −0.09-−0.13 (m, 9H).

LC-MS (ESI) m/z 593.6 [M+H]$^+$.

Compound 3 was further characterized by Supercritical Fluid Chromatography (SFC), which showed the following results: retention time of peak 1=1.352 min; retention time of peak 2=1.539 min.

3.3. Procedure for Preparation of Compound 4.

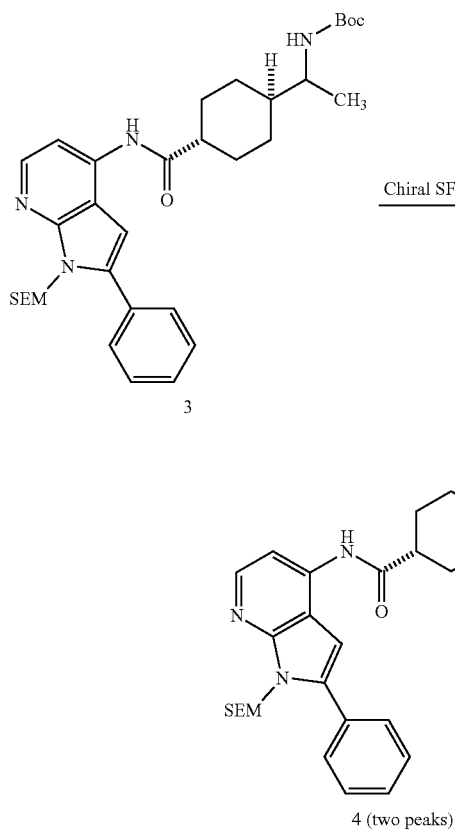

Compound 3 (840 mg, 1.42 mmol, 1.00 eq) was purified by Chiral SFC (column: DAICEL CHIRALPAK AD-H (250 mm*30 mm, 5 μm); mobile phase:[0.1% NH$_3$H$_2$O in MeOH]; B %:30%-30%, 3.05 min; 70 min) to give two fractions with different retention time.

Fraction 1 (peak 1): tert-butyl (1-((1r,4r)-4-((2-phenyl-1-((2-(trimethylsilyl)ethoxy)methyl)-1H-pyrrolo[2,3-b]pyridin-4-yl)carbamoyl)cyclohexyl)ethyl)carbamate (350 mg, 584 μmol, 41% yield) was obtained as a yellow solid. Synthesis of Compound 4 (Peak 1) was confirmed by $^1$H NMR, LC-MS, and SFC, which showed the following data:

$^1$H NMR (400 MHz, DMSO-d$_6$) δ=9.94 (s, 1H), 8.17 (d, J=5.6 Hz, 1H), 7.91 (d, J=5.6 Hz, 1H), 7.80-7.75 (m, 2H), 7.57-7.50 (m, 2H), 7.49-7.43 (m, 1H), 7.09 (s, 1H), 6.66 (d, J=8.8 Hz, 1H), 5.62 (s, 2H), 3.62-3.56 (m, 2H), 2.56-2.53 (m, 1H), 1.96-1.86 (m, 2H), 1.85-1.74 (m, 2H), 1.47-1.35 (m, 11H), 1.29-1.20 (m, 1H), 1.04-0.94 (m, 5H), 0.87-0.79 (m, 2H), −0.09-−0.13 (m, 9H).

LC-MS (ESI) m/z 593.6 [M+H]$^+$.

SFC: retention time=1.403 min.

Fraction 2 (peak 2): tert-butyl (1-((1r,4r)-4-((2-phenyl-1-((2-(trimethylsilyl)ethoxy)methyl)-1H-pyrrolo[2,3-b]pyridin-4-yl)carbamoyl)cyclohexyl)ethyl)carbamate (430 mg, 689 μmol, 49% yield) was obtained as a yellow solid. Synthesis of Compound 4 (Peak 2) was confirmed by $^1$H NMR, LC-MS, and SFC, which showed the following data:

$^1$H NMR (400 MHz, DMSO-d$_6$) δ=9.94 (s, 1H), 8.17 (d, J=5.6 Hz, 1H), 7.91 (d, J=5.6 Hz, 1H), 7.80-7.75 (m, 2H), 7.57-7.50 (m, 2H), 7.49-7.43 (m, 1H), 7.09 (s, 1H), 6.66 (d, J=8.8 Hz, 1H), 5.62 (s, 2H), 3.62-3.56 (m, 2H), 2.56-2.53 (m, 1H), 1.96-1.86 (m, 2H), 1.85-1.74 (m, 2H), 1.47-1.35 (m, 11H), 1.29-1.20 (m, 1H), 1.04-0.94 (m, 5H), 0.87-0.79 (m, 2H), −0.09-−0.13 (m, 9H).

LC-MS (ESI) m/z 593.6 [M+H]$^+$.

SFC: retention time=1.566 min.

3.4. Procedure for Preparation of MSK-A170-PEAK1 and MSK-A170-PEAK2

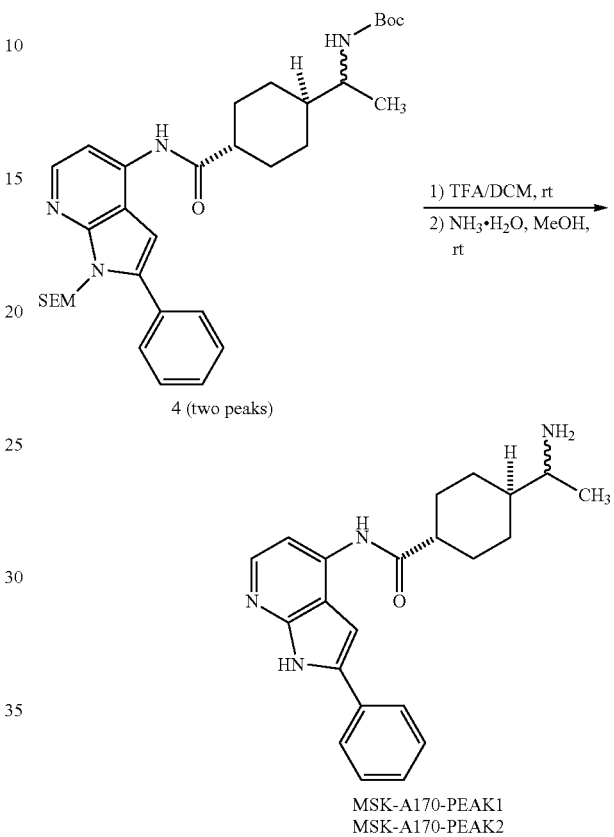

A solution of tert-butyl (1-((1r,4r)-4-((2-phenyl-1-((2-(trimethylsilyl)ethoxy)methyl)-1H-pyrrolo[2,3-b]pyridin-4-yl)carbamoyl)cyclohexyl)ethyl)carbamate (340 mg, 574 μmol, 1.00 eq) in DCM (10 mL) and TFA (2.5 mL) was stirred at 20° C. After 2 h, the reaction mixture was concentrated under vacuum. The residue was dissolved in MeOH (8 mL) and NH$_3$.H$_2$O (4 mL), and the mixture was stirred for 1 h at 20° C. The reaction mixture was concentrated under vacuum. The residue was purified by Prep-HPLC (column: Phenomenex Synergi C18 150*25*10 μm; water (0.05% HCl)-ACN) and lyophilized to give (1r,4r)-4-(1-aminoethyl)-N-(2-phenyl-1H-pyrrolo[2,3-b]pyridin-4-yl)cyclohexanecarboxamide as an off-white solid.

MSK-A170-PEAK1 synthesis showed the following yield: (184 mg, 419 μmol, 73% yield, 2HCl salt). Synthesis of MSK-A170-PEAK1 was confirmed by $^1$H NMR, LC-MS, and SFC, which showed the following data:

$^1$H NMR (400 MHz, DMSO-d$_6$) δ=12.85 (br s, 1H), 10.49 (br s, 1H), 8.19 (d, J=6.0 Hz, 1H), 8.06 (d, J=5.6 Hz, 1H), 7.93-7.87 (m, 5H), 7.55-7.51 (m, 3H), 7.45-7.36 (m, 1H), 3.12-3.02 (m, 1H), 2.76-2.68 (m, 1H), 2.06-1.97 (m, 2H), 1.90-1.78 (m, 2H), 1.58-1.38 (m, 3H), 1.22-1.06 (m, 5H).

LC-MS (ESI) m/z 363.3 [M+H]$^+$.

SFC: retention time=2.891 min.

Synthesis showed the following yield: MSK-A170-PEAK2 (164 mg, 369 μmol, 51% yield, 2HCl salt). Synthesis of MSK-A170-PEAK2 was confirmed by $^1$H NMR, LC-MS, and SFC, which showed the following data:

$^1$H NMR (400 MHz, DMSO-$d_6$) δ=12.98 (s, 1H), 10.60 (s, 1H), 8.21 (d, J=6.4 Hz, 1H), 8.11 (d, J=6.0 Hz, 1H), 7.94-7.87 (m, 5H), 7.61 (br s, 1H), 7.53 (t, J=7.6 Hz, 2H), 7.46-7.37 (m, 1H), 3.16-3.00 (m, 1H), 2.81-2.70 (m, 1H), 2.06-1.97 (m, 2H), 1.90-1.79 (m, 2H), 1.60-1.38 (m, 3H), 1.25-1.06 (m, 5H).

LC-MS (ESI) m/z 363.3 [M+H]$^+$.

SFC: retention time=3.305 min.

These results indicate that MSK-A170-PEAK1 and MSK-A170-PEAK2 may be synthesized using the process disclosed herein.

The absolute configuration of MSK-A170-PEAK2 was confirmed to be MSK-A170-(R), illustrated below, via the independent synthesis described hereafter.

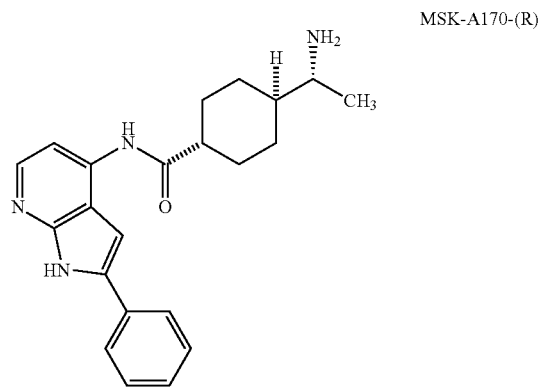

MSK-A170-(R)

Independent Synthesis of MSK-A170-PEAK2
Procedure for Preparation of Compound 2

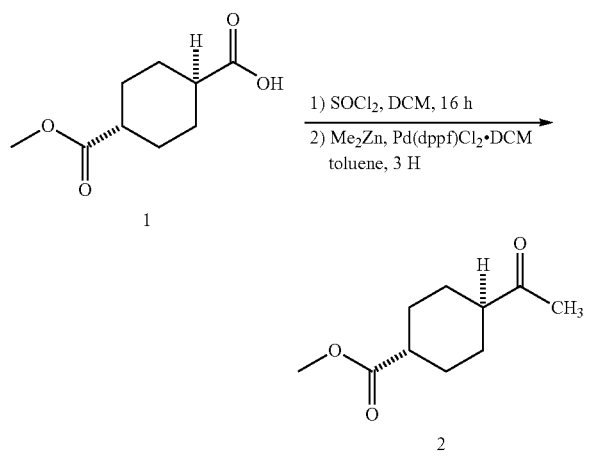

To a solution of (1r,4r)-4-(methoxycarbonyl)cyclohexanecarboxylic acid (68.0 g, 365 mmol, 1.00 eq) in DCM (600 mL) were added SOCl$_2$ (28.0 mL, 386 mmol, 1.06 eq) and DMF (798 mg, 10.9 mmol, 0.03 eq) at 0° C. The reaction mixture was warmed to 25° C. and stirred for 16 h under N$_2$. The reaction mixture was concentrated under reduced pressure to afford (1r,4r)-methyl 4-(chlorocarbonyl)cyclohexanecarboxylate (70.0 g, crude) as a colorless oil. The material was used into next step without further purification.

A solution of (1r,4r)-methyl 4-(chlorocarbonyl)-cyclohexanecarboxylate (17.5 g, 85.5 mmol, 1.00 eq, crude) and Pd(dppf)Cl$_2$.CH$_2$Cl$_2$ (2.00 g, 2.45 mmol, 0.03 eq) in toluene (200 mL) was cooled to 0° C. in an ice bath. The ZnMe$_2$ (1 M in toluene, 100 mL, 1.17 eq) was added to the reaction mixture that the temperature did not exceed 15° C. The cooling bath was then removed and the reaction mixture was stirred at 30° C. for 3 h (The reaction was performed by 4 batches in parallel). The reaction mixture was cooled to 0° C. and quenched carefully with water (100 mL). The solution was acidified with 2 M HCl solution to pH=7. The solution was diluted with ethyl acetate (300 mL). The four batches were combined and layers were separated. The organic layer was dried over Na$_2$SO$_4$, filtered and concentrated under reduced pressure. The residue was purified by automated flash chromatography column (petroleum ether/ethyl acetate=5/1) to afford (1r,4r)-methyl 4-acetylcyclohexanecarboxylate (40.0 g, 217 mmol, 63% yield) as a colorless oil. $^1$H NMR (400 MHz, CDCl$_3$) δ=3.68 (s, 3H), 2.38-2.23 (m, 2H), 2.15 (s, 3H), 2.12-2.05 (m, 2H), 2.03-1.96 (m, 2H), 1.54-1.29 (m, 4H).

Procedure for Preparation of Compound 3

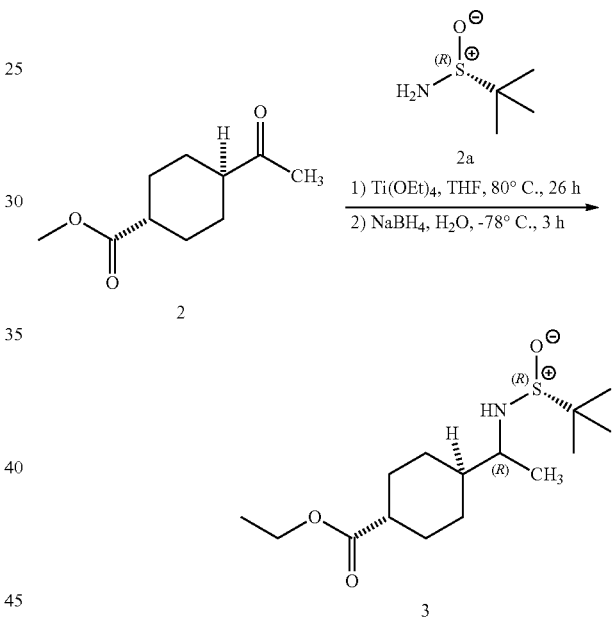

To a solution of (1r,4r)-methyl 4-acetylcyclohexanecarboxylate (10.0 g, 54.3 mmol, 1.00 eq) and (R)-2-methylpropane-2-sulfinamide (9.87 g, 81.4 mmol, 1.50 eq) in THF (100 mL) were added Ti(OEt)$_4$ (24.8 g, 109 mmol, 2.00 eq) under N$_2$. The reaction mixture was stirred at 80° C. for 26 h. Then the reaction mixture was cooled to −78° C., and NaBH4 (6.16 g, 163 mmol, 3.00 eq) and H$_2$O (2 mL) were added to the reaction mixture carefully. The suspension was stirred at −78° C. for 3 h (The reaction was performed by 3 batches in parallel). The reaction mixture was quenched with sat. NH$_4$Cl solution (150 mL) at −78° C., a large quantity of white precipitate was formed. The mixture was filtered and the cake was washed with ethyl acetate (250 mL), and layers were separated. The aqueous phase was extracted with ethyl acetate (250 mL). Combined extracts were washed with brine (150 mL), dried over Na$_2$SO$_4$, filtered and concentrated under vacuum. The residue was purified by flash silica gel chromatography (petroleum ether/ethyl acetate=1/1) followed by reversed-phase column (0.1% NH$_3$.H$_2$O in water/acetonitrile). The desired fraction was collected and concentrated to remove MeCN. The residue was extracted with ethyl acetate (1000 mL). The organic layer was dried over Na₂SO₄, filtered and concentrated under vacuum to afford (1R,4r)-ethyl 4-((R)-1-((R)-1,1-dimethylethylsulfinamido)ethyl)cyclohexanecarboxylate (31.0 g, 101 mmol, 62% yield) as a colorless oil. $^1$H NMR (400 MHz, DMSO-d₆) δ=4.87 (d, J=6.8 Hz, 1H), 4.08-4.00 (m, 2H), 3.04-2.95 (m, 1H), 2.24-2.13 (m, 1H), 1.96-1.81 (m, 3H), 1.79-1.69 (m, 1H), 1.43-1.34 (m, 1H), 1.33-1.21 (m, 2H), 1.19-1.14 (m, 3H), 1.13-1.07 (m, 9H), 1.06-0.91 (m, 5H). LC-MS (ESI) m/z 304.3 [M+H]⁺ SFC: retention time=1.398 min.

Procedure for Preparation of Compound 3

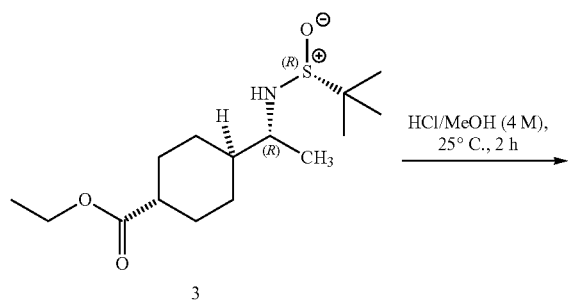

A solution of (1R,4r)-ethyl 4-((R)-1-((R)-1,1-dimethylethylsulfinamido)ethyl)cyclohexanecarboxylate (36.8 g, 121 mmol, 1.00 eq) in HCl/MeOH (4 M, 300 mL, 9.90 eq) was stirred at 25° C. for 2 h. The reaction mixture was concentrated under vacuum to afford (1R,4r)-methyl 4-((R)-1-aminoethyl)cyclohexane-carboxylate (26.8 g, 121 mmol, 100% yield, HCl salt) as a white solid. The material was used into next step without purification. $^1$H NMR (400 MHz, DMSO-d₆) δ=8.12 (s, 3H), 3.57 (s, 3H), 3.03-2.91 (m, 1H), 2.29-2.17 (m, 1H), 1.98-1.88 (m, 2H), 1.81-1.70 (m, 2H), 1.55-1.43 (m, 1H), 1.34-1.19 (m, 2H), 1.16-1.11 (m, 3H), 1.08-1.04 (m, 2H).

Procedure for Preparation of Compound 5

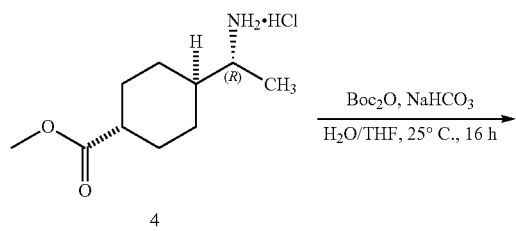

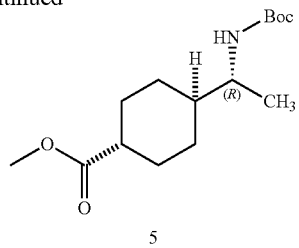

To a suspension of (1R,4r)-methyl 4-((R)-1-aminoethyl)cyclohexane-carboxylate (26.8 g, 145 mmol, 1.00 eq, HCl salt) and Boc₂O (33.3 g, 152 mmol, 1.05 eq) in THF (300 mL) and sat. NaHCO₃ (300 mL) solution (300 mL) was added NaHCO₃ (10 g, 119 mmol, 0.82 eq) solid until pH get ~8. After stirring at 25° C. for 12 h, the reaction mixture was poured into ethyl acetate (300 mL) and H₂O (300 mL). The solution was separated and the organic layer was washed with brine (300 mL), dried over Na₂SO₄, filtered and concentrated under reduced pressure. The residue was purified by flash silica gel chromatography (petroleum ether/ethyl acetate=3/17) to afford (1R,4r)-methyl 4-((R)-1-((tert-butoxycarbonyl)amino)ethyl)cyclohexanecarboxylate (28.2 g, 98.8 mmol, 68% yield) as a white solid. $^1$H NMR (400 MHz, DMSO-d₆) δ=6.61 (d, J=8.8 Hz, 1H), 3.57 (s, 3H), 3.30-3.13 (m, 1H), 2.25-2.12 (m, 1H), 1.96-1.83 (m, 2H), 1.79-1.64 (m, 2H), 1.37 (s, 9H), 1.32-1.13 (m, 3H), 1.04-0.85 (m, 5H).

Procedure for Preparation of Compound 6

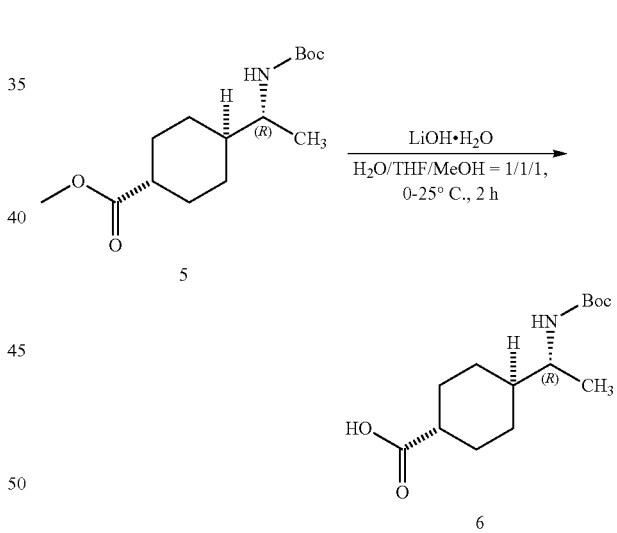

To a solution of (1R,4r)-methyl 4-((R)-1-((tert-butoxycarbonyl)amino)ethyl)cyclohexanecarboxylate (28.2 g, 98.8 mmol, 1.00 eq) in MeOH (200 mL) and THF (200 mL) was added a solution of LiOH H₂O (12.4 g, 296 mmol, 3.00 eq) in H₂O (200 mL) at 0° C. After stirring at 25° C. for 2 h, the reaction mixture was concentrated under vacuum. The residue was diluted with H₂O (300 mL) and the solution was washed with ethyl acetate (200 mL). The aqueous phase was acidified with 12 M HCl solution to pH=5-6. During this period, white precipitate was formed. The solid was collected by filtration. The filter cake was dissolved in DCM (500 mL) and layers were separated. The organic layer was dried over Na₂SO₄, filtered and concentrated under vacuum to afford (1R,4r)-4-((R)-1-((tert-butoxycarbonyl)amino)

ethyl)cyclohexane-carboxylic acid (23.8 g, 87.7 mmol, 89% yield) as a white solid. $^1$H NMR (400 MHz, DMSO-$d_6$) δ=11.96 (s, 1H), 6.60 (d, J=8.8 Hz, 1H), 3.30-3.13 (m, 1H), 2.07 (tt, J=3.2, 12.0 Hz, 1H), 1.96-1.86 (m, 2H), 1.80-1.62 (m, 2H), 1.37 (s, 9H), 1.30-1.10 (m, 3H), 1.07-0.82 (m, 5H).

Procedure for Preparation of Compound 7

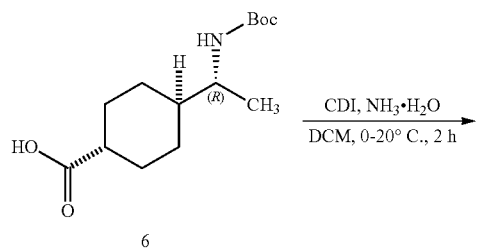

To a solution of (1R,4r)-4-((R)-1-((tert-butoxycarbonyl)amino)ethyl)cyclohexanecarboxylic acid (18.8 g, 69.3 mmol, 1.00 eq) in DCM (200 mL) was added CDI (11.3 g, 69.7 mmol, 1.01 eq) at 0° C. After stirring at 20° C. for 1 h, the reaction mixture was dropped into NH$_3$.H$_2$O (200 mL, 1.45 mol, 28% purity) at 0° C. After stirring at 20° C. for 2 h, dichloromethane was removed under reduce pressure. The residue was triturated with H$_2$O (300 mL) for 30 min. Then DCM (20 mL) was added to the mixture. The suspension was filtered and the filter cake was washed with H$_2$O (100 mL), and dried under vacuum to afford tert-butyl ((R)-1-((1r,4R)-4-carbamoylcyclohexyl)ethyl)carbamate (17.8 g, 65.8 mmol, 95% yield) as a white solid. $^1$H NMR (400 MHz, DMSO-$d_6$) δ=7.14 (s, 1H), 6.74-6.47 (m, 2H), 3.31-3.16 (m, 1H), 2.04-1.90 (m, 1H), 1.83-1.62 (m, 4H), 1.37 (s, 9H), 1.31-1.10 (m, 3H), 1.04-0.78 (m, 5H).

Procedure for Preparation of Compound 9

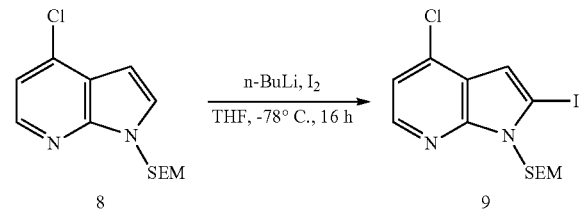 [SMILES: C[Si](C)(C)CCOCn1ccc2c(Cl)ccnc21 ; C[Si](C)(C)CCOCn1c(I)cc2c(Cl)ccnc21]

To a solution of 4-chloro-1-((2-(trimethylsilyl)ethoxy)methyl)-1H-pyrrolo[2,3-b]pyridine (28.0 g, 99.0 mmol, 1.00 eq) in THF (300 mL) was added n-BuLi (2.5 M in THF, 44 mL, 1.11 eq) at -78° C. under N$_2$. After 1 h, 12 (26.4 g, 104 mmol, 1.05 eq) in THF (100 mL) was dropped into the reaction mixture at -78° C. The reaction mixture was warmed to 25° C. and stirred for 16 h under N$_2$. The reaction mixture was cooled to 0° C., and quenched with 300 mL H$_2$O and sat. Na$_2$S$_2$O$_3$ solution (150 mL). The solution was extracted with ethyl acetate (400 mL×2). Combined extracts were washed with brine (400 mL), dried over Na$_2$SO$_4$, filtered and concentrated under vacuum. The residue was purified by automated flash chromatography system (petroleum ether/ethyl acetate=92/8) to afford 4-chloro-2-iodo-1-((2-(trimethylsilyl)ethoxy)-methyl)-1H-pyrrolo[2,3-b]pyridine (18.0 g, 42.7 mmol, 43% yield) as a yellow oil. $^1$H NMR (400 MHz, DMSO-$d_6$) δ=8.20 (d, J=5.2 Hz, 1H), 7.27 (d, J=5.2 Hz, 1H), 6.99 (s, 1H), 5.63 (s, 2H), 3.53 (s, 2H), 0.82 (s, 2H), -0.11 (s, 9H). LC-MS (ESI) m/z 409.0/411.0 [M+H]$^+$ Procedure for Preparation of Compound 10

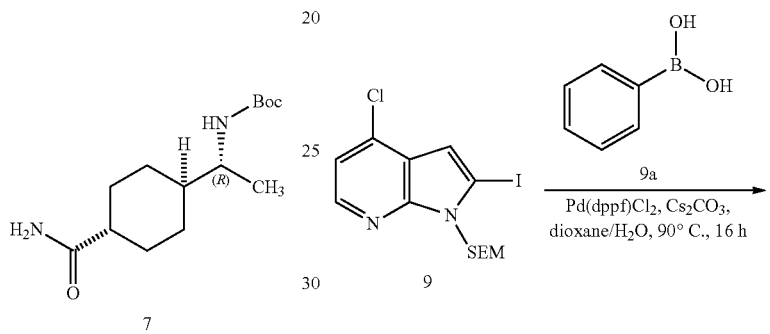

To a solution of 4-chloro-2-iodo-1-((2-(trimethylsilyl)ethoxy)methyl)-1H-pyrrolo[2,3-b]pyridine (10.0 g, 24.5 mmol, 1.00 eq) and phenylboronic acid (3.58 g, 29.4 mmol, 1.20 eq) in dioxane (100 mL) and water (25 mL) were added Cs$_2$CO$_3$ (24.0 g, 73.7 mmol, 3.01 eq) and Pd(dppf)Cl$_2$ (1.79 g, 2.45 mmol, 0.10 eq) under N$_2$. The reaction mixture was stirred at 80° C. for 16 h under nitrogen atmosphere. After the reaction mixture was cooled to room temperature, it was diluted with H$_2$O (100 mL). The solution was extracted with ethyl acetate (200 mL×2). Combined extracts were washed with brine (100 mL), dried over Na$_2$SO$_4$, filtered and concentrated under vacuum. The residue was purified by column chromatography (petroleum ether/ethyl acetate=100/1) to afford 4-chloro-2-phenyl-1-((2-(trimethylsilyl)ethoxy)methyl)-1H-pyrrolo-[2,3-b]pyridine (6.20 g, 17.1 mmol, 70% yield) as a yellow oil. $^1$H NMR (400 MHz, DMSO-$d_6$) δ=8.29 (d, J=5.2 Hz, 1H), 7.85-7.78 (m, 2H), 7.58-7.47 (m, 3H), 7.35 (d, J=5.2 Hz, 1H), 6.79 (s, 1H), 5.66 (s, 2H), 3.64-3.56 (m, 2H), 0.88-0.79 (m, 2H), -0.08--0.14 (m, 9H). LC-MS (ESI) m/z 359.1/361.1 [M+H]$^+$ Procedure for Preparation of Compound 11

Procedure for Preparation of MSK-A170-PEAK2

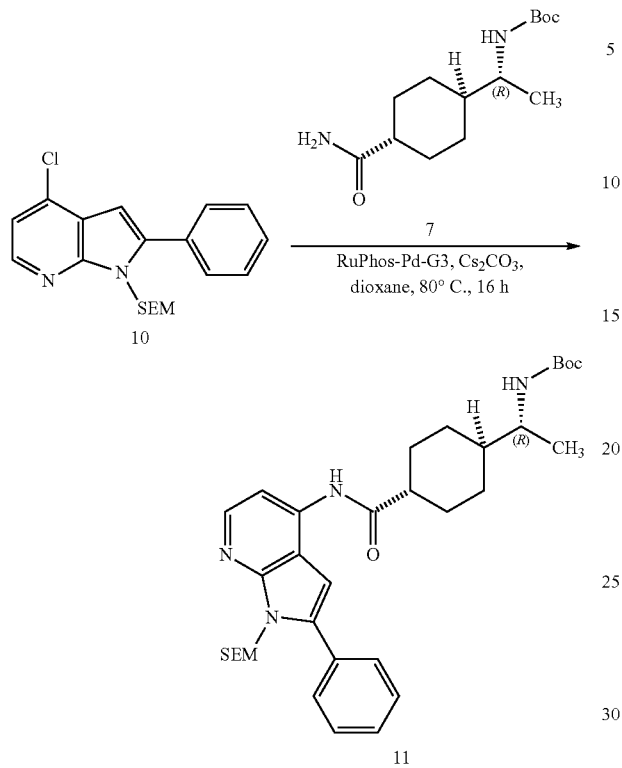

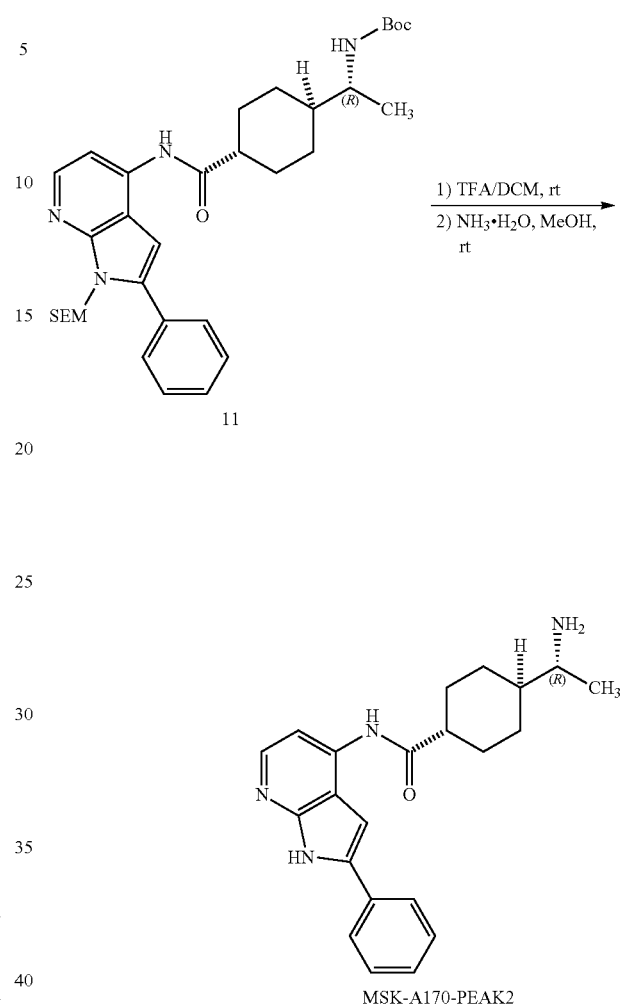

To a solution of 4-chloro-2-phenyl-1-((2-(trime-thylsilyl)ethoxy)methyl)-1H-pyrrolo[2,3-b]pyridine (9.35 g, 26.1 mmol, 1.00 eq) and tert-butyl ((R)-1-((1r,4R)-4-carbamoyl-cyclohexyl)ethyl)carbamate (8.45 g, 31.3 mmol, 1.20 eq) in dioxane (150 mL) were added $Cs_2CO_3$ (17.0 g, 52.1 mmol, 2.00 eq) and RuPhos-Pd-G3 (2.00 g, 2.39 mmol, 0.92 eq) under nitrogen atmosphere. The reaction mixture was stirred at 80° C. for 16 h (The reaction was performed by 2 batches in parallel). After the reaction mixture was cooled to room temperature, it was filtered and the filter cake was washed with ethyl acetate (100 mL). The filtrate was concentrated under vacuum. The residue was purified by automated flash chromatography column (petroleum ether/ethyl acetate=3/7) to afford tert-butyl ((R)-1-((1r,4R)-4-((2-phenyl-1-((2-(trim-ethylsilyl)ethoxy)methyl)-1H-pyrrolo[2,3-b]pyridin-4-yl)carbamoyl)cyclohexyl)ethyl)carbamate (16.0 g, 43.7 mmol, 52% yield) as a yellow solid. SFC: retention time=1.471 min. The title compound 11 (15.0 g) was purified by Chiral SFC (column: DAICEL CHIRALPAK AD-H (250 mm×30 mm, 5 μm); mobile phase: [0.1% $NH_3H_2O$ ETOH]; B %: 25%-25%, 5.0 min; 950 min) to give tert-butyl ((R)-1-((1r,4R)-4-((2-phenyl-1-((2-(trimethylsilyl)ethoxy)methyl)-1H-pyrrolo[2,3-b]pyridin-4-yl)carbamoyl)cyclohexyl)ethyl)carbamate (13.0 g, 20.4 mmol, 81% yield) as a white solid. $^1$H NMR (400 MHz, DMSO-$d_6$) δ=9.94 (s, 1H), 8.16 (d, J=5.6 Hz, 1H), 7.92 (d, J=5.6 Hz, 1H), 7.77 (d, J=7.2 Hz, 2H), 7.57-7.49 (m, 2H), 7.46 (d, J=7.4 Hz, 1H), 7.09 (s, 1H), 6.66 (d, J=8.8 Hz, 1H), 5.62 (s, 2H), 3.59 (t, J=8.0 Hz, 2H), 3.33-3.26 (m, 1H), 2.59-2.53 (m, 1H), 1.97-1.86 (m, 2H), 1.86-1.73 (m, 2H), 1.50-1.32 (m, 11H), 1.31-1.20 (m, 1H), 1.03-0.93 (m, 5H), 0.83 (t, J=8.0 Hz, 2H), −0.11 (s, 9H). LC-MS (ESI) m/z 593.4 [M+H]$^+$ HPLC: retention time=4.261 min. SFC: retention time=1.459 min.

A solution of tert-butyl ((R)-1-((1r,4R)-4-((2-phenyl-1-((2-(trimethylsilyl)ethoxy)methyl)-1H-pyrrolo-[2,3-b]pyridin-4-yl)carbamoyl)cyclohexyl)ethyl)carbamate (13.0 g, 21.9 mmol, 1.00 eq) in DCM (130 mL) and TFA (75 mL) was stirred at 20° C. After 2 h, the reaction mixture was concentrated under vacuum. The residue was dissolved in MeOH (130 mL) and $NH_3.H_2O$ (75 mL), and the mixture was stirred for 1 h at 20° C. The reaction mixture was concentrated under vacuum. The residue was purified by Prep-HPLC (column: Phenomenex luna C18 (250*70 mm, 10 μm); mobile phase: water (0.05% HCl)-ACN) and lyophilized to give (1R,4r)-4-((R)-1-aminoethyl)-N-(2-phenyl-1H-pyrrolo[2,3-b]pyridin-4-yl)cyclohexane-carboxamide (8.59 g, 21.3 mmol, 97% yield, 0.83 HCl salt) as a white solid. $^1$H NMR (400 MHz, DMSO-$d_6$) δ=12.83 (s, 1H), 10.49 (s, 1H), 8.19 (d, J=6.0 Hz, 1H), 8.05 (d, J=6.0 Hz, 1H), 8.00-7.85 (m, 5H), 7.58-7.47 (m, 3H), 7.44-7.35 (m, 1H), 3.13-3.00 (m, 1H), 2.79-2.68 (m, 1H), 2.06-1.95 (m, 2H), 1.91-1.78 (m, 2H), 1.59-1.37 (m, 3H), 1.22-1.05 (m, 5H). LC-MS (ESI) m/z 363.1 [M+H]$^+$ HPLC: retention time=1.699 min. SFC: retention time=3.457 min.

The independent synthesis thus also confirmed that of MSK-A170-PEAK1 was MSK-A170-(S), illustrated below.

MSK-A170-(S)
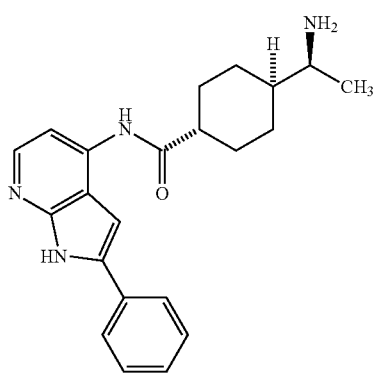
Example 7. Synthesis of MSK-A182 and MSK-A183
1. Structure of MSK-A182 and MSK-A183.
MSK-A182
MSK-A183
2. Synthetic Scheme of MSK-A182 and MSK-A183.
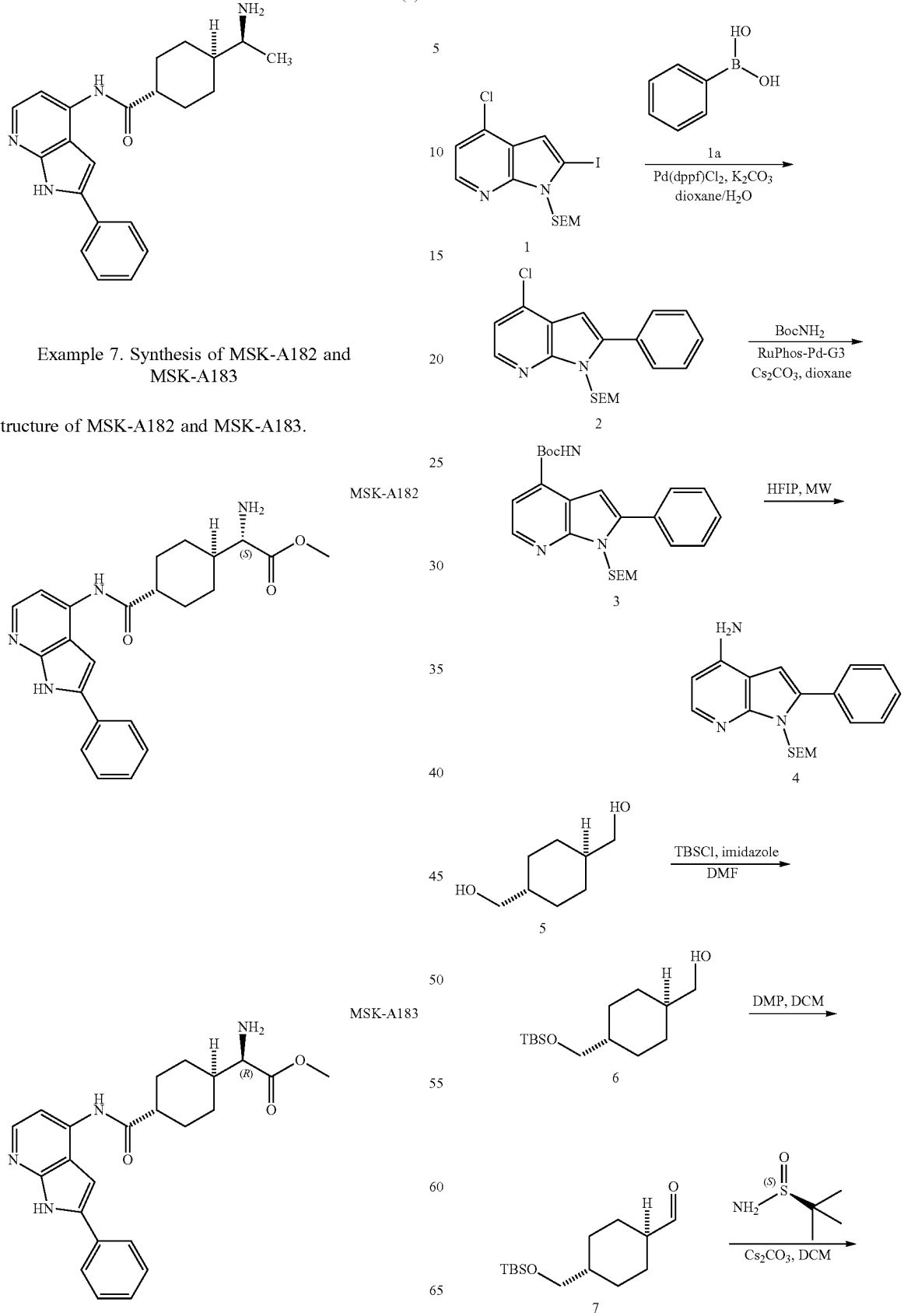

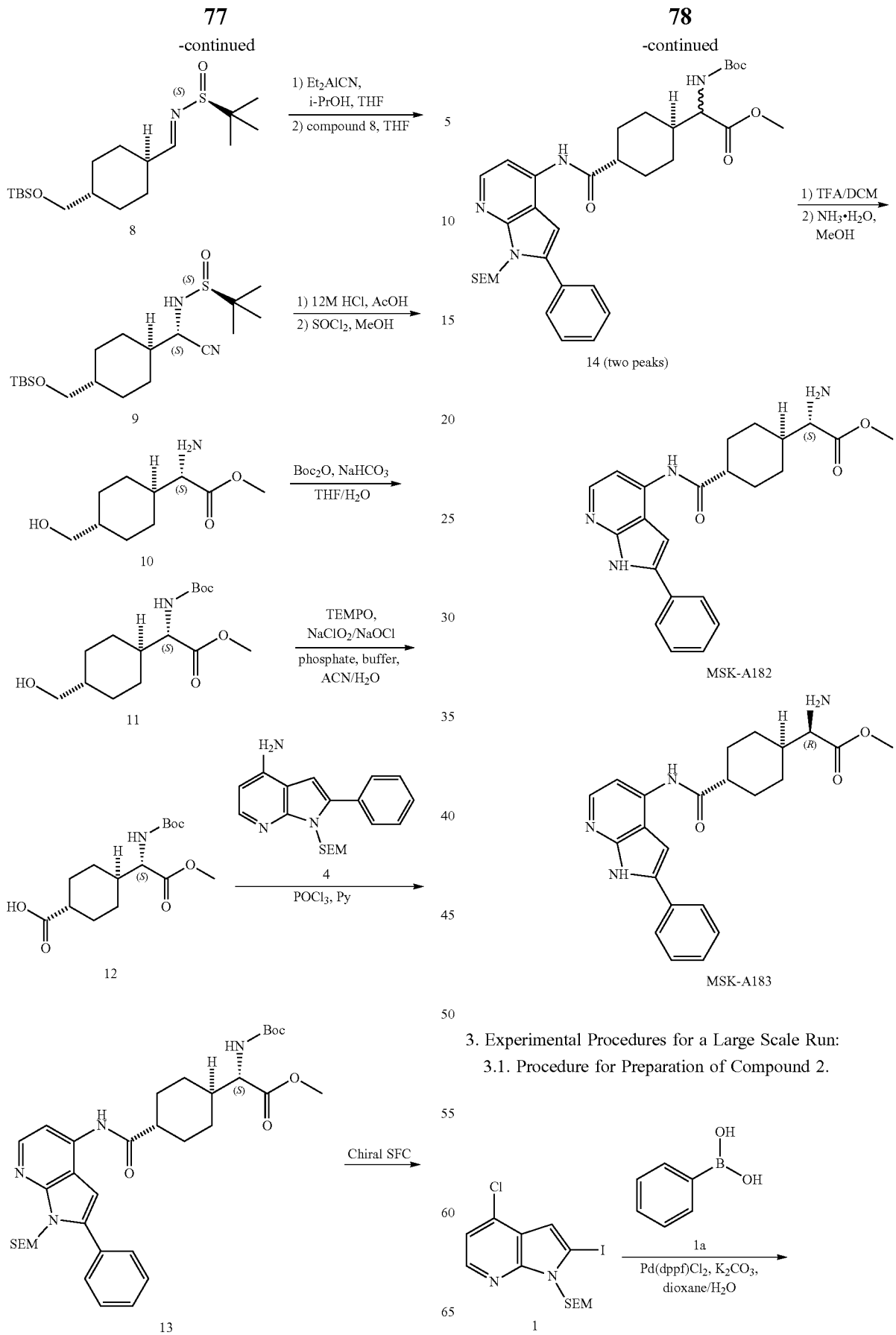
3. Experimental Procedures for a Large Scale Run:
3.1. Procedure for Preparation of Compound 2.

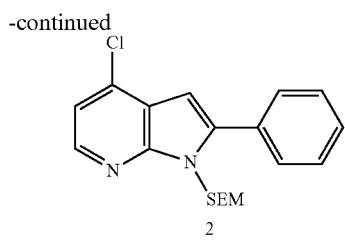

To a solution of 4-chloro-2-iodo-1-((2-(trimethylsilyl)ethoxy)methyl)-1H-pyrrolo[2,3-b]pyridine (500 mg, 1.22 mmol, 1.00 eq) and phenylboronic acid (179 mg, 1.47 mmol, 1.20 eq) in dioxane (12 mL) and water (3 mL) were added $Cs_2CO_3$ (1.20 g, 3.67 mmol, 3.00 eq) and $Pd(dppf)Cl_2$ (90.0 mg, 123 μmol, 0.10 eq) under $N_2$ atmosphere. The reaction mixture was stirred at 80° C. for 16 h. After the reaction mixture was cooled to room temperature, it was diluted with $H_2O$ (15 mL) and ethyl acetate (25 mL). The solution was filtered and layers were separated. The aqueous phase was extracted with ethyl acetate (25 mL). Combined extracts were washed with brine (20 mL), dried over $Na_2SO_4$, filtered and concentrated under vacuum. The residue was purified by column chromatography (TLC: Petroleum ether/Ethyl acetate=10/1, $R_f$=0.63; $SiO_2$, Petroleum ether/Ethyl acetate=I/O to 100/1) to afford 4-chloro-2-phenyl-1-((2-(trimethylsilyl)ethoxy) methyl)-1H-pyrrolo[2,3-b]pyridine (380 mg, 1.02 mmol, 83% yield) as a yellow oil. Synthesis of Compound 2 was confirmed by $^1$H NMR and LC-MS, which showed the following data:

$^1$H NMR (400 MHz, DMSO-$d_6$) δ=8.28 (d, J=5.2 Hz, 1H), 7.82 (dd, J=1.2, 8.0 Hz, 2H), 7.57-7.47 (m, 3H), 7.34 (d, J=5.2 Hz, 1H), 6.78 (s, 1H), 5.65 (s, 2H), 3.62-3.56 (m, 2H), 0.85-0.80 (m, 2H), −0.05--0.14 (m, 9H).

LC-MS (ESI) m/z 359.3/361.3 [M+H]$^+$.

3.2. Procedure for Preparation of Compound 3.

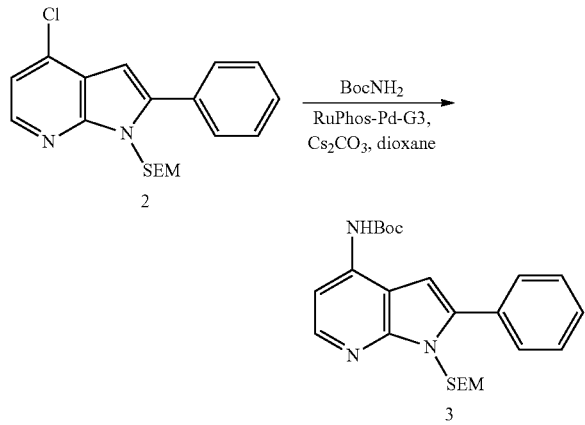

To a solution of 4-chloro-2-phenyl-1-((2-(trimethylsilyl)ethoxy)methyl)-1H-pyrrolo[2,3-b]pyridine (380 mg, 1.06 mmol, 1.00 eq) and $BocNH_2$ (149 mg, 1.27 mmol, 1.20 eq) in dioxane (15 mL) were added $Cs_2CO_3$ (1.03 g, 3.18 mmol, 3.00 eq) and RuPhos-Pd-G3 (89.0 mg, 106 μmol, 0.10 eq) under $N_2$ atmosphere. The reaction mixture was stirred at 80° C. for 16 h. After the reaction mixture was cooled to room temperature, it was diluted with $H_2O$ (15 mL). The mixture was extracted with ethyl acetate (2×25 mL). Combined extracts were washed with brine (20 mL), dried over $Na_2SO_4$, filtered and concentrated under vacuum. The residue was triturated in petroleum ether (10 mL) at 15° C. for 1 h to afford tert-butyl (2-phenyl-1-((2-(trimethylsilyl)ethoxy)methyl)-1H-pyrrolo[2,3-b]pyridin-4-yl)carbamate (310 mg, 698 μmol, 66% yield) as a white solid. Synthesis of Compound 3 was confirmed by $^1$H NMR and LC-MS, which showed the following data:

$^1$H NMR (400 MHz, DMSO-$d_6$) δ=9.76 (s, 1H), 8.14 (d, J=5.6 Hz, 1H), 7.77-7.71 (m, 2H), 7.68 (d, J=5.6 Hz, 1H), 7.56-7.49 (m, 2H), 7.46 (d, J=7.2 Hz, 1H), 7.15 (s, 1H), 5.60 (s, 2H), 3.63-3.55 (m, 2H), 1.53 (s, 9H), 0.87-0.80 (m, 2H), −0.07--0.13 (m, 9H).

LC-MS (ESI) m/z 440.4 [M+H]$^+$.

3.3. Procedure for Preparation of Compound 4.

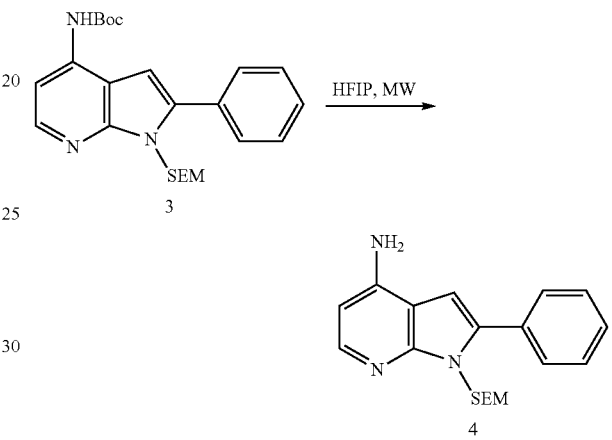

A solution of tert-butyl (2-phenyl-1-((2-(trimethylsilyl)ethoxy)methyl)-1H-pyrrolo[2,3-b]pyridin-4-yl) carbamate (310 mg, 705 μmol, 1.00 eq) in 1,1,1,3,3,3-hexafluoropropan-2-ol (7 mL) was stirred at 100° C. under microwave for 3 h. The reaction mixture was cooled to room temperature and concentrated under vacuum. The residue was purified by column chromatography (TLC: Petroleum ether/Ethyl acetate=2/1, $R_f$=0.24; $SiO_2$, Petroleum ether/Ethyl acetate=100/1, 20/1, 10/1, 5/1) to afford 2-phenyl-1-((2-(trimethyl-silyl)ethoxy)-methyl)-1H-pyrrolo[2,3-b]pyridin-4-amine (210 mg, 588 μmol, 83% yield) as a yellow solid. Synthesis of Compound 4 was confirmed by $^1$H NMR and LC-MS, which showed the following data:

$^1$H NMR (400 MHz, DMSO-$d_6$) δ=7.80 (d, J=5.6 Hz, 1H), 7.73-7.68 (m, 2H), 7.51-7.45 (m, 2H), 7.42-7.37 (m, 1H), 6.74 (s, 1H), 6.30 (s, 2H), 6.25 (d, J=5.6 Hz, 1H), 5.52 (s, 2H), 3.62-3.56 (m, 2H), 0.86-0.80 (m, 2H), −0.08--0.12 (m, 9H).

LC-MS (ESI) m/z 340.4 [M+H]$^+$.

3.4. Procedure for Preparation of Compound 6.

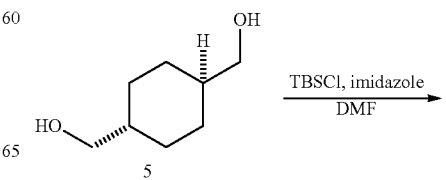

-continued

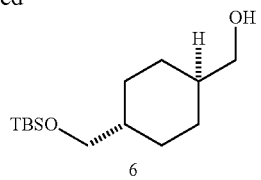

6

To a solution of (1r,4r)-cyclohexane-1,4-diyldimethanol (25.0 g, 173 mmol, 1.00 eq) in DMF (200 mL) was added imidazole (23.6 g, 347 mmol, 2.00 eq) and tert-butylchlorodimethylsilane (18.3 g, 121 mmol, 0.70 eq). The mixture was stirred at 25° C. for 16 h. Ethyl acetate (400 mL) and H₂O (300 mL) were added to the mixture and layers were separated. The organic layer was washed with H₂O (2×200 mL), brine (200 mL), dried over Na₂SO₄, filtered and concentrated under reduced pressure. The residue was purified by column chromatography (TLC: Petroleum ether/Ethyl acetate=5/1, $R_f$=0.17; SiO₂, Petroleum ether/Ethyl acetate=1/0, 100/1, 50/1, 5/1) to afford ((1r,4r)-4-(((tert-butyldimethylsilyl)oxy)methyl)cyclohexyl)methanol (17.0 g, 65.8 mmol, 37% yield) as a colorless oil. Synthesis of Compound 4 was confirmed by ¹H NMR, which showed the following data:

¹H NMR (400 MHz, DMSO-d₆) δ=4.31 (t, J=5.2 Hz, 1H), 3.38 (d, J=6.0 Hz, 2H), 3.19 (t, J=6.0 Hz, 2H), 1.77-1.68 (m, 4H), 1.40-1.21 (m, 2H), 0.90-0.80 (m, 13H), 0.05--0.03 (m, 6H).

3.5. Procedure for Preparation of Compound 7.

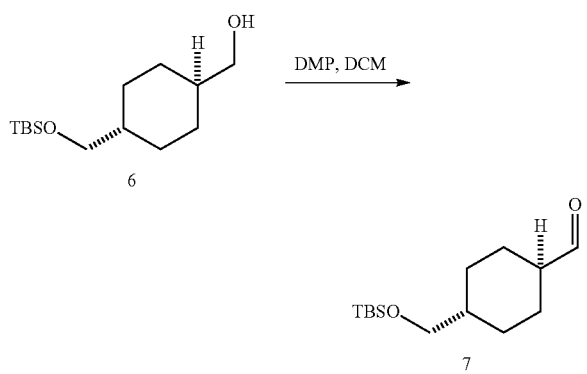

A mixture of ((1r,4r)-4-(((tert-butyldimethylsilyl)oxy)methyl)cyclohexyl)methanol (16.0 g, 61.9 mmol, 1.00 eq) and DMP (27.6 g, 65.0 mmol, 1.05 eq) in DCM (150 mL) was stirred at 15° C. for 2 h. Celite (15.0 g) was added to the reaction mixture. The suspension was filtered through a pad of celite and the filtrate was concentrated under vacuum. The residue was purified by column chromatography (TLC: Petroleum ether/Ethyl acetate=5/1, $R_f$=0.50; SiO₂, Petroleum ether/Ethyl acetate=1/0, 30/1) to afford (1r,4r)-4-(((tert-butyldimethylsilyl)oxy)methyl)cyclohexanecarbaldehyde (14.1 g, 55.0 mmol, 82% yield) as a colorless oil. Synthesis of Compound 7 was confirmed by ¹H NMR, which showed the following data:

¹H NMR (400 MHz, DMSO-d₆) δ=9.55 (d, J=1.2 Hz, 1H), 3.40 (d, J=6.4 Hz, 2H), 2.23-2.14 (m, 1H), 1.96-1.88 (m, 2H), 1.83-1.74 (m, 2H), 1.43-1.30 (m, 1H), 1.22-1.08 (m, 2H), 1.03-0.89 (m, 2H), 0.86 (s, 9H), 0.05--0.02 (m, 6H).

3.6. Procedure for Preparation of Compound 8.

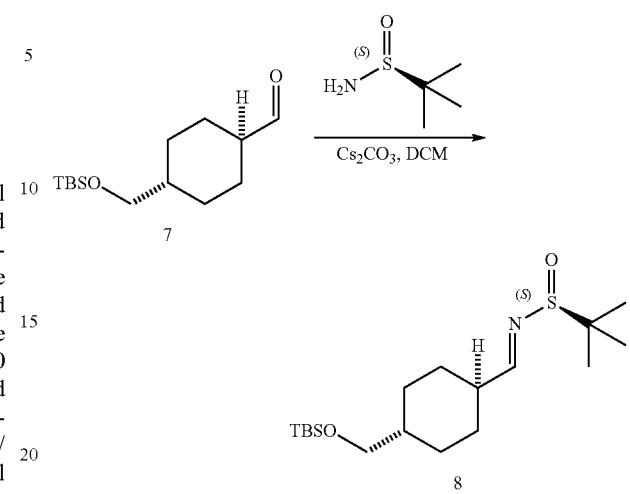

To a solution of (1r,4r)-4-(((tert-butyldimethylsilyl)oxy)methyl)cyclohexanecarbaldehyde (7.00 g, 27.3 mmol, 1.00 eq) and (S)-2-methylpropane-2-sulfinamide (3.97 g, 32.8 mmol, 1.20 eq) in DCM (100 mL) was added Cs₂CO₃ (26.7 g, 81.9 mmol, 3.00 eq). The reaction mixture was stirred at 25° C. for 16 h under N₂ atmosphere. The reaction mixture was filtered through a pad of celite. The filtrate was concentrated under vacuum. The residue was purified by column chromatography (SiO₂, Petroleum ether/Ethyl acetate=1/0, 50/1, 20/1) to afford (S)—N—((R)-1-((1r,4R)-4-(((tert-butyldimethylsilyl)oxy)methyl)cyclohexyl)-2,2,2-tri-fluoroethyl)-2-me-thylpropane-2-sulfinamide (8.86 g, 24.4 mmol, 89% yield) as a colorless oil. Synthesis of Compound 8 was confirmed by ¹H NMR and LC-MS, which showed the following data:

¹H NMR (400 MHz, DMSO-d₆) δ=7.86 (d, J=4.4 Hz, 1H), 3.40 (d, J=6.4 Hz, 2H), 2.45-2.34 (m, 1H), 1.97-1.85 (m, 2H), 1.84-1.74 (m, 2H), 1.47-1.34 (m, 1H), 1.31-1.16 (m, 2H), 1.09 (s, 9H), 1.06-0.93 (m, 2H), 0.86 (s, 9H), 0.02 (s, 6H).

LC-MS (ESI) m/z 360.3 [M+H]⁺.

3.7. Procedure for Preparation of Compound 9.

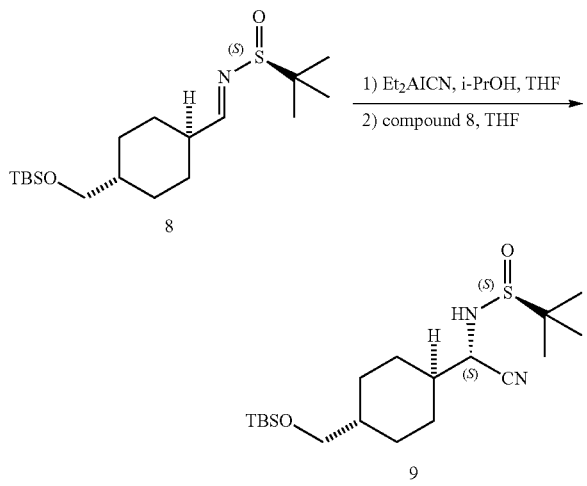

To a solution of cyanodiethylaluminum (1 M in toluene, 8.34 mL, 1.50 eq) in THF (15 mL) was added i-PrOH (1.00 g, 16.7 mmol, 3.00 eq) at dry ice-ethanol bath (−65° C.) under nitrogen atmosphere. The mixture was stirred for 15 min at 25° C. before transferring via a injection syringe to a dry ice-ethanol bath (−65° C.) cooled solution of (S,E)-N-(((1r,4S)-4-(((tert-butyldimethylsilyl)oxy)methyl)cyclohexyl)methyle)-2-methylpropane-2-sulfinamide (2.00 g, 5.56 mmol, 1.00 eq) in THF (35 mL). The reaction mixture was warmed to room temperature and stirred for 16 h under $N_2$ atmosphere. The reaction mixture was cooled down to −65° C. and quenched with aqueous solution of $NaHCO_3$ (30 mL, 10% purity). The suspension was filtered and the filtrate was extracted with ethyl acetate (2×50 mL). The combined organic phase was washed with brine (30 mL), dried over $Na_2SO_4$, filtered and evaporated under reduced pressure. The residue was purified by column chromatography (TLC: $SiO_2$, Petroleum ether:Ethyl acetate=2:1, $R_f$=0.24; Petroleum ether/Ethyl acetate=100/1, 20/1, 7/1, 5/1) to afford (S)—N—((S)-((1r,4S)-4-(((tert-butyldimethyl-silyl)oxy)methyl)cyclohexyl)(cyano)methyl)-2-methylpropane-2-sulfinamide (1.92 g, 4.92 mmol, 88% yield) as a colorless oil. Synthesis of Compound 9 was confirmed by $^1$H NMR, LC-MS, and SFC, which showed the following data:

$^1$H NMR (400 MHz, DMSO-$d_6$) δ=6.24 (d, J=9.6 Hz, 1H), 4.08 (dd, J=8.0, 9.6 Hz, 1H), 3.38 (d, J=6.0 Hz, 2H), 1.97-1.82 (m, 2H), 1.81-1.70 (m, 2H), 1.65-1.53 (m, 1H), 1.40-1.27 (m, 1H), 1.14 (s, 9H), 1.11-1.02 (m, 1H), 1.01-0.87 (m, 3H), 0.86 (s, 9H), 0.03-−0.01 (m, 6H).

LC-MS (ESI) m/z 387.4 [M+H]$^+$.

SFC: retention time=0.854 min.

3.8. Procedure for Preparation of Compound 10

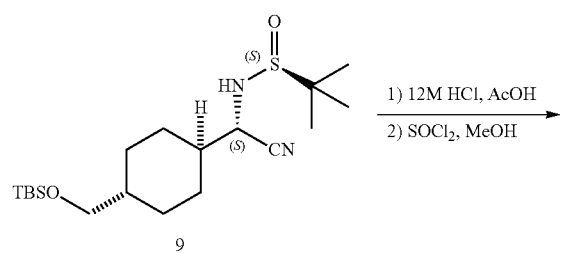

A mixture of (S)—N—((S)-((1r,4S)-4-(((tert-butyldimethylsilyl)oxy)methyl)cyclohexyl)(cyano)methyl)-2-methylpropane-2-sulfinamide (1.72 g, 4.40 mmol, 1.00 eq) in AcOH (2 mL) and HCl (12 M, 15 mL) was stirred at 120° C. for 16 h. The reaction mixture was concentrated under vacuum to afford a crude product (800 mg, crude, HCl salt). The crude product was dissolved in MeOH (20 mL), and $SOCl_2$ (1.02 g, 8.55 mmol, 2.39 eq) was added to the solution. The mixture was stirred at 80° C. for 3 h. After being cooled to room temperature, the reaction mixture was concentrated under vacuum to afford (S)-methyl 2-amino-2-((1r,4S)-4-(hydroxymethyl)cyclohexyl)acetate hydrochloride (1.17 g, crude) as a yellow solid which was used into the next step without further purification.

3.9. Procedure for Preparation of Compound 11.

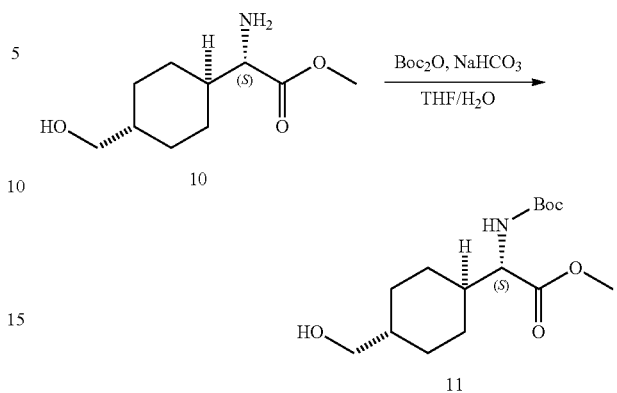

To a solution of (S)-methyl 2-amino-2-((1r,4S)-4-(hydroxymethyl)cyclohexyl)acetate hydrochloride (1.17 g, 4.92 mmol, 1.00 eq) in THF (12 mL) and sat. $NaHCO_3$ aqueous solution (12 mL) was added di-tert-butyl dicarbonate (1.52 g, 6.96 mmol, 1.42 eq). The reaction mixture was stirred at 15° C. for 16 h. The reaction mixture was diluted with $H_2O$ (30 mL) and extracted with ethyl acetate (2×40 mL). Combined extracts were washed with brine (30 mL), dried over $Na_2SO_4$, filtered and concentrated under vacuum. The residue was purified by column chromatography ($SiO_2$, Petroleum ether/Ethyl acetate=100/1, 10/1, 4/1, 3/1, 2/1) to afford (S)-methyl 2-((tert-butoxycarbonyl)amino)-2-((1r,4S)-4-(hydroxymethyl)cyclohexyl)acetate (670 mg, 2.11 mmol, 43% yield) as a yellow oil. Synthesis of Compound 11 was confirmed by $^1$H NMR, LC-MS, and SFC, which showed the following data:

$^1$H NMR (400 MHz, DMSO-$d_6$) δ=7.15 (d, J=8.0 Hz, 1H), 4.32 (t, J=5.2 Hz, 1H), 3.88-3.78 (m, 1H), 3.61 (s, 3H), 3.20-3.14 (m, 2H), 1.76-1.66 (m, 2H), 1.66-1.48 (m, 3H), 1.41-1.30 (m, 9H), 1.30-1.20 (m, 1H), 1.13-0.95 (m, 2H), 0.89-0.73 (m, 2H).

LC-MS (ESI) m/z 202.2 [M−100+H]$^+$.

SFC: retention time=0.912 min.

3.10. Procedure for Preparation of Compound 12.

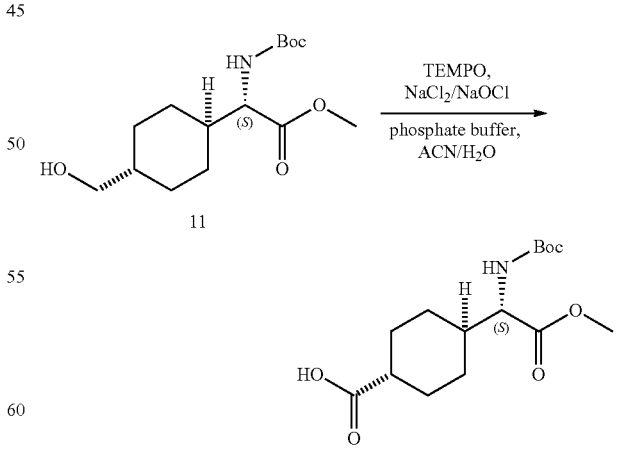

To a solution of methyl (S)-methyl 2-((tert-butoxycarbonyl)amino)-2-((1r,4S)-4-(hydroxymethyl)cyclohexyl)acetate (670 mg, 2.11 mmol, 1.00 eq) in ACN (6 mL) were added phosphate buffer (pH=~6.5, 4 mL) and TEMPO (20.0 mg, 127 μmol, 0.06 eq) at 15° C. After the mixture was heated to 35° C., sodium chlorite (191 mg, 2.11 mmol, 15% purity in $H_2O$, 1.00 eq) and NaClO (1.05 g, 422 μmol, 3% purity in $H_2O$, 0.20 eq) were added. The pH of the reaction solution was keep at ~6.5. The mixture was stirred at 35° C. for 4 h. After cooling to room temperature, the reaction mixture was concentrated under vacuum to remove ACN. The residue was adjusted to pH~11 by 5 M NaOH solution. The mixture was washed with ethyl acetate (20 mL). The aqueous phase was adjusted to pH=~5 by 1 M HCl solution and extracted with ethyl acetate (2×30 mL). Combined extracts were washed with brine (20 mL), dried over $Na_2SO_4$, filtered and concentrated under vacuum to afford (1S,4r)-4-((S)-1-((tert-butoxycarbonyl)amino)-2-methoxy-2-oxoethyl)-cyclohexanecarboxylic acid (330 mg, 1.04 mmol, 49% yield) as a colorless oil. Synthesis of Compound 12 was confirmed by $^1$H NMR, LC-MS, and SFC, which showed the following data:

$^1$H NMR (400 MHz, DMSO-$d_6$) δ=12.00 (s, 1H), 7.16 (br d, J=8.0 Hz, 1H), 3.84 (t, J=7.2 Hz, 1H), 3.62 (s, 3H), 2.14-2.03 (m, 1H), 1.94-1.83 (m, 2H), 1.69-1.50 (m, 3H), 1.37 (s, 9H), 1.28-0.99 (m, 4H)

LC-MS (ESI) m/z 216.1 [M−100+H]$^+$.

3.11. Procedure for Preparation of Compound 13 extracted with ethyl acetate (2×30 mL). Combined extracts were washed with brine (20 mL), dried over $Na_2SO_4$, filtered and concentrated under vacuum. The residue was purified by Prep-HPLC (column: Waters Xbridge C18 150*50 mm*10 μm; water (0.05% ammonia hydroxide)-ACN) to afford (S)-methyl 2-((tert-butoxycarbonyl)amino)-2-((1r,4S)-4-((2-phenyl-1-((2-(trimethylsilyl)ethoxy)methyl)-1H-pyrrolo[2,3-b]pyridin-4-yl)carbamoyl)cyclohexyl)acetate (200 mg, 311 μmol, 56% yield) as a white solid. Synthesis of Compound 13 was confirmed by $^1$H NMR, LC-MS, and SFC, which showed the following data:

$^1$H NMR (400 MHz, DMSO-$d_6$) δ=9.97 (s, 1H), 8.17 (d, J=5.6 Hz, 1H), 7.91 (d, J=5.6 Hz, 1H), 7.77 (d, J=7.2 Hz, 2H), 7.58-7.50 (m, 2H), 7.49-7.42 (m, 1H), 7.29 (d, J=8.0 Hz, 1H), 7.08 (s, 1H), 5.62 (s, 2H), 3.90 (t, J=7.2 Hz, 1H), 3.64 (s, 3H), 3.59 (t, J=8.0 Hz, 2H), 2.61-2.54 (m, 1H), 1.96-1.86 (m, 2H), 1.80-1.60 (m, 3H), 1.51-1.29 (m, 11H), 1.26-1.03 (m, 2H), 0.88-0.78 (m, 2H), −0.11 (s, 9H).

LC-MS (ESI) m/z 637.6 [M+H]$^+$.

SFC: retention of peak 1=1.445 min; retention time of peak 2=2.010 min.

3.12. Procedure for Preparation of Compound 14.

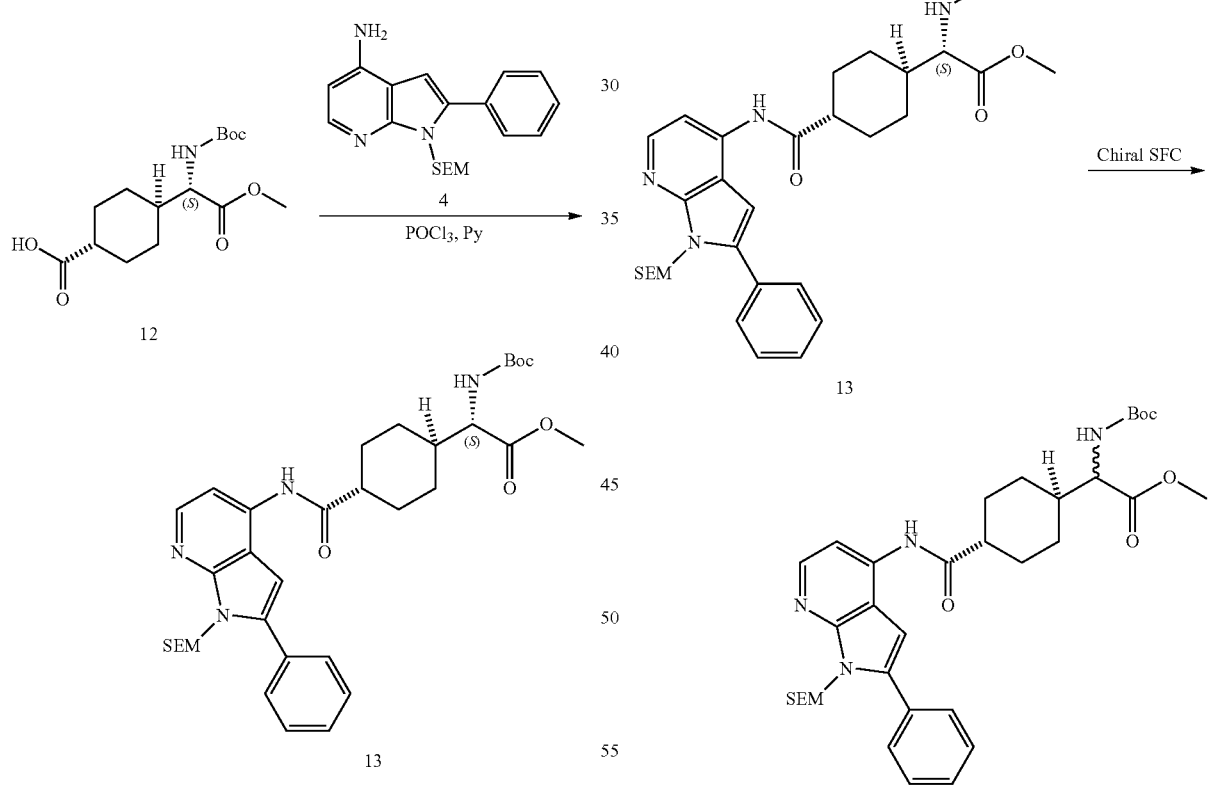

To a solution of 2-phenyl-1-((2-(trimethylsilyl)ethoxy)methyl)-1H-pyrrolo[2,3-b]pyridin-4-amine (190 mg, 560 μmol, 1.00 eq) and (1S,4r)-4-((S)-1-((tert-butoxycarbonyl)amino)-2-methoxy-2-oxoethyl)cyclohexane-carboxylic acid (230 mg, 729 μmol, 1.30 eq) in pyridine (10 mL) was added $POCl_3$ (264 mg, 1.72 mmol, 3.08 eq) under $N_2$ atmosphere at 0° C. The reaction mixture was stirred at 15° C. for 2 h. The reaction mixture was quenched with saturated solution of $NH_4Cl$ (5 mL) and diluted with $H_2O$ (20 mL). The pH was adjusted to ~7 with $NaHCO_3$ solid. The mixture was Compound 13 was separated by SFC (column: column: DAICEL CHIRALPAK AD (250 mm*30 mm, 10 μm); mobile phase:[0.1% $NH_3H_2O$ in ethanol]; B %:45%-45%, 2.6 min; 50 min) to give two peaks with different retention time.

Peak 1 (SFC: Rt=1.433 min): (R)-methyl 2-((tert-butoxycarbonyl)amino)-2-((1r,4R)-4-((2-phenyl-1-((2-(trimethylsilyl)ethoxy)methyl)-1H-pyrrolo[2,3-b]pyridin-4-yl)carbamoyl)cyclohexyl)acetate (20.0 mg, 31.1 μmol, 10% yield) was purified as a yellow solid. Synthesis of Compound 14 Peak 1 was confirmed by LC-MS, which showed the following data:

LC-MS (ESI) m/z 637.6 [M+H]$^+$.

Peak 2 (SFC: Rt=2.015 min): (S)-methyl 2-((tert-butoxycarbonyl)amino)-2-((1r,4S)-4-((2-phenyl-1-((2-(trimethylsilyl)ethoxy)methyl)-1H-pyrrolo[2,3-b]pyridin-4-yl)carbamoyl)cyclohexyl)acetate (160 mg, 249 μmol, 79% yield) was purified as a yellow solid. Synthesis of Compound 14 Peak 2 was confirmed by LC-MS, which showed the following data:

LC-MS (ESI) m/z 637.6 [M+H]$^+$ 3.13. Procedure for Preparation of MSK-A182 and MSK-A183

MSK-A182: (S)-methyl 2-amino-2-((1r,4S)-4-((2-phenyl-1H-pyrrolo[2,3-b]pyridin-4-yl)carbamoyl)cyclo-hexyl)acetate (75.3 mg) was obtained as a yellow solid.

$^1$H NMR (400 MHz, DMSO-d$_6$) δ=13.41 (br s, 1H), 10.92 (br s, 1H), 8.64 (d, J=2.4 Hz, 3H), 8.32-8.15 (m, 2H), 7.94 (d, J=7.2 Hz, 2H), 7.80 (s, 1H), 7.54 (t, J=7.6 Hz, 2H), 7.48-7.39 (m, 1H), 3.98-3.90 (m, 1H), 3.78 (s, 3H), 2.93-2.77 (m, 1H), 2.08-1.98 (m, 2H), 1.96-1.75 (m, 3H), 1.51-1.29 (m, 3H), 1.24-1.09 (m, 1H).

LC-MS (ESI) m/z 407.0 [M+H]$^+$

SFC: retention time=1.936 min

MSK-A183: (R)-methyl 2-amino-2-((1r,4R)-4-((2-phenyl-1H-pyrrolo[2,3-b]pyridin-4-yl)carbamoyl)cyclo-hexyl)acetate (9.7 mg) was obtained as a white solid. Synthesis of

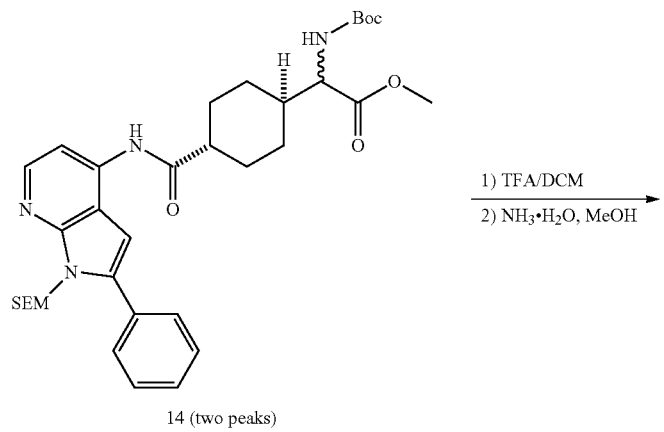

14 (two peaks)

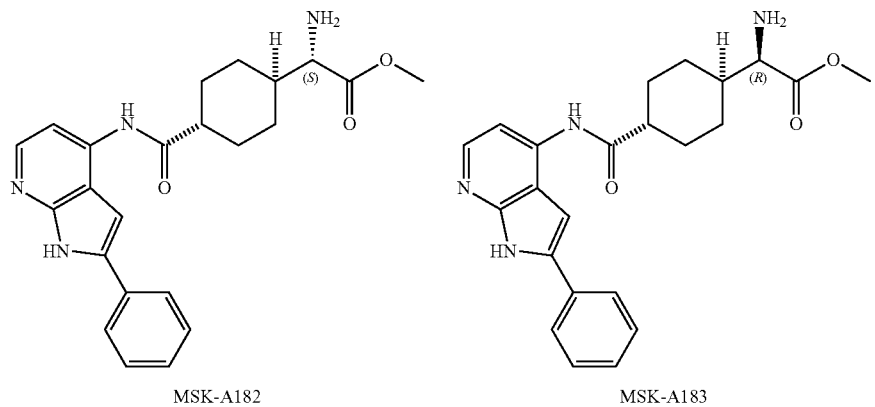

MSK-A182   MSK-A183

A solution of (S)-methyl 2-((tert-butoxycarbonyl)amino)-2-((1r,4S)-4-((2-phenyl-1-((2-(trimethylsilyl)ethoxy)methyl)-1H-pyrrolo[2,3-b]pyridin-4-yl)carbamoyl)cyclohexyl)acetate (150 mg, 236 μmol, 1.00 eq) in DCM (8 mL) and TFA (4 mL) was stirred at 15° C. for 2 h. The reaction mixture was concentrated under vacuum. The residue was dissolved in MeOH (8 mL) and NH$_3$.H$_2$O (4 mL), and the mixture was stirred at 15° C. for 1 h. The reaction mixture was concentrated under vacuum. The residue was purified by Prep-HPLC (column: Phenomenex Synergi C18 150*25*10 μm; water (0.05% HCl)-ACN) and lyophilized to afford the title compounds.

MSK-A183 was confirmed by $^1$H NMR, LC-MS, and SFC, which showed the following data:

$^1$H NMR (400 MHz, METHANOL-d$_4$) δ=8.45 (dd, J=2.4, 6.8 Hz, 1H), 8.24-8.17 (m, 1H), 7.88 (d, J=7.2 Hz, 2H), 7.64 (d, J=1.6 Hz, 1H), 7.57-7.49 (m, 2H), 7.49-7.42 (m, 1H), 4.02-3.97 (m, 1H), 3.90-3.88 (m, 2H), 3.88-3.86 (m, 1H), 2.91-2.80 (m, 1H), 2.21-2.11 (m, 2H), 2.09-1.92 (m, 2H), 1.92-1.83 (m, 1H), 1.72-1.59 (m, 2H), 1.57-1.44 (m, 1H), 1.40-1.27 (m, 1H).

LC-MS (ESI) m/z 407.0 [M+H]$^+$.

SFC: retention time=1.659 min.

These results indicate that MSK-A182 and MSK-A183 may be synthesized using the process disclosed herein.

Example 8. Synthesis of MSK-A176-Peak1 and MSK-A176-Peak2
1. Structure of MSK-A176-Peak1 and MSK-A176-Peak2.
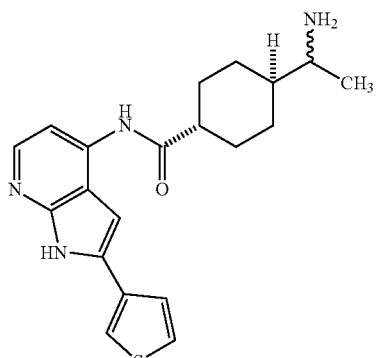
MSK-A176-peak1
MSK-A176-peak2
Synthesis of Compound 14 Peak 1 was confirmed by LC-MS, which showed the following data:
2. Synthetic Scheme of MSK-A176-Peak1 and MSK-A176-Peak2.
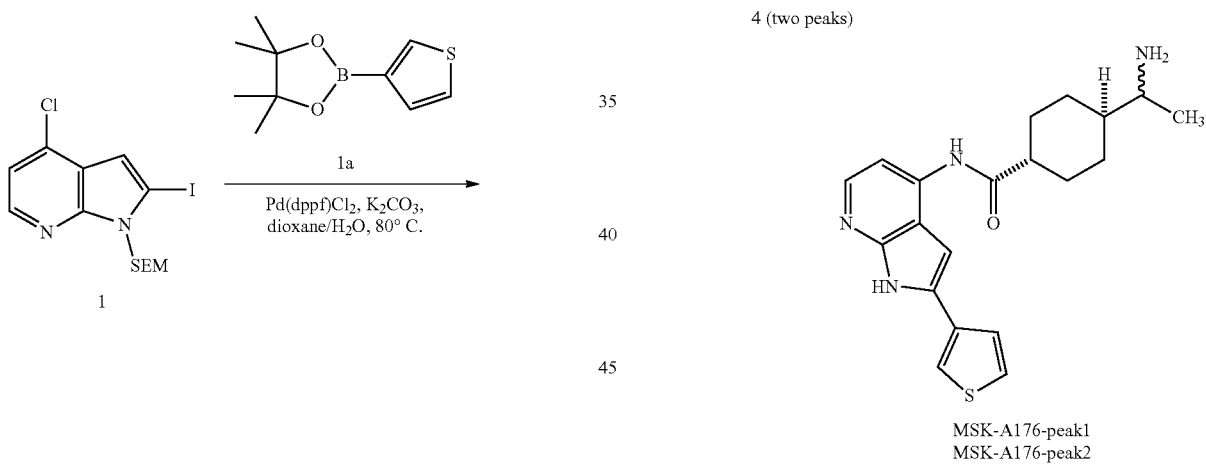
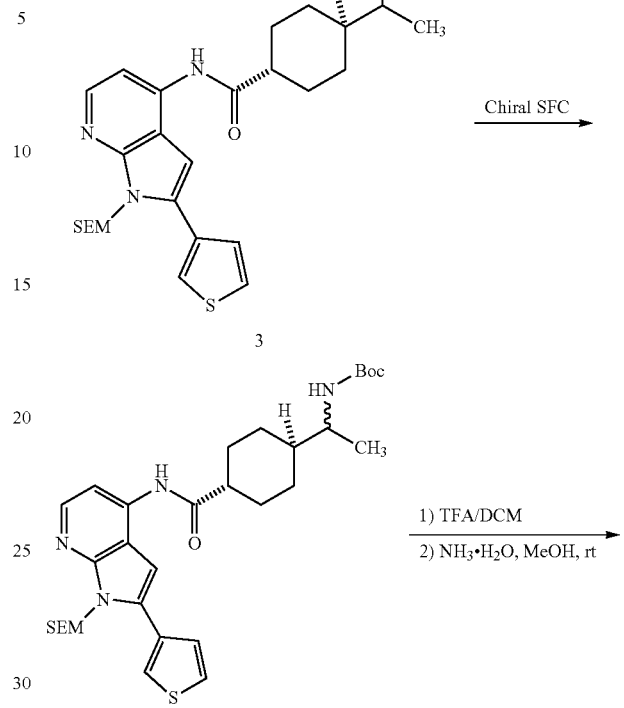
3. Experimental Procedures for a Large Scale Run:
3.1. Procedure for Preparation of Compound 2
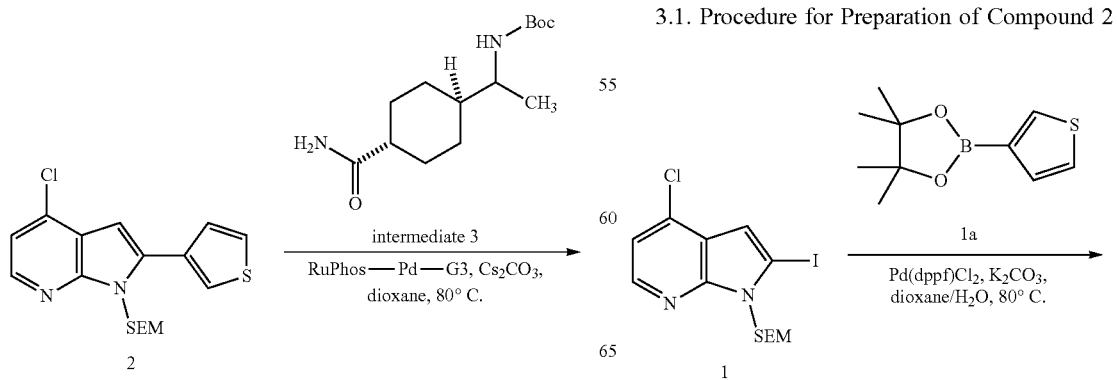

-continued

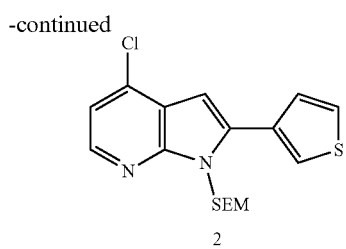

2

To a solution of 4-chloro-2-iodo-1-((2-(trimethylsilyl)ethoxy)methyl)-1H-pyrrolo[2,3-b]pyridine (400 mg, 979 μmol, 1.00 eq) and 4,4,5,5-tetramethyl-2-(thiophen-3-yl)-1,3,2-dioxaborolane (226 mg, 1.08 mmol, 1.10 eq) in dioxane (12 mL) and water (3 mL) were added Cs$_2$CO$_3$ (956 mg, 2.93 mmol, 3.00 eq) and Pd(dppf)Cl$_2$ (72.0 mg, 98.4 μmol, 0.10 eq). After stirring at 80° C. for 16 h under nitrogen atmosphere, the palladium catalyst was removed by thiourea resin. Then the mixture was filtered and the filtrate was concentrated under vacuum. The residue was purified by Prep-HPLC (column: Phenomenex Synergi Max-RP 250*50 mm*10 μm; water (0.1% TFA)-ACN) to afford 4-chloro-2-(thiophen-3-yl)-1-((2-(trimethylsilyl) ethoxy)methyl)-1H-pyrrolo[2,3-b]pyridine (180 mg, 488 μmol, 50% yield) as a yellow solid. Synthesis of Compound 2 was confirmed by LC-MS, which showed the following data:

LC-MS (ESI) m/z 365.1/367.1 [M+H]$^+$.

3.2. Procedure for Preparation of Compound 3.

Synthesis of Compound 14 Peak 1 was confirmed by LC-MS, which showed the following data:

To a solution of 4-chloro-2-(thiophen-3-yl)-1-((2-(trimethylsilyl)ethoxy)methyl)-1H-pyrrolo[2,3-b]pyridine (320 mg, 868 μmol, 1.00 eq) and tert-butyl (1-((1r,4r)-4-carbamoylcyclohexyl)ethyl)carbamate (236 mg, 873 μmol, 1.01 eq) in dioxane (15 mL) were added Cs$_2$CO$_3$ (849 mg, 2.61 mmol, 3.00 eq) and RuPhos-Pd-G3 (73.0 mg, 87.3 μmol, 0.10 eq) under N$_2$ atmosphere. The reaction mixture was stirred at 80° C. for 16 h N$_2$ atmosphere. After being cooled to room temperature, thiourea resin (100 mg) was added to the mixture and stirred at room temperature for 4 h. The solution was filtered and the filtrate was concentrated under vacuum. The residue was purified by Prep-HPLC (column: Phenomenex Synergi Max-RP 250*50 mm*10 μm; water (0.1% TFA)-ACN) to afford tert-butyl (1-((1r,4r)-4-((2-(thiophen-3-yl)-1-((2-(trimethylsilyl)ethoxy)methyl)-1H-pyrrolo[2,3-b]pyridin-4-yl)carbamoyl)cyclohexyl)ethyl)carbamate (300 mg, 496 μmol, 57% yield) as a white solid. Synthesis of Compound 3 was confirmed by $^1$H NMR, LC-MS, and SFC, a which showed the following data:

$^1$H NMR (400 MHz, DMSO-d$_6$) δ=9.94 (s, 1H), 8.15 (d, J=5.2 Hz, 1H), 7.94 (dd, J=1.2, 2.8 Hz, 1H), 7.90 (d, J=5.6 Hz, 1H), 7.75 (dd, J=2.8, 5.2 Hz, 1H), 7.53 (dd, J=1.2, 5.2 Hz, 1H), 7.13 (s, 1H), 6.67 (br d, J=9.6 Hz, 1H), 5.71 (s, 2H), 3.64-3.57 (m, 2H), 3.31-3.28 (m, 1H), 1.96-1.87 (m, 2H), 1.86-1.75 (m, 2H), 1.39 (s, 11H), 1.23 (br s, 1H), 1.05-0.97 (m, 5H), 0.90-0.83 (m, 2H), −0.09−−0.13 (m, 9H).

LC-MS (ESI) m/z 599.4 [M+H]$^+$

SFC: retention time of peak 1=1.332 min; retention time of peak 2=1.462 min.

3.3. Procedure for Preparation of Compound 4

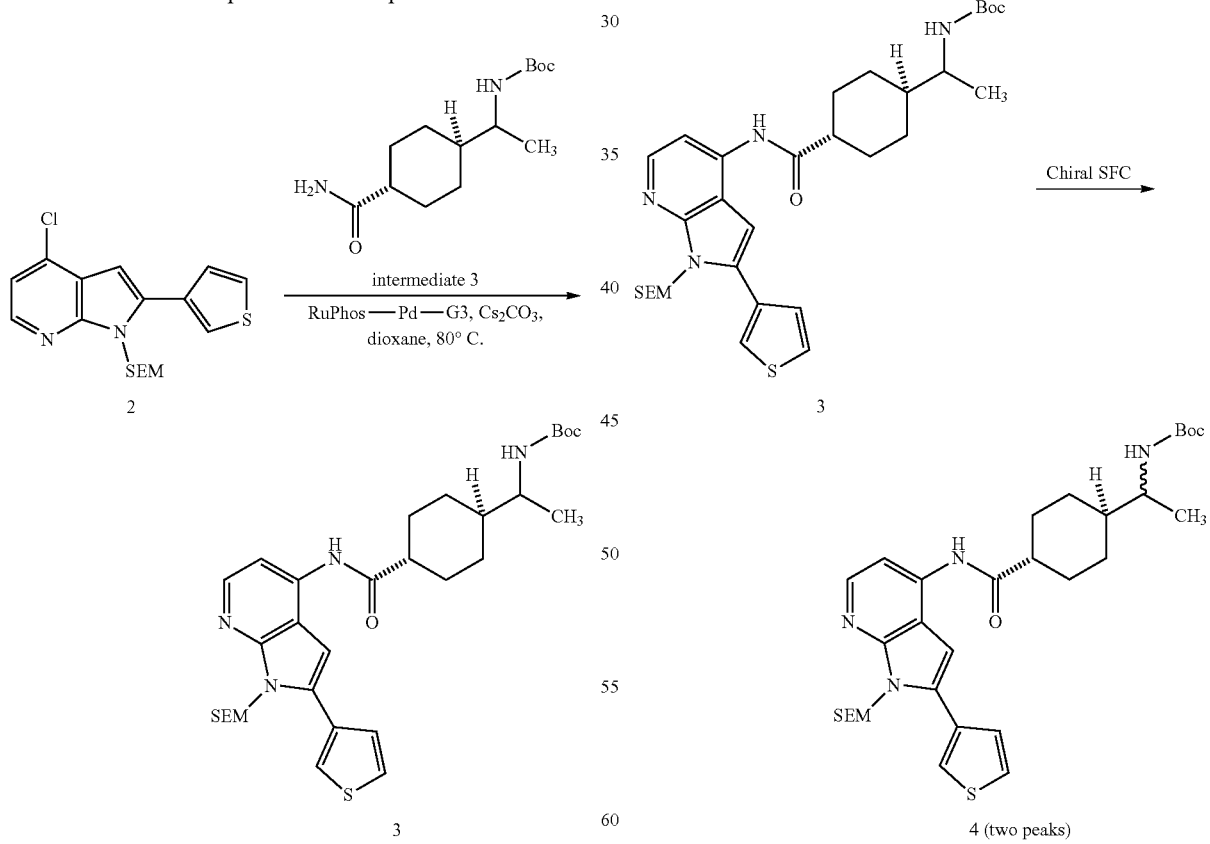

4 (two peaks)

Compound 3 (300 mg, 501 μmol, 1.00 eq) was purified by Chiral SFC (column: DAICEL CHIRALPAK AD (250 mm*30 mm, 10 μm); mobile phase:[0.1% NH$_3$H$_2$O in ethanol]; B %:25%-25%, 2.1 min; 70 min) to give two fractions with different retention time:

Fraction 1 (peak 1): tert-butyl (1-((1r,4r)-4-((2-(thiophen-3-yl)-1-((2-(trimethylsilyl)ethoxy)methyl)-1H-pyrrolo[2,3-b]pyridin-4-yl)carbamoyl)cyclohexyl)ethyl)carbamate (120 mg, 198 μmol, 40% yield) was obtained as a white solid. Synthesis of Compound 4 (Fraction 1 (peak 1)) was confirmed by LC-MS, which showed the following data:

$^1$H NMR (400 MHz, DMSO-d$_6$) δ=9.93 (s, 1H), 8.14 (d, J=5.6 Hz, 1H), 7.93 (dd, J=1.2, 2.8 Hz, 1H), 7.90 (d, J=5.6 Hz, 1H), 7.75 (dd, J=2.8, 5.2 Hz, 1H), 7.53 (dd, J=1.2, 5.2 Hz, 1H), 7.13 (s, 1H), 6.67 (d, J=8.8 Hz, 1H), 5.71 (s, 2H), 3.64-3.57 (m, 2H), 1.96-1.87 (m, 2H), 1.86-1.75 (m, 2H), 1.42-1.36 (m, 11H), 1.31-1.21 (m, 1H), 1.05-0.96 (m, 5H), 0.90-0.83 (m, 2H), −0.10−−0.12 (m, 9H).

LC-MS (ESI) m/z 599.4 [M+H]$^+$.

SFC: retention time=1.345 min.

Fraction 2 (peak 2): tert-butyl (1-((1r,4r)-4-((2-(thiophen-3-yl)-1-((2-(trimethylsilyl)ethoxy)methyl)-1H-pyr-rolo[2,3-b]pyridin-4-yl)carbamoyl)cyclohexyl)ethyl)carbamate (150 mg, 248 μmol, 50% yield) was obtained as a white solid. Synthesis of Compound 4 (Fraction 2 (peak 2)) was confirmed by LC-MS, which showed the following data:

$^1$H NMR (400 MHz, DMSO-d$_6$) δ=9.94 (s, 1H), 8.14 (d, J=5.6 Hz, 1H), 7.93 (dd, J=1.2, 2.8 Hz, 1H), 7.90 (d, J=5.6 Hz, 1H), 7.75 (dd, J=2.8, 5.2 Hz, 1H), 7.53 (dd, J=1.2, 5.2 Hz, 1H), 7.13 (s, 1H), 6.67 (d, J=8.8 Hz, 1H), 5.71 (s, 2H), 3.63-3.59 (m, 2H), 1.96-1.87 (m, 2H), 1.86-1.75 (m, 2H), 1.42-1.36 (m, 11H), 1.31-1.21 (m, 1H), 1.05-0.96 (m, 5H), 0.90-0.83 (m, 2H), −0.10−−0.12 (m, 9H).

LC-MS (ESI) m/z 599.4 [M+H]$^+$.

SFC: retention time=1.466 min.

3.4. Procedure for Preparation of MSK-A176-Peak1 and MSK-A176-Peak2.

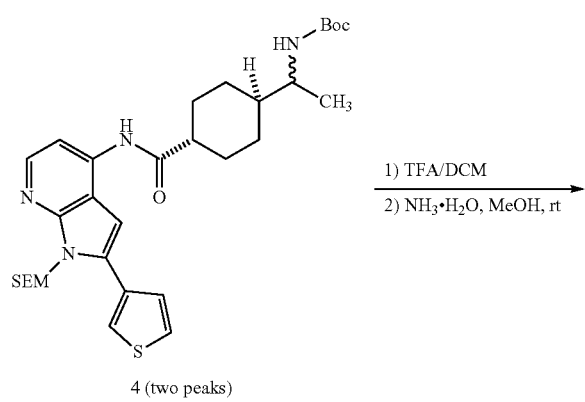

4 (two peaks)

MSK-A176-peak1
MSK-A176-peak2

A solution of tert-butyl (1-((1r,4r)-4-((2-(thiophen-3-yl)-1-((2-(trimethylsilyl)ethoxy)methyl)-1H-pyrrolo [2,3-b] pyridin-4-yl)carbamoyl)cyclohexyl)ethyl)carbamate (120 mg, 200 μmol, 1.00 eq) in DCM (4 mL) and TFA (2 mL) was stirred at 20° C. After 1 h, the reaction mixture was concentrated under vacuum. The residue was dissolved in MeOH (4 mL) and NH$_3$.H$_2$O (2 mL). The mixture was stirred at 20° C. for 1 h. The reaction mixture was concentrated under vacuum. The residue was purified by Prep-HPLC (column: Phenomenex Synergi C18 150*25*10 μm; water (0.05% HCl)-ACN) and lyophilized to afford (1r,4r)-4-(1-aminoethyl)-N-(2-(thiophen-3-yl)-1H-pyrrolo[2,3-b] pyridin-4-yl)cyclohexanecarboxamide as a yellow solid.

Synthesis of MSK-A176-peak1 (21.7 mg, 47.3 μmol, 24% yield, 2HCl salt) was confirmed by $^1$H NMR, LC-MS, and SFC, which showed the following data:

$^1$H NMR (400 MHz, DMSO-d$_6$) δ=13.47 (br s, 1H), 10.88 (s, 1H), 8.21 (br s, 3H), 8.06 (br s, 3H), 7.74 (br s, 1H), 7.61 (br s, 2H), 3.13-2.96 (m, 1H), 2.89-2.74 (m, 1H), 2.10-1.92 (m, 2H), 1.91-1.77 (m, 2H), 1.62-1.31 (m, 3H), 1.24-1.05 (m, 5H).

LC-MS (ESI) m/z 369.2 [M+H]$^+$

SFC: retention time=1.666 min.

Synthesis of MSK-A176-peak2 (53.1 mg, 116 μmol, 46% yield, 2HCl) was confirmed by $^1$H NMR, LC-MS, and SFC, which showed the following data:

$^1$H NMR (400 MHz, DMSO-d$_6$) δ=13.21 (br s, 1H), 10.70 (s, 1H), 8.26-8.11 (m, 3H), 7.98 (br s, 3H), 7.74 (br dd, J=2.8, 4.4 Hz, 1H), 7.60 (d, J=4.4 Hz, 1H), 7.49 (br s, 1H), 3.10-3.03 (m, 1H), 2.79-2.72 (m, 1H), 2.07-1.95 m, 2H), 1.91-1.78 (m, 2H), 1.60-1.36 (m, 3H), 1.22-1.05 (m, 5H).

LC-MS (ESI) m/z 369.2 [M+H]$^+$.

SFC: retention time=1.796 min.

Example 9. Synthesis of MSK-A184_Peak 1 and MSK-A184_Peak 2

1. Structure of MSK-A184_Peak 1 and MSK-A184_Peak 2

MSK-A184_peak 1
MSK-A184_peak 2

2. Synthetic Scheme of MSK-A184_Peak 1 and MSK-A184_Peak 2

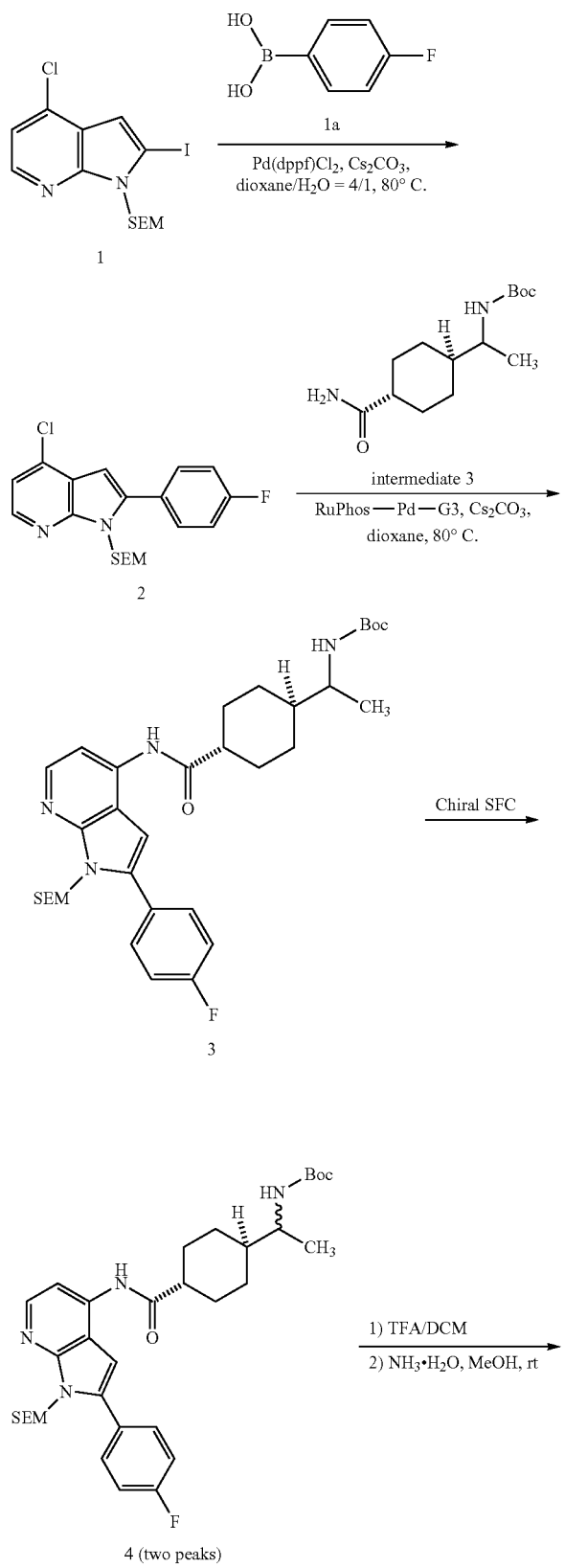

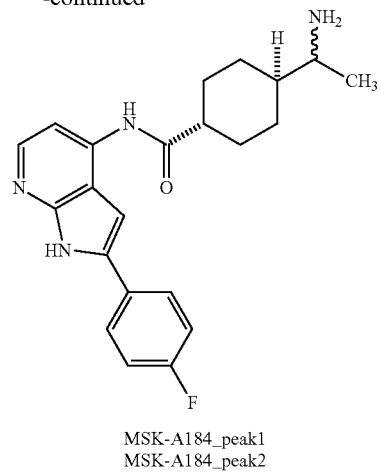

MSK-A184_peak1
MSK-A184_peak2

3. Experimental Procedures for a Large Scale Run:
3.1. Procedure for Preparation of Compound 2.

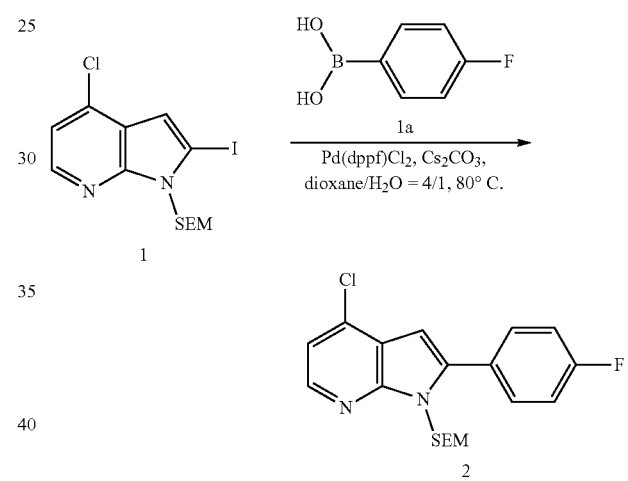

To a solution of 4-chloro-2-iodo-1-((2-(trimethylsilyl)ethoxy)methyl)-1H-pyrrolo[2,3-b]pyridine (500 mg, 1.22 mmol, 1.00 eq) and (4-fluorophenyl)boronic acid (188 mg, 1.34 mmol, 1.10 eq) in water (4 mL) and dioxane (16 mL) were added $Cs_2CO_3$ (1.19 g, 3.66 mmol, 3.00 eq) and $Pd(dppf)Cl_2$ (89.0 mg, 122 µmol, 0.10 eq) under $N_2$ atmosphere. After stirring at 80° C. for 16 h, the reaction mixture was cooled to room temperature and diluted with $H_2O$ (20 mL) and ethyl acetate (20 mL). The solution was filtered and layers were separated. The organic layer was washed with brine (20 mL), dried over anhydrous $Na_2SO_4$, filtered and concentrated under vacuum. The residue was purified by Prep-HPLC (column: Phenomenex luna C18 150*40 mm*15 µm; water (0.1% TFA)-ACN) to afford 4-chloro-2-(4-fluorophenyl)-1-((2-(trimethylsilyl) ethoxy)methyl)-1H-pyrrolo[2,3-b]pyridine (310 mg, 781 µmol, 64% yield) as a yellow oil. Synthesis of Compound 2 was confirmed by $^1H$ NMR and LC-MS, which showed the following data:

$^1H$ NMR (400 MHz, DMSO-$d_6$) δ=8.28 (d, J=5.2 Hz, 1H), 7.91-7.82 (m, 2H), 7.44-7.31 (m, 3H), 6.78 (s, 1H), 5.64 (s, 2H), 3.63-3.54 (m, 2H), 0.85-0.79 (m, 2H), −0.08-−0.13 (m, 9H).

LC-MS (ESI) m/z 377.2/379.2 [M+H]$^+$.

3.2. Procedure for Preparation of Compound 3.

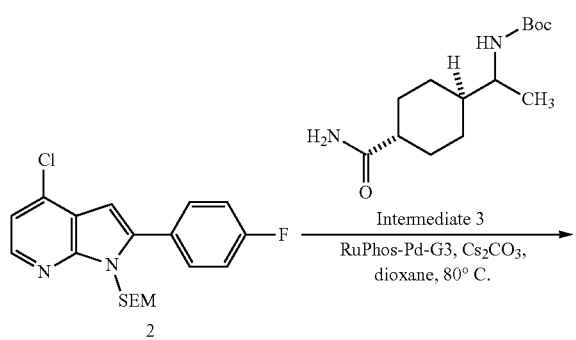

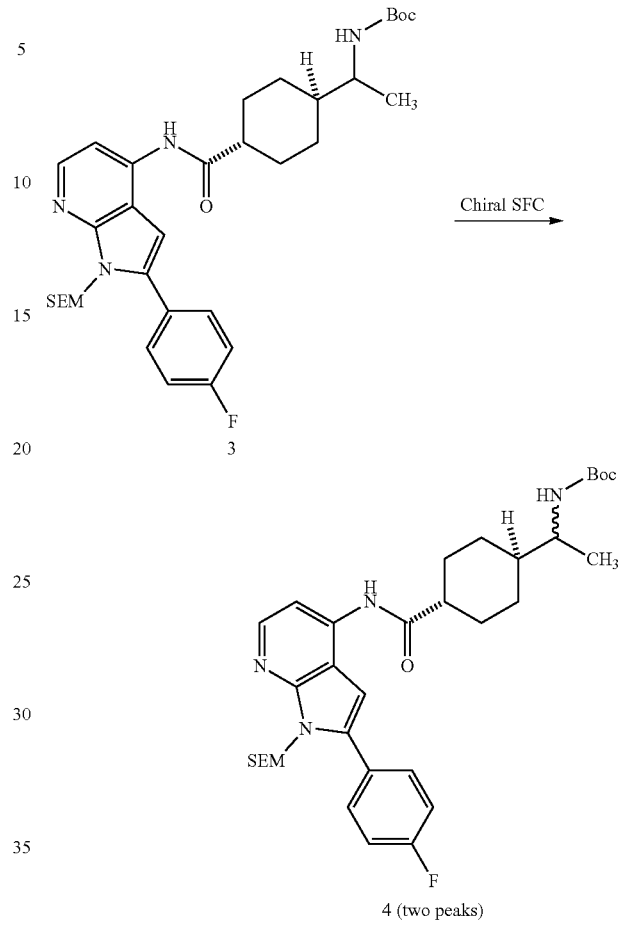

To a solution of 4-chloro-2-(4-fluorophenyl)-1-((2-(trimethylsilyl)ethoxy)methyl)-1H-pyrrolo[2,3-b] pyridine (160 mg, 424 μmol, 1.00 eq) and tert-butyl (1-((1r,4r)-4-carbamoylcyclohexyl)ethyl)carbamate (115 mg, 425 μmol, 1.00 eq) in dioxane (8 mL) were added Cs$_2$CO$_3$ (415 mg, 1.27 mmol, 3.00 eq) and RuPhos-Pd-G3 (36.0 mg, 43.0 μmol, 0.10 eq) under N$_2$ atmosphere. After stirring at 90° C. for 16 h, the palladium catalyst was removed with thiourea resin. To the mixture was added thiourea resin (100 mg) and stirred for 1 h at room temperature. The mixture was filtered and the filtrate was concentrated under vacuum. The residue was purified by reversed-phase column (0.1% TFA in water) to afford tert-butyl (1-((1r,4r)-4-((2-(4-fluorophenyl)-1-((2-(trimethylsilyl)ethoxy)methyl)-1H-pyrrolo[2,3-b]pyridin-4-yl)carbamoyl)cyclohexyl)ethyl)carbamate (240 mg, 381 μmol, 90% yield) as a yellow solid. Synthesis of Compound 3 was confirmed by LC-MS, which showed the following data: LC-MS (ESI) m/z 611.2 [M+H]$^+$.

SFC: retention time of peak 1=2.71 min; retention time of peak 2=3.56 min.

3.3. Procedure for Preparation of Compound 4

Compound 3 (330 mg, 540 μmol, 1.00 eq) was purified by Chiral SFC (column: DAICEL CHIRALCEL OD-H (250 mm*30 mm, 5 μm); mobile phase:[15% ethanol (0.1% DEA) in heptane (0.1% DEA)]; 3.5 min; 95 min) to give two fractions with different retention time:

Fraction 1 (peak 1): tert-butyl (1-((1r,4r)-4-((2-(4-fluorophenyl)-1-((2-(trimethylsilyl)ethoxy)methyl)-1H-pyrrolo[2,3-b]pyridin-4-yl)carbamoyl)cyclohexyl)ethyl)carbamate (150 mg, 233 μmol, 43% yield) was obtained as a yellow solid. Synthesis of Compound 4 (fraction 1 (Peak 1)) was confirmed by $^1$H NMR, LC-MS, and SFC, which showed the following data:

$^1$H NMR (400 MHz, DMSO-d$_6$) δ=9.94 (s, 1H), 8.17 (d, J=5.6 Hz, 1H), 7.91 (d, J=5.6 Hz, 1H), 7.83-7.78 (m, 2H), 7.41-7.35 (m, 2H), 7.07 (s, 1H), 6.67 (br d, J=8.6 Hz, 1H), 5.65-5.59 (m, 2H), 3.61-3.55 (m, 2H), 3.27-3.24 (m, 1H), 2.71-2.68 (m, 1H), 1.95-1.87 (m, 2H), 1.85-1.75 (m, 2H), 1.44-1.33 (m, 11H), 1.21-1.17 (m, 1H), 1.05-0.95 (m, 5H), 0.86-0.81 (m, 2H), −0.10−−0.14 (m, 9H).

LC-MS (ESI) m/z 611.3 [M+H]$^+$.

SFC: retention time=2.732 min.

Fraction 2 (peak 2): tert-butyl (1-((1r,4r)-4-((2-(4-fluorophenyl)-1-((2-(trimethylsilyl)ethoxy)methyl)-1H-pyrrolo[2,3-b]pyridin-4-yl)carbamoyl)cyclohexyl)ethyl)carbamate (120 mg, 193 μmol, 36% yield) was obtained as a yellow solid. Synthesis of Compound 4 Fraction 2 (peak 2) was confirmed by LC-MS, which showed the following data:

$^1$H NMR (400 MHz, DMSO-d$_6$) 9.94 (s, 1H), 8.17 (d, J=5.6 Hz, 1H), 7.91 (d, J=5.6 Hz, 1H), 7.83-7.78 (m, 2H), 7.41-7.35 (m, 2H), 7.07 (s, 1H), 6.67 (br d, J=8.6 Hz, 1H), 5.61 (s, 2H), 3.61-3.55 (m, 2H), 3.27-3.24 (m, 1H), 2.71-2.68 (m, 1H), 1.95-1.87 (m, 3H), 1.85-1.75 (m, 2H), 1.44-1.33 (m, 11H), 1.05-0.95 (m, 5H), 0.86-0.83 (m, 2H), −0.10−−0.13 (m, 9H).

LC-MS (ESI) m/z 611.3 [M+H]$^+$.

SFC: retention time=3.643 min.

3.4. Procedure for Preparation of MSK-A184_Peak 1 and MSK-A184-Peak 2

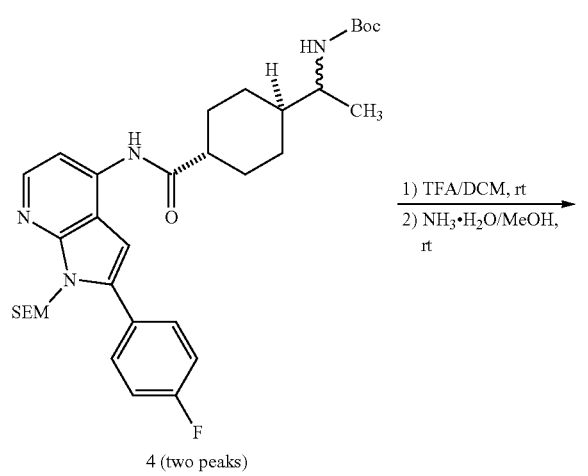

4 (two peaks)

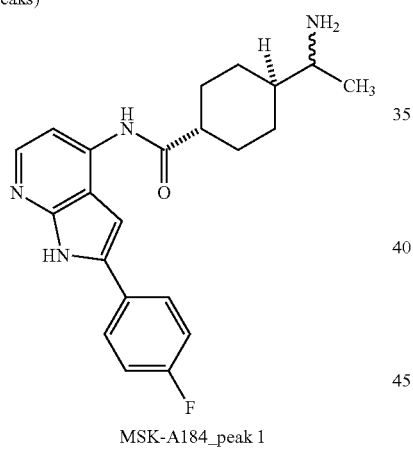

MSK-A184_peak 1
MSK-A184_peak 2

A solution of tert-butyl (1-((1r,4r)-4-((2-(4-fluorophenyl)-1-((2-(trimethylsilyl)ethoxy)methyl)-1H-pyrrolo [2,3-b]pyridin-4-yl)carbamoyl)cyclohexyl)ethyl)carbamate (150 mg, 246 μmol, 1.00 eq) in DCM (4 mL) and TFA (2 mL) was stirred at 20° C. After 1 h, the reaction mixture was concentrated under vacuum. The residue was dissolved in MeOH (4 mL) and NH$_3$.H$_2$O (2 mL), and the mixture was stirred at 20° C. for 1 h. The reaction mixture was concentrated under vacuum. The residue was purified by Prep-HPLC (column: Phenomenex Synergi C18 150*25*10 μm; water (0.05% HCl)-ACN) and lyophilized to afford (1r,4r)-4-(1-aminoethyl)-N-(2-(4-fluorophenyl)-1H-pyrrolo[2,3-b]pyridin-4-yl)cyclohexanecarboxamide.

MSK-A184_peak 1 (59.1 mg, 129 μmol, 53% yield, 2HCl salt) was obtained as an off-white solid. Synthesis of MSK-A184_peak 1 was confirmed by $^1$H NMR and LC-MS, which showed the following data:

$^1$H NMR (400 MHz, DMSO-d$_6$) S=12.97 (br s, 1H), 10.58 (br s, 1H), 8.20 (d, J=6.4 Hz, 1H), 8.09 (d, J=6.4 Hz, 1H), 8.02-7.84 (m, 5H), 7.55 (br s, 1H), 7.39 (t, J=8.8 Hz, 2H), 3.14-3.01 (m, 1H), 2.80-2.69 (m, 1H), 2.06-1.97 (m, 2H), 1.90-1.79 (m, 2H), 1.58-1.38 (m, 3H), 1.22-1.05 (m, 5H).

LC-MS (ESI) m/z 381.1 [M+H]$^+$.

MSK-A184_peak 2 (50.3 mg, 110 μmol, 56% yield, 2HCl salt) was obtained as a yellow solid. Synthesis of MSK-A184_peak2 was confirmed by $^1$H NMR and LC-MS, which showed the following data:

$^1$H NMR (400 MHz, DMSO-d$_6$) δ=13.06 (br s, 1H), 10.66 (s, 1H), 8.21 (d, J=6.4 Hz, 1H), 8.11 (d, J=6.4 Hz, 1H), 8.04-7.88 (m, 5H), 7.60 (s, 1H), 7.39 (t, J=8.8 Hz, 2H), 3.13-3.02 (m, 1H), 2.82-2.70 (m, 1H), 2.06-1.96 (m, 2H), 1.92-1.78 m, 2H), 1.59-1.37 (m, 3H), 1.22-1.06 (m, 5H).

LC-MS (ESI) m/z 381.1 [M+H]$^+$.

Example 10. Synthesis of MSK-A170, MSK-A176, MSK-A177, MSK-A200 and MSK-A184-198

1. Structure of MSK-A170, MSK-A176, MSK-A177, MSK-A200 and MSK-A184-198.

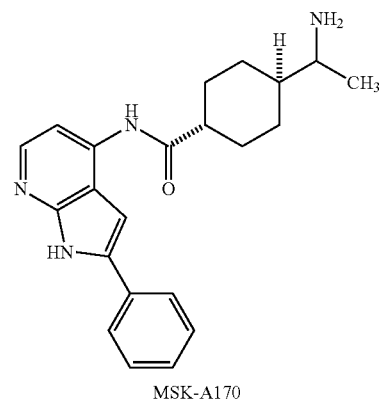

MSK-A170

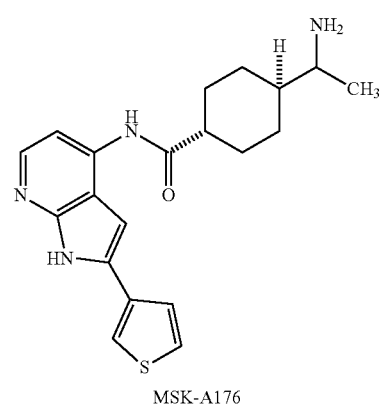

MSK-A176

-continued
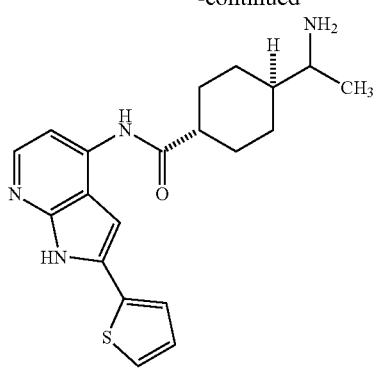
MSK-A177
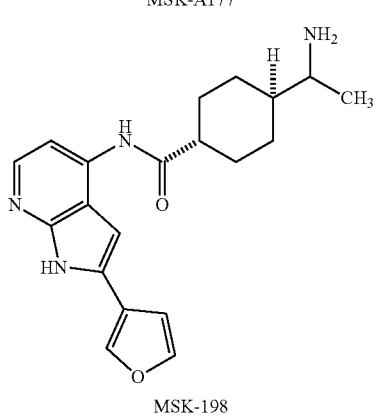
MSK-198
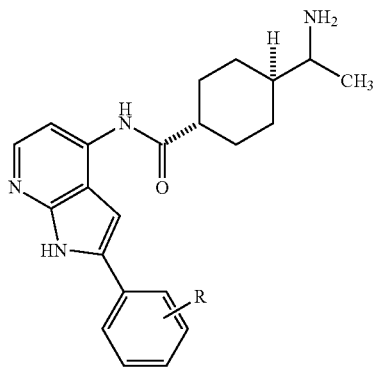
MSK-A184, R = 4-F;
MSK-A185, R = 4-me;
MSK-A186, R = 4-cyclopropane;
MSK-A187, R = 4-CF₃;
MSK-A188, R = 4-OMe;
MSK-A189, R = 4-CN;
MSK-A190, R = 2-naphthalene;
MSK-A191, R = 3-F;
MSK-A192, R = 3-Me;
MSK-A193, R = 3-cyclopropane;
MSK-A194, R = 3-CF₃;
MSK-A195, R = 3-OMe;
MSK-A196, R = 4-CN;
MSK-A197, R = 2-F;
MSK-A200, R = 3, 4-F
2. Synthetic Scheme of MSK-A170.
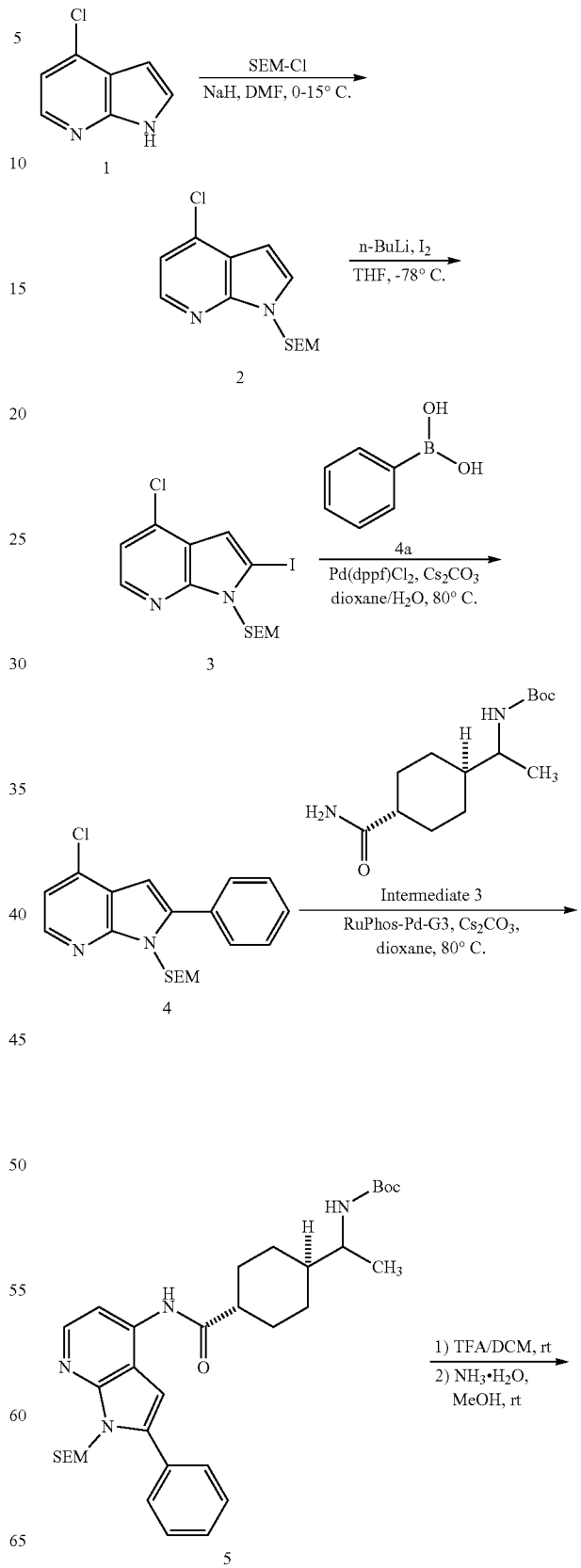

103

-continued

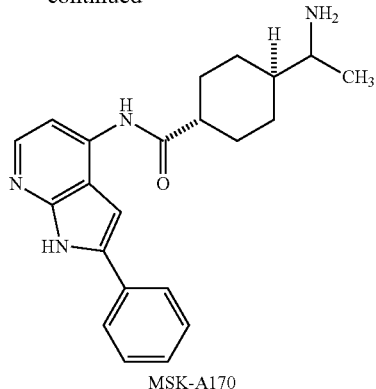

MSK-A170

3. Experimental Procedures for a Large Scale Run.
  3.1. Procedure for Preparation of Compound 2.

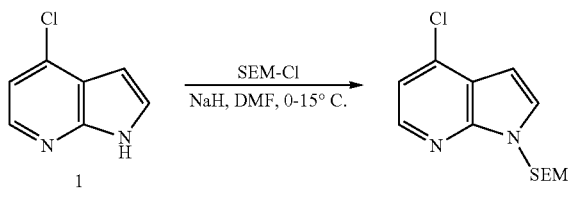

To a solution of 4-chloro-1H-pyrrolo[2,3-b]pyridine (3.00 g, 19.7 mmol, 1.00 eq) in DMF (30 mL) was added NaH (1.20 g, 30.0 mmol, 60% purity, 1.53 eq) at 0° C. After stirring at 0° C. for 1 h, SEM-Cl (3.96 g, 23.7 mmol, 1.21 eq) was added. Then the resulting was stirred at 15° C. for 1 h. The reaction mixture was quenched with H$_2$O (60 mL) and extracted with ethyl acetate (100 mL). The extracts were washed with H$_2$O (2×100 mL), brine (100 mL), dried over anhydrous Na$_2$SO$_4$, filtered and concentrated under vacuum. The residue was purified by column chromatography (SiO$_2$, petroleum ether/ethyl acetate=I/O to 100:1) to afford 4-chloro-1-((2-(trimethylsilyl)ethoxy)methyl)-1H-pyrrolo[2,3-b]pyridine (4.10 g, 14.4 mmol, 72% yield) as a yellow oil. Synthesis of Compound 2 was confirmed by $^1$H NMR and LC-MS, which showed the following data:

$^1$H NMR (400 MHz, DMSO-d$_6$) δ=8.25 (d, J=5.2 Hz, 1H), 7.77 (d, J=3.6 Hz, 1H), 7.28 (d, J=5.2 Hz, 1H), 6.60 (d, J=3.6 Hz, 1H), 5.64 (s, 2H), 3.51 (t, J=8.0 Hz, 2H), 0.93-0.69 (m, 2H), −0.12 (s, 9H).

LC-MS (ESI) m/z 283.2/285.2 [M+H]$^+$.

3.2. Procedure for Preparation of Compound 3.

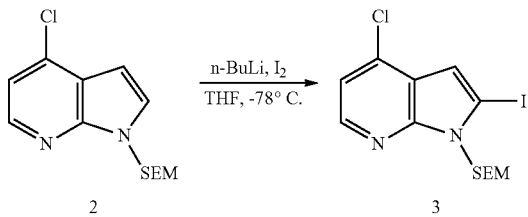

To a solution of 4-chloro-1-((2-(trimethylsilyl)ethoxy) methyl)-1H-pyrrolo[2,3-b]pyridine (1.00 g, 3.54 mmol, 1.00 eq) in THF (10 mL) was added n-BuLi (2.5 M in hexanes, 1.9 mL, 1.34 eq) at −78° C. under N$_2$ atmosphere. After 1 h, a solution of I$_2$ (1.08 g, 4.24 mmol, 1.20 eq) in THF (10 mL) was added at −78° C. The reaction mixture was warmed to 15° C. and stirred for 1 h. The reaction mixture was cooled to 0° C., it was quenched with H$_2$O (20 mL). The solution was extracted with ethyl acetate (2×30 mL). Combined extracts were washed with brine (20 mL), dried over Na$_2$SO$_4$, filtered and concentrated under vacuum. The residue was purified by column chromatography (SiO$_2$, petroleum ether/ethyl acetate=I/O to 100/1) to afford 4-chloro-2-iodo-1-((2-(trimethylsilyl)ethoxy)methyl)-1H-pyrrolo[2,3-b]pyridine (1.00 g, 2.23 mmol, 62% yield) as a yellow oil. Synthesis of Compound 3 was confirmed by $^1$H NMR and LC-MS, which showed the following data:

$^1$H NMR (400 MHz, DMSO-d$_6$) δ=10.04 (s, 1H), 8.70 (d, J=4.4 Hz, 1H), 8.21 (d, J=5.6 Hz, 1H), 8.00-7.88 (m, 3H), 7.48 (s, 1H), 7.44-7.37 (m, 1H), 6.68 (d, J=9.2 Hz, 1H), 6.16 (s, 2H), 3.57-3.55 (m, 1H), 3.39-3.30 (m, 2H), 2.64-2.62 (m, 1H), 2.00-1.87 (m, 2H), 1.87-1.75 (m, 2H), 1.55-1.32 (m, 11H), 1.29-1.21 (m, 1H), 1.08-0.93 (m, 5H), 0.74-0.63 (m, 2H), −0.12-−0.33 (m, 9H).

LC-MS (ESI) m/z 408.9/410.9 [M+H]$^+$.

3.3. Procedure for Preparation of Compound 4.

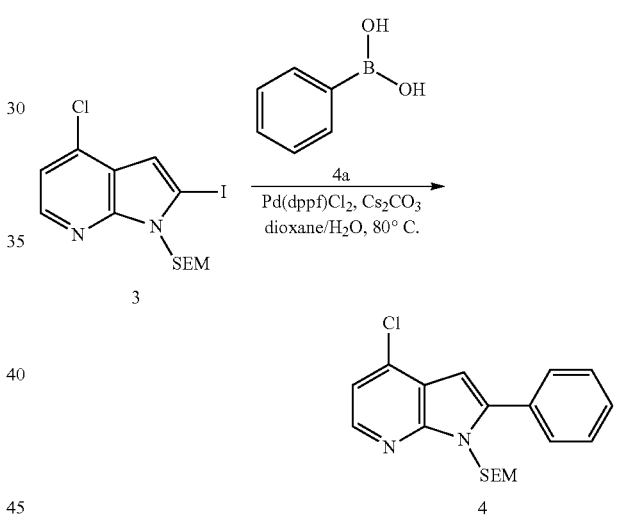

To the solution of 4-chloro-2-iodo-1-((2-(trimethylsilyl) ethoxy)methyl)-1H-pyrrolo[2,3-b]pyridine (150 mg, 367 μmol, 1.00 eq) in 1,4-dioxane (4 mL) and H$_2$O (1 mL) were added phenylboronic acid (54.0 mg, 443 μmol, 1.21 eq), Cs$_2$CO$_3$ (360 mg, 1.10 mmol, 3.01 eq) and Pd(dppf)Cl$_2$ (27.0 mg, 36.9 μmol, 0.10 eq) at 15° C. The mixture was heated to 80° C. and stirred for 4 h under N$_2$ atmosphere. The reaction mixture was diluted with H$_2$O (15 mL) and ethyl acetate (20 mL). The mixture was filtered and the filtrate was separated. The aqueous phase was extracted with ethyl acetate (25 mL). The combined organic layers were washed with brine (20 mL), dried over Na$_2$SO$_4$, filtered and concentrated under reduced pressure. The residue was purified by Prep-TLC (petroleum ether: ethyl acetate=10:1) to afford 4-chloro-2-phenyl-1-((2-(trimethylsilyl)ethoxy)methyl)-1H-pyrrolo[2,3-b]pyridine (100 mg, 279 μmol, 76% yield) as a colorless oil. Synthesis of Compound 4 was confirmed by $^1$H NMR and LC-MS, which showed the following data:

$^1$H NMR (400 MHz, DMSO-d$_6$) δ=8.29 (d, J=5.2 Hz, 1H), 7.82 (dd, J=1.2, 8.0 Hz, 2H), 7.58-7.47 (m, 3H), 7.34

(d, J=5.2 Hz, 1H), 6.78 (s, 1H), 5.65 (s, 2H), 3.62-3.56 (m, 2H), 0.87-0.79 (m, 2H), −0.11 (s, 9H).

3.4. Procedure for Preparation of Compound 5.

3.5. Procedure for Preparation of MSK-A170.

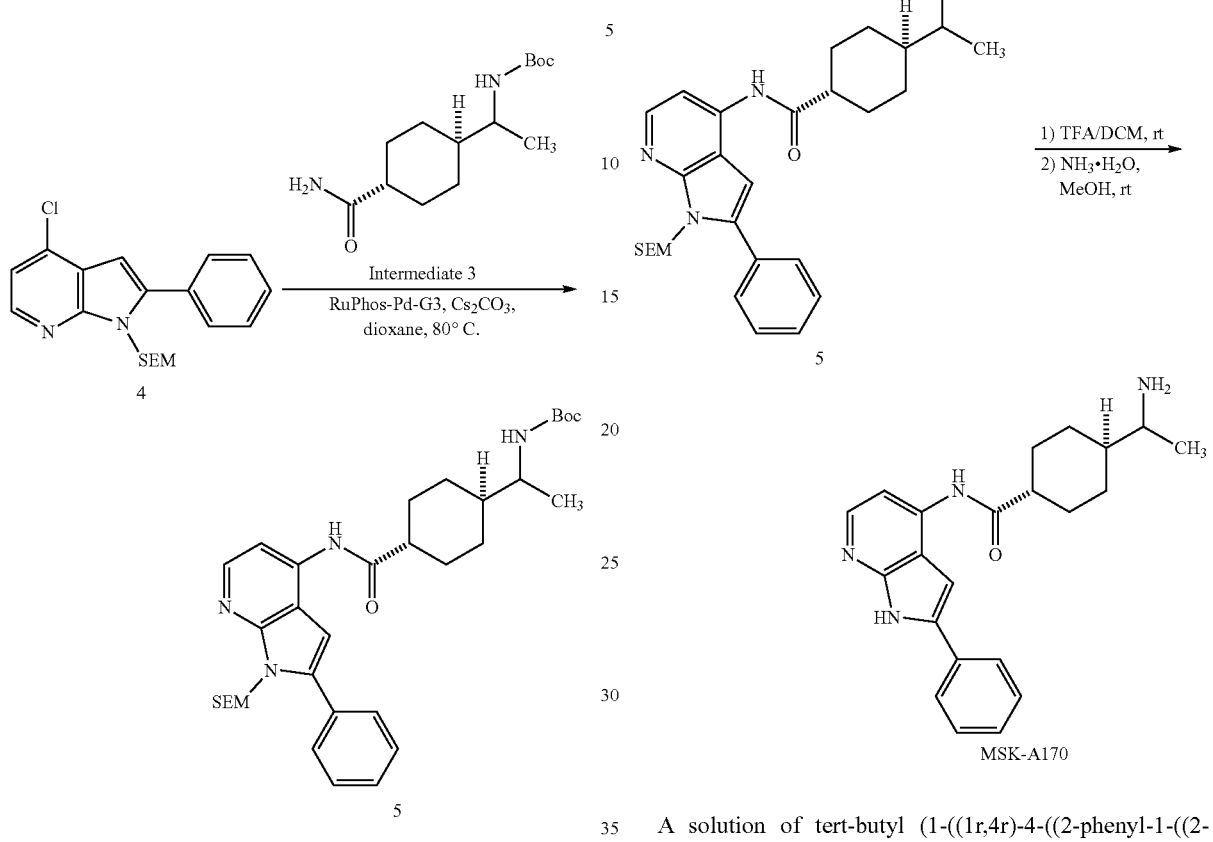

To a solution of 4-chloro-2-phenyl-1-((2-(trimethylsilyl) ethoxy)methyl)-1H-pyrrolo[2,3-b]pyridine (90.0 mg, 251 μmol, 1.00 eq) and tert-butyl (1-((1r,4r)-4-carbamoylcyclohexyl)ethyl)carbamate (68.0 mg, 252 μmol, 1.00 eq) in 1,4-dioxane (10 mL) was added Cs$_2$CO$_3$ (245 mg, 752 μmol, 3.00 eq) and RuPhos-Pd-G3 (21.0 mg, 25.1 μmol, 0.10 eq) under N$_2$ atmosphere. The reaction mixture was stirred at 80° C. After 16 h, the reaction mixture was cooled to room temperature, and diluted with H$_2$O (15 mL) and ethyl acetate (25 mL). The solution was filtered and layers were separated. The aqueous phase was extracted with ethyl acetate (25 mL). Combined extracts were washed with brine (20 mL), dried over Na$_2$SO$_4$, filtered and concentrated under vacuum. The residue was purified by prep-HPLC (column: Phenomenex Synergi C18 150*25*10 μm; water (0.1% TFA)-ACN) to afford tert-butyl (1-((1r,4r)-4-((2-phenyl-1-((2-(trimethylsilyl)-ethoxy)methyl)-1H-pyrrolo[2,3-b]pyridin-4-yl)carbamoyl)cyclohexyl)ethyl)carbamate (75.0 mg, 105 μmol, 42% yield, TFA salt) as a white solid. Synthesis of Compound 5 was confirmed by $^1$H NMR and LC-MS, which showed the following data:

$^1$H NMR (400 MHz, DMSO-d$_6$) δ=9.95 (s, 1H), 8.17 (d, J=5.2 Hz, 1H), 7.92 (d, J=5.2 Hz, 1H), 7.80-7.74 (m, 2H), 7.57-7.50 (m, 2H), 7.50-7.43 (m, 1H), 7.09 (s, 1H), 6.65 (d, J=9.2 Hz, 1H), 5.62 (s, 2H), 3.63-3.55 (m, 2H), 3.32-3.28 (m, 1H), 2.58-2.55 (m, 1H), 1.96-1.86 (m, 2H), 1.86-1.74 (m, 2H), 1.48-1.33 (m, 11H), 1.29-1.21 (m, 1H), 1.07-0.92 (m, 5H), 0.87-0.79 (m, 2H), −0.11 (s, 9H).

LC-MS (ESI) m/z 593.4 [M+H]$^+$.

A solution of tert-butyl (1-((1r,4r)-4-((2-phenyl-1-((2-(trimethylsilyl)ethoxy)methyl)-1H-pyrrolo[2,3-b] pyridin-4-yl)carbamoyl)cyclohexyl)ethyl)carbamate (75.0 mg, 106 μmol, 1.00 eq, TFA salt) in TFA (2 mL) and DCM (8 mL) was stirred at 15° C. After 2 h, the reaction mixture was concentrated under vacuum. The residue was dissolved in MeOH (6 mL) and NH$_3$.H$_2$O (3 mL) and stirred at 15° C. for 1 h. The reaction mixture was concentrated under vacuum. The residue was purified by Prep-HPLC (column: Phenomenex Synergi C18 150*25*10 um; water (0.05% HCl)-ACN) and lyophilized to afford (1r,4r)-4-(1-aminoethyl)-N-(2-phenyl-1H-pyrrolo[2,3-b]pyridin-4-yl) cyclohexanecarboxamide (29.2 mg, 66.5 μmol, 63% yield, 2HCl salt) as a yellow solid. Synthesis of MSK-A170 was confirmed by $^1$H NMR and LC-MS, which showed the following data:

$^1$H NMR (400 MHz, DMSO-d$_6$) δ=13.20 (br s, 1H), 10.77 (br s, 1H), 8.27-8.20 (m, 1H), 8.20-8.14 (m, 1H), 7.98 (d, J=2.0 Hz, 3H), 7.92 (d, J=7.6 Hz, 2H), 7.71 (s, 1H), 7.54 (t, J=7.6 Hz, 2H), 7.47-7.39 (m, 1H), 3.13-3.00 (m, 1H), 2.85-2.73 (m, 1H), 2.07-1.96 (m, 2H), 1.91-1.78 (m, 2H), 1.60-1.36 (m, 3H), 1.22-1.05 (m, 5H).

LC-MS (ESI) m/z 363.1 [M+H]$^+$.

These results indicate that MSK-A170, MSK-A176, MSK-A177, MSK-A200 and MSK-A184-198 may be synthesized using the process disclosed herein.

Example 11. Synthesis of Further Compounds

The general procedure disclosed herein was followed for the syntheses of other target molecules summarized in the following table.

| Compound ID | Total weight (mg) | Yield (%) | Purity (%) |
|---|---|---|---|
| MSK-A176 | 34.27 | 78 | 99 |
| MSK-A177 | 5.2 | 20 | 98 |
| MSK-A184 | 41.18 | 36 | 99 |
| MSK-A185 | 43.72 | 41 | 98 |
| MSK-A186 | 35.14 | 44 | 95 |
| MSK-A187 | 44.1 | 60 | 99 |
| MSK-A188 | 13.56 | 9 | 99 |
| MSK-A189 | 43.87 | 46 | 99 |
| MSK-A190 | 44.81 | 45 | 99 |
| MSK-A191 | 47.54 | 57 | 99 |
| MSK-A192 | 30.98 | 55 | 99 |
| MSK-A193 | 78.44 | 69 | 99 |
| MSK-A194 | 48.36 | 60 | 99 |
| MSK-A195 | 34.42 | 61 | 99 |
| MSK-A196 | 54.97 | 56 | 99 |
| MSK-A197 | 70.73 | 67 | 99 |
| MSK-A198 | 50 | 80 | 96 |
| MSK-A200 | 10.08 | 67 | 99 |

MSK-A176.

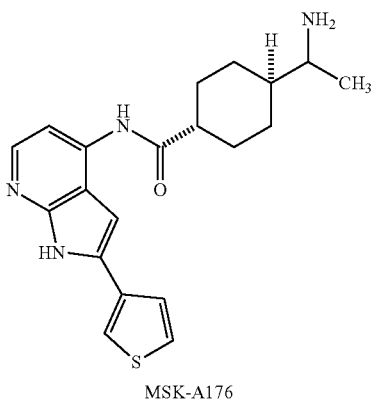

MSK-A176

$^1$H NMR (400 MHz, DMSO-d$_6$) δ=13.20 (br s, 1H), 10.69 (br s, 1H), 8.23-8.18 (m, 1H), 8.18-8.11 (m, 2H), 7.99 (br s, 3H), 7.74 (dd, J=2.8, 5.2 Hz, 1H), 7.60 (dd, J=1.2, 5.2 Hz, 1H), 7.50 (s, 1H), 3.11-3.00 (m, 1H), 2.82-2.70 (m, 1H), 2.07-1.95 (m, 2H), 1.90-1.78 (br s, 2H), 1.59-1.37 (m, 3H), 1.22-1.04 (m, 5H). LC-MS (ESI) m/z 369.1 [M+H]$^+$.

MSK-A177.

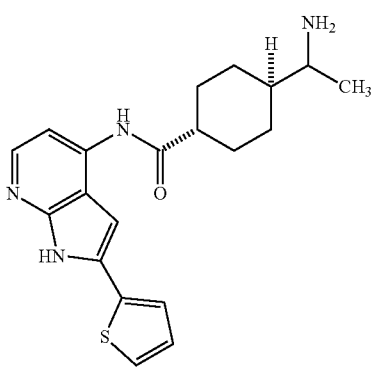

MSK-A177

$^1$H NMR (400 MHz, DMSO-d$_6$) δ=13.22 (br s, 1H), 10.56 (br s, 1H), 8.20 (d, J=6.4 Hz, 1H), 8.14 (d, J=6.4 Hz, 1H), 7.98 (br s, 3H), 7.76 (d, J=2.8 Hz, 1H), 7.66 (dd, J=0.8, 5.2 Hz, 1H), 7.41 (s, 1H), 7.20 (dd, J=3.6, 5.2 Hz, 1H), 3.13-3.00 (m, 1H), 2.79-2.66 (m, 1H), 2.05-1.95 (m, 2H), 1.90-1.76 (m, 2H), 1.60-1.35 (m, 3H), 1.26-1.05 (m, 5H). LC-MS (ESI) m/z 369.1 [M+H]$^+$.

Synthesis of MSK-A184 was confirmed by $^1$H NMR and LC-MS, which showed the following data:

1H NMR (400 MHz, DMSO-d$_6$) δ=12.11 (s, 1H), 9.94 (s, 1H), 8.08 (d, J=5.6 Hz, 1H), 7.94-7.86 (m, 2H), 7.80 (d, J=5.6 Hz, 1H), 7.74 (br s, 3H), 7.38-7.29 (m, 2H), 7.20 (d, J=2.0 Hz, 1H), 3.15-3.03 (m, 1H), 2.63-2.55 (m, 1H), 2.04-1.94 (m, 2H), 1.839-1.76 (m, 2H), 1.57-1.39 (m, 3H), 1.22-1.03 (m, 5H).

LC-MS (ESI) m/z 381.5 [M+H]$^+$.

Synthesis of MSK-A185 was confirmed by $^1$H NMR and LC-MS, which showed the following data:

$^1$H NMR (400 MHz, DMSO-d$_6$) δ=13.38 (br s, 1H), 10.92 (s, 1H), 8.22 (s, 2H), 8.04 (s, 3H), 7.83 (d, J=8.4 Hz, 2H), 7.75 (d, J=1.6 Hz, 1H), 7.35 (d, J=8.0 Hz, 2H), 3.12-2.99 (m, 1H), 2.90-2.78 (m, 1H), 2.37 (s, 3H), 2.07-1.97 (m, 2H), 1.91-1.79 (m, 2H), 1.60-1.50 (m, 1H), 1.49-1.36 (m, 2H), 1.22-1.06 (m, 5H).

LC-MS (ESI) m/z 377.1 [M+H]$^+$.

Synthesis of MSK-A186 was confirmed by $^1$H NMR and LC-MS, which showed the following data:

$^1$H NMR (400 MHz, DMSO-d$_6$) δ=13.34 (br s, 1H), 10.88 (br s, 1H), 8.22 (s, 2H), 8.01 (br s, 3H), 7.81 (d, J=8.4 Hz, 2H), 7.71 (s, 1H), 7.24 (d, J=8.4 Hz, 2H), 3.11-3.00 (m, 1H), 2.88-2.77 (m, 1H), 2.08-1.94 (m, 3H), 1.90-1.79 (m, 2H), 1.59-1.49 (m, 1H), 1.48-1.36 (m, 2H), 1.22-1.06 (m, 5H), 1.05-0.97 (m, 2H), 0.79-0.72 (m, 2H).

LC-MS (ESI) m/z 403.2 [M+H]$^+$.

Synthesis of MSK-A187 was confirmed by $^1$H NMR and LC-MS, which showed the following data:

$^1$H NMR (400 MHz, DMSO-d$_6$) δ=13.27 (br s, 1H), 10.77 (br s, 1H), 8.26 (d, J=6.4 Hz, 1H), 8.18-8.09 (m, 3H), 7.99 (br s, 3H), 7.90 (d, J=8.4 Hz, 2H), 7.85 (s, 1H), 3.13-3.00 (m, 1H), 2.84-2.73 (m, 1H), 2.07-1.96 (m, 2H), 1.91-1.79 (m, 2H), 1.60-1.37 (m, 3H), 1.24-1.05 (m, 5H).

LC-MS (ESI) m/z 431.1 [M+H]$^+$.

Synthesis of MSK-A188 was confirmed by $^1$H NMR and LC-MS, which showed the following data:

$^1$H NMR (400 MHz, DMSO-d$_6$) δ=13.32 (br s, 1H), 10.86 (br s, 1H), 8.30-8.18 (m, 2H), 8.02 (br s, 3H), 7.88 (d, J=8.8 Hz, 2H), 7.64 (s, 1H), 7.11 (d, J=8.8 Hz, 2H), 3.84 (s, 3H), 3.14-3.00 (m, 1H), 2.89-2.77 (m, 1H), 2.10-1.96 (m, 2H), 1.92-1.79 (m, 2H), 1.60-1.49 (m, 1H), 1.44 (q, J=12.0 Hz, 2H), 1.24-1.06 (m, 5H).

LC-MS (ESI) m/z 393.1 [M+H]$^+$.

Synthesis of MSK-A189 was confirmed by $^1$H NMR and LC-MS, which showed the following data.

$^1$H NMR (400 MHz, DMSO-d$_6$) δ=13.60 (br s, 1H), 11.06 (br s, 1H), 8.29 (d, J=6.4 Hz, 1H), 8.21 (d, J=6.4 Hz, 1H), 8.17-8.03 (m, 6H), 8.02-7.98 (m, 2H), 3.12-2.99 (m, 1H), 2.95-2.82 (m, 1H), 2.09-1.96 (m, 2H), 1.91-1.78 (m, 2H), 1.61-1.35 (m, 3H), 1.25-1.04 (m, 5H). LC-MS (ESI) m/z 388.1 [M+H]$^+$.

Synthesis of MSK-A190

*MSK-A190*

MSK-A190 was confirmed by ¹H NMR and LC-MS, which showed the following data:

¹H NMR (400 MHz, DMSO-$d_6$) δ=13.51 (br s, 1H), 10.92 (br s, 1H), 8.54 (s, 1H), 8.30-8.25 (m, 1H), 8.25-8.20 (m, 1H), 8.11-8.07 (m, 1H), 8.07-7.95 (m, 5H), 7.92 (d, J=1.2 Hz, 1H), 7.65-7.55 (m, 2H), 3.13-3.01 (m, 1H), 2.90-2.78 (m, 1H), 2.11-1.98 (m, 2H), 1.92-1.79 (m, 2H), 1.61-1.38 (m, 3H), 1.25-1.06 (m, 5H).

LC-MS (ESI) m/z 413.1 [M+H]⁺.

Synthesis of MSK-A191 was confirmed by ¹H NMR and LC-MS, which showed the following data:

¹H NMR (400 MHz, DMSO-$d_6$) δ=13.39 (br s, 1H), 10.90 (s, 1H), 8.25 (d, J=6.4 Hz, 1H), 8.19 (d, J=6.4 Hz, 1H), 8.03 (br s, 2H), 7.86 (s, 1H), 7.81-7.76 (m, 2H), 7.59-7.57 (m, 1H), 7.27-7.26 (m, 1H), 3.06-3.03 (m, 1H), 2.90-2.78 (m, 1H), 2.04-2.01 (m, 2H), 1.85-1.83 (m, 2H), 1.45-1.42 (m, 3H), 1.19-1.11 (m, 5H).

LC-MS (ESI) m/z 381.1 [M+H]⁺.

Synthesis of MSK-A192 was confirmed by ¹H NMR and LC-MS, which showed the following data:

¹H NMR (400 MHz, DMSO-$d_6$) δ=13.49 (br s, 1H), 11.00 (s, 1H), 8.25 (s, 2H), 8.10 (br s, 3H), 7.84 (d, J=1.6 Hz, 1H), 7.77 (s, 1H), 7.74 (d, J=8.0 Hz, 1H), 7.42 (t, J=7.6 Hz, 1H), 7.25 (d, J=7.6 Hz, 1H), 3.05-2.98 (m, 1H), 2.93-2.87 (m, 1H), 2.40 (s, 3H), 2.07-1.97 (m, 2H), 1.90-1.79 (m, 2H), 1.61-1.50 (m, 1H), 1.50-1.36 (m, 2H), 1.19-1.11 (m, 5H).

LC-MS (ESI) m/z 377.2 [M+H]⁺.

Synthesis of MSK-A193 was confirmed by ¹H NMR and LC-MS, which showed the following data:

¹H NMR (400 MHz, DMSO-$d_6$) δ=13.33 (br s, 1H), 10.83 (br s, 1H), 8.27-8.18 (m, 2H), 8.03 (br s, 3H), 7.74 (s, 1H), 7.68 (d, J=7.6 Hz, 1H), 7.63 (s, 1H), 7.40 (t, J=7.6 Hz, 1H), 7.16 (d, J=7.6 Hz, 1H), 3.11-3.01 (m, 1H), 2.87-2.76 (m, 1H), 2.08-1.96 (m, 3H), 1.92-1.79 (m, 2H), 1.60-1.37 (m, 3H), 1.24-1.06 (m, 5H), 1.05-0.98 (m, 2H), 0.84-0.79 (m, 2H).

LC-MS (ESI) m/z 403.2 [M+H]⁺.

Synthesis of MSK-A194 was confirmed by ¹H NMR and LC-MS, which showed the following data:

¹H NMR (400 MHz, DMSO-$d_6$) δ=13.42 (br s, 1H), 10.84 (br s, 1H), 8.31-8.25 (m, 2H), 8.24-8.16 (m, 2H), 8.04 (br s, 3H), 7.91 (s, 1H), 7.81-7.75 (m, 2H), 3.12-3.00 (m, 1H), 2.81 (tt, J=3.2, 12.0 Hz, 1H), 2.07-1.97 (m, 2H), 1.90-1.79 (m, 2H), 1.60-1.37 (m, 3H), 1.21-1.07 (m, 5H).

LC-MS (ESI) m/z 431.2 [M+H]⁺.

Synthesis of MSK-A195 was confirmed by ¹H NMR and LC-MS, which showed the following data:

¹H NMR (400 MHz, DMSO-$d_6$) δ=13.25 (s, 1H), 10.77 (br s, 1H), 8.27-8.21 (m, 1H), 8.20-8.15 (m, 1H), 8.00 (br s, 3H), 7.73 (s, 1H), 7.55-7.41 (m, 3H), 7.00 (td, J=1.2, 6.8 Hz, 1H), 3.86 (s, 3H), 3.06 (qd, J=6.0, 12.0 Hz, 1H), 2.80 (tt, J=3.2, 12.0 Hz, 1H), 2.07-1.97 (m, 2H), 1.90-1.79 (m, 2H), 1.59-1.37 (m, 3H), 1.21-1.07 (m, 5H).

LC-MS (ESI) m/z 393.2 [M+H]⁺.

Synthesis of MSK-A196 was confirmed by ¹H NMR and LC-MS, which showed the following data:

¹H NMR (400 MHz, DMSO-$d_6$) δ=13.29 (br s, 1H), 10.81 (br s, 1H), 8.38 (s, 1H), 8.26 (d, J=6.4 Hz, 1H), 8.22 (d, J=8.0 Hz, 1H), 8.14 (d, J=6.4 Hz, 1H), 8.01 (br s, 3H), 7.90-7.83 (m, 2H), 7.79-7.71 (m, 1H), 3.11-3.00 (m, 1H), 2.85-2.75 (m, 1H), 2.08-1.96 (m, 2H), 1.91-1.79 (m, 2H), 1.60-1.37 (m, 3H), 1.22-1.11 (m, 5H).

LC-MS (ESI) m/z 388.2 [M+H]⁺.

Synthesis of MSK-A197 was confirmed by ¹H NMR and LC-MS, which showed the following data:

¹H NMR (400 MHz, DMSO-$d_6$) δ=13.24 (br s, 1H), 10.81 (s, 1H), 8.30-8.26 (m, 1H), 8.25-8.20 (m, 1H), 8.17-7.93 (m, 4H), 7.75 (s, 1H), 7.53-7.35 (m, 3H), 3.05 (qd, J=5.6, 11.6 Hz, 1H), 2.78 (tt, J=3.2, 11.6 Hz, 1H), 2.06-1.96 (m, 2H), 1.90-1.79 (m, 2H), 1.60-1.36 (m, 3H), 1.22-1.06 (m, 5H).

LC-MS (ESI) m/z 381.2 [M+H]⁺.

Synthesis of MSK-A198 was confirmed by ¹H NMR and LC-MS, which showed the following data:

¹H NMR (400 MHz, DMSO-$d_6$) δ=12.92 (br s, 1H), 10.53 (s, 1H), 8.34 (s, 1H), 8.18 (d, J=6.4 Hz, 1H), 8.08 (d, J=6.4 Hz, 1H), 7.93 (br s, 3H), 7.85 (t, 1H), 7.27 (s, 1H), 6.96-6.95 (m, 1H), 3.07-3.06 (m, 1H), 2.73-2.70 (m, 1H), 2.01-1.98 (m, 2H), 1.84-1.82 (m, 2H), 1.54-1.38 (m, 3H), 1.18-1.06 (m, 5H).

LC-MS (ESI) m/z 353.1 [M+H]⁺.

Synthesis of MSK-A200 was confirmed by ¹H NMR and LC-MS, which showed the following data:

¹H NMR (400 MHz, DMSO-$d_6$) δ=13.24 (br s, 1H), 10.78 (br s, 1H), 8.24 (d, J=6.4 Hz, 1H), 8.13 (d, J=6.4 Hz, 1H), 8.08-7.92 (m, 4H), 7.80-7.70 (m, 2H), 7.68-7.58 (m, 1H), 3.12-3.00 (m, 1H), 2.85-2.73 (m, 1H), 2.07-1.96 (m, 2H), 1.90-1.79 (m, 2H), 1.59-1.36 (m, 3H), 1.22-1.06 (m, 5H).

LC-MS (ESI) m/z 399.2 [M+H]⁺.

These results indicate that MSK-A176, MSK-A177, MSK-A184, MSK-A185, MSK-A186, MSK-A187, MSK-A188, MSK-A189, MSK-A190, MSK-A191, MSK-A192, MSK-A193, MSK-A194, MSK-A195, MSK-A196, MSK-A197, MSK-A198, and MSK-A200 may be synthesized using the process disclosed herein.

Example 12. Synthesis of MSK-A191_Peak 1 and MSK-A191_Peak 2
1. Structure of MSK-A191 peak 1 and MSK-A191 peak 2.
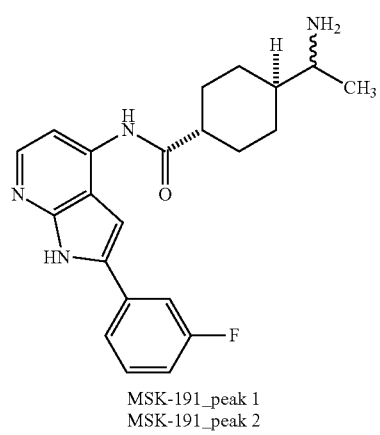
MSK-191_peak 1
MSK-191_peak 2
2. Synthetic Scheme of MSK-A191 Peak 1 and MSK-A191 Peak 2.
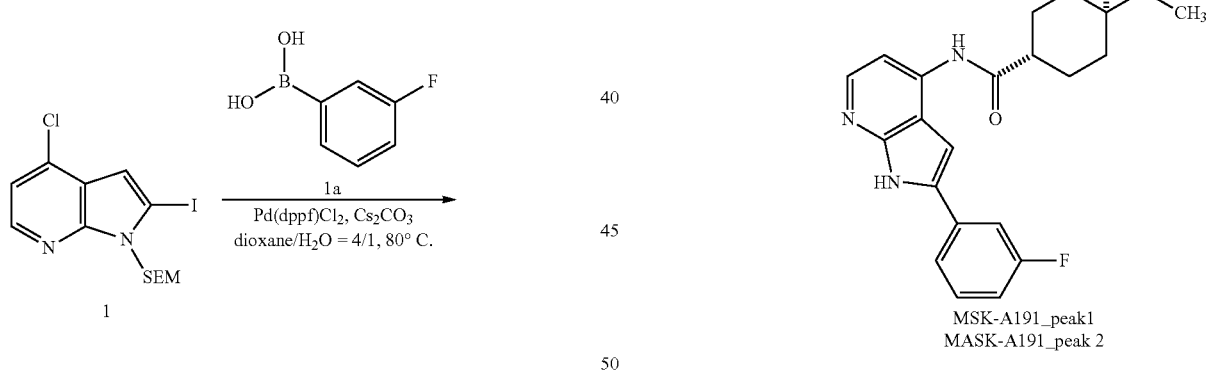
3. Experimental Procedures for a Large Scale Run:
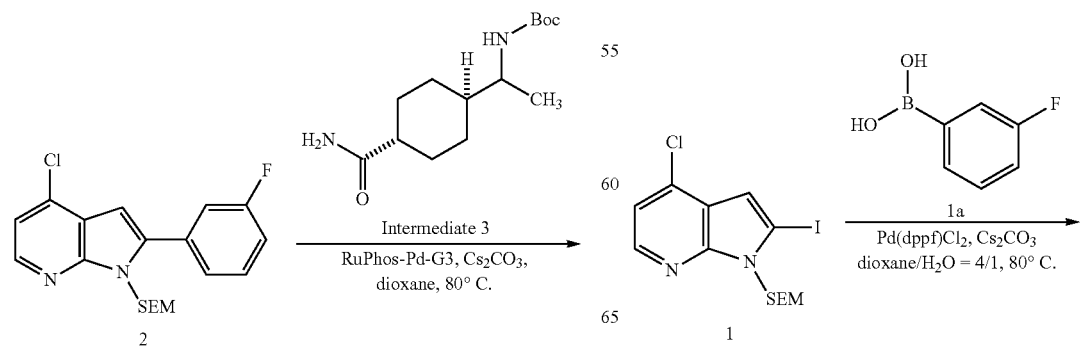

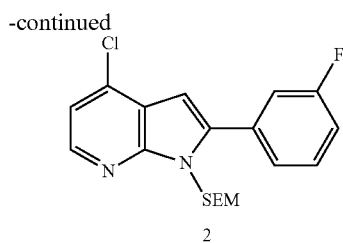

3.1. Procedure for Preparation of Compound 2.

To a solution of 4-chloro-2-iodo-1-((2-(trimethylsilyl)ethoxy)methyl)-1H-pyrrolo[2,3-b]pyridine (500 mg, 1.22 mmol, 1.00 eq) and (3-fluorophenyl)boronic acid (171 mg, 1.22 mmol, 1.00 eq) in dioxane (16 mL) and water (4 mL) were added $Cs_2CO_3$ (1.20 g, 3.67 mmol, 3.00 eq) and $Pd(dppf)Cl_2$ (90.0 mg, 123 µmol, 0.10 eq) under $N_2$ atmosphere. After stirring at 80° C. for 16 h, the reaction mixture was cooled to room temperature. It was diluted with $H_2O$ (20 mL) and ethyl acetate (20 mL). The solution was filtered and layers were separated. The organic layer was washed with brine (20 mL), dried over anhydrous $Na_2SO_4$, filtered and concentrated under vacuum. The residue was purified by Prep-HPLC (column: Phenomenex Synergi Max-RP 250*50 mm*10 µm; water (0.1% TFA)-ACN) to afford 4-chloro-2-(3-fluorophenyl)-1-((2-(trimethylsilyl)ethoxy)methyl)-1H-pyrrolo[2,3-b]pyridine (290 mg, 762 µmol, 62% yield) as a yellow oil. Synthesis of Compound 2 was confirmed by $^1H$ NMR and LC-MS, which showed the following data:

$^1$H NMR (400 MHz, DMSO-$d_6$) δ=8.31 (d, J=5.2 Hz, 1H), 7.74-7.66 (m, 2H), 7.63-7.54 (m, 1H), 7.38-7.30 (m, 2H), 6.89 (s, 1H), 5.68 (s, 2H), 3.65-3.58 (m, 2H), 0.89-0.80 (m, 2H), -0.09--0.14 (m, 9H).

LC-MS (ESI) m/z 377.2/379.2 [M+H]$^+$.

3.2. Procedure for Preparation of Compound 3.

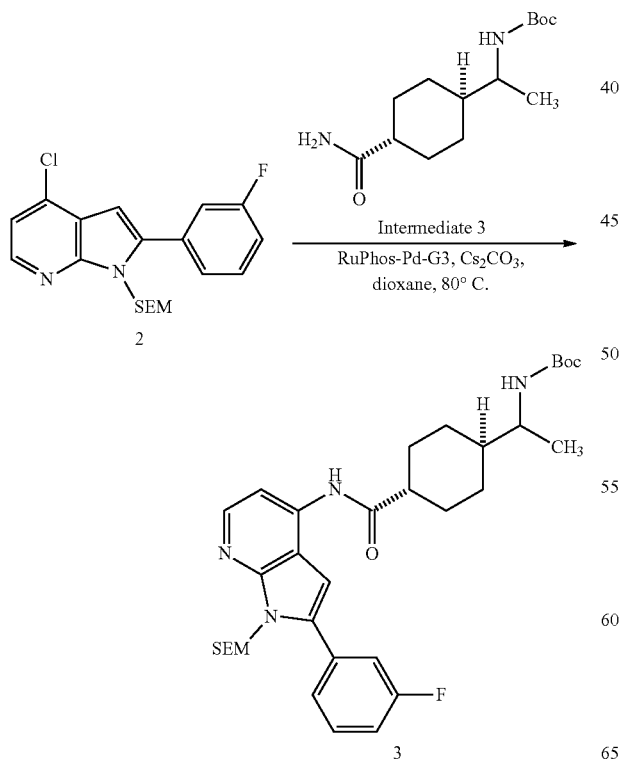

To a solution of 4-chloro-2-(3-fluorophenyl)-1-((2-(trimethylsilyl)ethoxy)methyl)-1H-pyrrolo[2,3-b]pyridine (290 mg, 769 µmol, 1.00 eq) and tert-butyl (1-((1r,4r)-4-carbamoylcyclohexyl)ethyl)carbamate (214 mg, 792 µmol, 1.03 eq) in dioxane (12 mL) were added $Cs_2CO_3$ (752 mg, 2.31 mmol, 3.00 eq) and RuPhos-Pd-G3 (64.0 mg, 76.5 µmol, 0.10 eq) under $N_2$ atmosphere. The reaction mixture was stirred at 80° C. for 16 h under nitrogen atmosphere. After being cooled to room temperature, 200 mg of thiourea resin was added to the mixture and it was stirred at room temperature for 4 h. The mixture was filtered and the filtrate was concentrated in vacuo. The residue was purified by Prep-HPLC (column: Phenomenex luna C18 150*40 mm*15 µm; water (0.1% TFA)-ACN) to afford tert-butyl (1-((1r,4r)-4-((2-(3-fluorophenyl)-1-((2-(trimethylsilyl)ethoxy)methyl)-1H-pyrrolo[2,3-b]pyridin-4-yl)carbamoyl)cyclohexyl)ethyl)carbamate (310 mg, 462 µmol, 60% yield) as a yellow oil. Synthesis of Compound 3 was confirmed by $^1$H NMR, LC-MS, and SFC, which showed the following data:

$^1$H NMR (400 MHz, DMSO-$d_6$) δ=9.98 (s, 1H), 8.19 (d, J=5.6 Hz, 1H), 7.93 (d, J=5.6 Hz, 1H), 7.67-7.54 (m, 3H), 7.31 (d, J=1.2 Hz, 1H), 7.18 (s, 1H), 6.67 (d, J=8.0 Hz, 1H), 5.65 (s, 2H), 3.65-3.57 (m, 2H), 3.33-3.25 (m, 1H), 2.58-2.53 (m, 1H), 1.97-1.87 (m, 2H), 1.86-1.74 (m, 2H), 1.47-1.33 (m, 11H), 1.31-1.19 (m, 1H), 1.32-1.19 (m, 5H), 0.88-0.81 (m, 2H), -0.07--0.14 (m, 9H).

LC-MS (ESI) m/z 611.4 [M+H]$^+$.

SFC: retention time of peak 1=2.747 min; retention time of peak 2=3.682 min.

3.3. Procedure for Preparation of Compound 4.

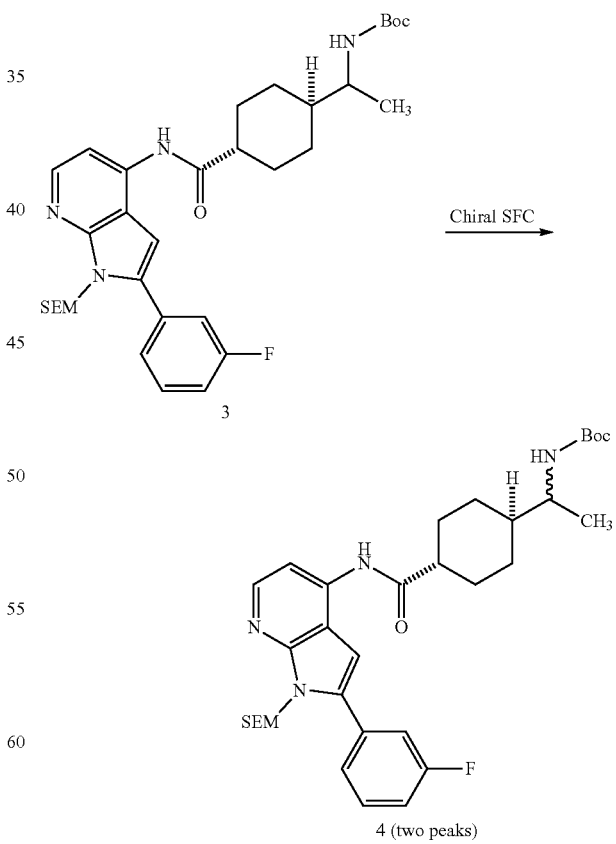

Compound 3 (310 mg, 508 µmol, 1.00 eq) was purified by Chiral SFC (column: DAICEL CHIRALCEL OD-H (250 mm*30 mm, 5 μm); mobile phase: [10% ethanol (0.1% DEA) in heptane (0.1% DEA)]; 6.0 min; 115 min) to give two desired fractions with different retention time:

Fraction 1 (peak 1): tert-butyl (1-((1r,4r)-4-((2-(3-fluorophenyl)-1-((2-(trimethylsilyl)ethoxy)methyl)-1H-pyrrolo[2,3-b]pyridin-4-yl)carbamoyl)cyclohexyl)ethyl)carbamate (110 mg, 178 μmol, 35% yield) was obtained as a colourless foam.

Synthesis of Compound 4 (Fraction 1 (peak 1)) was confirmed by LC-MS and SFC, which showed the following data.

LC-MS (ESI) m/z 611.3 [M+H]⁺.

SFC: retention time=2.769 min.

Synthesis of Compound 4 (Fraction 2 (peak 2)) was confirmed by ¹H NMR and LC-MS, which showed the following data:

Fraction 2 (peak 2): tert-butyl (1-((1r,4r)-4-((2-(3-fluorophenyl)-1-((2-(trimethylsilyl)ethoxy)methyl)-1H-pyrrolo[2,3-b]pyridin-4-yl)carbamoyl)cyclohexyl)ethyl)carbamate (100 mg, 162 μmol, 32% yield) was obtained as a colourless foam. Synthesis was confirmed by LC-MS and SFC, which showed the following data:

LC-MS (ESI) m/z 611.5 [M+H]⁺.

SFC: retention time=3.663 min.

3.4. Procedure for Preparation of MSK-A191_Peak 1 MSK-A191-Peak 2.

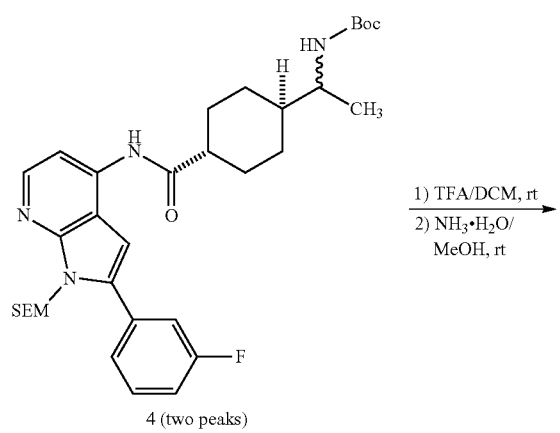

4 (two peaks)

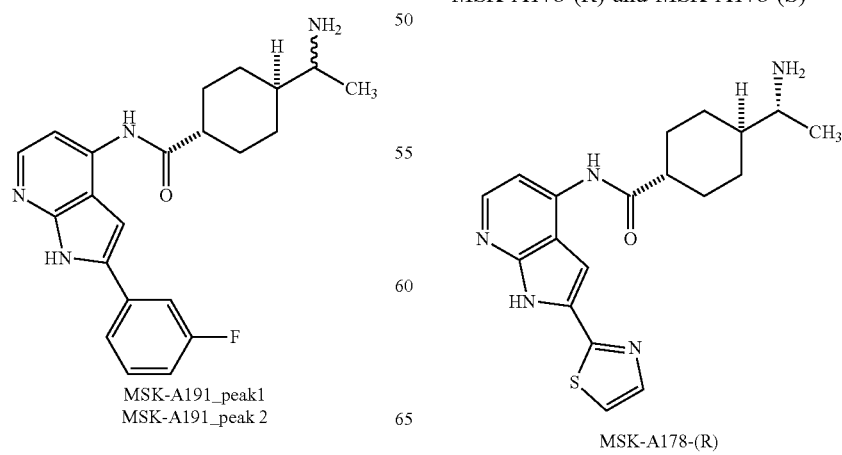

MSK-A191_peak1
MSK-A191_peak 2

A solution of tert-butyl (1-((1r,4r)-4-((2-(3-fluorophenyl)-1-((2-(trimethylsilyl)ethoxy)methyl)-1H-pyrrolo-[2,3-b]pyridin-4-yl)carbamoyl)cyclohexyl)ethyl)carbamate (110 mg, 178 μmol, 1.00 eq) in TFA (2 mL) and DCM (4 mL) was stirred at 20° C. After 1 h, the reaction mixture was concentrated under vacuum. The residue was dissolved in NH₃·H₂O (2 mL) and MeOH (4 mL), and the mixture was stirred for 1 h. The reaction mixture was concentrated under vacuum. The residue was purified by Prep-HPLC (column: Phenomenex Synergi C18 150*25*10 μm; water (0.05% HCl)-ACN and lyophilized to afford (1r,4r)-4-(1-aminoethyl)-N-(2-(3-fluorophenyl)-1H-pyrrolo[2,3-b]pyridin-4-yl)cyclohexanecarboxamide as a yellow solid.

Synthesis of MSK-A191_peak 1 (66.5 mg, 145 μmol, 81% yield, 2HCl salt) was confirmed by ¹H NMR and LC-MS, which showed the following data:

¹H NMR (400 MHz, DMSO-d₆) δ=13.06 (br s, 1H), 10.64 (s, 1H), 8.23 (d, J=6.0 Hz, 1H), 8.10 (d, J=6.0 Hz, 1H), 7.96 (br s, 3H), 7.81-7.73 (m, 2H), 7.70 (s, 1H), 7.57 (dt, J=6.4, 8.0 Hz, 1H), 7.25 (dt, J=2.0, 8.4 Hz, 1H), 3.12-3.01 (m, 1H), 2.82-2.71 (m, 1H), 2.06-1.97 (m, 2H), 1.91-1.79 (m, 2H), 1.59-1.37 (m, 3H), 1.22-1.06 (m, 5H).

LC-MS (ESI) m/z 381.1 [M+H]⁺.

Synthesis of MSK-A191_peak 2 (39.6 mg, 86.6 μmol, 53% yield, 2HCl salt) was confirmed by ¹H NMR and LC-MS, which showed the following data:

¹H NMR (400 MHz, DMSO-d₆) δ=13.17 (br s, 1H), 10.73 (s, 1H), 8.24 (d, J=6.4 Hz, 1H), 8.13 (d, J=6.4 Hz, 1H), 7.98 (br s, 3H), 7.83-7.70 (m, 3H), 7.58 (dt, J=6.4, 8.0 Hz, 1H), 7.25 (dt, J=2.0, 8.4 Hz, 1H), 3.12-3.00 (m, 1H), 2.85-2.72 (m, 1H), 2.07-1.97 (m, 2H), 1.90-1.79 (m, 2H), 1.60-1.37 (m, 3H), 1.22-1.05 (m, 5H).

LC-MS (ESI) m/z 381.1 [M+H]⁺.

Example 13. Further Compounds of the Present Technology

Utilizing similar procedures, purification protocols, and isolation protocols as discussed previously herein, compounds MSK-A178-(R), MSK-A178-(S), MSK-A201, MSK-A202, MSK-A203, MSK-A204, MSK-A205, MSK-A207, MSK-A208, MSK-A209, MSK-A210, and MSK-A211, MSK-A226, and MSK-A227 were provided. Representative characterization data for these compounds is provided below.

MSK-A178-(R) and MSK-A178-(S)

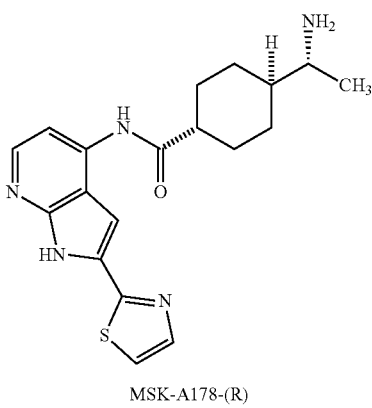

MSK-A178-(R)

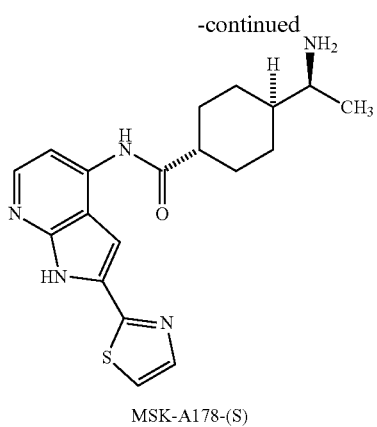

MSK-A178-(S)

¹H NMR (400 MHz, DMSO-d₆) δ=13.12 (s, 1H), 10.51 (s, 1H), 8.24 (d, J=6.0 Hz, 1H), 8.08 (d, J=6.0 Hz, 1H), 8.03-7.90 (m, 4H), 7.87 (d, J=3.2 Hz, 1H), 7.75 (s, 1H), 3.13-3.00 (m, 1H), 2.77-2.64 (m, 1H), 2.05-1.93 (m, 2H), 1.91-1.78 (m, 2H), 1.59-1.36 (m, 3H), 1.22-1.04 (m, 5H).

MSK-A201

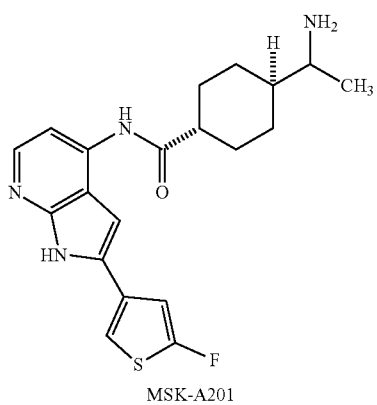

MSK-A201

¹H NMR (400 MHz, DMSO-d₆) δ=13.33 (s, 1H), 10.81 (s, 1H), 8.24-8.18 (m, 1H), 8.14 (d, J=6.4 Hz, 1H), 8.05 (br s, 3H), 7.63 (dd, J=2.0, 3.6 Hz, 1H), 7.52 (s, 1H), 7.22 (t, J=2.0 Hz, 1H), 3.11-2.98 (m, 1H), 2.84-2.72 (m, 1H), 2.06-1.93 (m, 2H), 1.90-1.77 (m, 2H), 1.59-1.34 (m, 3H), 1.21-1.05 (m, 5H). LC-MS (ESI) m/z 387.1 [M+H]⁺

MSK-A202

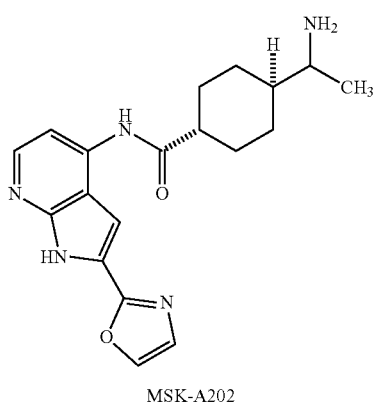

MSK-A202

¹H NMR (400 MHz, DMSO-d₆) δ=13.61 (br s, 1H), 10.94 (s, 1H), 8.36 (d, J=0.4 Hz, 1H), 8.33 (d, J=6.4 Hz, 1H), 8.21 (d, J=6.4 Hz, 1H), 8.06 (s, 3H), 7.98 (s, 1H), 7.52 (d, J=0.4 Hz, 1H), 3.11-3.01 (m, 1H), 2.87-2.77 (m, 1H), 2.07-1.95 (m, 2H), 1.90-1.79 (m, 2H), 1.60-1.49 (m, 1H), 1.49-1.36 (m, 2H), 1.22-1.05 (m, 5H). LC-MS (ESI) m/z 354.0 [M+H]⁺

MSK-A203

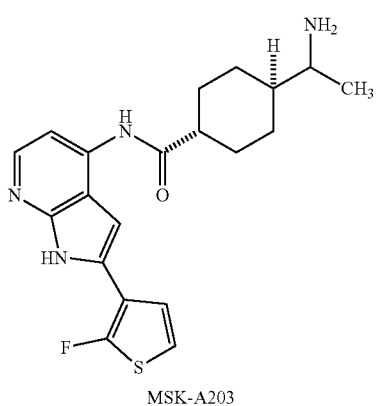

MSK-A203

¹H NMR (400 MHz, DMSO-d₆) δ=13.39 (s, 1H), 10.84 (s, 1H), 8.25 (s, 2H), 8.08 (s, 3H), 7.62 (s, 1H), 7.55 (dd, J=3.6, 6.0 Hz, 1H), 7.20 (dd, J=4.0, 6.0 Hz, 1H), 3.10-2.99 (m, 1H), 2.83-2.74 (m, 1H), 2.05-1.94 (m, 2H), 1.90-1.78 (m, 2H), 1.60-1.49 (m, 1H), 1.49-1.35 (m, 2H), 1.21-1.05 (m, 5H). LC-MS (ESI) m/z 387.1 [M+H]⁺

MSK-A204

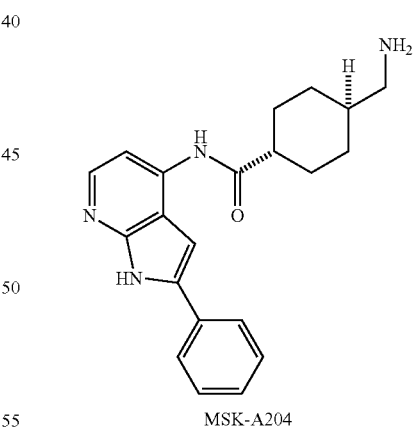

MSK-A204

¹H NMR (400 MHz, DMSO-d₆) δ=12.10 (s, 1H), 9.97 (s, 1H), 8.40 (s, 1H), 8.07 (d, J=5.6 Hz, 1H), 7.88 (d, J=7.6 Hz, 2H), 7.81 (d, J=5.6 Hz, 1H), 7.48 (t, J=7.6 Hz, 2H), 7.37-7.31 (m, 1H), 7.28-7.24 (m, 1H), 2.66-2.56 (m, 3H), 1.99-1.84 (m, 4H), 1.55-1.38 (m, 3H), 1.10-0.95 (m, 2H). LC-MS (ESI) m/z 349.2 [M+H]⁺

MSK-A205

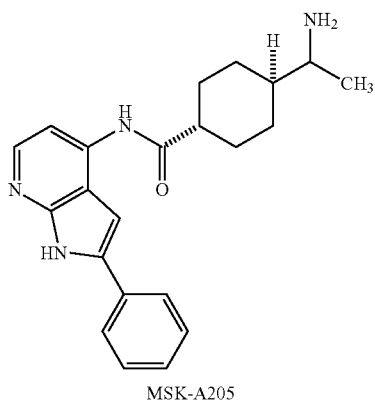
MSK-A205

$^1$H NMR (400 MHz, DMSO-d$_6$) δ=11.95 (s, 1H), 8.54-8.41 (m, 2H), 8.36 (dt, J=2.0, 3.6 Hz, 2H), 7.97 (s, 3H), 7.73-7.58 (m, 3H), 3.11-3.02 (m Hz, 1H), 2.89-2.76 (m, 1H), 2.17-2.03 (m, 2H), 1.92-1.77 (m, 2H), 1.60-1.36 (m, 3H), 1.25-1.04 (m, 5H). LC-MS (ESI) m/z 364.2 [M+H]$^+$

MSK-A207

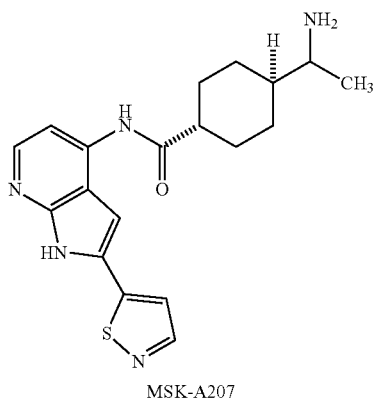
MSK-A207

$^1$H NMR (400 MHz, DMSO-d$_6$) δ=13.14 (s, 1H), 10.48 (s, 1H), 8.64 (d, J=1.6 Hz, 1H), 8.25 (d, J=6.0 Hz, 1H), 8.07 (d, J=6.0 Hz, 1H), 8.01-7.89 (m, 4H), 7.60 (s, 1H), 3.13-3.02 (m, 1H), 2.74-2.66 (m, 1H), 2.06-1.95 (m, 2H), 1.90-1.79 (m, 2H), 1.59-1.36 (m, 3H), 1.21-1.04 (m, 5H). LC-MS (ESI) m/z 370.1 [M+H]$^+$

MSK-A208

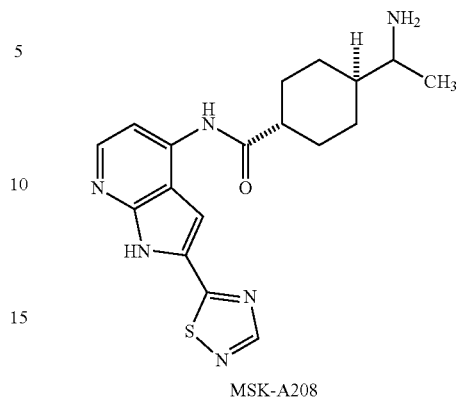
MSK-A208

$^1$H NMR (400 MHz, DMSO-d$_6$) δ=13.72 (s, 1H), 10.82 (s, 1H), 9.00 (s, 1H), 8.35 (d, J=6.0 Hz, 1H), 8.19-8.12 (m, 2H), 8.06 (br s, 3H), 3.11-2.98 (m, 1H), 2.83-2.72 (m, 1H), 2.05-1.95 (m, 2H), 1.90-1.79 (m, 2H), 1.60-1.49 (m, 1H), 1.49-1.36 (m, 2H), 1.26-1.05 (m, 5H). LC-MS (ESI) m/z 371.2 [M+H]$^+$

MSK-A209

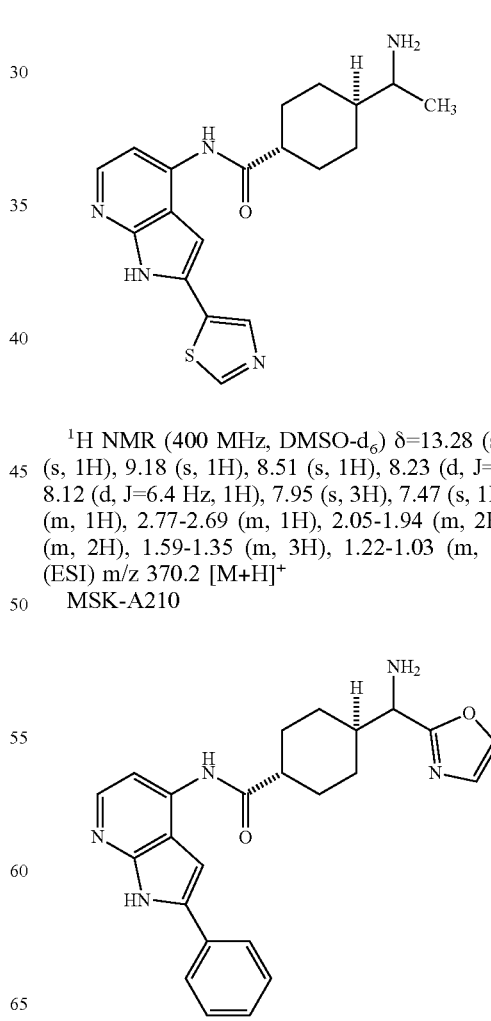

$^1$H NMR (400 MHz, DMSO-d$_6$) δ=13.28 (s, 1H), 10.56 (s, 1H), 9.18 (s, 1H), 8.51 (s, 1H), 8.23 (d, J=6.4 Hz, 1H), 8.12 (d, J=6.4 Hz, 1H), 7.95 (s, 3H), 7.47 (s, 1H), 3.13-2.99 (m, 1H), 2.77-2.69 (m, 1H), 2.05-1.94 (m, 2H), 1.91-1.77 (m, 2H), 1.59-1.35 (m, 3H), 1.22-1.03 (m, 5H). LC-MS (ESI) m/z 370.2 [M+H]$^+$

MSK-A210

¹H NMR (400 MHz, DMSO-d₆) δ=13.07 (s, 1H), 10.62 (s, 1H), 8.98-8.78 (m, 3H), 8.28 (s, 1H), 8.20 (d, J=6.4 Hz, 1H), 8.11 (d, J=6.4 Hz, 1H), 7.91 (d, J=7.2 Hz, 2H), 7.62 (s, 1H), 7.53 (t, J=7.6 Hz, 2H), 7.46-7.35 (m, 2H), 4.60-4.47 (m, 1H), 2.78-2.68 (m, 1H), 2.10-1.89 (m, 4H), 1.69-1.58 (m, 1H), 1.53-1.31 (m, 2H), 1.30-1.14 (m, 1H), 1.13-1.00 (m, 1H). LC-MS (ESI) m/z 416.2 [M+H]⁺

MSK-A211

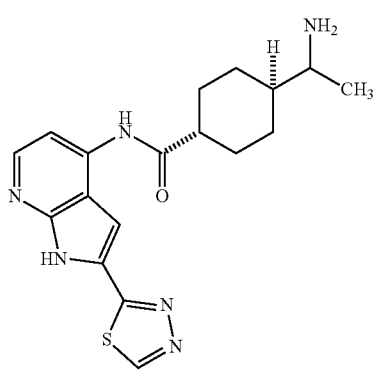

MSK-A211

¹H NMR (400 MHz, DMSO-d₆) δ=13.55 (br s, 1H), 10.76 (s, 1H), 9.69 (s, 1H), 8.31 (d, J=6.0 Hz, 1H), 8.14 (d, J=6.0 Hz, 1H), 8.10-7.92 (m, 4H), 3.13-2.96 (m, 1H), 2.85-2.70 (m, 1H), 2.09-1.93 (m, 2H), 1.92-1.77 (m, 2H), 1.60-1.33 (m, 3H), 1.27-1.04 (m, 5H). LC-MS (ESI) m/z 371.1 [M+H]⁺

MSK-A226

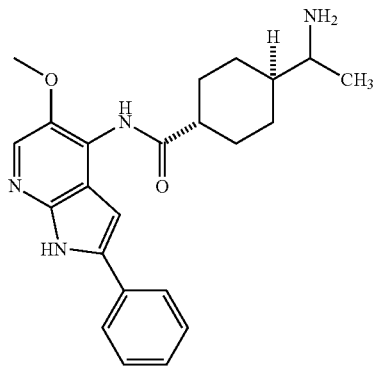

MSK-A226

¹H NMR (400 MHz, DMSO-d₆) δ=12.34 (s, 1H), 9.84 (s, 1H), 8.10 (s, 1H), 7.98 (s, 3H), 7.93-7.86 (m, 2H), 7.53-7.43 (m, 2H), 7.41-7.32 (m, 1H), 6.68 (d, J=2.0 Hz, 1H), 3.91 (s, 3H), 3.13-2.99 (m, 1H), 2.62-2.56 (m, 1H), 2.07-1.96 (m, 2H), 1.90-1.77 (m, 2H), 1.61-1.41 (m, 3H), 1.21-1.04 (m, 5H). LC-MS (ESI) m/z 393.2 [M+H]⁺

MSK-A227

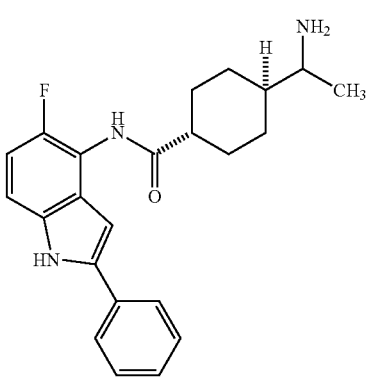

MSK-A227

¹H NMR (400 MHz, DMSO-d₆) δ=12.25 (s, 1H), 10.15 (s, 1H), 8.18 (d, J=3.2 Hz, 1H), 8.04 (s, 3H), 7.91 (d, J=7.6 Hz, 2H), 7.54-7.43 (m, 2H), 7.41-7.31 (m, 1H), 6.80 (d, J=2.0 Hz, 1H), 3.12-2.96 (m, 1H), 2.58-2.52 (m, 1H), 2.08-1.96 (m, 2H), 1.92-1.77 (m 2H), 1.62-1.36 (m, 3H), 1.26-1.05 (m, 5H). LC-MS (ESI) m/z 381.2 [M+H]⁺

Example 14. In Vitro Kinase Assay

In vitro kinase assays were performed as described below:

Recombinant His-tagged ULK1/Atg13 kinase complex was expressed in SH9 insect cells, and affinity-purified by Ni-NTA beads, aliquoted and stored at −80° C.

Compounds were dissolved in DMSO to make 10 mM stock solution, aliquoted and stored at −80° C.

1× kinase buffer was prepared: 20 mM Tris-HCl, pH7.5, 100 mM NaCl, 5 mM MgCl2, 0.5 mg/ml BSA, 5 mM DTT, 0.1% Tween-20.

For compound screening experiment, 1 μl of the 10 mM compound stock solution was added using P2.5 pipette into 99 μl 1×kinase buffer to make 100 μM working solution.

For compound titration experiment, 100 μM compound solution was further diluted (with 1×kinase buffer containing 1% DMSO) in a series manner.

30 mM MBP (Myelin basic protein) 1-20 peptide (sequence: ASQKRPSQRSKYLATASTMD; SEQ ID NO: 1) was prepared in 1× kinase buffer.

500 μM ATP was prepared in 1× kinase buffer.

Pre-incubation reactions were set up as shown in the Table below and pre-incubated for 10 min at room temperature.

|  | Pos | Neg | Test |
| --- | --- | --- | --- |
| 1x kinase buffer | 4 μl | 8 μl | 4 μl |
| 20 nM ULK1 | 4 μl | 0 μl | 4 μl |
| 30 mM MBP | 4 μl | 4 μl | 4 μl |
| Compound or DMSO control | 4 μl 1% DMSO | 4 μl 1% DMSO | 4 μl compound |
| TOTAL | 16 μl | 16 μl | 16 μl |

4 μl of 500 μM ATP was added to the pre-incubation reaction (thus the final reaction volume is 20 μl) and incubated for 75 min at room temperature.

20 μl Kinase-Glo Plus (Promega) was added to the reaction (warmed to RT), mixed well and incubated at room temperature for 15 min.

20 µl reaction was pipetted into each well of a white 384-well plate.

the 384-well plate was subjected to brief centrifugation, and luminescence was read in a plate reader.

Calculated inhibition (%) was calculated as follows:

$$\frac{(x - \text{neg control})}{(\text{pos control} - \text{neg control})} \times 100\%$$

Dose-inhibition % curve was prepared and $IC_{50}$ for the indicated compounds in Table 1 below was calculated using Prism.

TABLE 1

| Compound | Salt form | $IC_{50}$ (µM) |
|---|---|---|
| MSK-A091 | HCl | 2.2 |
| MSK-A157 | HCl | 0.073 |
| MSK-A170 | HCl | 0.018 |
| MSK-A171 | HCl | 1.45 |
| MSK-A172 | HCl | 0.11 |
| MSK-A173 | HCl | 0.63 |
| MSK-A176 | HCl | 0.005 |
| MSK-A177 | HCl | 0.054 |
| MSK-A178 | HCl | 0.047 |
| MSK-A180 | HCl | 2.384 |
| MSK-A181 | HCl | 0.515 |
| MSK-A182 | HCl | 0.0229 |
| MSK-A183 | HCl | 0.185 |
| MSK-A184 | TFA | 0.0189 |
| MSK-A185 | HCl | 0.0121 |
| MSK-A186 | HCl | 0.0298 |
| MSK-A187 | HCl | 0.0405 |
| MSK-A189 | HCl | 0.0183 |
| MSK-A190 | HCl | 0.0238 |
| MSK-A191 | HCl | 0.0206 |
| MSK-A192 | HCl | 0.0202 |
| MSK-A193 | HCl | 0.0263 |
| MSK-A194 | HCl | 0.0292 |
| MSK-A195 | HCl | 0.0156 |
| MSK-A196 | HCl | 0.0208 |
| MSK-A197 | HCl | 0.0257 |
| MSK-A188 | HCl | 0.0194 |
| MSK-A176-peak 1 | HCl | 0.0562 |
| MSK-A176-peak 2 | HCl | 0.0236 |
| MSK-A184_peak 1 | HCl | 0.0155 |
| MSK-A184_peak 2 | HCl | 0.0389 |
| MSK-A191_peak 1 | HCl | 0.0408 |
| MSK-A191_peak 2 | HCl | 0.0591 |
| MSK-A198 | HCl | 0.0433 |
| MSK-A199 | HCl | 0.109 |
| MSK-A200 | HCl | 0.0392 |
| MSK-A178_Peak 1 | HCl | 0.3525 |
| MSK-A178_Peak 2 | HCl | 0.0891 |
| MSK-A202 | HCl | 0.1559 |

These results indicated that the compounds of the present technology inhibit ULK1/Atg13 kinase activity in vitro. Accordingly, the compounds of the present technology are useful in the methods disclosed herein.

Example 15. Cellular ULK1 Activity Assay

Cellular ULK1 activity assay was performed as follows: $2*10^5$ HT1080 cells were seeded into each well of a 12-well plate.

The next day the cells were pre-treated with indicated concentration of compounds or DMSO control for 2 h.

1 µM Torin was added into each well and treated for another 2 h.

Cells were harvested and lysed in 100p RIPA buffer.

20 µl of cleared lysate was loaded for SDS-PAGE for western blot analysis.

Relative pAtg13-S318 level was detected to indicate cellular ULK1 activity.

Efficacy of different compounds at each tested concentration may be assessed by this method.

Example 16. Inhibition of Protein Kinase CDK7

Multiple compounds of the present technology, such as MSK-A182, MSK-A189, MSK-A184, MSK-A191, and MSK-A176, have been found to inhibit protein kinase CDK7 with low nM potency, and thus evidence the compounds of the present technology are also useful as therapeutic CDK7 inhibitors.

Figure 2:
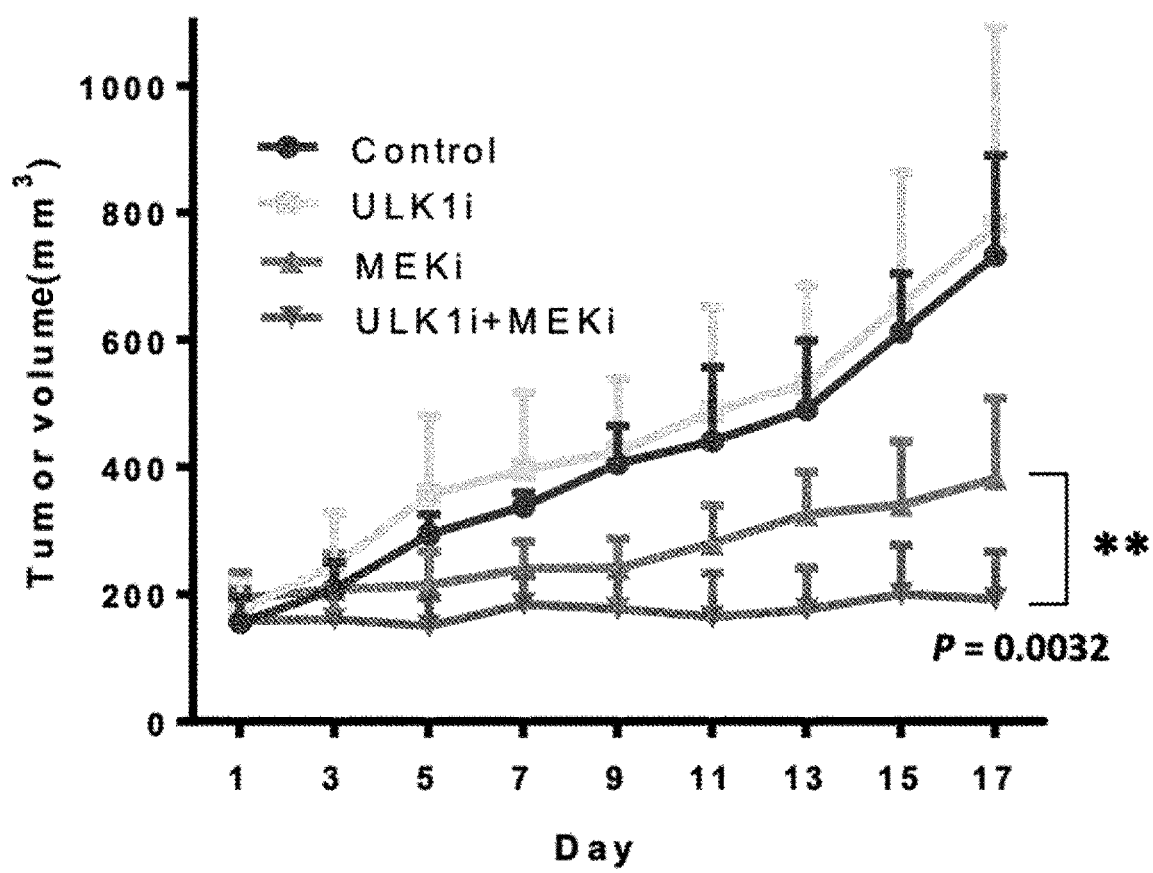
FIG. 2 provides the tumor volume over time for each group of the xenograft mouse model study that provided the data of FIG. 1, according to the working examples.

Example 17. Effects of Compounds of the Present Technology in MiaCaPa-2 Pancreatic Ductal Adenocarcinoma (PDAC) Cell Line Xenograft Mice Model Female athymic nude (Foxn1$^{nu}$) mice were implanted with $2 \times 10^6$ MiaCaPa-2 cancer cells per animal subcutaneously at the right flank. When tumors reached about 200 mm$^3$, the mice were randomly separated into 4 groups (n=5-7 per group): Group 1 ("Control") mice were treated 6 days a week, i.p., for 17 days with dosing vehicle (10% DMSO and 10% 2-hydroxypropyl-β-cyclodextrin in water); Group 2 ("ULK1i") mice were treated 6 days a week, i.p., for 17 days with a compound of the present technology (MSK-A170-PEAK2), 10 mg/kg; Group 3 ("MEKi") mice were treated 6 days a week, i.p., for 17 days with MEK1 inhibitor trametinib (Selleckchem, Houston, TX), 0.5 mg/Kg; Group 4 ("ULKi+MEKi") mice were treated 6 days a week, i.p., for 17 days with a combination of MSK-A170-PEAK2, 10 mg/kg, and trametinib, 0.5 mg/kg. The tumor volume was measured on 1, 3, 5, 7, 9, 11, 13, 15, and 17. Mice were sacrificed on day 17, and final tumors were weighted. FIG. 1 shows the weights of the final tumors (i.e., on day 17) in the mice of each group. FIG. 2 illustrates the tumor volume over time in the mice of each group. As illustrated by the data, significantly improved results were observed via treatment with a combination of MSK-A170-PEAK2 and trametinib over treatment with trametinib alone.

While certain embodiments have been illustrated and described, a person with ordinary skill in the art, after reading the foregoing specification, can effect changes, substitutions of equivalents and other types of alterations to the compounds of the present technology or salts, pharmaceutical compositions, derivatives, prodrugs, metabolites, tautomers or racemic mixtures thereof as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A compound of Formula I:

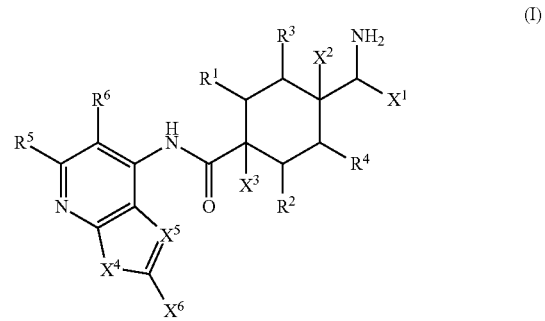

or a pharmaceutically acceptable salt and/or solvate thereof, wherein $R^1$ and $R^2$ are each independently H, or $R^1$ and $R^2$ together are a bond;

$R^3$ and $R^4$ are each independently H, or $R^3$ and $R^4$ together are a bond;

$R^5$ and $R^6$ are each independently H, alkyl, O-alkyl, $CO_2H$, $CO_2$-alkyl, halogen, or cyano;

$X^1$ is H, Me, $CO_2$-alkyl, or heteroaryl;

$X^2$ is H or Me;

$X^3$ is H or Me;

$X^4$ is NH or O;

$X^5$ is CH or N; and $X^6$ is H, aryl, or heteroaryl.

B. The compound of Paragraph A, wherein $X^6$ is substituted phenyl, unsubstituted phenyl, or heteroaryl.

C. The compound of Paragraph A or Paragraph B, wherein $X^6$ is

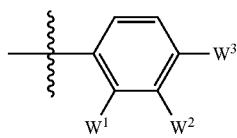

where $W^1$, $W^2$, and $W^3$ are each independently H, Cl, Br, F, Me, cyclopropyl, $CF_3$, OMe, or CN.

D. The compound of any one of Paragraphs A-C, wherein $R^1$ and $R^2$ are each independently H.

E. The compound of any one of Paragraphs A-D, wherein $R^3$ and $R^4$ are each independently H.

F. The compound of any one of Paragraphs A-E, wherein $R^1$, $R^2$, $R^3$, and $R^4$ are each independently H.

G. The compound of any one of Paragraphs A-F, wherein the compound is of the Formula IA

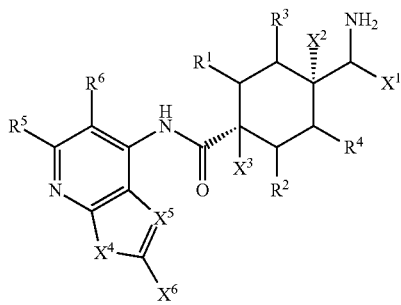 (IA)

or a pharmaceutically acceptable salt and/or solvate thereof.

H. The compound of any one of Paragraphs A-G, wherein the compound is of the Formula IB

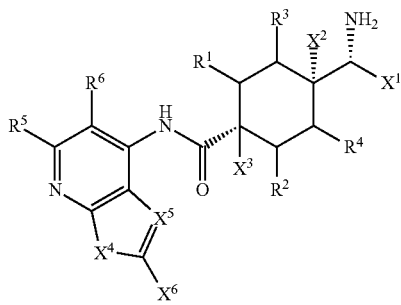 (IB)

or a pharmaceutically acceptable salt and/or solvate thereof, wherein $X^1$ is Me, $CO_2$-alkyl, or heteroaryl.

I. The compound of any one of Paragraphs A-G, wherein the compound is of the Formula IC

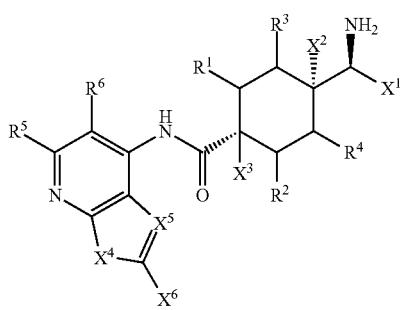 (IC)

or a pharmaceutically acceptable salt and/or solvate thereof, wherein $X^1$ is Me, $CO_2$-alkyl, or heteroaryl.

J. The compound of any one of Paragraphs A-I, wherein the compound is

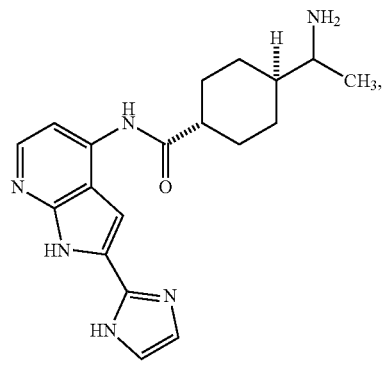 MSK-A157

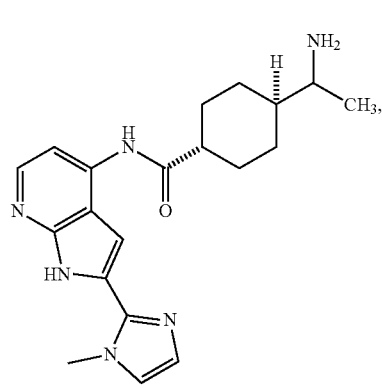 MSK-A171

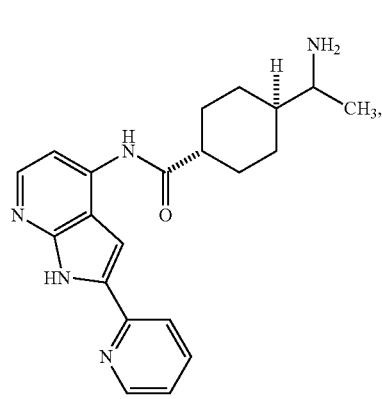 MSK-A172

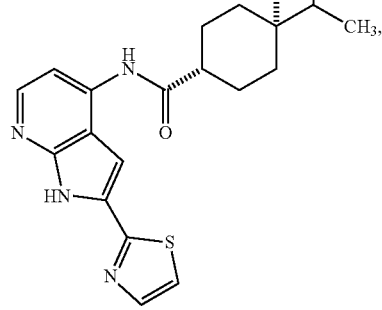 MSK-A178

MSK-A180
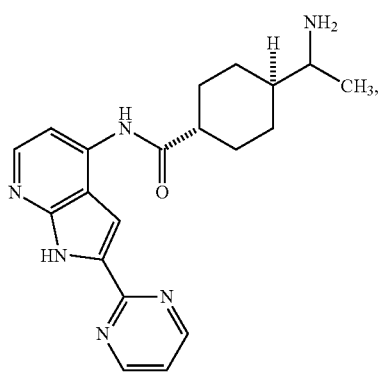
MSK-A181
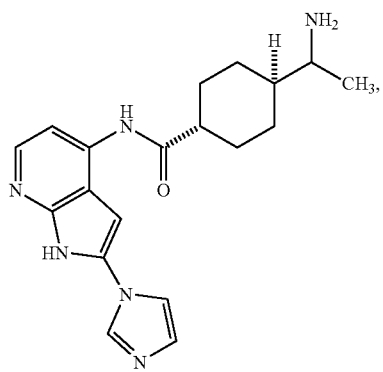
MSK-A199
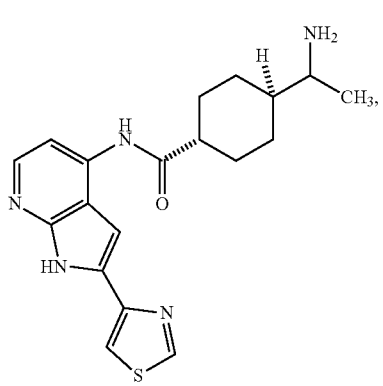
MSK-A170-(R)
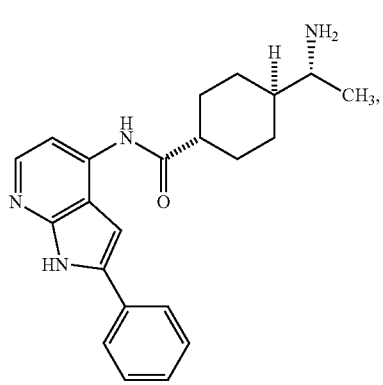
MSK-A202
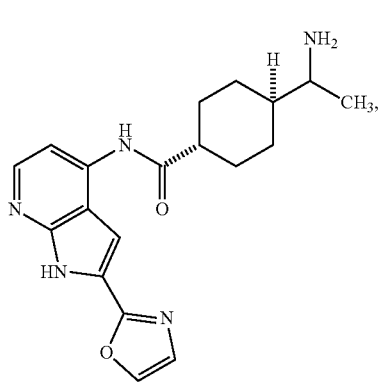
MSK-A170-(S)
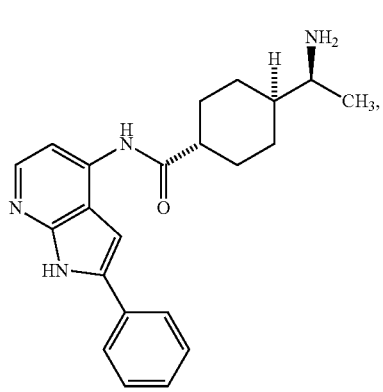
MSK-A173
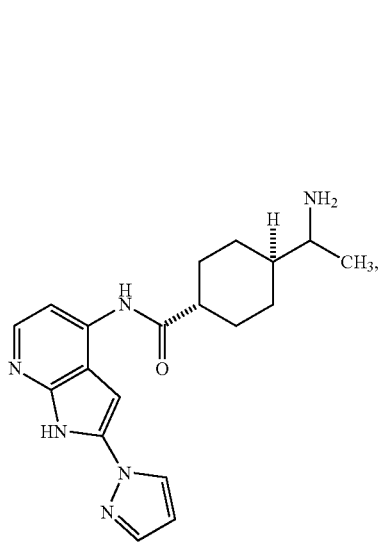
MSK-A182
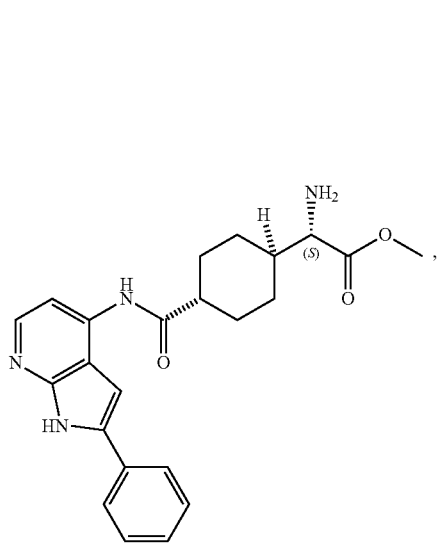

-continued
MSK-A183
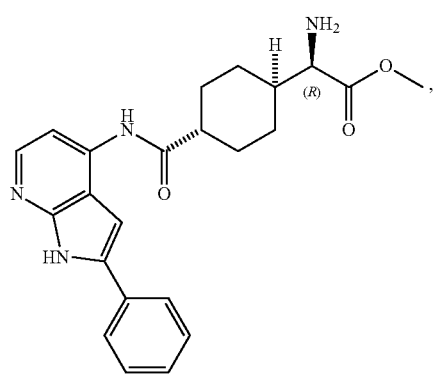
MSK-A176-(R)
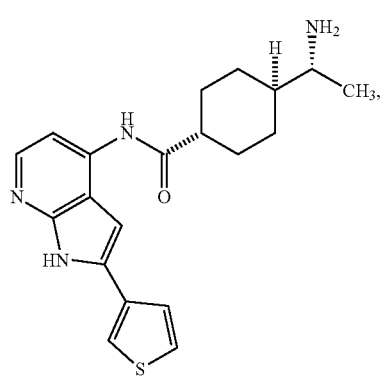
MSK-A176-(S)
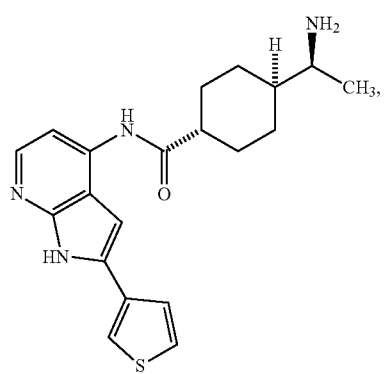
MSK-A178-(R)
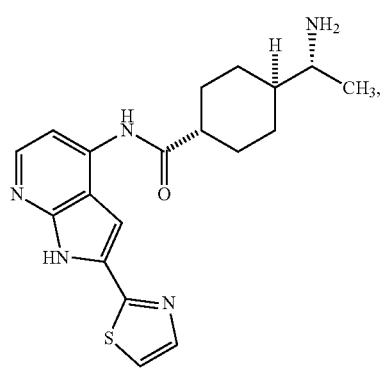
MSK-A178-(S)
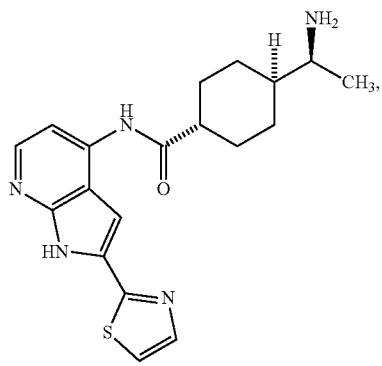
MSK-A184-(R)
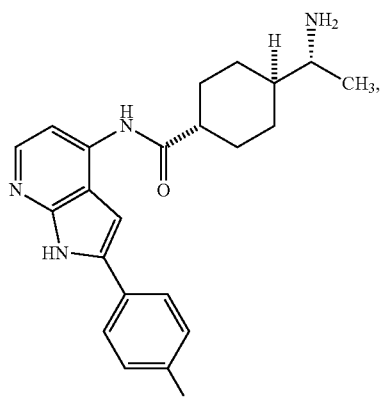
MSK-A184-(S)
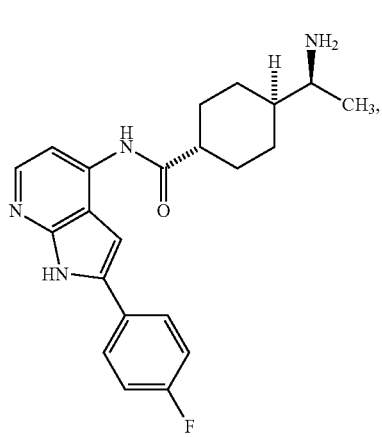
MSK-A177
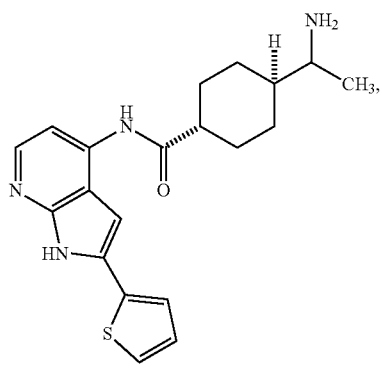

MSK-A198
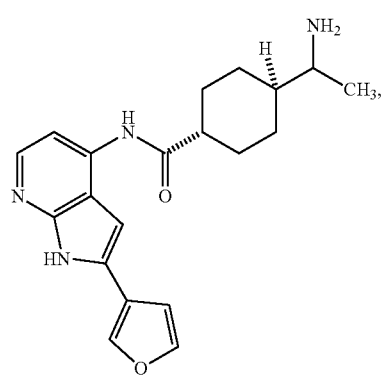
MSK-A188
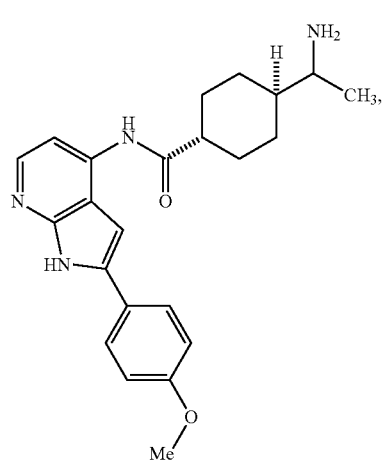
MSK-A185
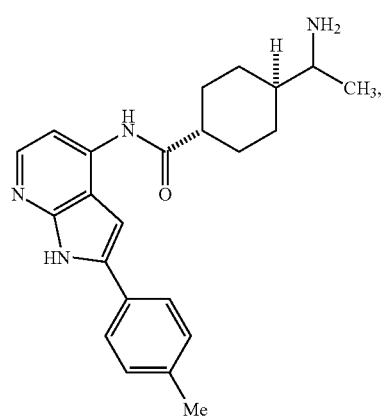
MSK-A189
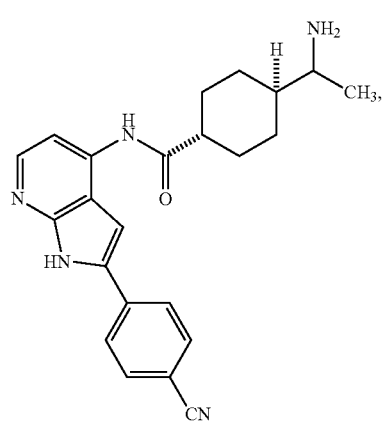
MSK-A186
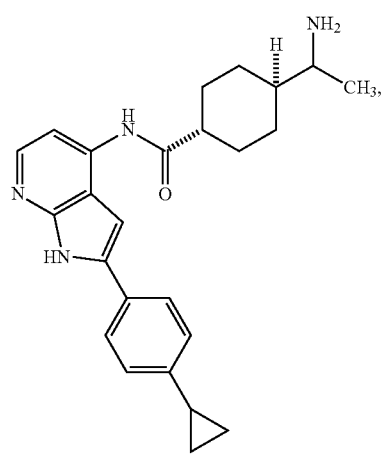
MSK-A187
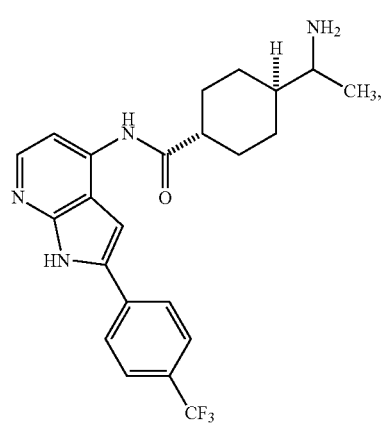
MSK-A190
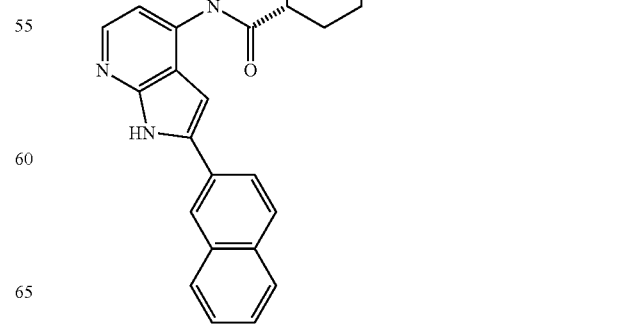

-continued
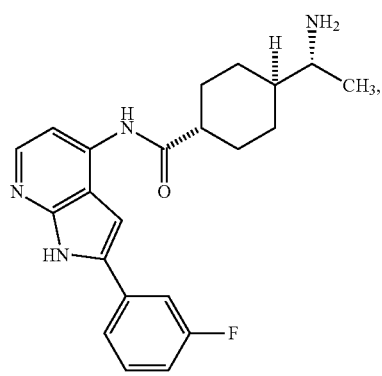
MSK-A191-(R)
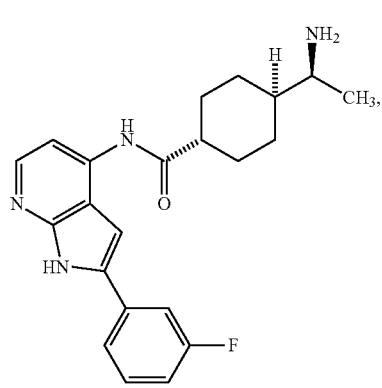
MSK-A191-(S)
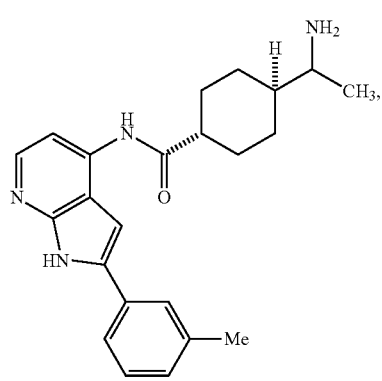
MSK-A192
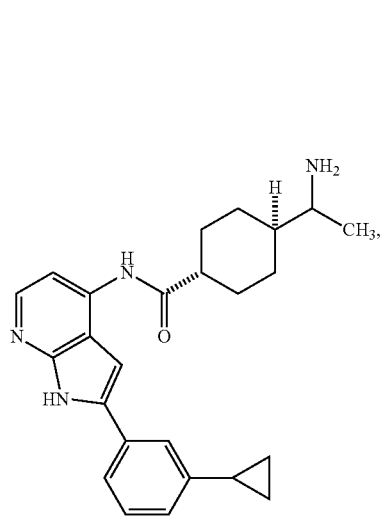
MSK-A193
-continued
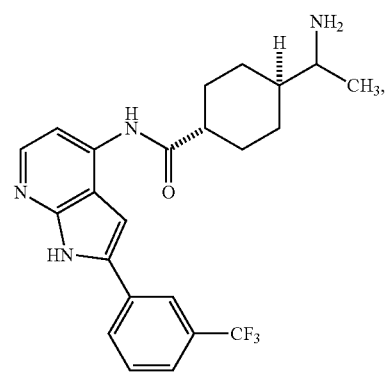
MSK-A194
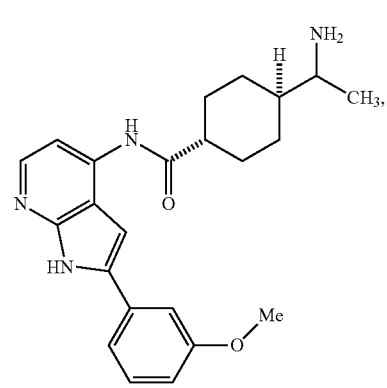
MSK-A195
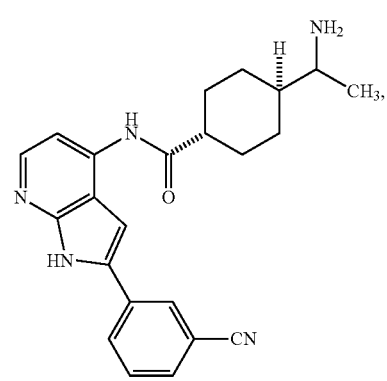
MSK-A196
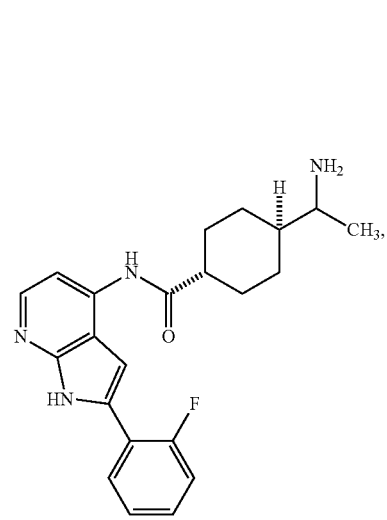
MSK-A197

-continued
MSK-A200
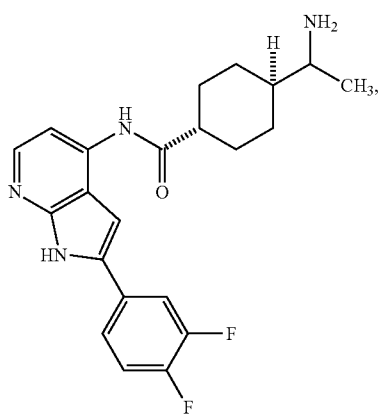
MSK-A201
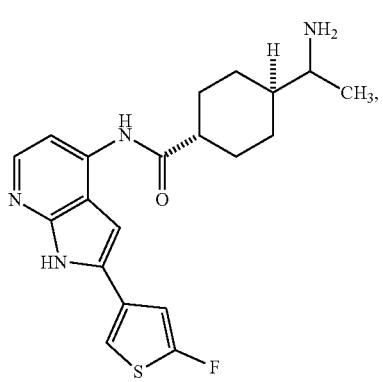
MSK-A202
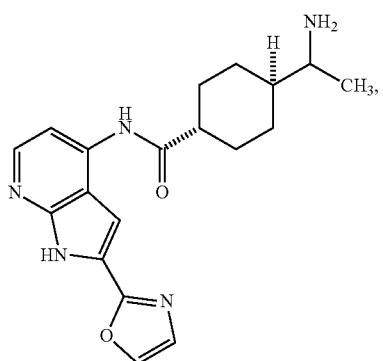
MSK-A203
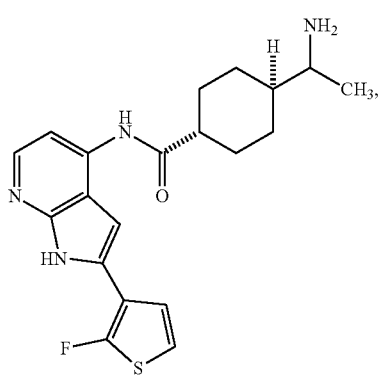
-continued
MSK-A204
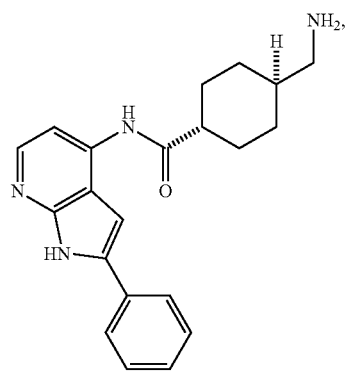
MSK-A205
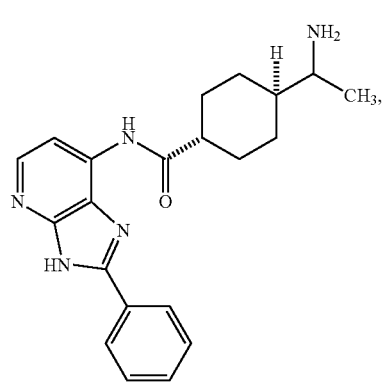
MSK-A207
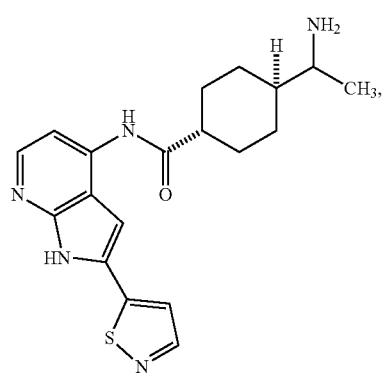
MSK-A208
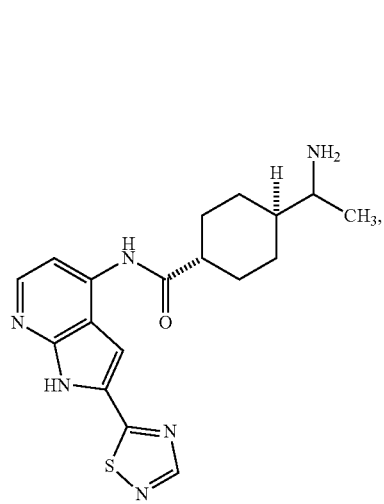

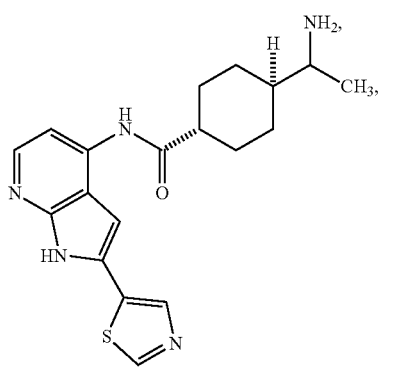

MSK-A209

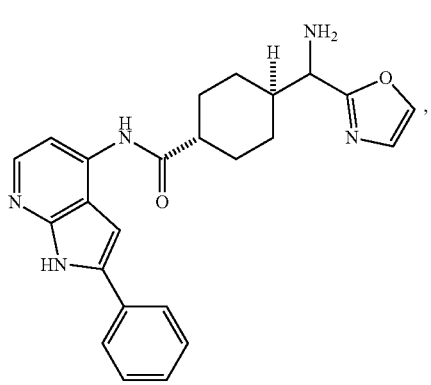

MSK-A210

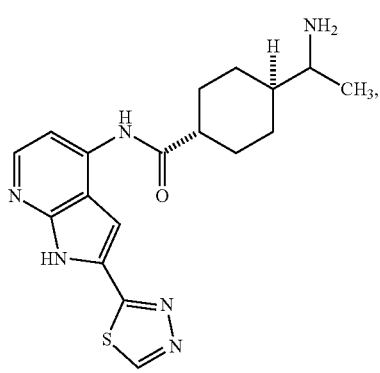

MSK-A211

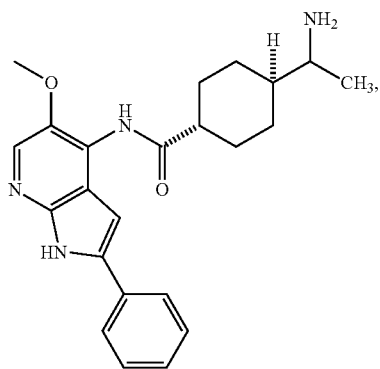

MSK-A226

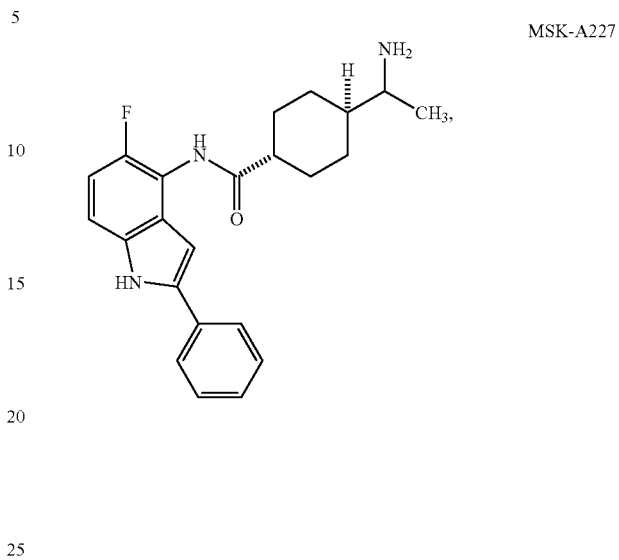

MSK-A227 or a pharmaceutically acceptable salt and/or solvate thereof.

K. A composition comprising a compound of any one of Paragraphs A-J and a pharmaceutically acceptable carrier.

L. A pharmaceutical composition comprising an effective amount of a compound of any one of Paragraphs A-J for treating cancer in a subject, and a pharmaceutically acceptable carrier.

M. A method comprising administering an effective amount of a compound of any one of Paragraphs A-J for treating cancer to a subject in need thereof.

N. The method of Paragraph M, wherein the administering further comprises administration of an effective amount of a MEK inhibitor.

O. The method of Paragraph M or Paragraph N, wherein the administering further comprises administration of an effective amount of trametinib, cobimetinib, binimetinib, selumetinib, or a combination of any two or more thereof.

P. The method of any one of Paragraphs M-O, wherein the subject is suffering from one or more of nasopharyngeal carcinoma, oesophageal squamous cell carcinoma, colorectal cancer, hepatocellular carcinoma, glioblastoma, lung cancer, non-small cell lung cancer, renal carcinonma, renal clear cell carcinonma, pancreatic cancer, and breast cancer.

Q. A method of inhibiting ULK1, the method comprising contacting ULK1 with a compound of any one of Paragraphs A-J.

R. The method of Paragraph Q, wherein the contacting comprises contacting a cell not within a patient.

S. The method of Paragraph R, wherein the cell is a nasopharyngeal carcinoma cell, oesophageal squamous cell carcinoma cell, colorectal cancer cell, hepatocellular carcinoma cell, glioblastoma cell, lung cancer cell, non-small cell lung cancer cell, renal carcinonma cell, renal clear cell carcinonma cell, pancreatic cancer cell, or breast cancer cell.

Other embodiments are set forth in the following claims, along with the full scope of equivalents to which such claims are entitled.

What is claimed is:

1. A compound of Formula I:

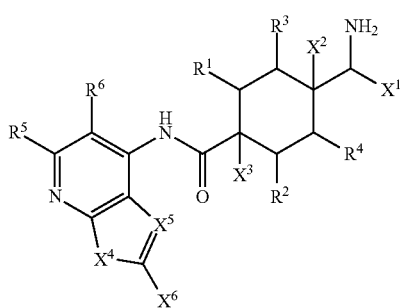

or a pharmaceutically acceptable salt and/or solvate thereof, wherein
   $R^1$ and $R^2$ are each independently H, or $R^1$ and $R^2$ together are a bond;
   $R^3$ and $R^4$ are each independently H, or $R^3$ and $R^4$ together are a bond;
   $R^5$ and $R^6$ are each independently H, alkyl, O-alkyl, $CO_2H$, $CO_2$-alkyl, halogen, or cyano;
   $X^1$ is H, Me, $CO_2$-alkyl, or heteroaryl;
   $X^2$ is H or Me;
   $X^3$ is H or Me;
   $X^4$ is NH or O;
   $X^5$ is CH or N; and
   $X^6$ is aryl or heteroaryl.

2. The compound of claim 1, wherein $X^6$ is substituted phenyl, unsubstituted phenyl, or heteroaryl.

3. The compound of claim 1, wherein $X^6$ is

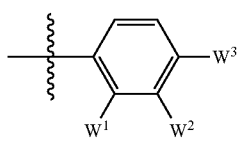

where $W^1$, $W^2$, and $W^3$ are each independently H, Cl, Br, F, Me, cyclopropyl, $CF_3$, OMe, or CN.

4. The compound of claim 1, wherein $R^1$ and $R^2$ are each independently H.

5. The compound of claim 1, wherein $R^3$ and $R^4$ are each independently H.

6. The compound of claim 1, wherein $R^1$, $R^2$, $R^3$, and $R^4$ are each independently H.

7. The compound of claim 1, wherein the compound is of Formula IA

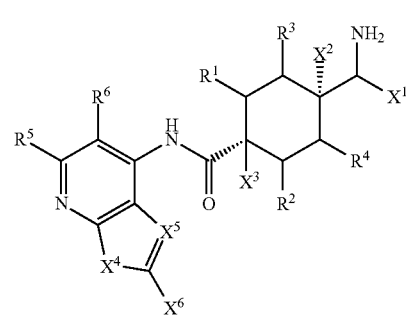

or a pharmaceutically acceptable salt and/or solvate thereof.

8. The compound of claim 1, wherein the compound is of Formula IB

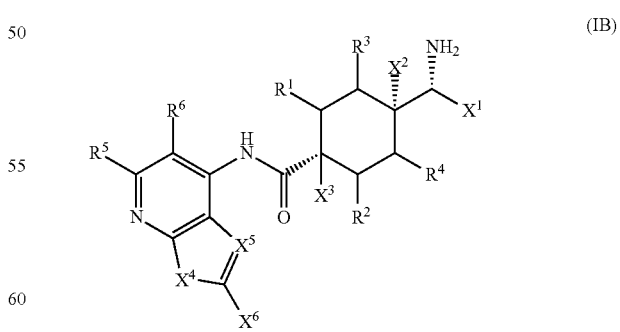

or a pharmaceutically acceptable salt and/or solvate thereof, wherein $X^1$ is Me, $CO_2$-alkyl, or heteroaryl.

9. The compound of claim 1, wherein the compound is of Formula IC
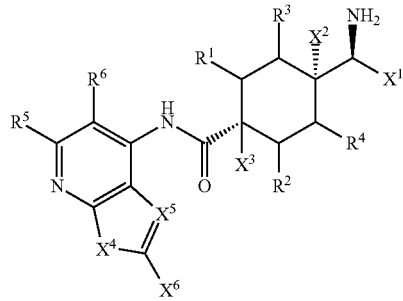
(IC)
or a pharmaceutically acceptable salt and/or solvate thereof, wherein $X^1$ is Me, $CO_2$-alkyl, or heteroaryl.
10. The compound of claim 1, wherein the compound is
MSK-A157
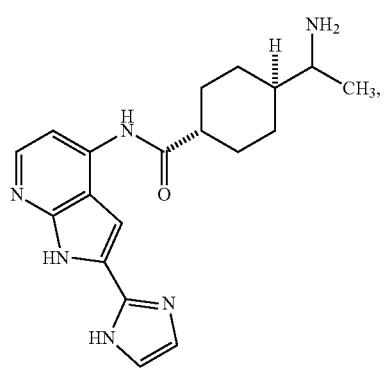
MSK-A171
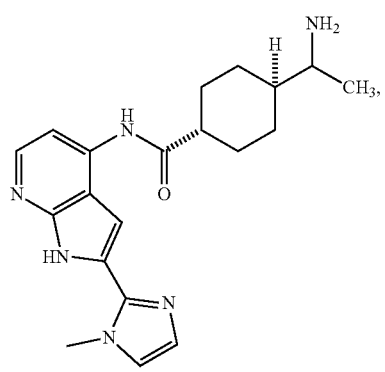
MSK-A172
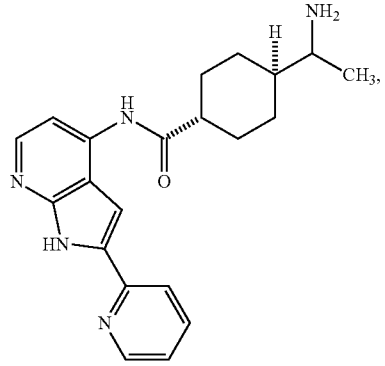
-continued
MSK-A178
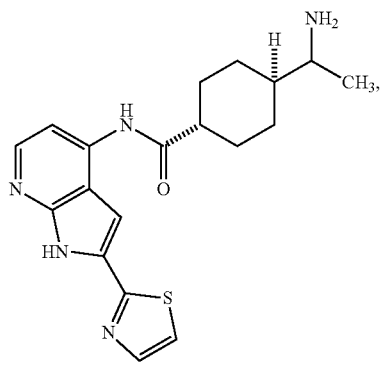
MSK-A180
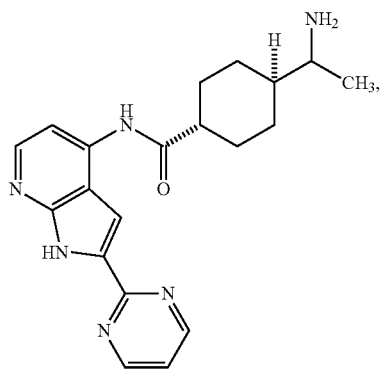
MSK-A199
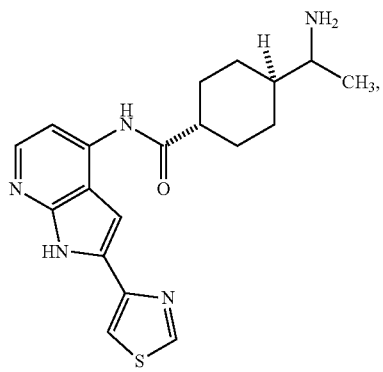
MSK-A202
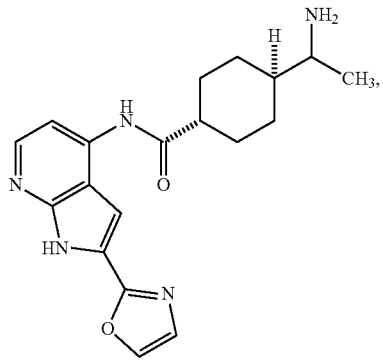

MSK-A173
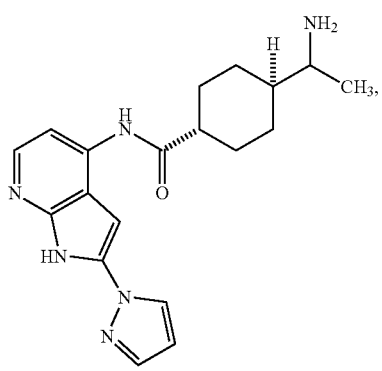
MSK-A182
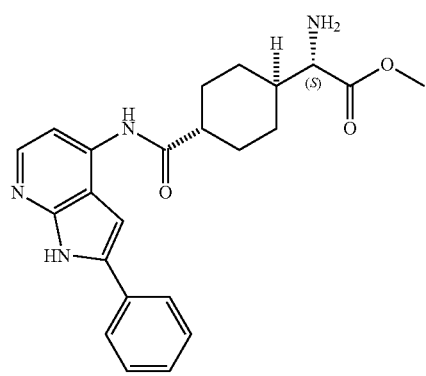
MSK-A181
MSK-A183
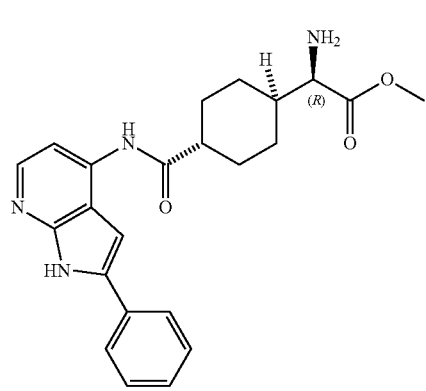
MSK-A170-(R)
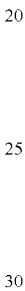
MSK-A176-(R)
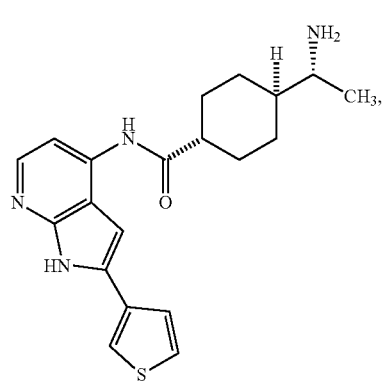
MSK-A170-(S)
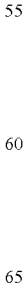
MSK-A176-(S)
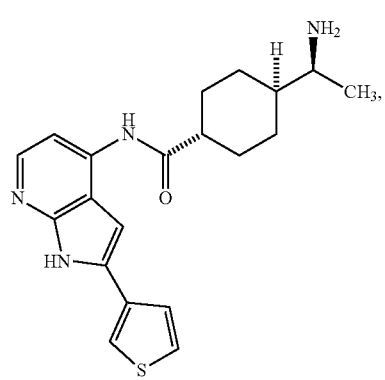

MSK-A178-(R)
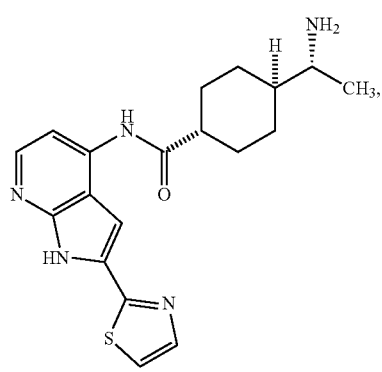
MSK-A178-(S)
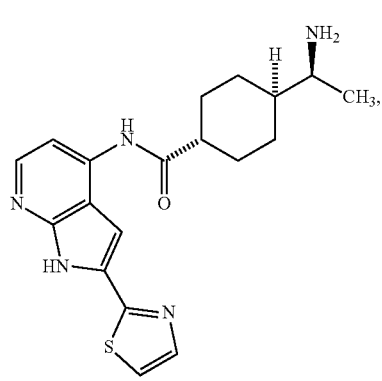
MSK-A184-(R)
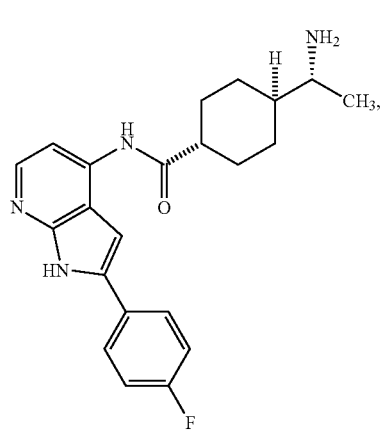
MSK-A184-(S)
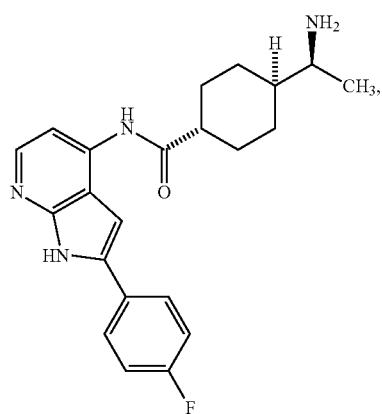
MSK-A177
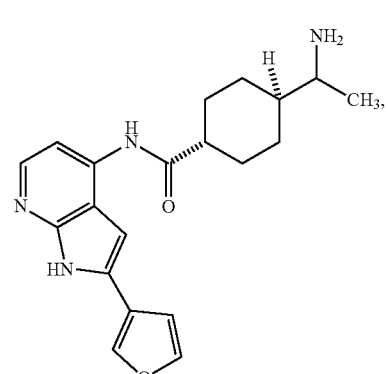
MSK-A198
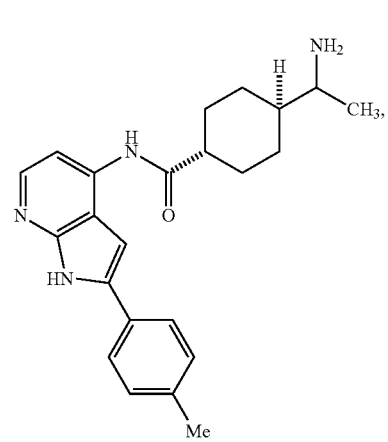
MSK-A185
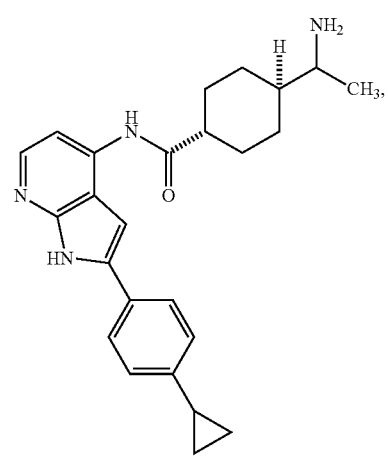
MSK-A186
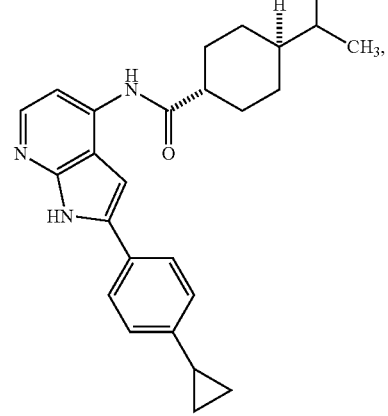

-continued
MSK-A187
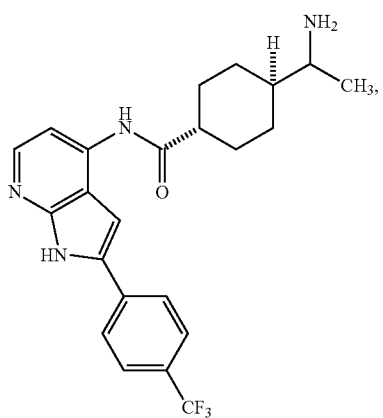
MSK-A188
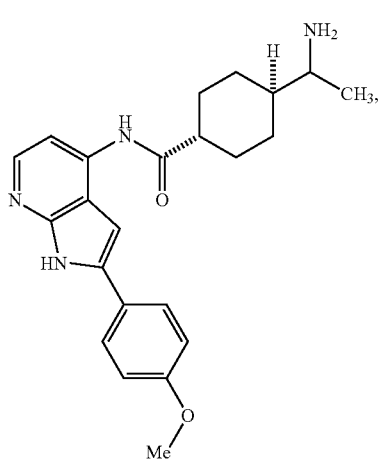
MSK-A189
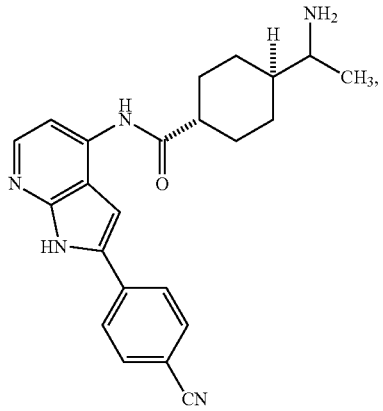
-continued
MSK-A190
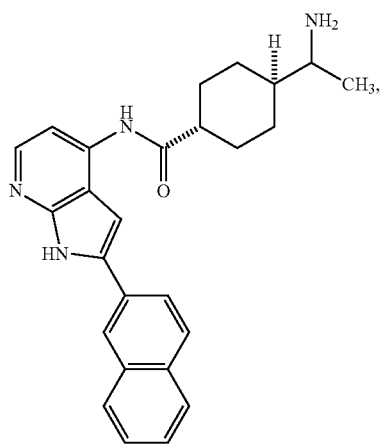
MSK-A191-(R)
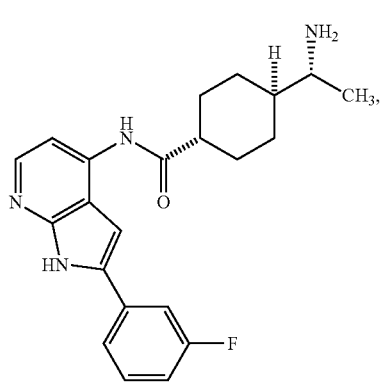
MSK-A191-(S)
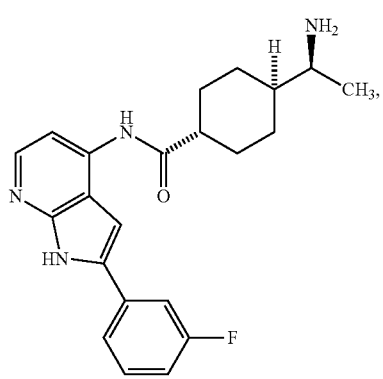
MSK-A192
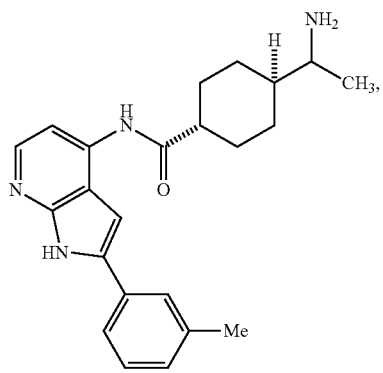

MSK-A193
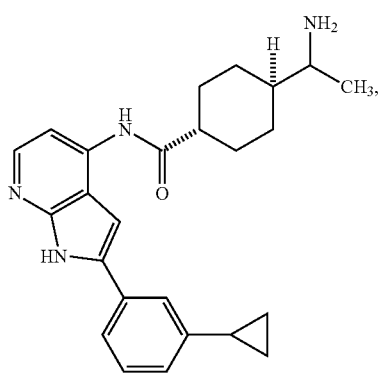
MSK-A194
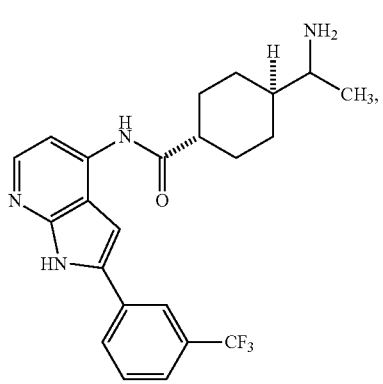
MSK-A195
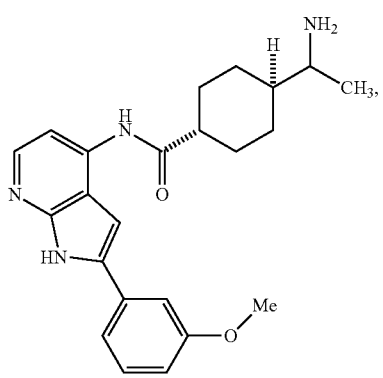
MSK-A196
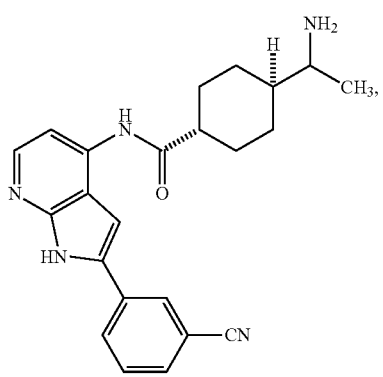
MSK-A197
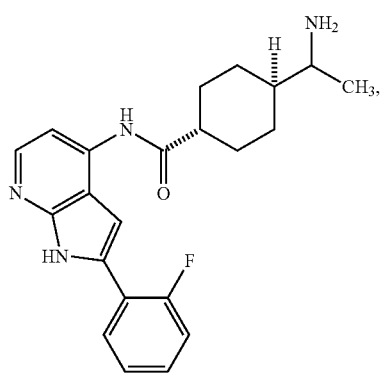
MSK-A200
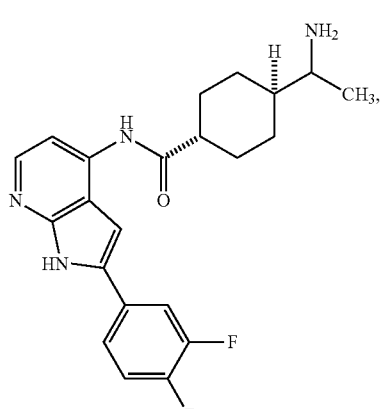
MSK-A201
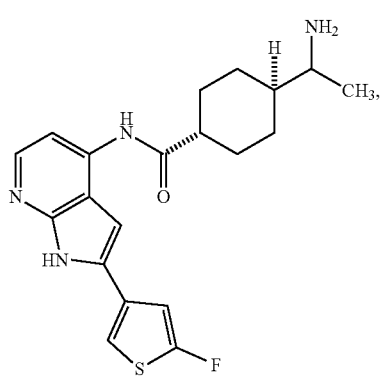
MSK-A202
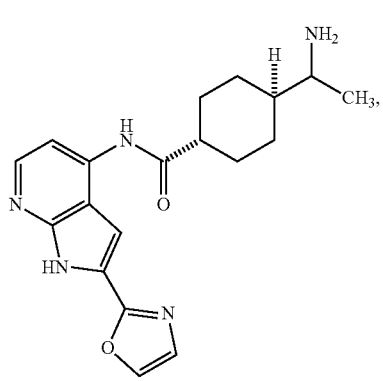

MSK-A203
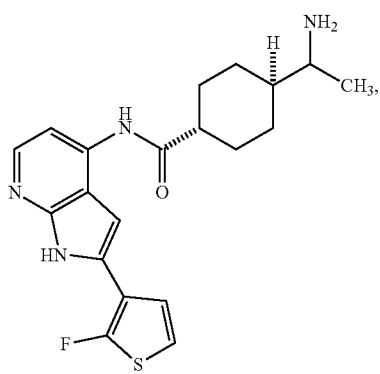
MSK-A204
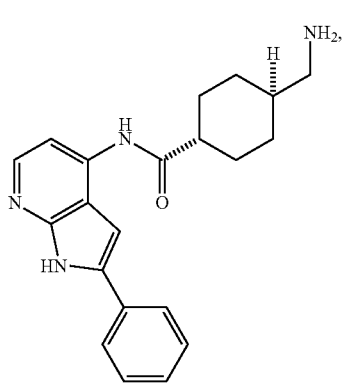
MSK-A205
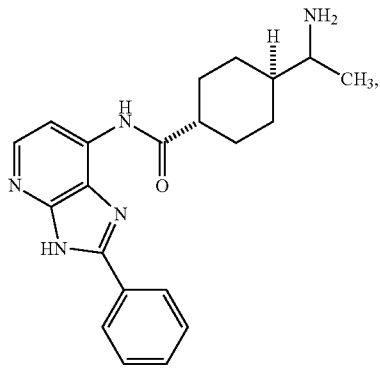
MSK-A208
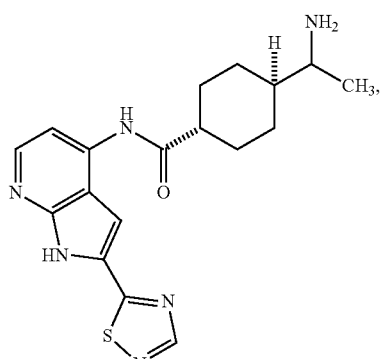
MSK-A209
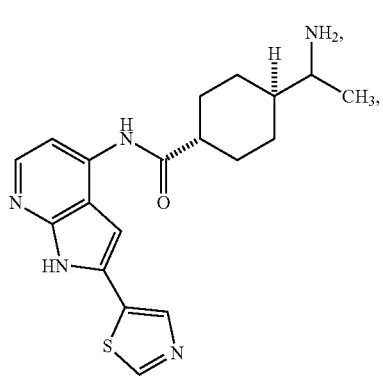
MSK-A210
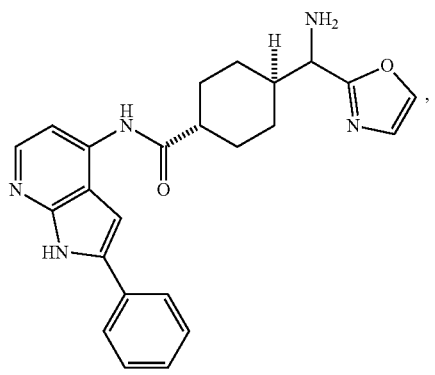
MSK-A207
MSK-A211
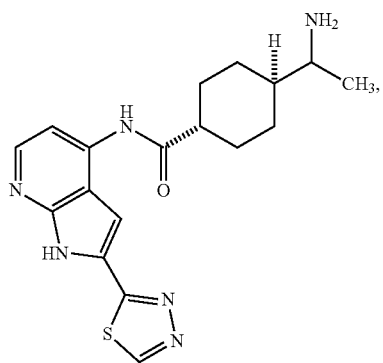

-continued

MSK-A226

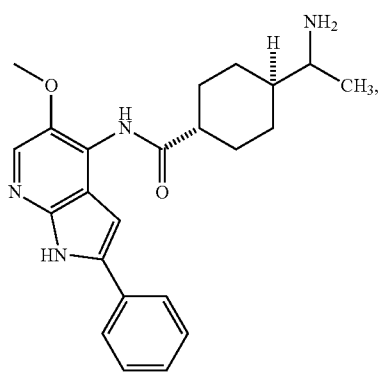

MSK-A227

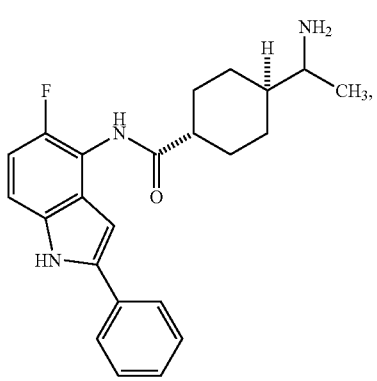

or a pharmaceutically acceptable salt and/or solvate thereof.

11. A composition comprising a compound of claim 1 and a pharmaceutically acceptable carrier.

12. A pharmaceutical composition comprising an effective amount of a compound of claim 1 for treating cancer in a subject, and a pharmaceutically acceptable carrier.

13. A method comprising administering an effective amount of a compound of claim 1 for treating cancer to a subject in need thereof, wherein the subject is suffering from one or more of nasopharyngeal carcinoma, oesophageal squamous cell carcinoma, colorectal cancer, hepatocellular carcinoma, glioblastoma, lung cancer, non-small cell lung cancer, renal carcinoma, renal clear cell carcinoma, pancreatic cancer, and breast cancer.

14. The method of claim 13, wherein the administering further comprises administration of an effective amount of a MEK inhibitor.

15. The method of claim 13, wherein the administering further comprises administration of an effective amount of trametinib, cobimetinib, binimetinib, selumetinib, or a combination of any two or more thereof.

16. A method of inhibiting ULK1, the method comprising contacting ULK1 with a compound of claim 1.

17. The method of claim 16, wherein the contacting comprises contacting a cell not within a patient.

18. The method of claim 17, wherein the cell is a nasopharyngeal carcinoma cell, oesophageal squamous cell carcinoma cell, colorectal cancer cell, hepatocellular carcinoma cell, glioblastoma cell, lung cancer cell, non-small cell lung cancer cell, renal carcinoma cell, renal clear cell carcinoma cell, pancreatic cancer cell, or breast cancer cell.

* * * * *

SEQUENCE LISTING

```
<160> NUMBER OF SEQ ID NOS: 1

<210> SEQ ID NO 1
<211> LENGTH: 20
<212> TYPE: PRT
<213> ORGANISM: Unknown
<220> FEATURE:
<223> OTHER INFORMATION: Description of Unknown:
      Myelin basic protein sequence

<400> SEQUENCE: 1

Ala Ser Gln Lys Arg Pro Ser Gln Arg Ser Lys Tyr Leu Ala Thr Ala
1               5                   10                  15

Ser Thr Met Asp
            20
```